United States Patent [19]

Ohta et al.

[11] Patent Number: 4,819,186

[45] Date of Patent: Apr. 4, 1989

[54] WAVEFORM GENERATING APPARATUS FOR DRIVING LIQUID CRYSTAL DEVICE

[75] Inventors: Morio Ohta; Hideaki Inoue, both of Tokyo, Japan

[73] Assignees: Casio Computer Co., Ltd.; Casio Electronics Manufacturing Co., Ltd., Tokyo, Japan

[21] Appl. No.: 148,424

[22] Filed: Jan. 25, 1988

[30] Foreign Application Priority Data

| | | | |
|---|---|---|---|
| Jan. 30, 1987 | [JP] | Japan | 62-21587 |
| Feb. 17, 1987 | [JP] | Japan | 62-35294 |
| May 7, 1987 | [JP] | Japan | 62-111468 |
| May 19, 1987 | [JP] | Japan | 62-123146 |
| Oct. 6, 1987 | [JP] | Japan | 62-253212 |

[51] Int. Cl.[4] .......... G06F 15/66

[52] U.S. Cl. .......... 364/519; 350/332

[58] Field of Search .......... 364/518–519; 350/332, 333; 346/154, 160, 107 R, 108; 358/78, 290, 302

[56] References Cited

U.S. PATENT DOCUMENTS

| | | | |
|---|---|---|---|
| 4,745,560 | 5/1988 | Decker et al. | 364/519 |
| 4,748,444 | 5/1988 | Arai | 350/332 |

*Primary Examiner*—Arthur G. Evans

*Attorney, Agent, or Firm*—Nixon & Vanderhye

[57] ABSTRACT

A waveform generating apparatus for driving a liquid crystal device has a memory for storing waveform data for designating a drive waveform of the liquid crystal device and duration data for designating a duration for which the drive waveform designated by the waveform data is to be supplied, and for outputting the waveform data and the duration data in accordance with an input address designation signal. The apparatus also has a macro decoder for receiving the waveform data output from the memory and a clock signal having a predetermined period and a predetermined phase, and outputting a plurality of drive waveforms designated by the waveform data from corresponding output terminals, thereby generating predetermined waveforms.

19 Claims, 89 Drawing Sheets

| BLADR | | DSTATUS 7 | 6 | 5 | 4 | 3 | 2 | 1 | 0 |
|---|---|---|---|---|---|---|---|---|---|
| 0 | DST(0) | 0 | 0 | 0 | 0 | 0 | 1 | 1 | 0 |
| 1 | DST(1) | 0 | 0 | 0 | 0 | 1 | 0 | 1 | 1 |
| 2 | DST(2) | 0 | 0 | 0 | 0 | 0 | 1 | 1 | 0 |
| 3 | DST(3) | 0 | 0 | 0 | 0 | 1 | 0 | 1 | 1 |
| 4 | DST(4) | 0 | 0 | 0 | 0 | 0 | 1 | 1 | 0 |
| $\ell$-2 | DST($\ell$-2) | 0 | 0 | 0 | 0 | 0 | 1 | 1 | 0 |
| $\ell$-1 | DST($\ell$-1) | 0 | 0 | 0 | 0 | 1 | 0 | 1 | 1 |
| $\ell$ | DST($\ell$) | 0 | 0 | 0 | 0 | 0 | 1 | 0 | 0 |
| n-3 | DST(n-3) | 0 | 0 | 1 | 1 | 0 | 1 | 0 | 0 |
| n-2 | DST(n-2) | 0 | 0 | 1 | 1 | 1 | 1 | 0 | 0 |
| n-1 | DST(n-1) | 1 | 1 | 1 | 1 | 0 | 1 | 0 | 0 |

FIG. 3

FIG. 7

| BLADR | DSTATUS 7 6 5 4 | 3 2 1 0 |
|---|---|---|
| 0 | ST (0) | |
| 1 | MAC (1) | MAC (0) |
| 2 | ST (2) | |
| 3 | MAC (3) | MAC (2) |
| 2x | ST (2x) | |
| 2x+1 | MAC(2x+1) | MAC(2x) |
| n-2 | ST(n-2) | |
| n-1 | MAC(n-1) | MAC(n-2) |

FIG. 8

| | | |
|---|---|---|
| 0 | 53 | |
| 1 | 3 | 2 |
| 2 | 53 | |
| 3 | 1 | 0 |
| 4 | 53 | |
| 5 | 1 | 0 |
| 6 | 53 | |
| 7 | 3 | 2 |
| 8 | 83 | |
| 9 | 9 | 8 |

| REGISTER SELECT INPUT RS3 | RS2 | RS1 | RS0 | PCI REGISTER |
|---|---|---|---|---|
| 0 | 0 | 0 | 0 | PCCSR |
| 0 | 0 | 0 | 1 | PCDR0 |
| 0 | 0 | 1 | 0 | PCDR1 |
| 0 | 0 | 1 | 1 | PCDR2 |
| 0 | 1 | 0 | 0 | PCDR3 |
| 0 | 1 | 0 | 1 | PCDR4 |
| 0 | 1 | 1 | 0 | PCDR5 |
| 0 | 1 | 1 | 1 | PCDR6 |
| 1 | 0 | 0 | 0 | PCDR7 |
| 1 | 0 | 0 | 1 | PCDR8 |
| 1 | 0 | 1 | 0 | PCDR9 |
| 1 | 0 | 1 | 1 | PCDR10 |
| 1 | 1 | 0 | 0 | PCDR11 |
| 1 | 1 | 0 | 1 | PCDR12 |
| 1 | 1 | 1 | 0 | PCDR13 |
| 1 | 1 | 1 | 1 | PCDR14 |

| | | | | |
|---|---|---|---|---|
| 0 | 0 | 1 | 0 | 1 |
| 1 | 0 | 0 | 1 | 1 |
| 2 | 1 | 1 | 0 | 1 |
| 3 | 1 | 1 | 0 | 0 |
| 4 | 0 | 1 | 0 | 1 |
| 5 | 0 | 0 | 1 | 1 |
| 6 | 1 | 1 | 1 | 1 |
| 7 | 1 | 1 | 1 | 0 |
| 8 | 0 | 1 | 0 | 1 |
| 9 | 0 | 0 | 1 | 1 |
| 10 | 1 | 1 | 1 | 1 |
| 11 | 1 | 1 | 1 | 0 |
| 12 | 0 | 1 | 0 | 1 |
| 13 | 0 | 0 | 1 | 1 |
| 14 | 1 | 1 | 0 | 1 |
| 15 | 1 | 1 | 0 | 0 |
| 16 | 0 | 0 | 1 | 1 |
| 17 | 0 | 1 | 0 | 1 |
| 18 | 0 | 1 | 1 | 1 |
| 19 | 0 | 1 | 1 | 0 |

FIG. 32

| BLADR | DSTATUS 3 | 2 | 1 | 0 |
|---|---|---|---|---|
| 0 | 0 | 1 | 0 | 1 |
| 1 | 0 | 0 | 1 | 1 |
| 2 | 1 | 1 | 0 | 1 |
| 3 | 1 | 1 | 0 | 0 |
| 4 | 0 | 1 | 0 | 1 |
| 5 | 0 | 0 | 1 | 1 |
| 6 | 1 | 1 | 1 | 1 |
| 7 | 1 | 1 | 1 | 0 |
| 8 | 1 | 0 | 1 | 0 |
| 9 | 0 | 0 | 0 | 1 |
| 10 | 1 | 1 | 1 | 1 |
| 11 | 1 | 1 | 1 | 1 |
| 12 | 1 | 0 | 1 | 0 |
| 13 | 0 | 0 | 0 | 1 |
| 14 | 1 | 1 | 1 | 0 |
| 15 | 1 | 1 | 1 | 0 |
| 16 | 1 | 0 | 1 | 0 |
| 17 | 0 | 0 | 0 | 1 |
| 18 | 1 | 1 | 0 | 1 |
| 19 | 1 | 1 | 0 | 1 |
| 20 | 1 | 0 | 1 | 0 |
| 21 | 0 | 0 | 0 | 1 |
| 22 | 1 | 1 | 0 | 0 |
| 23 | 1 | 1 | 0 | 0 |
| 24 | 1 | 0 | 0 | 1 |
| 25 | 0 | 0 | 1 | 0 |
| 26 | 0 | 1 | 1 | 1 |
| 27 | 0 | 1 | 1 | 1 |
| 28 | 1 | 0 | 0 | 1 |
| 29 | 0 | 0 | 1 | 0 |
| 30 | 0 | 1 | 1 | 0 |
| 31 | 0 | 1 | 1 | 0 |

FIG. 49

| BLADR | DSTATUS 3 | 2 | 1 | 0 |
|---|---|---|---|---|
| 0 | 1 | 0 | 0 | 1 |
| 1 | 1 | 0 | 1 | 1 |
| 2 | 1 | 0 | 0 | 0 |
| 3 | 1 | 0 | 0 | 0 |
| 4 | 1 | 0 | 0 | 1 |
| 5 | 1 | 0 | 1 | 1 |
| 6 | 1 | 0 | 0 | 1 |
| 7 | 0 | 0 | 0 | 0 |
| 8 | 1 | 0 | 0 | 1 |
| 9 | 0 | 0 | 1 | 1 |
| 10 | 0 | 0 | 0 | 1 |
| 11 | 1 | 0 | 1 | 0 |
| 12 | 1 | 0 | 0 | 1 |
| 13 | 1 | 0 | 1 | 1 |
| 14 | 1 | 0 | 1 | 1 |
| 15 | 1 | 0 | 1 | 1 |
| 16 | 1 | 0 | 0 | 0 |
| 17 | 1 | 0 | 0 | 1 |
| 18 | 0 | 0 | 1 | 0 |
| 19 | 0 | 0 | 1 | 0 |
| 20 | 1 | 0 | 0 | 1 |
| 21 | 1 | 0 | 0 | 0 |
| 22 | 0 | 0 | 1 | 1 |
| 23 | 0 | 0 | 1 | 1 |
| 24 | 1 | 0 | 0 | 1 |
| 25 | 1 | 0 | 0 | 0 |
| 26 | 0 | 0 | 1 | 1 |
| 27 | 0 | 0 | 1 | 1 |
| 28 | 0 | 1 | 0 | 0 |
| 29 | 0 | 0 | 0 | 0 |
| 30 | 0 | 0 | 1 | 1 |
| 31 | 0 | 0 | 1 | 1 |

FIG. 51

| INPUT | | OUTPUT | | | | |
|---|---|---|---|---|---|---|
| S | G | Y4 | Y3 | Y2 | Y1 | Y0 |
| 0 | 1 | D | A3 | A2 | A1 | A0 |
| 1 | 1 | D | B3 | B2 | B1 | B0 |
| — | 0 | C4 | C3 | C2 | C1 | C0 |

FRAME (BLADR 0–3)

| BLADR | DSTATUS 3 2 1 0 |
|---|---|
| 0 | ST(0)L |
| 1 | ST(0)H |
| 2 | MAC(0) |
| 3 | MAC(1) |
| 4 | ST(2)L |
| | |
| 27 | |
| 28 | ST(14)L |
| 29 | ST(14)H |
| 30 | MAC(14) |
| 31 | MAC(15) |

DATA(4 BLOCK) OF 1 FRAME

| | |
|---|---|
| 2x | ST(x)L |
| 2x+1 | ST(x)H |
| 2x+2 | MAC(x) |
| 2x+3 | MAC(x+1) |

| BLADR | DSTATUS 3 | 2 | 1 | 0 |
|---|---|---|---|---|
| 0 | 0 | 1 | 0 | 1 |
| 1 | 0 | 0 | 1 | 1 |
| 2 | 1 | 1 | 0 | 1 |
| 3 | 1 | 1 | 0 | 0 |
| 4 | 0 | 1 | 0 | 1 |
| 5 | 0 | 0 | 1 | 1 |
| 6 | 1 | 1 | 1 | 1 |
| 7 | 1 | 1 | 1 | 0 |
| 8 | 1 | 0 | 1 | 0 |
| 9 | 0 | 0 | 0 | 1 |
| 10 | 1 | 1 | 1 | 1 |
| 11 | 1 | 1 | 1 | 1 |
| 12 | 1 | 0 | 1 | 0 |
| 13 | 0 | 0 | 0 | 1 |
| 14 | 1 | 1 | 1 | 0 |
| 15 | 1 | 1 | 1 | 0 |
| 16 | 1 | 0 | 1 | 0 |
| 17 | 0 | 0 | 0 | 1 |
| 18 | 1 | 1 | 0 | 1 |
| 19 | 1 | 1 | 0 | 1 |
| 20 | 1 | 0 | 1 | 0 |
| 21 | 0 | 0 | 0 | 1 |
| 22 | 1 | 1 | 0 | 0 |
| 23 | 1 | 1 | 0 | 0 |
| 24 | 1 | 0 | 0 | 1 |
| 25 | 0 | 0 | 1 | 0 |
| 26 | 0 | 1 | 1 | 1 |
| 27 | 0 | 1 | 1 | 1 |
| 28 | 1 | 0 | 0 | 1 |
| 29 | 0 | 0 | 1 | 0 |
| 30 | 0 | 1 | 1 | 0 |
| 31 | 0 | 1 | 1 | 0 |

FIG. 58

| DADR | DDATA 3 | 2 | 1 | 0 |
|---|---|---|---|---|
| 0 | 1 | 0 | 1 | 0 |
| 1 | 0 | 1 | 0 | 1 |
| 2 | 1 | 1 | 0 | 0 |
| 3 | 0 | 0 | 1 | 1 |
| 4 | 1 | 0 | 1 | 0 |
| 5 | 1 | 1 | 0 | 1 |
| 6 | 1 | 1 | 0 | 0 |
| 7 | 0 | 1 | 1 | 1 |
| 8 | 1 | 1 | 0 | 0 |
| 9 | 0 | 1 | 1 | 0 |
| 10 | 1 | 1 | 0 | 1 |
| 11 | 0 | 1 | 1 | 1 |
| 12 | 0 | 1 | 0 | 0 |
| 13 | 0 | 1 | 1 | 0 |
| 14 | 0 | 1 | 0 | 0 |
| 15 | 1 | 1 | 1 | 0 |
| 16 | 1 | 0 | 1 | 0 |
| 17 | 0 | 1 | 0 | 1 |
| 18 | 1 | 1 | 0 | 0 |
| 19 | 0 | 0 | 1 | 1 |
| 20 | 0 | 0 | 1 | 0 |
| 21 | 0 | 1 | 0 | 1 |
| 22 | 1 | 0 | 0 | 0 |
| 23 | 0 | 0 | 1 | 1 |
| 24 | 1 | 0 | 0 | 1 |
| 25 | 0 | 0 | 1 | 1 |
| 26 | 1 | 0 | 0 | 0 |
| 27 | 0 | 0 | 1 | 0 |
| 28 | 1 | 0 | 0 | 1 |
| 29 | 1 | 0 | 1 | 1 |
| 30 | 0 | 0 | 0 | 1 |
| 31 | 1 | 0 | 1 | 1 |

F I G. 59

| DADR | DDATA 3 | 2 | 1 | 0 |
|---|---|---|---|---|
| 0 | 1 | 0 | 1 | 0 |
| 1 | 0 | 1 | 0 | 1 |
| 2 | 1 | 1 | 0 | 0 |
| 3 | 0 | 0 | 1 | 1 |
| 4 | 1 | 0 | 1 | 0 |
| 5 | 1 | 1 | 0 | 0 |
| 6 | 1 | 1 | 0 | 0 |
| 7 | 0 | 1 | 1 | 1 |
| 8 | 1 | 1 | 0 | 1 |
| 9 | 1 | 0 | 1 | 0 |
| 10 | 1 | 1 | 0 | 1 |
| 11 | 0 | 1 | 1 | 1 |
| 12 | 0 | 1 | 0 | 0 |
| 13 | 0 | 1 | 1 | 0 |
| 14 | 0 | 1 | 0 | 0 |
| 15 | 1 | 1 | 1 | 0 |
| 16 | 1 | 0 | 1 | 0 |
| 17 | 0 | 1 | 0 | 1 |
| 18 | 1 | 1 | 0 | 0 |
| 19 | 0 | 0 | 1 | 1 |
| 20 | 0 | 0 | 1 | 0 |
| 21 | 0 | 1 | 0 | 1 |
| 22 | 1 | 0 | 0 | 0 |
| 23 | 0 | 0 | 1 | 1 |
| 24 | 0 | 1 | 0 | 1 |
| 25 | 0 | 0 | 1 | 0 |
| 26 | 1 | 0 | 0 | 0 |
| 27 | 0 | 0 | 1 | 0 |
| 28 | 1 | 0 | 0 | 1 |
| 29 | 1 | 0 | 1 | 1 |
| 30 | 0 | 0 | 0 | 1 |
| 31 | 1 | 0 | 1 | 1 |

F I G. 62

| BLADR | DSTATUS | | | |
|---|---|---|---|---|
| | 3 | 2 | 1 | 0 |
| 0 | 1 | 0 | 0 | 1 |
| 1 | 0 | 1 | 0 | 1 |
| 2 | 1 | 1 | 0 | 1 |
| 3 | 1 | 1 | 1 | 1 |
| 4 | 1 | 0 | 0 | 1 |
| 5 | 0 | 1 | 0 | 1 |
| 6 | 1 | 1 | 0 | 0 |
| 7 | 1 | 1 | 1 | 0 |
| 8 | 1 | 1 | 1 | 1 |
| 9 | 0 | 0 | 1 | 0 |
| 10 | 1 | 0 | 0 | 1 |
| 11 | 1 | 0 | 0 | 0 |
| 12 | 0 | 0 | 1 | 1 |
| 13 | 0 | 0 | 1 | 0 |
| 14 | 0 | 1 | 1 | 1 |
| 15 | 0 | 1 | 1 | 1 |
| 16 | 1 | 0 | 0 | 0 |
| 17 | 0 | 0 | 0 | 0 |
| 18 | 0 | 1 | 1 | 0 |
| 19 | 0 | 1 | 1 | 0 |
| 20 | 1 | 0 | 0 | 0 |
| 21 | 0 | 0 | 0 | 0 |
| 22 | 0 | 1 | 1 | 0 |
| 23 | 0 | 1 | 1 | 0 |
| 24 | 1 | 0 | 0 | 0 |
| 25 | 0 | 0 | 0 | 0 |
| 26 | 0 | 1 | 1 | 0 |
| 27 | 0 | 1 | 1 | 0 |
| 28 | 1 | 0 | 0 | 0 |
| 29 | 0 | 0 | 0 | 0 |
| 30 | 0 | 1 | 1 | 0 |
| 31 | 0 | 1 | 1 | 0 |

FIG. 63

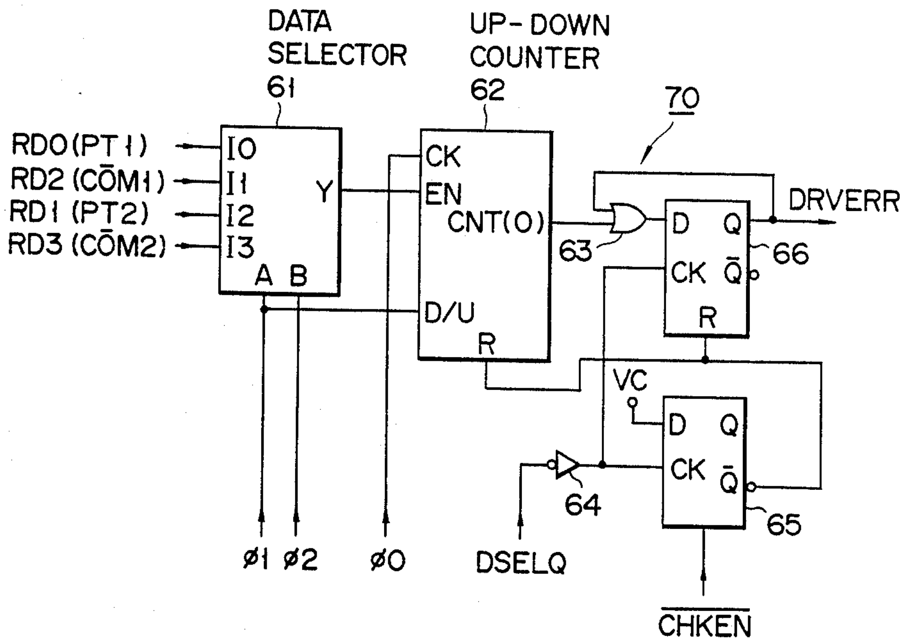
FIG. 67
FIG. 68
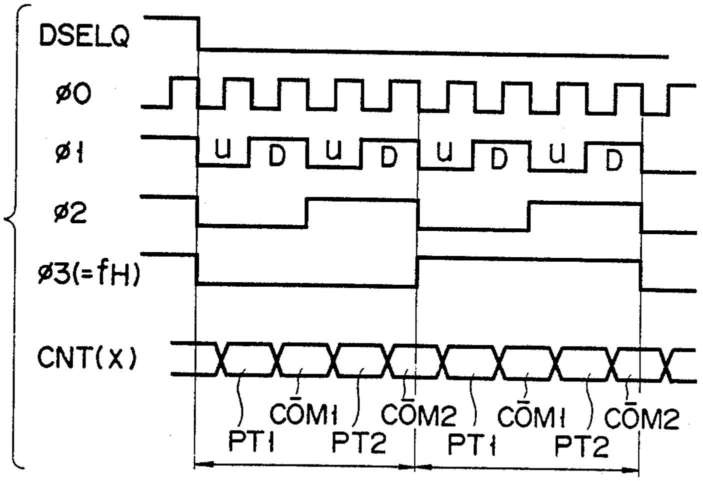

| STD 3, 2, 1, 0 | |
|---|---|
| ST(X)L | |
| PTY | ST(X)H |

| BADR | STD 3 | 2 | 1 | 0 |
|---|---|---|---|---|
| 0 | 0 | 1 | 0 | 1 |
| 1 | 0 | 0 | 1 | 0 |
| 2 | 0 | 1 | 0 | 1 |
| 3 | 0 | 0 | 1 | 0 |
| 4 | 1 | 1 | 1 | 0 |
| 5 | 1 | 0 | 1 | 0 |
| 6 | 0 | 1 | 0 | 1 |
| 7 | 0 | 0 | 1 | 0 |
| 8 | 0 | 0 | 1 | 0 |
| 9 | 1 | 0 | 0 | 1 |
| 10 | 0 | 0 | 1 | 0 |
| 11 | 1 | 0 | 0 | 1 |
| 12 | 0 | 0 | 1 | 0 |
| 13 | 1 | 0 | 0 | 1 |
| 14 | 0 | 0 | 1 | 0 |
| 15 | 1 | 0 | 0 | 1 |

| | BADR | STD 3, 2, 1, 0 |
|---|---|---|
| FRAME | 0 | ST(0)L |
| | 1 | ST(0)H |
| | 2 | ST(1)L |
| | 3 | ST(1)H |
| | n-2 | ST(n/2-1)L |
| | n-1 | ST(n/2-1)H |

FIG. 78

| | MADR | MACD 3, 2, 1, 0 |
|---|---|---|
| FRAME / FIRST BLOCK | 0 | MAC(0) |
| SECOND BLOCK | 1 | MAC(1) |
| THIRD BLOCK | 2 | MAC(2) |
| FOURTH BLOCK | 3 | MAC(3) |
| | 4 | MAC(4) |
| | m-4 | MAC(m-4) |
| | m-3 | MAC(m-3) |
| | m-2 | MAC(m-2) |
| | m-1 | MAC(m-1) |

FIG. 79

| MADR | | | | |
|---|---|---|---|---|
| MADR4 | MADR3 | MADR1 | MADR1 | MADR0 |
| QD | QC | QB | SELMAC | ø3 |

FIG. 80

| BADR | STD | | | |
|---|---|---|---|---|
| | 3 | 2 | 1 | 0 |
| 0 | 0 | 1 | 0 | 1 |
| 1 | 0 | 0 | 1 | 1 |
| 2 | 0 | 1 | 0 | 1 |
| 3 | 0 | 0 | 1 | 1 |
| 4 | 1 | 0 | 1 | 0 |
| 5 | 0 | 0 | 0 | 1 |
| 6 | 1 | 0 | 1 | 0 |
| 7 | 0 | 0 | 0 | 1 |
| 8 | 1 | 0 | 1 | 0 |
| 9 | 0 | 0 | 0 | 1 |
| 10 | 1 | 0 | 1 | 0 |
| 11 | 0 | 0 | 0 | 1 |
| 12 | 1 | 0 | 0 | 1 |
| 13 | 0 | 0 | 1 | 0 |
| 14 | 1 | 0 | 0 | 1 |
| 15 | 0 | 0 | 1 | 0 |

| MADR | MACD 3 | 2 | 1 | 0 |
|---|---|---|---|---|
| 0 | 0 | 1 | 1 | 0 |
| 1 | 1 | 0 | 1 | 1 |
| 2 | 0 | 1 | 0 | 0 |
| 3 | 1 | 0 | 0 | 1 |
| 4 | 1 | 1 | 1 | 0 |
| 5 | 1 | 0 | 1 | 1 |
| 6 | 0 | 1 | 0 | 0 |
| 7 | 0 | 0 | 0 | 1 |
| 8 | 1 | 1 | 1 | 0 |
| 9 | 1 | 0 | 1 | 1 |
| 10 | 1 | 1 | 1 | 0 |
| 11 | 1 | 0 | 1 | 1 |
| 12 | 0 | 1 | 0 | 0 |
| 13 | 0 | 0 | 0 | 1 |
| 14 | 0 | 1 | 0 | 0 |
| 15 | 0 | 0 | 0 | 1 |
| 16 | 0 | 1 | 1 | 0 |
| 17 | 1 | 0 | 1 | 1 |
| 18 | 0 | 1 | 1 | 0 |
| 19 | 1 | 0 | 1 | 1 |
| 20 | 0 | 1 | 0 | 0 |
| 21 | 1 | 0 | 0 | 1 |
| 22 | 0 | 1 | 0 | 0 |
| 23 | 1 | 0 | 0 | 1 |
| 24 | 0 | 1 | 1 | 1 |
| 25 | 0 | 0 | 1 | 1 |
| 26 | 0 | 1 | 1 | 1 |
| 27 | 0 | 0 | 1 | 1 |
| 28 | 1 | 1 | 0 | 0 |
| 29 | 1 | 0 | 0 | 0 |
| 30 | 1 | 1 | 0 | 0 |
| 31 | 1 | 0 | 0 | 0 |

FIG. 84

| BADR | STD 3 | 2 | 1 | 0 |
|---|---|---|---|---|
| 0 | 1 | 0 | 0 | 1 |
| 1 | 0 | 1 | 0 | 1 |
| 2 | 1 | 0 | 0 | 1 |
| 3 | 0 | 1 | 0 | 1 |
| 4 | 1 | 1 | 1 | 1 |
| 5 | 0 | 0 | 1 | 0 |
| 6 | 0 | 0 | 1 | 1 |
| 7 | 0 | 0 | 1 | 0 |
| 8 | 1 | 0 | 0 | 0 |
| 9 | 0 | 0 | 0 | 0 |
| 10 | 1 | 0 | 0 | 0 |
| 11 | 0 | 0 | 0 | 0 |
| 12 | 1 | 0 | 0 | 0 |
| 13 | 0 | 0 | 0 | 0 |
| 14 | 1 | 0 | 0 | 0 |
| 15 | 0 | 0 | 0 | 0 |

| MADR | MACD 3 | 2 | 1 | 0 |
|---|---|---|---|---|
| 0 | 0 | 1 | 1 | 0 |
| 1 | 1 | 0 | 1 | 1 |
| 2 | 1 | 1 | 1 | 0 |
| 3 | 1 | 0 | 1 | 1 |
| 4 | 0 | 1 | 0 | 0 |
| 5 | 1 | 0 | 0 | 1 |
| 6 | 0 | 1 | 0 | 0 |
| 7 | 0 | 0 | 0 | 1 |
| 8 | 1 | 0 | 1 | 0 |
| 9 | 0 | 0 | 1 | 0 |
| 10 | 1 | 1 | 0 | 1 |
| 11 | 0 | 1 | 0 | 1 |
| 12 | 0 | 1 | 1 | 1 |
| 13 | 0 | 0 | 1 | 1 |
| 14 | 0 | 1 | 1 | 1 |
| 15 | 0 | 0 | 1 | 1 |
| 16 | 1 | 1 | 0 | 0 |
| 17 | 1 | 0 | 0 | 0 |
| 18 | 1 | 1 | 0 | 0 |
| 19 | 1 | 0 | 0 | 0 |
| 20 | 1 | 1 | 0 | 0 |
| 21 | 1 | 0 | 0 | 0 |
| 22 | 1 | 1 | 0 | 0 |
| 23 | 1 | 0 | 0 | 0 |
| 24 | 1 | 1 | 0 | 0 |
| 25 | 1 | 0 | 0 | 0 |
| 26 | 1 | 1 | 0 | 0 |
| 27 | 1 | 0 | 0 | 0 |
| 28 | 1 | 1 | 0 | 0 |
| 29 | 1 | 0 | 0 | 0 |
| 30 | 1 | 1 | 0 | 0 |
| 31 | 1 | 0 | 0 | 0 |

FIG. 88

| BADR | STD | | | |
|---|---|---|---|---|
| | 3 | 2 | 1 | 0 |
| 0 | 1 | 0 | 0 | 1 |
| 1 | 0 | 0 | 1 | 1 |
| 2 | 1 | 0 | 0 | 1 |
| 3 | 0 | 0 | 1 | 1 |
| 4 | 1 | 0 | 0 | 1 |
| 5 | 0 | 0 | 1 | 1 |
| 6 | 1 | 0 | 0 | 1 |
| 7 | 0 | 0 | 1 | 1 |
| 8 | 1 | 0 | 0 | 0 |
| 9 | 0 | 0 | 0 | 1 |
| 10 | 1 | 0 | 0 | 1 |
| 11 | 0 | 0 | 0 | 0 |
| 12 | 1 | 0 | 0 | 1 |
| 13 | 0 | 0 | 0 | 0 |
| 14 | 0 | 1 | 0 | 0 |
| 15 | 0 | 0 | 0 | 0 |

| MADR | MACD 3 | MACD 2 | MACD 1 | MACD 0 |
|---|---|---|---|---|
| 0 | 1 | 1 | 0 | 0 |
| 1 | 1 | 0 | 0 | 1 |
| 2 | 1 | 1 | 0 | 0 |
| 3 | 1 | 0 | 0 | 1 |
| 4 | 0 | 1 | 1 | 0 |
| 5 | 0 | 0 | 1 | 1 |
| 6 | 1 | 0 | 1 | 0 |
| 7 | 1 | 0 | 1 | 0 |
| 8 | 0 | 1 | 0 | 1 |
| 9 | 0 | 1 | 0 | 1 |
| 10 | 1 | 1 | 0 | 1 |
| 11 | 1 | 0 | 0 | 0 |
| 12 | 0 | 1 | 1 | 1 |
| 13 | 0 | 0 | 1 | 0 |
| 14 | 0 | 1 | 1 | 1 |
| 15 | 0 | 0 | 1 | 0 |
| 16 | 1 | 1 | 0 | 0 |
| 17 | 1 | 1 | 0 | 0 |
| 18 | 1 | 1 | 0 | 0 |
| 19 | 1 | 1 | 0 | 0 |
| 20 | 0 | 0 | 1 | 1 |
| 21 | 0 | 0 | 1 | 1 |
| 22 | 0 | 0 | 1 | 1 |
| 23 | 0 | 0 | 1 | 1 |
| 24 | 0 | 0 | 1 | 1 |
| 25 | 0 | 0 | 1 | 1 |
| 26 | 0 | 0 | 1 | 1 |
| 27 | 0 | 0 | 1 | 1 |
| 28 | 0 | 0 | 1 | 1 |
| 29 | 0 | 0 | 1 | 1 |
| 30 | 0 | 0 | 1 | 1 |
| 31 | 0 | 0 | 1 | 1 |

FIG. 92

| BADR | STD 3 | STD 2 | STD 1 | STD 0 |
|---|---|---|---|---|
| 0 | 0 | 1 | 0 | 1 |
| 1 | 0 | 0 | 1 | 0 |
| 2 | 0 | 1 | 0 | 1 |
| 3 | 0 | 0 | 1 | 0 |
| 4 | 1 | 1 | 1 | |
| 5 | 0 | 0 | 1 | 0 |
| 6 | 0 | 1 | 0 | 1 |
| 7 | 0 | 0 | 1 | 0 |
| 8 | 0 | 0 | 1 | 0 |
| 9 | 0 | 0 | 0 | 1 |
| 10 | 0 | 0 | 1 | 0 |
| 11 | 0 | 0 | 0 | 1 |
| 12 | 0 | 0 | 1 | 0 |
| 13 | 0 | 0 | 0 | 1 |
| 14 | 0 | 0 | 1 | 0 |
| 15 | 0 | 0 | 0 | 1 |

| MADR | MACD 3 | MACD 2 | MACD 1 | MACD 0 |
|---|---|---|---|---|
| 0 | 0 | 1 | 0 | 0 |
| 1 | 1 | 0 | 0 | 1 |
| 2 | 0 | 1 | 0 | 0 |
| 3 | 0 | 0 | 0 | 1 |
| 4 | 0 | 1 | 1 | 0 |
| 5 | 1 | 0 | 1 | 1 |
| 6 | 1 | 1 | 1 | 1 |
| 7 | 1 | 0 | 1 | 0 |
| 8 | 0 | 0 | 1 | 1 |
| 9 | 0 | 0 | 1 | 1 |
| 10 | 1 | 1 | 0 | 0 |
| 11 | 1 | 1 | 0 | 0 |
| 12 | 0 | 1 | 0 | 0 |
| 13 | 1 | 0 | 0 | 1 |
| 14 | 0 | 1 | 0 | 0 |
| 15 | 0 | 0 | 0 | 1 |
| 16 | 0 | 1 | 1 | 0 |
| 17 | 1 | 0 | 1 | 1 |
| 18 | 0 | 1 | 1 | 0 |
| 19 | 1 | 0 | 1 | 1 |
| 20 | 1 | 1 | 1 | 0 |
| 21 | 1 | 0 | 1 | 1 |
| 22 | 1 | 1 | 1 | 0 |
| 23 | 1 | 0 | 1 | 1 |
| 24 | 1 | 1 | 0 | 0 |
| 25 | 1 | 0 | 0 | 0 |
| 26 | 1 | 1 | 0 | 0 |
| 27 | 1 | 0 | 0 | 0 |
| 28 | 0 | 1 | 1 | 1 |
| 29 | 0 | 0 | 1 | 1 |
| 30 | 0 | 1 | 1 | 1 |
| 31 | 0 | 0 | 1 | 1 |

FIG. 96

WAVEFORM GENERATING APPARATUS FOR DRIVING LIQUID CRYSTAL DEVICE

BACKGROUND OF THE INVENTION

In a conventional liquid crystal printer, for example, optical write access of image data is performed by ON/-OFF-controlling a large number of microshutters provided to a liquid crystal optical shutter (to be referred to as an LCS hereinafter), thus forming an electrostatic latent image.

In order to perform high-speed optical write access, the LCS is controlled by two-frequency driving, e.g., at low frequency fL and high frequency fH. In order to decrease the numbers of drive elements and wirings, and a mounting area to minitualize the shutter, time-divisional driving is performed.

FIG. 1 is a block diagram showing an LCS drive signal generator for generating drive signals and timing signals to two-frequency drive the LCS, as a related art shown in U.S. Application Ser. No. 769,692 (U.S. Application Ser. No. 45,191). FIG. 2 is a timing chart showing an operation of the LCS drive signal generator, and FIG. 3 is a table showing contents of data DSTATUS stored in ROM 2 (to be described later). The arrangement and operation of the conventional LCS drive signal generator will be described with reference to FIGS. 1 to 3.

Referring to FIG. 1, counter 1 is a modulo-n ($n \leqq 2^m$) counter, and counts 0 to n−1 in synchronism with inverted clock signal $\bar{\phi}$ of clock signal $\phi$ input through inverter 4. Counter 1 outputs block address signal BLADR from output terminals Q0 (LSB) to Qm−1 (MSB) to address input terminals A0 to Am−1 of ROM (Read Only Memory) 2. Block address signal BLADR varies in the range of values 0 to n−1, as shown in FIG. 2, and is cyclically input to ROM 2 within period Tw in response to trailing edges of inverted clock signal $\bar{\phi}$ in the order of 0 to n−1. Rom 2 stores data DSTATUS at addresses "0" to "n−1", as shown in FIG. 3. Terminal $\overline{CE}$ (Chip Enable) and terminal $\overline{OE}$ (Output Enable) of ROM 2 are grounded, and are always at active (L) level. Therefore, each time block address signal BLADR is input to address input terminals A0 to Am−1, data DSTATUS corresponding to input block address BLADR is output from one of data output terminals D0 to D7 of ROM 2 to corresponding one of data input terminals D0 to D7 of latch 3.

ROM 2 has input terminals Am and Am+1. When a page selection signal is input to input terminals Am and Am+1, one of four pages can be selected. Therefore, different contents of data DSTATUS are stored for each page, so that four combinations (LCS drive signals COM1, COM2, PT1, and PT2, and timing signals DSEL, $\overline{CK2}$, and TWSX) of signals can be generated.

Terminal CK of latch 3 receives clock signal $\phi$. In synchronism with the leading edge of clock signal $\phi$, data DSTATUS output from output terminals D0 to D7 of ROM 2 are input to data input terminals D0 to D7, and are held until next clock signal $\phi$ rises. Data DSTATUS input to latch 3 are output from output terminals Q0 to Q6 as LCS drive signals PT1, $\overline{PT2}$, COM1, and COM2, and timing signals DSEL, $\overline{CK2}$, and TWSX (FIG. 2). When data DST(n−1) (FIG. 3) is input to latch 3, a reset signal is output from output terminal Q7 of latch 3 to reset terminal R of modulo-n counter 1. Therefore, after modulo-n counter 1 counts from 0 to (n−1) (addresses of ROM 2), it is reset by value "1" of bit "7" of data DST(n−1) output from ROM 2 to latch 3. LCS drive signals COM1, COM2, PT1, and PT2 output from latch 3 are output to an optical write controller (not shown), and are used for two-frequency drive control of the LCS through the controller in the time-divisional manner.

As shown in FIG. 2, in the LCS drive signal generator, n blocks of data stored in ROM 2 are read out within period Tw.

Since a block of data is read out from ROM 2 for each period $T\phi$ of clock signal $\phi$, the number n of blocks read out during an interval of period Tw is:

$$n = Tw/T\phi = 2Tw/TfH = 2fH.Tw \quad (1.1)$$

where fH is a frequency of a high frequency used in the two-frequency driving, and is expressed as:

$$fH = 1/TfH = \tfrac{1}{2}T\phi \quad \text{(FIG. 2).}$$

If Tw=2 ms and recording is performed at a recording density of 240 DPI, recording of nine A4-sized sheets can be performed per minute. However, if fH=300 kHz, the number n of necessary blocks is:

$$n = 2\times300\times10^3\times2\times10^{-3} = 1200 \text{ (blocks).}$$

Therefore, in order to store 1200 blocks of data DSTATUS, ROM 2 having a capacity of 2m×8 (where m satisfying $2^m \geqq 1200$, i.e., $m \geqq 11$), i.e., $2^{11}\times8=2048\times8$ (bits), must be used. For this reason, if a versatile EPROM, EEPROM, mask ROM, or the like is used as ROM 2 to constitute the LCS drive signal generator, a ROM having a capacity of 2048×8 (bits) must be used although a ROM having a capacity of 1200×8 (bits) need only be used in practice, resulting in high cost.

Since ROM 2 is additionally mounted, if a large-capacity ROM is used, the number of connecting wirings is increased, and thus, a mounting area is increased.

In the conventional LCS drive signal generator described above, LCS drive waveforms such as LCS drive signals COM1, COM2, PT1, and PT2, timing signals DSEL, $\overline{CK2}$, and TWSX, and the like are generated in accordance with data DSTATUS nonrewritably stored in ROM 2. However, operation characteristics of the LCS may be changed due to improvement or modification of a liquid crystal material used in the LCS along with developments of the liquid crystal techniques or modification of specifications. In this case, in a waveform generating apparatus which can only generate fixed LCS drive waveforms in accordance with data DSTATUS stored in ROM 2 like in the conventional LCS drive signal generator, modifications of specifications of LCS drive waveforms along with modifications and improvements of the liquid crystal material cannot be readily performed, and optimal LCS drive waveforms cannot be generated.

FIGS. 4A and 4B show possible combinations of LCS drive signals PT1, PT2, COM1, and COM2 used in time-divisional two-frequency driving of the LCS.

In FIG. 4A, Y1 (PT1) and Y2 (PT2) represent waveforms of voltages applied to signal electrodes of microshutters of the LCS, and Y3 (COM1) and Y4 (COM2) represent waveforms of voltages applied to common electrodes of the LCS. As is known, in a formation region of the microshutters, signal electrodes and common electrodes intersect with each other, and any of combinations of voltage waveforms Y3-Y1, Y3-Y2, Y4-Y1, and Y4-Y2 is applied to each microshutter, as shown in FIG. 4B. Voltage waveform components applied to each microshutter are four components, i.e., high-frequency components fH and *fH and low-frequency components fL and *fL. The microshutters of the LCS are ON/OFF-controlled by the four combinations of the voltage waveform components. Note that *fH is obtained by inverting a phase of fH, and *fL is obtained by inverting a phase of fL.

Since Y1, Y2, Y3, and Y4 can respectively take four types of waveforms fH, *fH, fL, and *fL, the number of combinations of waveforms of Y1 to Y4 is 4×4×4×4=256. However, even if all of Y1 to Y4 are inverted and applied to the microshutters, the effect as drive waveforms is not changed. Therefore, in practice, the number of combinations of waveforms applied to the microshutters of the LCS is 128.

However, all the 128 combinations of drive waveforms of the LCS may not possibly be used, and 20 combinations need only be used, as shown in FIG. 4B. By using 20 combinations, any of voltage waveforms of Y3-Y1, Y3-Y2, Y4-Y1, and Y4-Y2 is applied to the microshutters of the LCS.

However, in the conventional LCS drive signal generator, since LCS drive signals PT1, PT2, COM1, and COM2 are generated in accordance with data DSTATUS nonrewritably stored in ROM 2, when waveforms of LCS drive signal PT1, PT2, COM1, and COM2 must be changed due to modifications or improvement of the liquid crystal material, ROM 2 must be replaced. In order to improve the operation characteristics of the LCS, an LCS panel is warmed up by a light source or the like upon starting the LCS. In this case, it is known that a special high-frequency signal is applied to the LCS upon starting of the LCS, so that the LCS can be warmed up to an optimal operating temperature. The high-frequency signal has a different waveform from those of the LCS drive signals during a printing operation, and cannot be generated by a waveform generating apparatus which can only generate fixed drive waveforms like in the conventional LCS drive signal generator.

Furthermore, data DSTATUS stored in ROM 2 may be changed for some reason. However, since no error check of data is performed, even if an abnormal drive waveform is applied to the LCS and a DC component applied to the LCS within one period is not "0", the abnormal voltage is kept applied to the LCS for a long period of time. As a result, the LCS may cause electrolysis and be broken.

SUMMARY OF THE INVENTION

It is an object of the present invention to provide a waveform generating apparatus for driving a liquid crystal device, which can eliminate drawbacks of the conventional waveform generating apparatus described above, can greatly reduce a program capacity for generating waveforms, and has high mounting efficiency.

It is another object of the present invention to provide a waveform generating apparatus for driving a liquid crystal device, which can generate desired drive waveforms by rewriting data in a memory of the apparatus.

In order to achieve the above objects, a waveform generating apparatus for driving a liquid crystal device according to the present invention comprises:

storage means for storing waveform data for designating drive waveforms for driving the liquid crystal device and duration data for designating a duration for which the drive waveforms designated by the waveform data are to be supplied, and outputting the waveform data and the duration data in accordance with an input address designation signal;

drive waveform output means for receiving the waveform data and a clock signal having a predetermined phase, and outputting a plurality of drive waveforms designated by the waveform data from a plurality of output terminals;

measuring means for receiving the duration data and measuring the duration designated by the duration data; and count means for counting a predetermined number upon completion of measurement of the duration designated by the duration data by the measuring means, and for outputting a count value serving as the address designation signal input to the storage means.

Furthermore, a waveform generating apparatus for driving a liquid crystal device according to the present invention comprises:

first storage means for storing drive waveforms and outputting the drive waveforms in accordance with input address designation signals;

second storage means for storing duration data for designation a duration for which the drive waveforms are to be supplied and outputting the duration data in accordance with input address designation signals;

measuring means for receiving the duration data and measuring the duration designated by the duration data; and count means for counting a predetermined number upon completion of measurement of the duration designated by the duration data by the measuring means, and for outputting a count value serving as the address designation signal input to the second storage means, wherein the address designation signal input to the first storage means includes the count value output from the count means and a clock signal having a predetermined period and a predetermined phase.

With the above arrangement, a waveform generating apparatus for driving a liquid crystal device according to the present invention generates waveforms macro data storing waveforms and the number of developing steps of the macro data. Therefore, the following effects can be obtained.

Since a program capacity for generating waveforms is greatly reduced, mounting efficiency is improved, and hence, cost can be reduced.

Since macro data and the number of developing steps stored in memory can be rewritten by a microcomputer, waveforms can be easily modified without modifying a circuit.

Furthermore, the waveform generating apparatus for driviang the liquid crystal device according to the present invention can provide the following effects.

Since data for setting a one-frame duration of a waveform and data for designating a waveform are stored in a programmable memory to develop a waveform:

Almost infinite combinations of waveforms can be obtained;

Since data stored in the memory can be rewritten by external control, when the apparatus is used for generating LCS drive waveforms, modifications of drive waveforms along with improvement or modifications of a liquid crystal material can be readily performed, resulting in easy maintenance;

When the apparatus is used for generating LCS drive waveforms of a recording apparatus which performs optical write access using a normally-ON type LCS, a waveform for closing microshutters of the LCS is applied to the microshutters during warming up, so that when an LCS panel is auxiliarily heated by a light source during warming up, a photosensitive body need not be rotated, resulting in simple control. In addition, degradation in photosensitive body can also be prevented;

For either of a normal developing method and a reversal developing method, data stored in a memory can be rewritten so that recording can be performed using identical video data.

BRIEF DESCRIPTION OF THE DRAWINGS

FIG. 3 is a table showing contents of data DSTATUS stored in a ROM in the generator shown in FIG. 1;

FIG. 7 is a view showing macro data stored in memory 11 in the apparatus shown in FIG. 5 and the number of developing steps thereof;

FIG. 8 is a view showing in more detail the macro data and the number of developing steps thereof shown in FIG. 7;

FIG. 32 is a view showing in more detail the macro data and the number of developing steps thereof shown in FIG. 31;

FIG. 49 is a view showing data DSTATUS in detail;

FIG. 51 is a view showing, in more detail, data DSTATUS for generating the signal waveform patterns shown in FIG. 50;

FIG. 58 is a detailed format of macro data and the number of developing steps stored in memory 1 shown in FIG. 52A;

FIG. 59 is a detailed format of data stored in FIG. 52A;

FIG. 62 is a view showing the contents of memory 2 (FIG. 52A) for generating the LCS drive signal waveform shown in FIG. 61;

FIG. 63 shows contents of data stored in memory 1 shown in FIG. 52A;

FIG. 67 is a circuit diagram of a second embodiment of the drive error detector;

FIG. 68 is a timing chart of the drive error detector shown in FIG. 67;

FIG. 77 is a timing chart showing the relationship among LCS drive signal waveforms and timing signal waveforms generated by the apparatus shown in FIGS. 64A to 64C, development of macro data, and the like;

FIG. 78 shows a format of macro data stored in memory 12 shown in FIG. 64A;

FIG. 79 shows a format of macro data stored in memory 11 shown in FIG. 64B;

FIG. 80 is a view showing a bit configuration of address signal MADR shown in FIGS. 78 and 79;

FIGS. 83 and 84 respectively show detailed formats of step count STD and macro data MACD for generating LCS drive signals COM1, COM2, PT1, and PT2 shown in FIG. 77;

FIG. 85 is a graph showing a change in product of PT1+PT2−COM1−COM2 for one period Tw using LCS drive signals COM1, COM2, PT1, and PT2 generated in accordance with step count STD and macro data MACD shown in FIGS. 83 and 84;

FIG. 86 is a waveform chart of LCS drive signals COM1, COM2, PT1, and PT2 generated by the LCS drive signal generator according to the embodiment shown in FIGS. 64A, 64B, and 64C;

FIGS. 87 and 88 respectively show detailed formats of step count STD and macro data MACD for generating LCS drive signals COM1, COM2, PT1, and PT2 shown in FIG. 86;

FIGS. 91 and 92 respectively show detailed formats of step count STD and macro data MACD for generating LCS drive signals COM1, COM2, PT1, and PT2 shown in FIG. 90;

FIG. 93 is a graph showing a change in product of PT1+PT2−COM1−COM2 for one period Tw using LCS drive signals COM1, COM2, PT1, and PT2 generated in accordance with step count STD and macro data MACD shown in FIGS. 91 and 92;

FIG. 94 is a waveform chart of LCS drive signals COM1, COM2, PT1, and PT2 generated by the LCS drive signal generator in the embodiment shown in FIGS. 64A, 64B, and 64C;

FIGS. 95 and 96 respectively show detailed formats of step count STD and macro data MACD for generating LCS drive signals COM1, COM2, PT1, and PT2 shown in FIG. 94;

DETAILED DESCRIPTION OF THE PREFERRED EMBODIMENTS

Figure 1:
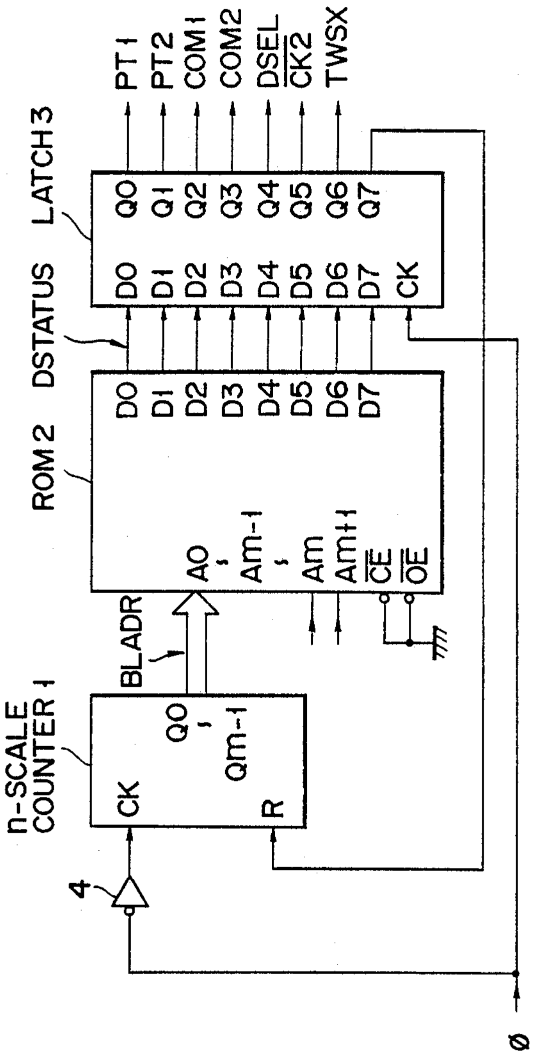
FIG. 1 (PRIOR ART)
FIG. 1 is a block diagram showing an arrangement of a conventional LCS drive signal generator.
Figure 2:
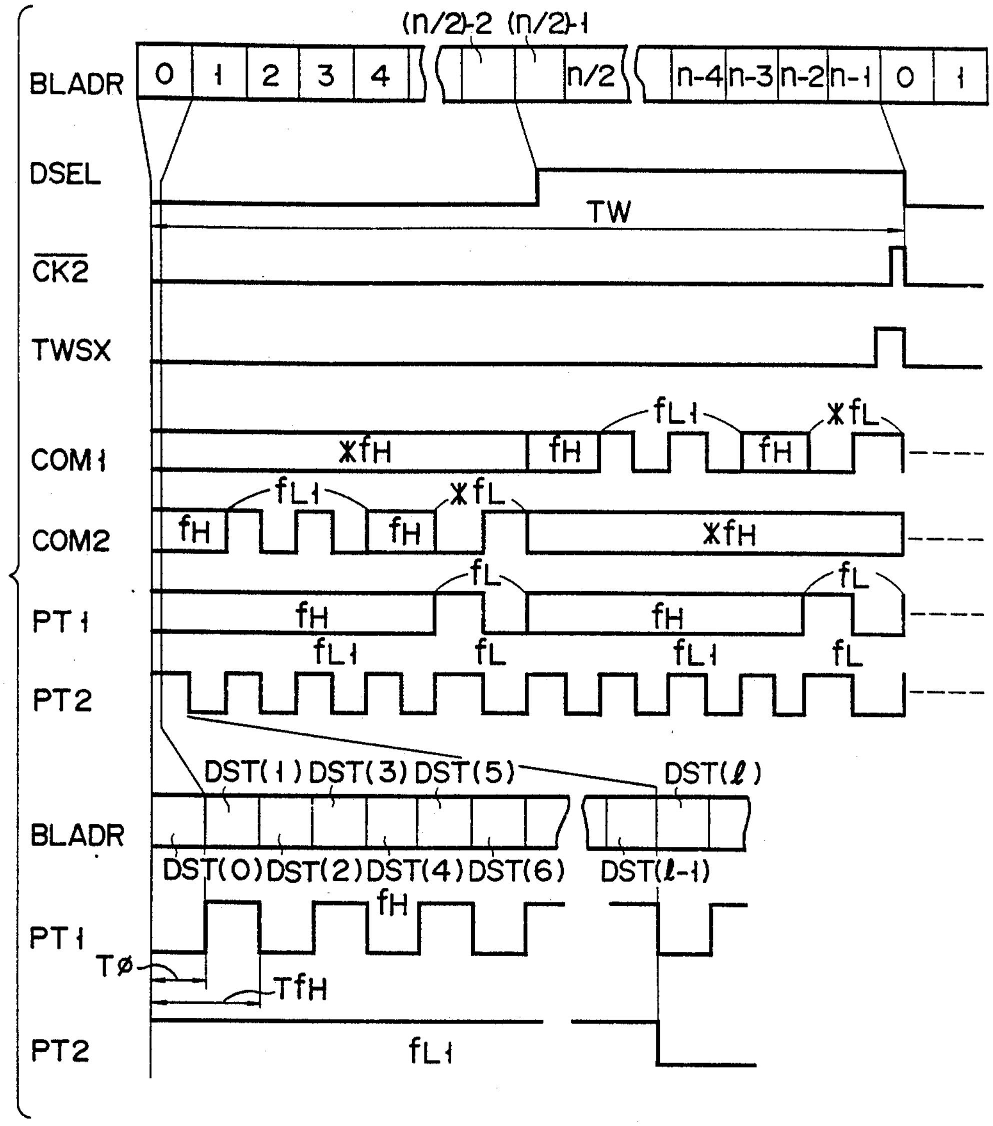
FIG. 2 is a timing chart showing the operation of the generator shown in FIG. 1.
Figures 4A, 4B:
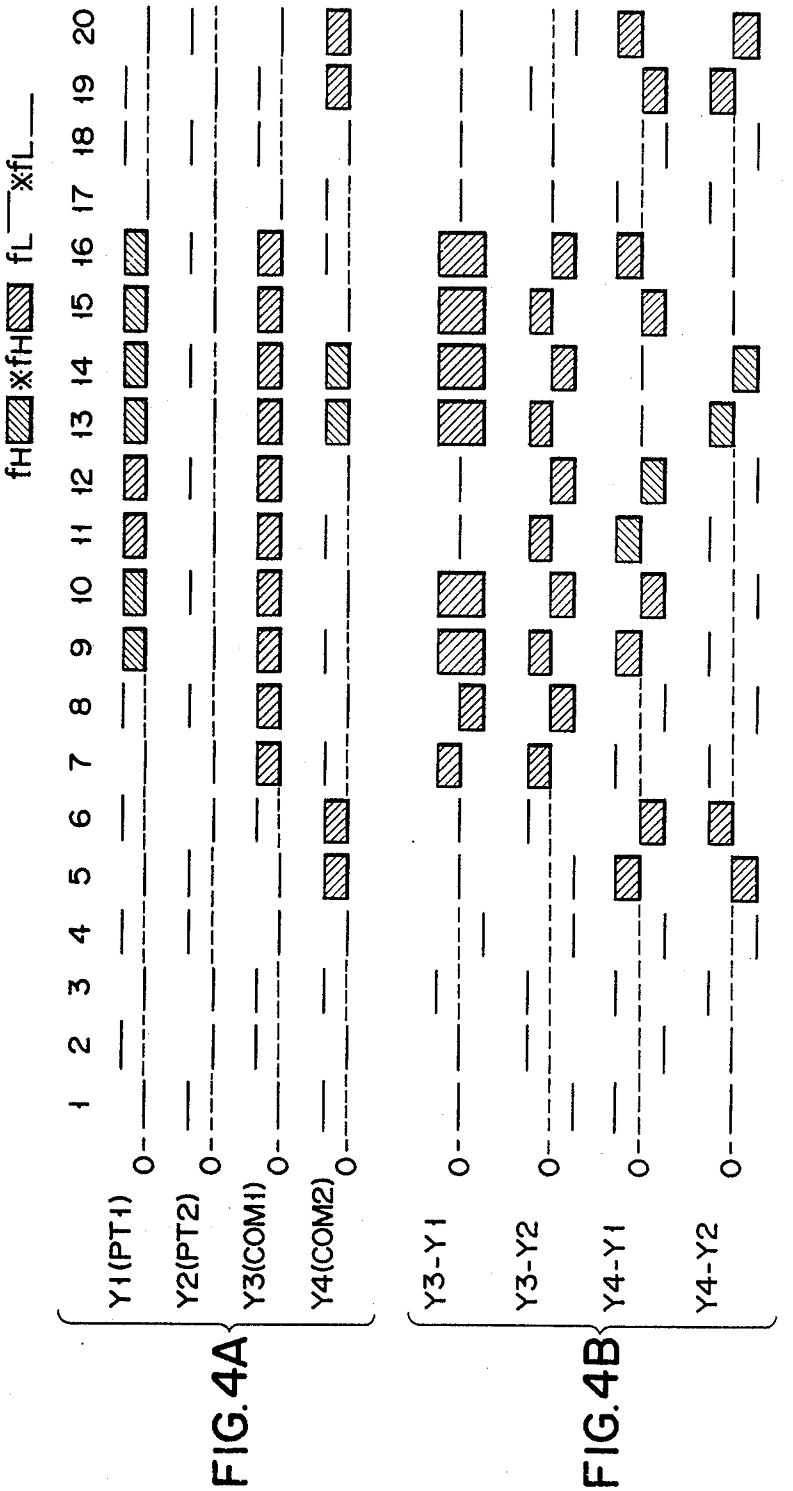
FIG. 4A shows waveform patterns of LCS drive signals COM1, COM2, PT1, and PT2 generated by the generator shown in FIG. 1.
FIG. 4B shows voltage waveform patterns applied to the LCS using combinations of the signal waveforms shown in FIG. 4A.
Figure 5:
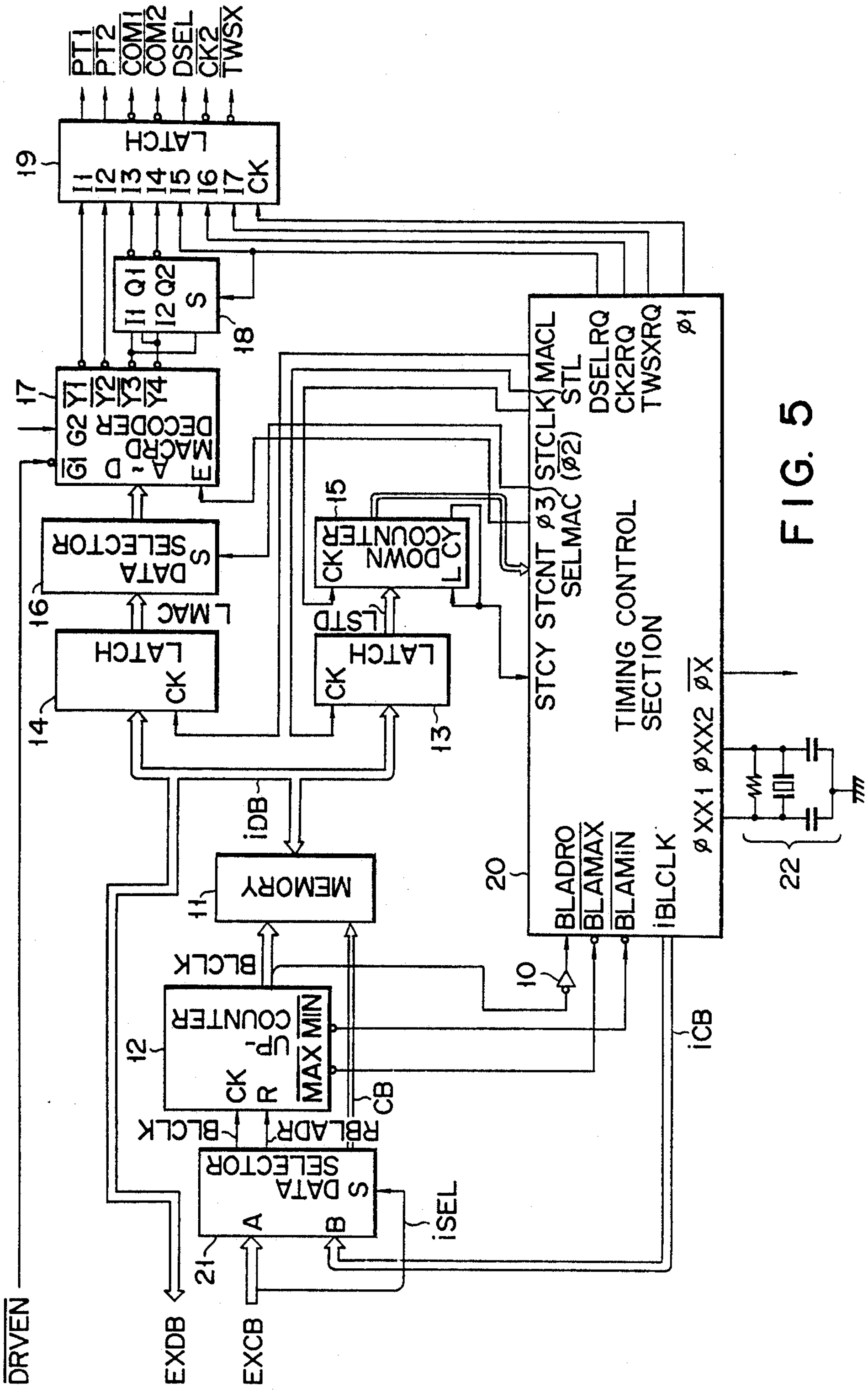
FIG. 5 is a block diagram showing an arrangement of a waveform generating apparatus for driving a liquid crystal device according to the present invention.

FIG. 5 is a block diagram showing an arrangement of an LCS drive signal generator according to an embodiment of the present invention. The LCS drive signal generator shown in FIG. 5 generates LCS drive signals $\overline{PT1}$, $\overline{PT2}$, $\overline{COM1}$, and $\overline{COM2}$ for performing two-frequency driving of a liquid crystal shutter (to be referred to as an LCS hereinafter).

Figure 6:
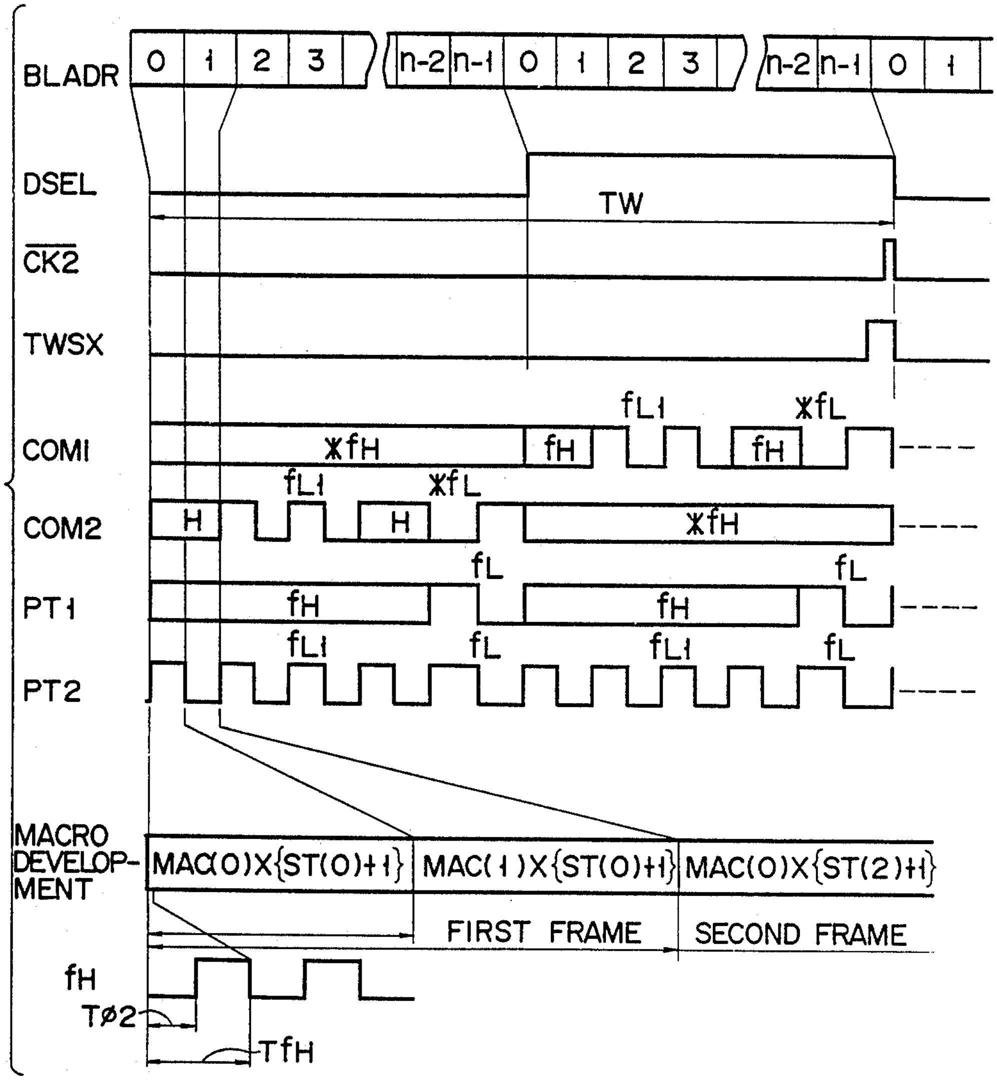
FIG. 6 is a timing chart showing the operation of the apparatus shown in FIG. 5.

In FIG. 5, memory 11 is a semiconductor memory for storing data (DSTATUS) shown in FIG. 7 at addresses (BLADR) "0" to "n−1" (where value "n" in this embodiment is different from value "n" in the related art), and comprises a RAM, an EEPROM, or the like. DSTATUS indicates macro data MAC(2X) (where x is an integer within the range of 0 to [(n/2)−1] and MAC(2x+1) or step count ST(2x) indicating the number of step when MAC(2x) and MAC(2x+1) are developed. Data DSTATUS is stored in memory 11 in the format shown in FIG. 8 in practice. As shown in FIG. 7, data ST(2x) has a one-word (8-bit) format, and each of data MAC(2x) and MAC(2x+1) has a 4-bit format. Data MAC(2x) and MAC(2x+1) are respectively stored in upper and lower portions of an identical word. Data ST(2x) indicates a common number of developing steps. {ST(2x), MAC(2x), MAC(2x+1)}, i.e., two words, form a one-frame waveform of an LCS drive signal. Therefore, memory 11 stores waveform patterns of LCS drive signals for n/2 frames. FIG. 6 shows waveforms of LCS drive signals COM1, COM2, PT1, and PT2 actually formed by {ST(2x), MAC(2x), MAC(2x+1)} shown in FIGS. 7 and 8. As shown in FIG. 6, MAC(0) is developed by {ST(0)+1} steps to form a first-half one block of a first frame of the LCS drive signal. MAC(1) is developed by (ST(0)+1) to form a second-half one block of the first frame. Similarly, second, third, . . . , (n/2)th frames of the LCS drive signals COM1, COM2, PT1, and PT2 are formed by {ST(2), MAC(2), MAC(3)}, {ST(4), MAC(4), MAC(5)}, . . . , {ST(n−2), MAC(n−2), MAC(n−1)}.

In one period (a time corresponding thereto will be indicated by Tw hereinafter) of actual LCS drive signals (two-divided LCS drive signals), signals COM1 and COM2 simply have symmetrical waveforms in the first half (Tw/2) and the second half (Tw/2) of the period. Therefore, in this embodiment, {ST(0), MAC(0), MAC(1)}, {ST(2), MAC(2), MAC(3)}, . . . , {ST(n−2), MAC(n−2), MAC(n−1)} are developed, and signals COM1 and COM2 are selectively output by data selector 18 as will be described later, as shown in FIG. 5.

In this embodiment, ST(2x) has an 8-bit format, and the step count can be a maximum of $2^8=256$ steps. In addition, MAC(2x) and MAC(2x+1) have a 4-bit format, and $2^4=16$ types of macro data can be defined.

Figure 9:
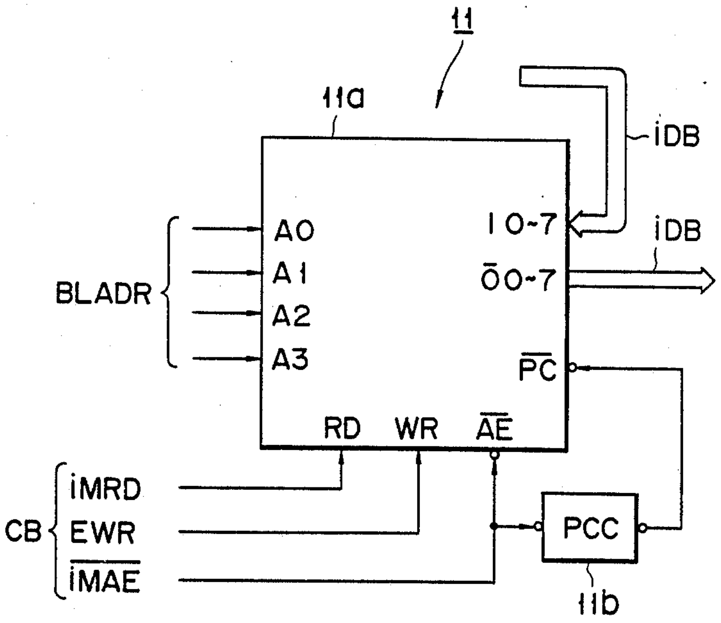
FIG. 9 is a view for explaining a RAM as memory 11 shown in FIG. 5 in detail.

FIG. 9 shows, in detail, memory 11 used in this embodiment.

Memory 11 is a synchronous type static RAM comprising gate arrays, and consists of memory cells 11*a* and precharge cells 11*b*. Each memory cell 11*a* receives block address signal BLADR output from up counter 12 (to be described later) at input terminals A0 to A3, and also receives signal iMRD and $\overline{iMAE}$ from data selector 21 (to be described later) through internal control bus CB at terminals RD and $\overline{AE}$. Memory cell 11*a* also receives write signal EWR at terminal WR from an external microcomputer (not shown) through internal control bus CB. Internal data bus iDB is connected to input terminals I0 to I7 and output terminals O0 to O7. Precharge cell 11*b* receives signal $\overline{iMAE}$ output from data selector 21, and an output from precharge cell 11*b* is input to terminal $\overline{PC}$ of memory cell 11*b*. Memory cell 11*a* has a capacity of n×8 bits. Note that in place of the RAM of this type, ROM (Read Only Memory) may be used. In this case, drive waveforms for a liquid crystal device can be generated using a ROM of a smaller capacity than that in the related art.

Referring again to FIG. 5, up counter 12 is a modulo-n counter, and performs counting in response to the leading edge of pulse signal BLCLK input from data selector 21 (to be described later), and outputs a count value (BLADR) to memory 11. Value BLADR serves as an address signal for memory 11. Thus, the count value is output from up counter 12 to memory 11 to designate addresses "0" to "n−1". Up counter 12 outputs, from terminals MIN and MAX to timing control section 20, signals $\overline{BLAMIN}$ and $\overline{BLAMAX}$ which are set at L level when count value BLADR indicates a minimum value (0) and a maximum value (n−1), respectively. Up counter 12 also outputs an LSB (Least Significant Bit) signal of count value BLADR to inverter 10. Inverter 10 outputs inverted signal BLADRO of the LSB signal to timing control section 20. Latch 13 receives step count ST(2x) output from memory 11 through internal data bus iDB in response to the leading edge of latch signal STL input from timing control section 20, and outputs the received data to down counter 15 (LSTD). Meanwhile, latch 14 receives macro data MAC(2x) and MAC(2x+1) output from memory 11 through internal data bus iDB in response to the leading edge of latch signal MACL input from timing control section 20, and outputs the received data to data selector 16 (LMAC).

Down counter 15 receives step count ST(2x) output from latch 13 as a count value in response to the leading edge of clock signal STCLK($\overline{\phi 2}$) when carry signal STCY is at H level, and performs down-count in synchronism with the leading edge of clock signal STCLK($\overline{\phi 2}$) sequentially input from timing control section 20. Down counter 15 outputs count value STCNT and carry signal STCY to timing control section 20. Carry signal STCY goes to H level only when count value STCNT is "0".

Data selector 16 is an inverting type selector which selects one of macro data MAC(2x) and MAC(2x+1) in accordance with select signal SELMAC input of timing control section 20, and outputs the selected data to macro decoder 17. During an L-level period of select signal SELMAC (first half of a frame), selector 16 inverts data MAC(2x) and outputs it to macro decoder 17. During an H-level period of select signal SELMAC (second half of a frame), selector 16 inverts data MAC(2x+1) and outputs it to macro decoder 17. Macro decoder 17 receives inverted data of macro data MAC(2x) or MAC(2x+1) from data selector 16 at input terminals $\overline{A}$ to $\overline{D}$, and clock signal $\phi 3$ from timing control section 20 at input terminal E. Decoder 17 generates a first-half portion of a frame of each of inverted signals $\overline{PT1}$, $\overline{PT2}$, $\overline{COM1}$ and $\overline{COM2}$ of signals PT1, PT2, COM1, and COM2 shown in FIG. 6. Decoder 17 outputs signals $\overline{COM1}$ and $\overline{COM2}$ to data selector 18 from terminals $\overline{Y3}$ and $\overline{Y4}$, and outputs $\overline{PT1}$ and $\overline{PT2}$ to terminals I1 and I2 of latch 19 from terminals $\overline{Y1}$ and $\overline{Y2}$. Decoder 17 receives external LCS drive enable signal $\overline{DRVEN}$ at terminal $\overline{G1}$, and also receives another LCS drive enable signal at terminal G2 although not shown.

Figure 10:
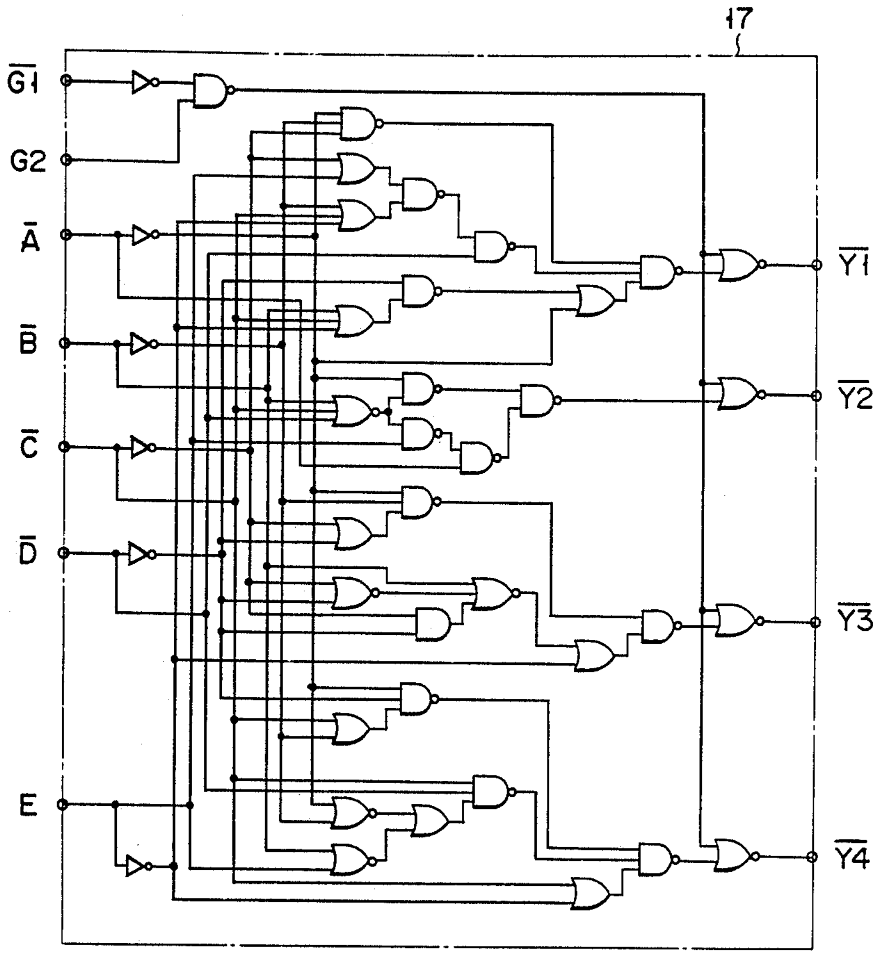
FIG. 10 is a detailed circuit diagram of macro decoder 17 shown in FIG. 5.

FIG. 10 shows an internal arrangement of macro decoder 17. As shown in FIG. 10, only when $\overline{G1}$=L level and G2=H level, $\overline{Y1}$, $\overline{Y2}$, $\overline{Y3}$, and $\overline{Y4}$ outputs are valid.

Data selector 18 is adopted to output $\overline{Y3}$ and $\overline{Y4}$ outputs from macro decoder 17 to terminals I3 and I4 of latch 19 when selector signal DSELRQ is at L level (in the first half of a frame) and to output Y3 and Y4 outputs from macro decoder 17 to terminals I3 and I4 of latch 19 when signal DSELRQ is at H level (in the second half of a frame). That is, selector 18 switches waveforms of COM1 and COM2 in the first and second halves of the frame, and outputs them to latch 19.

Figure 27B:
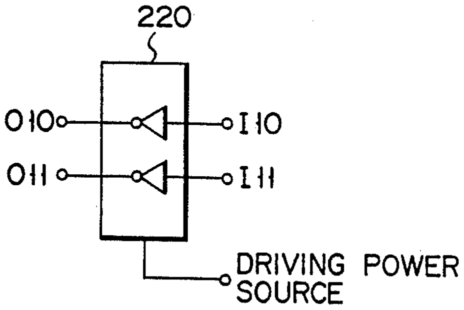
FIG. 27B is a circuit diagram of high-voltage driver 220 shown in FIG. 27A.
Figure 28B:
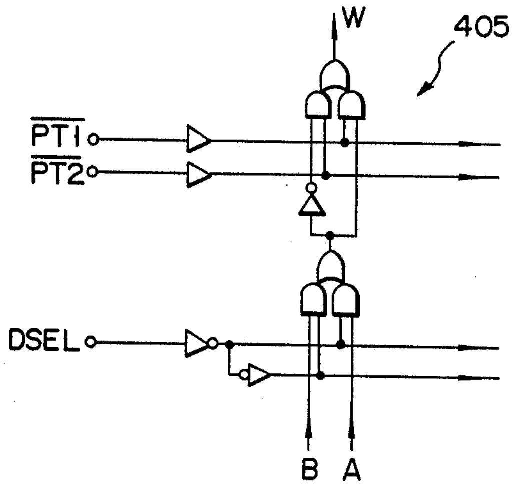
FIG. 28B is a circuit diagram of multiplexer 405 shown in FIG. 28A.
Figure 27A:
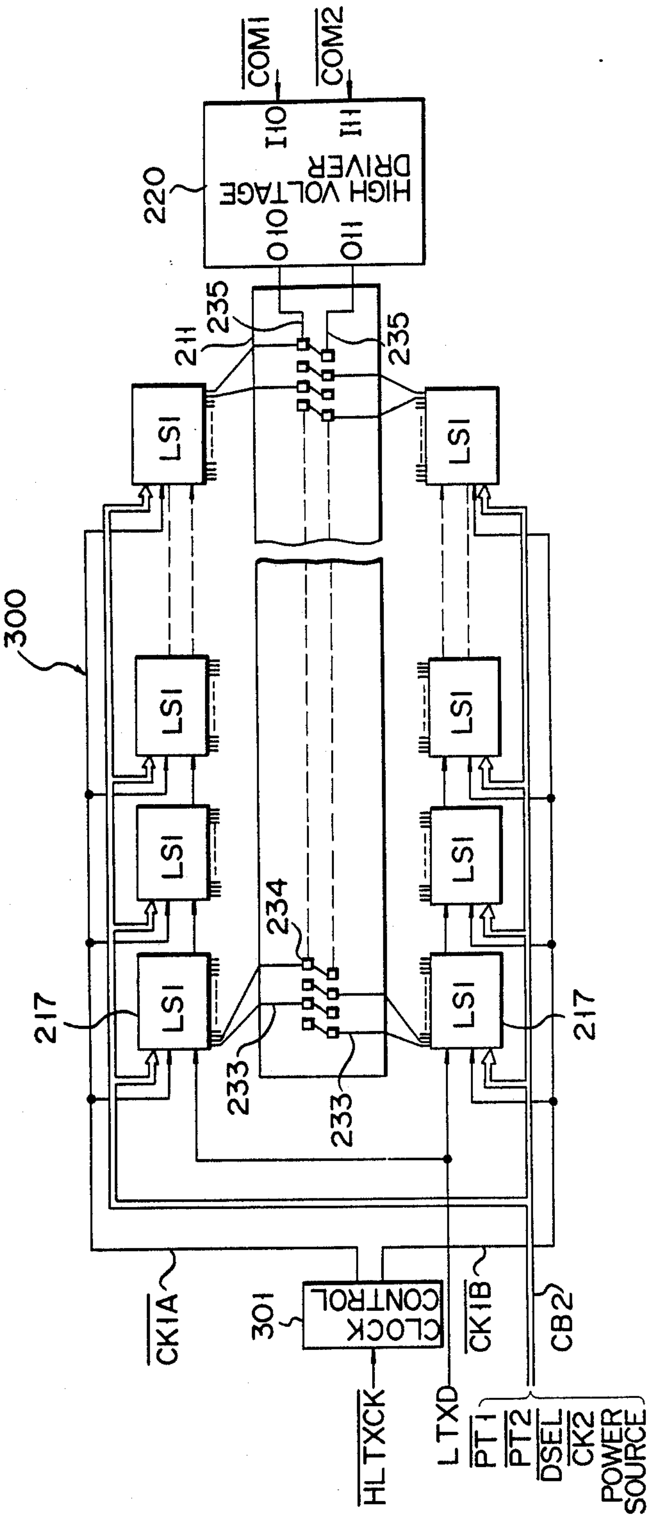
FIG. 27A is a block diagram showing an arrangement of recording control section 300.

Latch 19 receives $\overline{Y1}$ and $\overline{Y2}$ outputs from macro decoder 17, O1 and O2 outputs from data selector 18, and DSELRQ, CK2RQ, and TWSXRQ output from timing control section 20 in response to the leading edge of clock signal $\phi 1$ input from timing control section 20, and outputs them to recording control section 300 as shown in FIG. 27A as LCS drive signals $\overline{PT1}$, $\overline{PT2}$, $\overline{COM1}$, and $\overline{COM2}$, and timing signals DSEL, $\overline{CK2}$, and $\overline{TWSX}$.

Oscillating element 22 and inverter 31 (to be described later; FIG. 11A) of timing control section 20 constitute an oscillation circuit, and timing control section 20 receives reference clock signal $\phi xx2$ as an output from the oscillation circuit. Section 20 frequency-divides an inverted signal of reference clock signal $\phi xx2$ to generate clock signals $\phi 1$, $\phi 2$, and $\phi 3$. Section 20 outputs clock signal $\phi 1$ to clock terminal CK of latch 19, and clock signal $\phi 3$ to an E terminal of macro decoder 17. In addition, section 20 outputs signal STCLK($\overline{\phi 2}$) as the inverted signal of clock signal $\phi 2$ to clock terminal CK of down counter 15. Furthermore, section 20 outputs latch signals STL and MACL to terminals CK of latches 13 and 14, thus controlling timings at which latches 13 and 14 receive step count data ST(2x) {macro data MAC(2x), MAC(2x+1)} output from memory 11. Moreover, section 20 outputs select signal SELMAC to select terminal S of data selector 16, and causes selector 16 to select macro data MAC(2x) and MAC(2x+1) and to output selected data to macro decoder 17. Section 20 also outputs select signal DSELRQ to select terminal S of data selector 18 and causes selector 18 to switch output signals from terminals $\overline{Y3}$ and $\overline{Y4}$ of macro decoder 17 and to output them to terminals I3 and I4 of latch 19. Select signal DSELRQ is also input to latch 19 together with control signals CK2RQ and TWSXRQ.

Timing control section 20 is connected to data selector 21 through internal control bus iCB, and supplies clock signal iBLCLK to data selector 21 through internal control bus iCB.

Section 20 receives, from inverter 10, inverted signal BLADRO of the LSB signal of block address signal BLADR output from up counter 12 to memory 11, and receives, from up counter 12, signals $\overline{BLAMAX}$ and $\overline{BLAMIN}$ which go to L level when the address values of block address signal BLADR are maximum value (n−1) and minimum value (0), respectively. Section 20 also receives carry signal STCY and count value STCNT from down counter 15.

Figure 11B:
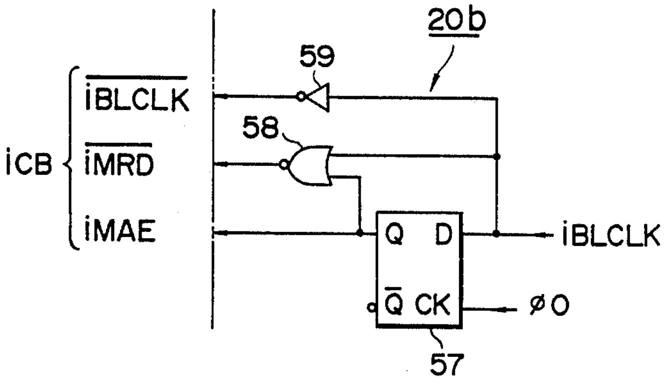
FIGS. 11A and 11B are circuit diagrams of timing control section 20 shown in FIG. 5.
Figure 11A:
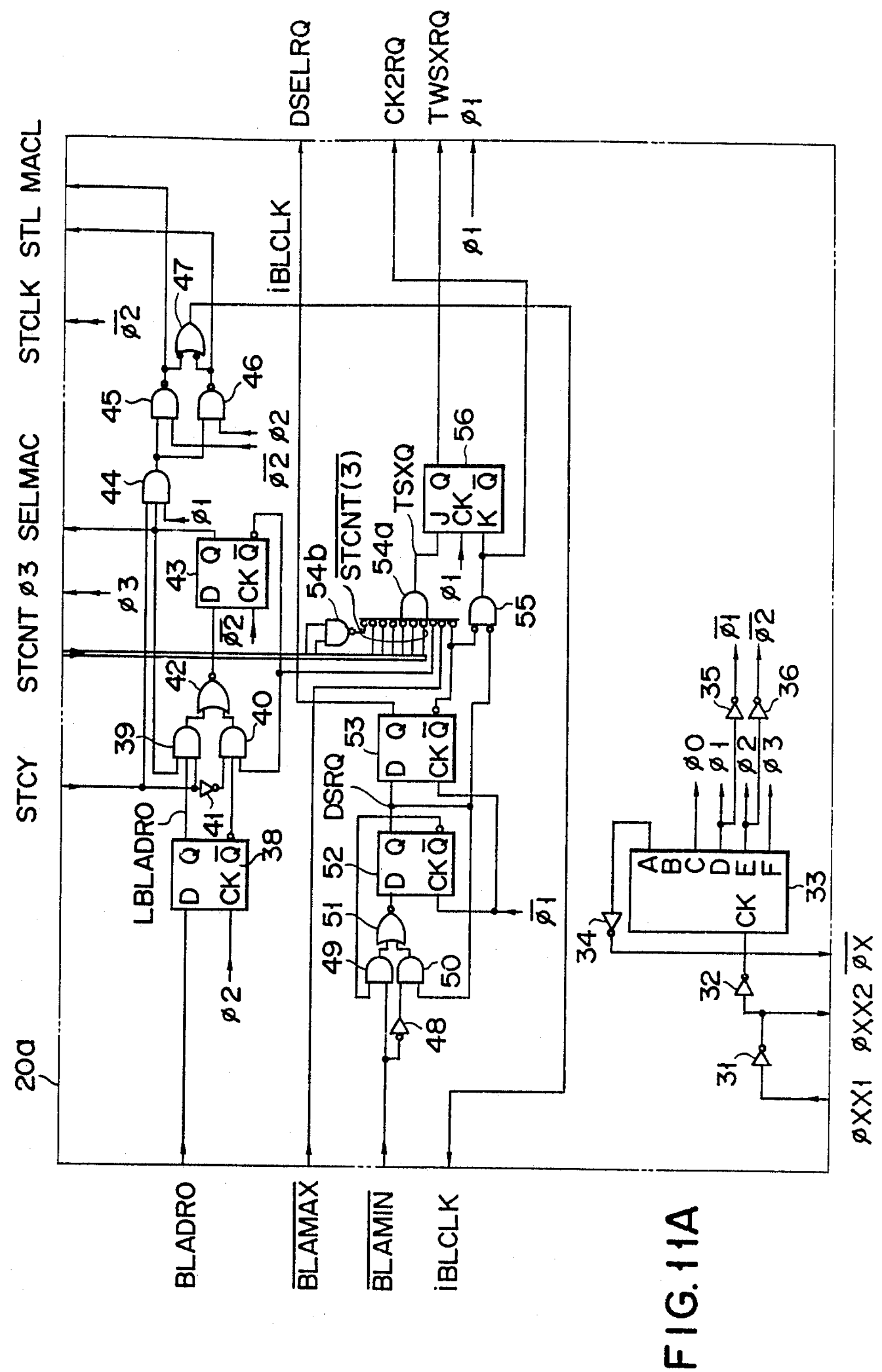

FIGS. 11A and 11B show the internal arrangement of timing control section 20. Timing control section 20 comprises timing control circuits 20*a* and 20*b*. Referring first to FIG. 11A (also referring to FIG. 5), clock signal $\phi xx2$ as an output from the oscillation circuit constituted by oscillating element 22 and inverter 31 is input to inverter 32, and clock signal $\overline{\phi xx2}$ inverted by inverter 32 is input to timing generator 33. Timing generator 33 frequency-divides clock signal $\overline{\phi xx2}$ to generate five clock signals $\phi x$, $\phi 0$, $\phi 1$, $\phi 2$, and $\phi 3$ and to output them from output terminals A, C, D, E, and F, respectively. Clock signal $\phi x$ is inverted by inverter 34 and signal $\overline{\phi x}$ is supplied to an external circuit. Clock signals $\phi 1$ and $\phi 2$ are respectively inverted by inverters 35 and 36 to be clock signals $\overline{\phi 1}$ and $\overline{\phi 2}$.

Inverted signal BLADRO of the LSB of block address signal BLADR output from inverter 10 shown in FIG. 5 is input to data input terminal D of flip-flop 38 shown in FIG. 11A. Flip-flop 38 is operated in synchronism with clock signal $\phi 2$, and its Q output (LBLADRO) is input to AND gate 39. A $\overline{Q}$ output of flip-flop 38 is input to AND gate 40. AND gate 39 receives carry signal STCY output from down counter 15 (FIG. 5) and a Q output (SELMAC) from flip-flop 43 (to be described later) in addition to signal LBLADRO. AND gate 40 receives an inverted signal of carry signal STCY from inverter 41 and a $\overline{Q}$ output from flip-flop 43 in addition to the $\overline{Q}$ output from flip-flop 38. The outputs from AND gates 39 and 40 are input to NOR gate 42, and the output from NOR gate 42 is input to terminal D of flip-flop 43. Flip-flop 43 is operated in synchronism with clock signal $\overline{\phi 2}$, and outputs its Q output (SELMSC) to data selector 16 and AND gates 39 and 44. The $\overline{Q}$ output of flip-flop 43 is supplied to AND gate 40 and NOR gate 54*a*. AND gate 44 receives carry signal STCY, signal SELMAC, and clock signal $\phi 1$, and its output is supplied to NAND gates 45 and 46. NAND gates 45 and 46 respectively receive clock signals $\overline{\phi 2}$ and $\phi 2$. The output (STL) from NAND gate 46 is input to latch 13 and NAND gate 47. The output (MACL) from NAND gate 45 is input to latch 14 and NAND gate 47. The output (iBLCLK) from NAND gate 47 is supplied to input terminal D of flip-flop 57, NOR gate 58, and inverter 59 shown in FIG. 11B. Flip-flop 57 is operated in synchronism with the leading edge of clock signal $\phi 0$, and its Q output (iMAE) is input to data selector 21 through internal control bus iCB and to NOR gate 58. The output ($\overline{iMRD}$) from NOR gate 58 and the output ($\overline{iBLCKL}$) from inverter 59 are input to data selector 21 through internal control bus iCB.

When block address signal BLADR output from up counter 12 indicates a minimum value (0), L-level signal $\overline{BLAMIN}$ output from up counter 12 is input to inverter 48 and AND gate 49, as shown in FIG. 11A. AND gate 49 also receives a $\overline{Q}$ output from flip-flop 52 (to be described later), and its output is supplied to NOR gate 51. AND gate 50 receives the output from inverter 48 and the Q output from flip-flop 52, and its output is supplied to NOR gate 51. Flip-flops 52 and 53 are operated in synchronism with clock signal $\overline{\phi 1}$. The Q output (DSRQ) from flip-flop 52 is input to terminal D of flip-flop 53 and to AND gate 50 and NOR gate 55. Flip-flop 53 supplies its $\overline{Q}$ output (DSELRQ) to latch 19, and supplies its $\overline{Q}$ output to NOR gates 54a and 55. Lower 2 bits of 8-bit signal STCNT output from down counter 15 are input to NAND gate 54b. The output from NAND gate 54b is input to NOR gate 54a. Upper 6 bits of signal STCNT are input to NOR gate 54a. Note that a 7-bit signal constituted by the output from NAND gate 54b and upper 6 bits of signal STCNT is referred to as signal $\overline{STCNT}$(3). NAND gate 54a receives signal $\overline{BLAMAX}$ output from up counter 12, the $\overline{Q}$ output from flip-flop 43, and the Q output from flip-flop 53. The output from NOR gate 54a is input to terminal J of flip-flop 56. NOR gate 55 receives the Q output from flip-flop 52 and the $\overline{Q}$ output from flip-flop 53, and its output (CK2RQ) is input to terminal K of flip-flop 56 and terminal I6 of latch 19. Flip-flop 56 is a J-K flip-flop operated in synchronism with clock signal $\phi 1$, and its Q output (TWSXRQ) is output to latch 19.

Data selector 21 outputs, to up counter 12, clock signal BLCLK for incrementing block address signal BLADR, and outputs reset signal RBLADR to reset terminal R of up counter 12 to reset up counter 12. Data selector 21 is connected to external control bus EXCB and internal control bus iCB. When signal iSEL on external control bus EXCB is at L level, selector 21 selects bus EXCB; when at H level, selector 21 selects bus iCB. Data selector 21 outputs, to memory 11 through control bus CB, a control signal for performing read/write access to memory 11. When internal control bus CB is selected, selector 21 inverts signals $\overline{iBLCLK}$, $\overline{iMRD}$, and iMAE input from timing control circuit 20b through bus iCB to obtain signals BLCLK, iMRD, and $\overline{iMAE}$. Selector 21 then outputs signal BLCLK to up counter 12, and outputs iMRD and $\overline{iMAE}$ to memory 11 through control bus CB.

The operation of the LCS drive signal generator with the above arrangement will be explained below.

The operation of timing control section 20 will first be described with reference to the timing charts shown in FIG. 12, FIGS. 13A and 13B, and FIG. 14. A case will be described below wherein a transmission from the second half of an (n/2)th frame to a 1st frame is performed.

When count value STCNT of down counter 15 has reached "00000011", i.e., "3", signal $\overline{STCNT}$(3) becomes "0000000" (FIG. 11A).

Figure 12:
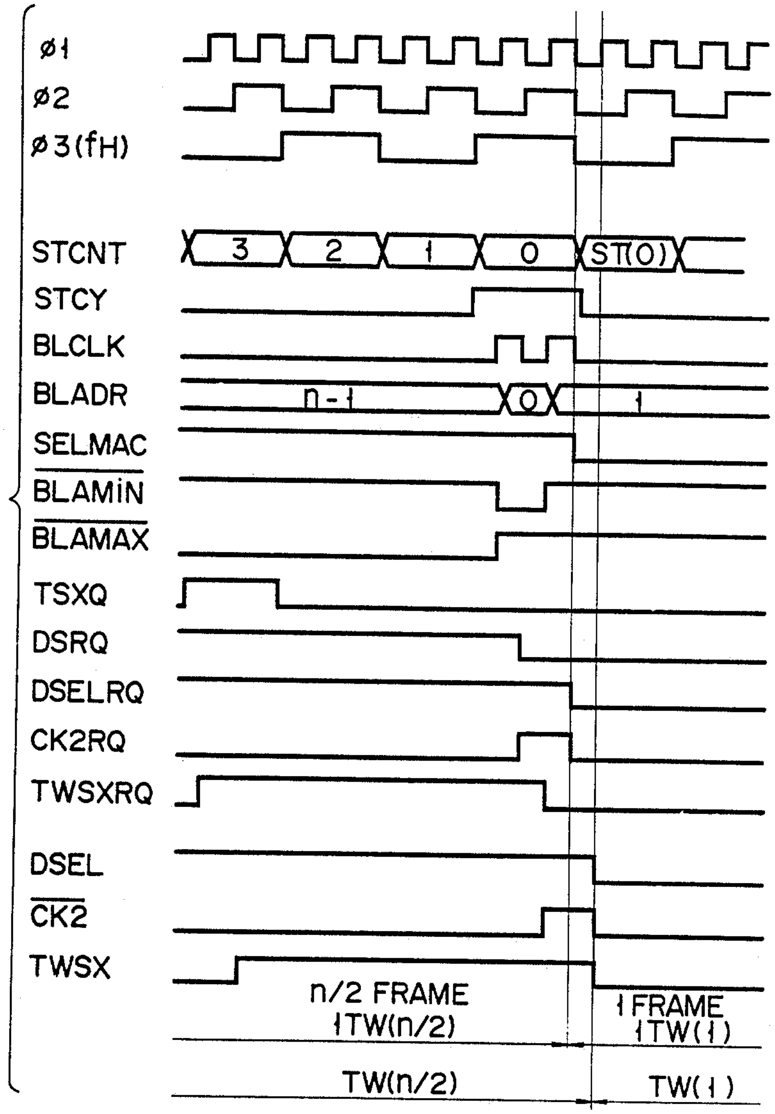
FIG. 12 and FIGS. 13A and 13B are flow charts showing the operation of the apparatus according to an embodiment shown in FIG. 5.

At this time, as shown in the flow chart of FIG. 12, since signal BLAMAX is at L level, the Q output (SELMAC) from flip-flop 43 is at H level (that is, its $\overline{Q}$ output is at L level), and the Q output (DSRQ) from flip-flop 52 is at H level (that is, the Q output (DSELRQ) from flip-flop 53 is at L level), the output (TSXQ) from NOR gate 54a goes to H level, and is applied to terminal J of flip-flop 56. Since signal DSRQ is at H level, the output from AND gate 55 goes to L level, and is applied to terminal K of flip-flop 56. For this reason, the Q output (TWSXRQ) from flip-flop 56 goes to H level in response to the leading edge of clock signal $\phi 1$. Signal TSXQ goes again to L level when count value STCNT of down counter 15 reaches "00000010" (2). In this manner, signal TSXQ goes to H level only when count value STCNT of down counter 15 is "00000011". Meanwhile, signal DSRQ goes to L level in response to the leading edge of clock signal $\overline{\phi 1}$ (i.e., trailing edge of clock signal $\phi 1$) when block address signal BLADR output from up counter 12 is "0", i.e., when signal BLAMIN is at L level. When signal DSRQ goes to L level, the output (CK2RQ) from AND gate 55 goes to H level.

When the output levels of signals DSRQ and CR2RQ are inverted, the Q output (TWSXRQ) from flip-flop 56 goes to L level in response to the leading edge of next clock signal $\overline{\phi 1}$. When clock signal $\overline{\phi 1}$ rises (i.e., clock signal $\phi 1$ falls), since signal DSRQ is at L level, the Q output (DSELRQ) from flip-flop 53 goes to L level. In response to this, signal CK2RQ goes from H level to L level.

Signals DSELRQ, CK2RQ, and TWSXRQ are output to latch 19 (FIG. 5) together with clock signal $\phi 1$.

Figure 13A:
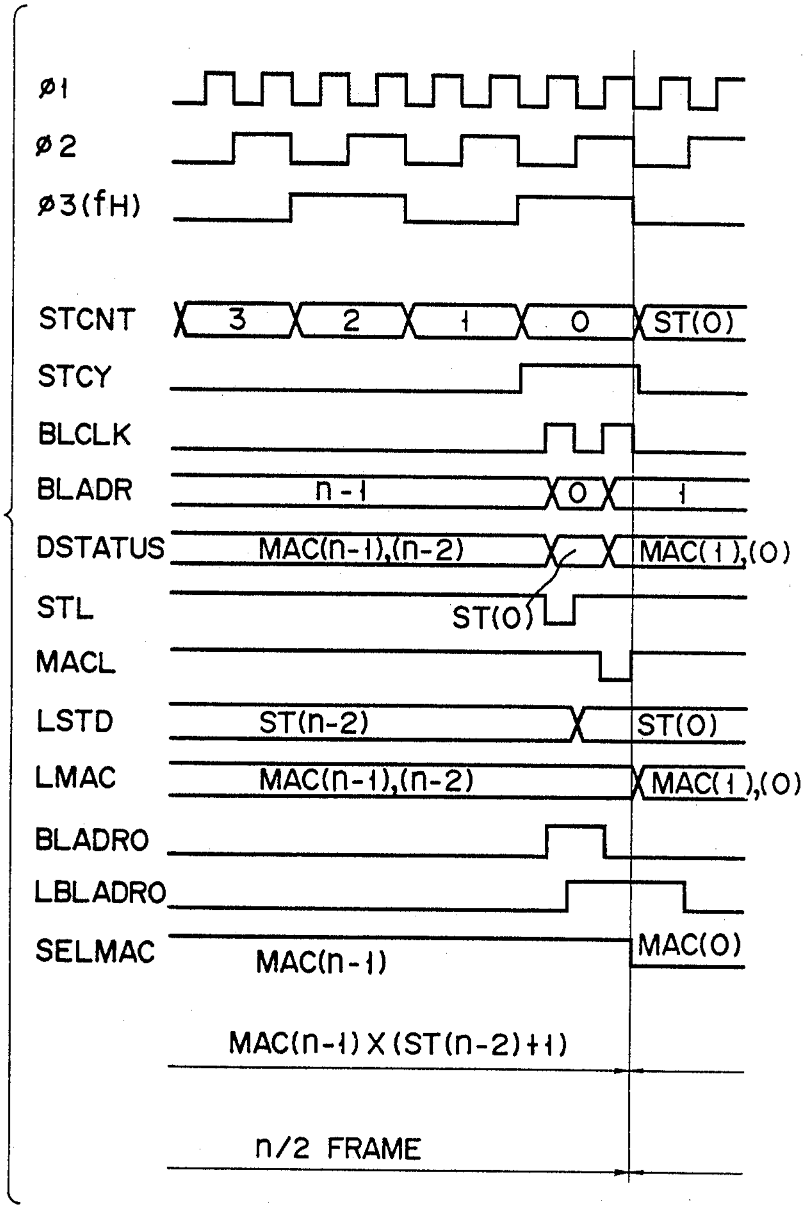
Figure 13B:
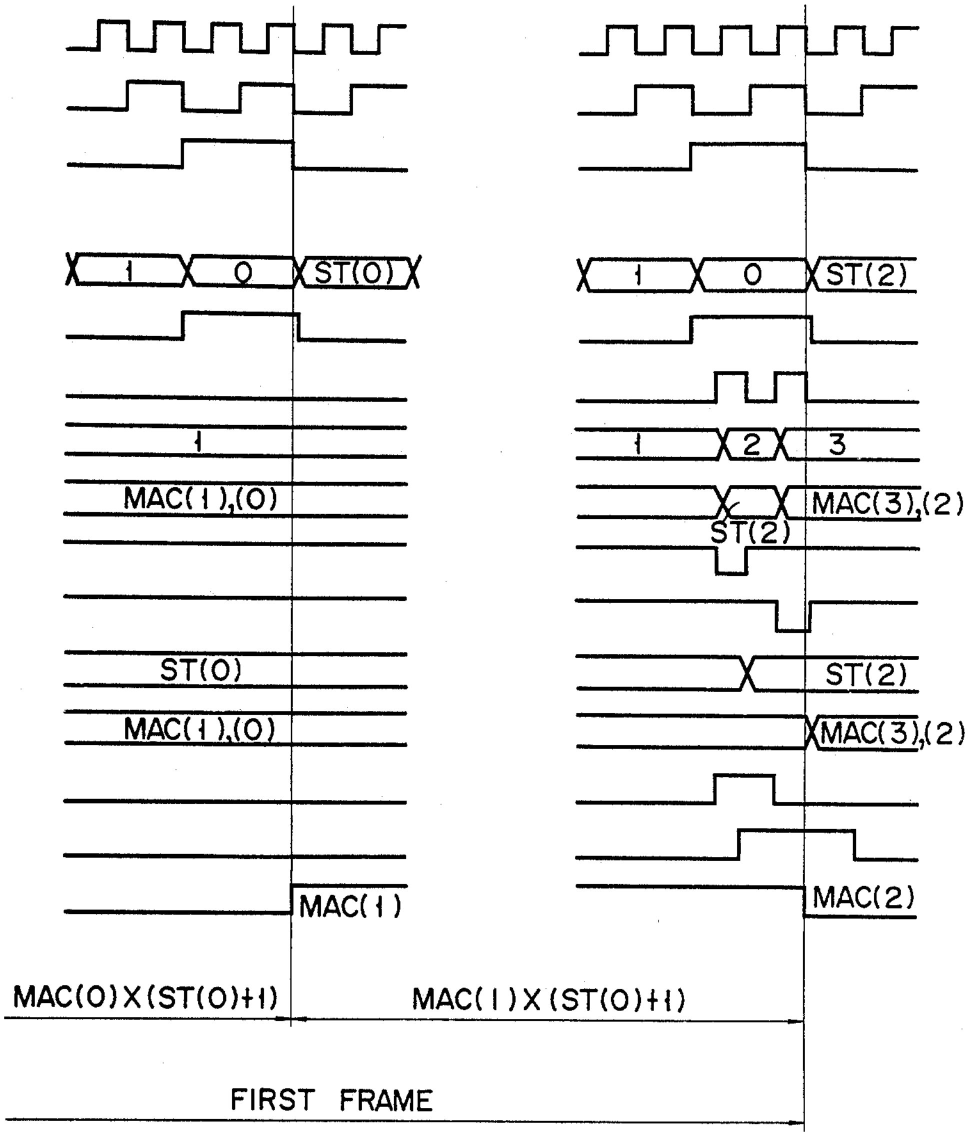

A description will be made with reference to the timing charts of FIGS. 13A and 13B. When count value STCNT of down counter 15 has reached "0", carry signal STCY output from down counter 15 goes to H level. In this case, since signal SELMAC is at H level, clock signal $\phi 1$ passes through AND gate 44 and is input to NAND gates 45 and 46. For this reason, during an H-level interval of carry signal STCY, clock signal $\phi 2$ is output from NAND gate 46 to latch 13 as signal STL, and clock signal $\overline{\phi 2}$ is output from NAND gate 45 to latch 14 as signal MACL. Clock signals $\overline{\phi 2}$ and $\phi 2$ passing through NAND gates 45 and 46, respectively, are input to NAND gate 47 to be converted to two-pulse signal iBLCLK. Then, signal iBLCLK is input to flip-flop 57, NOR gate 58, and inverter 59 in timing control circuit 20b shown in FIG. 11B, thus generating signals iMAE, $\overline{iMRD}$, and $\overline{iBLCLK}$ shown in the timing chart of FIG. 14. These signals are input to data selector 21 through internal control bus iCB. Signals iMAE and $\overline{iMRD}$ are inverted by data selector 21 to be $\overline{iMAE}$ and iMRD, and these signals are input to memory 11. Signal $\overline{iBLCLK}$ is also inverted by data selector 21 to the iBLCLK, and is input to up counter 12. Thus, BLADR=0 is output from up counter 12 to memory 11 in response to the leading edge of the first pulse of signal BLCLK shown in the timing charts of FIGS. 13A and 13B. Then, step count ST(0) stored at block address "0" is output from memory 11 to internal data bus iDB in response to the leading edge of signal iMAE shown in FIG. 14. Similarly, BLCLK="1" is output from up counter 12 to memory 11 in response to the leading edge of the second pulse of signal BLCLK, and {MAC(1), MAC(0)} is output from memory 11 onto internal data bus iDB in response to the leading edge of signal iMAE. When block address signal BLADR output from up counter 12 has reached "0", signal BLADRO goes to H level, as shown in FIG. 11A, and is input to terminal D of flip-flop 38. Then, the Q output (LBLADRO) from flip-flop 38 goes to H level in response to the leading edge of clock signal $\phi 2$. For this reason, signals STCY, LBLADRO, SELMAC go to H level, and hence, the output from AND gate 39 goes to H level. Therefore, the output from NOR gate 42 goes to L level, and is input to terminal D of flip-flop 43. The Q output (SELMAC) from flip-flop 43 goes to L level in response to the leading edge of next clock signal $\phi 2$. Down counter 15 then performs count-down of step count ST(O). When count value STCNT has reached "0", carry signal STCY goes again to H level. However, in this case, since signal SELMAC is at L level, clock signal $\phi 1$ cannot pass through AND gate 44, and signal iBLCLK from NAND gate 47 is not pulsated. For this reason, block address signal BLADR output from up counter 12 is left unchanged, i.e., "1", and signals BLADRO and LBLADRO are kept at L level. Since clock signal $\phi 1$ does not pass through gate 44, signals LSTD and LMAC are left unchanged, i.e., ST(0) and {MAC(0), (1)}. Furthermore, since signals SELMAC and LBLADRO are at L level and signal STCY is at H level, the output from NOR gate 42 goes to H level, and the Q output (SELMAC) goes to H level in response to the leading edge of clock signal $\overline{\phi 2}$. Even if signal STCY goes to L level, since signal SELMAC is at H level, the output from NOR gate 42 is kept at H level, and signal SELMAC is also kept at H level. Thus, MAC(1) is selected by data selector 16, and inverted data of MAC(1) is output to macro decoder 17. A change in level of signal SELMAC is caused by the output (H level) of next carry signal STCY.

The one-frame operation of timing control section 20 has been described.

Next, the operation of the overall LCS drive signal generator will be described hereinafter. At the beginning of use of the generator, when data DSTATUS shown in FIG. 7 is to be written in memory 11, LCS drive enable signal $\overline{DRVEN}$ is externally set at H level, and the outputs from terminals $\overline{Y1}$, $\overline{Y2}$, $\overline{Y3}$, and $\overline{Y4}$ of macro decoder 17 are set at L level. For this reason, all LCS drive signals $\overline{PT1}$, $\overline{PT2}$, $\overline{COM1}$, and $\overline{COM2}$ output from latch 19 go to L level, and signal electrodes and common electrodes of the LCS (not shown) are set at the same potential. Therefore, the LCS is set in an inoperative state, in practice, and hence, an accidental voltage, in particular, a DC voltage can be prevented from being applied to the LCS.

Selection signal iSEL is set at L level through external control bus EXCB to select external control bus EXCB. Thereafter, reset signal RBLADR is set at H level through external control bus EXCB, thus resetting up counter 12. Then, data DSTATUS is written in memory 11 through external data bus EXDB. At this time, address signal BLADR from memory 11 is supplied to memory 11 through up counter 12 by supplying clock signal BLCLK from an external apparatus to up counter 12 through external control bus EXCB. A control signal (not shown) for write access is input to data selector 21 through external control bus EXCB, and is supplied from data selector 21 to memory 11 through control bus CB.

After data DSTATUS is written at block addresses BLADR[0] to [n−1] of memory 11 with the above operation, it is confirmed that all the data DSTATUS are normally written. If all the data DSTATUS are normal, select signal iSEL is set at H level through external control bus EXCB to select internal control bus iCB. LCS drive enable signal $\overline{DRVEN}$ for enabling the LCS drive signals and timing signals sets select signal iSEL at H level, and thereafter, sets it at L level (enable) at least one period Tw later. An H level signal is kept input from an external apparatus to terminal G2 of macro decoder 17. Thus, the LCS drive signals and timing signals are normally operated. Note that during an idling state, signal $\overline{DRVEN}$ is set at H level to disable the LCS, thus effectively prolonging the service life of the LCS.

The operation for one period Tw in the circuit shown in FIG. 5 will be described with reference to the timing charts shown in FIG. 12 and FIGS. 13A and 13B. As shown in the timing chart of in FIG. 12, when count value STCNT of down counter 15 has reached "0" in the second half of an (n/2)th frame, carry signal STCY goes to H level, and two-pulse signal iBLCLK is supplied from timing control section 20 to data selector 21 through internal control bus iCB, and two-pulse clock signal BLCLK is input to clock terminal CK of up counter 12 through data selector 21. During an H-level interval of carry signal STCY, clock signal $\phi 1$ serves as latch signal STL (during an H-level interval of $\phi 2$) and latch signal MACL (during an H level interval of $\phi 2$) and these latch signals are respectively input to latches 13 and 14. As shown in the timing charts of FIGS. 13A and 13B, up counter 12 starts counting in response to the leading edge of the first pulse of clock signal BLCLK. When block address signal BLADR becomes "0", data DSTATUS=ST(0) at block address signal BLADR=0 is output onto internal data bus iDB. Data ST(0) is input to latch 13 in response to the leading edge of latch signal STL (LSTD). Up counter 12 outputs block address signal BLADR=1 in response to the leading edge of the second pulse of clock signal BLCLK, and macro data MAC(0) and MAC(1) are output from memory 11 onto internal data bus iDB. Data MAC(0) and MAC(1) are input to latch 14 in response to the leading edge of latch signal MACL (LMAC).

When all carry signal STCY, select signal SELMAC, and signal LBLADRO are at H level, select signal SELMAC goes from H level to L level in response to the trailing edge of clock signal $\phi 2$. For this reason, data selector 16 selects macro data MAC(0), and its inverted data is input to macro decoder 17. Since signal LBLADR0 goes to L level in response to the leading edge of next clock signal $\phi 2$ since signal BLADRO is kept at L level. Select signal SELMAC is left unchanged until count value STCNT of down counter 15 reaches "0" since its output level is changed in response to the trailing edge of clock signal $\phi 2$ when carry signal STCY is set at H level.

Therefore, while step count data ST(0) is counted down by down counter 15 and reaches "0", i.e., during (ST(0)+1)xT$\phi 2$, inverted data of macro data MAC(0) is input to macro decoder 17, and LCS drive signals $\overline{PT1}$, $\overline{PT2}$, $\overline{COM1}$, and $\overline{COM2}$ are generated (T$\phi 2$ indicates one period of clock signal $\phi 2$).

When H-level carry signal STCY is output from down counter 15, no clock signal iBCLK is generated since select signal SELMAC is at L level. Therefore, clock signal BLCLK is not pulsated, and block address signal BLADR is left unchanged.

When carry signal STCY is at H level and signal LBLADRO is at H level, since select signal SELMAC goes to L level in response to the trailing edge of clock signal $\phi 2$, data selector 16 selects macro data MAC(1), and its inverted data is input to macro decoder 17. When carry signal STCY is at H level, since step count data ST output from latch 13 is set in down counter 15 in response to the trailing edge of clock signal $\phi 2$, macro decoder 17 then generates LCS drive signals $\overline{PT1}$, $\overline{PT2}$, $\overline{COM1}$, and $\overline{COM2}$ based on the value of macro data MAC(1) during a period of (ST(0)+1xT$\phi 2$). In this manner, the one-frame operation is completed.

When the count-down of down counter 15 is completed and hence carry signal STCY goes to H level, since signal SELMAC is set at H level, two-pulse signal iBLCK is output from timing control section 20 in synchronism with clock signal $\phi 1$, and then, clock pulses BLCLK are input to up counter 12 through data selector 21. Block address signal BLADR (=2,3) is output from up counter 12 in synchronism with signal BLCLK. Then, step count data ST(2) is input to latch 13 in response to the leading edge of latch signal STL, and macro data MAC(2) and MAC(3) are input to latch 14 in response to the leading edge of latch signal LMAC. During an H-level interval of carry signal STCY, step count data ST(2) is set in down counter 15 in response to the trailing edge of clock signal $\phi 2$. Thereafter, LCS drive signals $\overline{PT1}$, $\overline{PT2}$, $\overline{COM1}$, and $\overline{COM2}$ are generated based on MAC(2) during a the first half period (ST(2)+1)xT$\phi$2 of the second frame and based on data MAC(3) during a second half period (ST(2)+1)xT$\phi$2 in the same manner as in the first frame.

Each time the one-frame operation is completed, timing control section 20 generates two-pulse signal iBLCLK, and two subsequent block addresses are output from up counter 12 to memory 11 in synchronism with signal iBLCLK (BLCLK). Step count ST(2x) is input to and latched by latch 13 in response to latch signal STL output from section 20, and macro data MAC(2x) and MAC(2x+1) are input to and latched by latch 14 in response to latch signal MACL from section 20 (where x is an integer falling within the range of 0 to [(n/2)−1]). Macro decoder 17 receives inverted data of macro data MAC(2x) in the first half of a frame, and inverted data of macro data MAC(2x+1) in the second half of the frame in response to signal SELMAC output from timing control section 20. Then, macro decoder 17 generates LCS drive signals PT1, PT2, COM1, and COM2 based on macro data MAC(2x) in the first half of the frame and based on macro data MAC(2x+1) in the second half of the frame.

Figure 14:
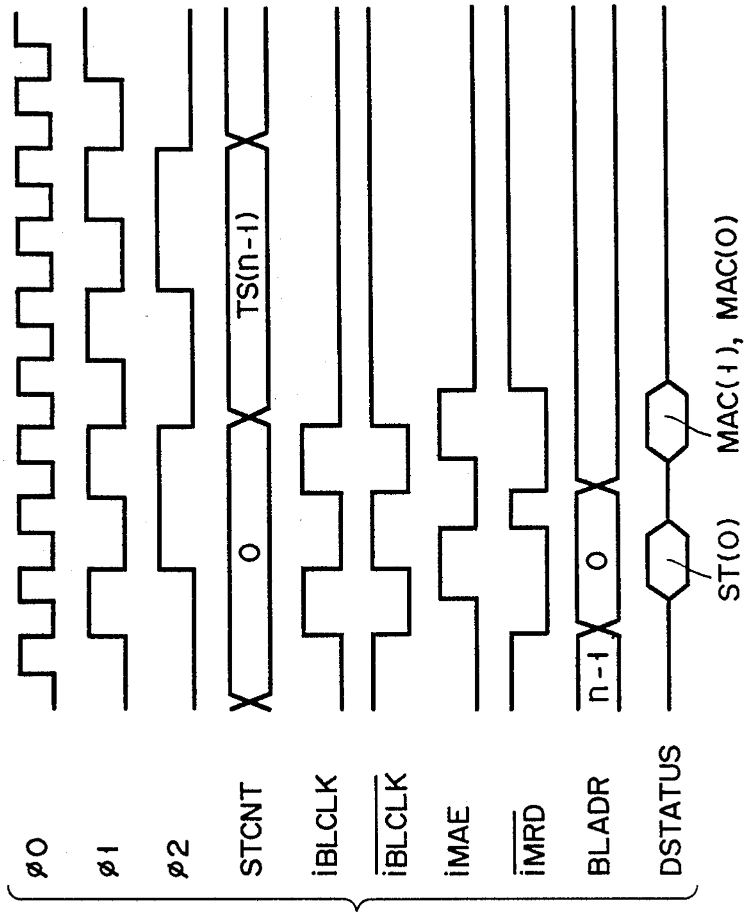
FIG. 14 is a timing chart for explaining a read operation of memory 11 shown in FIG. 5.

A period of the frame is defined by step count ST(2x), and corresponds to (ST(2x)+1)xT$\phi$2 in both the first and second halves of the frame. FIG. 6 shows waveforms of LCS drive signals COM1, COM2, PT1, and PT2 during period Tw, which are generated by developing macro data MAC(0) to MAC(n−1). COM1, COM2, PT1, and PT2 are signals representing LCS drive signals $\overline{COM1}$, $\overline{COM2}$, $\overline{PT1}$, and $\overline{PT2}$ output from latch 19 in positive logic, respectively. Referring to FIG. 6, fL and fL1 indicate low-frequency signals, fH and *fH indicate high-frequency signals. Waveforms *fL and *fH have phases respectively shifted from fL and fH by 180 degrees. Macro decoder 17 generates AC waveforms with reference to clock signal $\phi 3$, and frequency TfH of fH is equal to period T 3 of clock signal $\phi 3$. As shown in FIG. 14, since the period of $\phi 3$ is twice that of $\phi 2$, TfH=2T$\phi$2, as shown in FIG. 6.

When the first half (Tw/2) of period Tw is completed, two-pulse signal BLCLK is generated in the same manner as described above, and signal BLADR=0, 1 is output from up counter 12 to memory 11. During BLADR=0, since signal BLAMIN is set at L level, the level of signal DSELRQ output from timing control section 20 goes from L level to H level, so that data selector 18 switches the $\overline{Y3}$ and $\overline{Y4}$ outputs from macro decoder 17 to the I4 and I3 inputs to latch 19. In the second half (Tw/2) of period Tw, macro data MAC(0) to MAC(n−1) are developed based on step counts ST(0) to ST(n−2). However, since the $\overline{Y3}$ and $\overline{Y4}$ outputs from macro decoder 17 are switched by data selector 18, the waveforms of signals COM1 and COM2 are replaced with each other in the first and second halves (Tw/2) of period Tw, as shown in FIG. 6.

As shown in the timing chart of FIG. 12, in the second half of the last frame (an (n/2)th frame) of the second half (Tw/2) of period Tw, when count value STCNT output from down counter 15 has reached "00000011" (3), the output (TSXQ) from NOR gate 54 of timing control section 20 goes to H level, and the Q output (TSWXRQ) from flip-flop 56 goes to H level. When count value STCNT has reached "0", carry signal STCY from down counter 15 goes to H level, and two-pulse signal BLCLK is generated.

When signal BLADR output from up counter 12 becomes "0" in response to the first pulse of signal BLCLK, signal BLAMIN goes to L level, and the Q output (DSRQ) from flop-flop 52 of timing control section 20 goes from H level to L level in response to the leading edge of signal $\overline{\phi 1}$ (i.e., the trailing edge of signal $\phi 1$).

Therefore, the output (CK2RQ) from NOR gate 55 goes from L level to H level. Since signal TSQX is already at L level, the Q output (TWSXRQ) from flip-flop 56 goes to L level again in response to the leading edge of signal $\phi 1$.

Signal DSRQ is input to flip-flop 53 in response to the leading edge of signal $\overline{\phi 1}$ (i.e., the trailing edge of signal $\phi 1$), and the Q output (DSELRQ) from flip-flop 55 goes from H level to L level. Furthermore, since signal DSELRQ goes to L level, the output (CK2RQ) from NOR gate 55 goes to L level again.

Signals DSELRQ, CK2RQ, and TWSXRQ output from timing control section 20 are input to latch 19 in response to the leading edge of clock signal $\phi 1$, and are output to recording control section 300 (FIG. 27A) as signals DSEL, $\overline{CK2}$, and $\overline{TWSX}$, respectively.

Figures 15A, 15B:
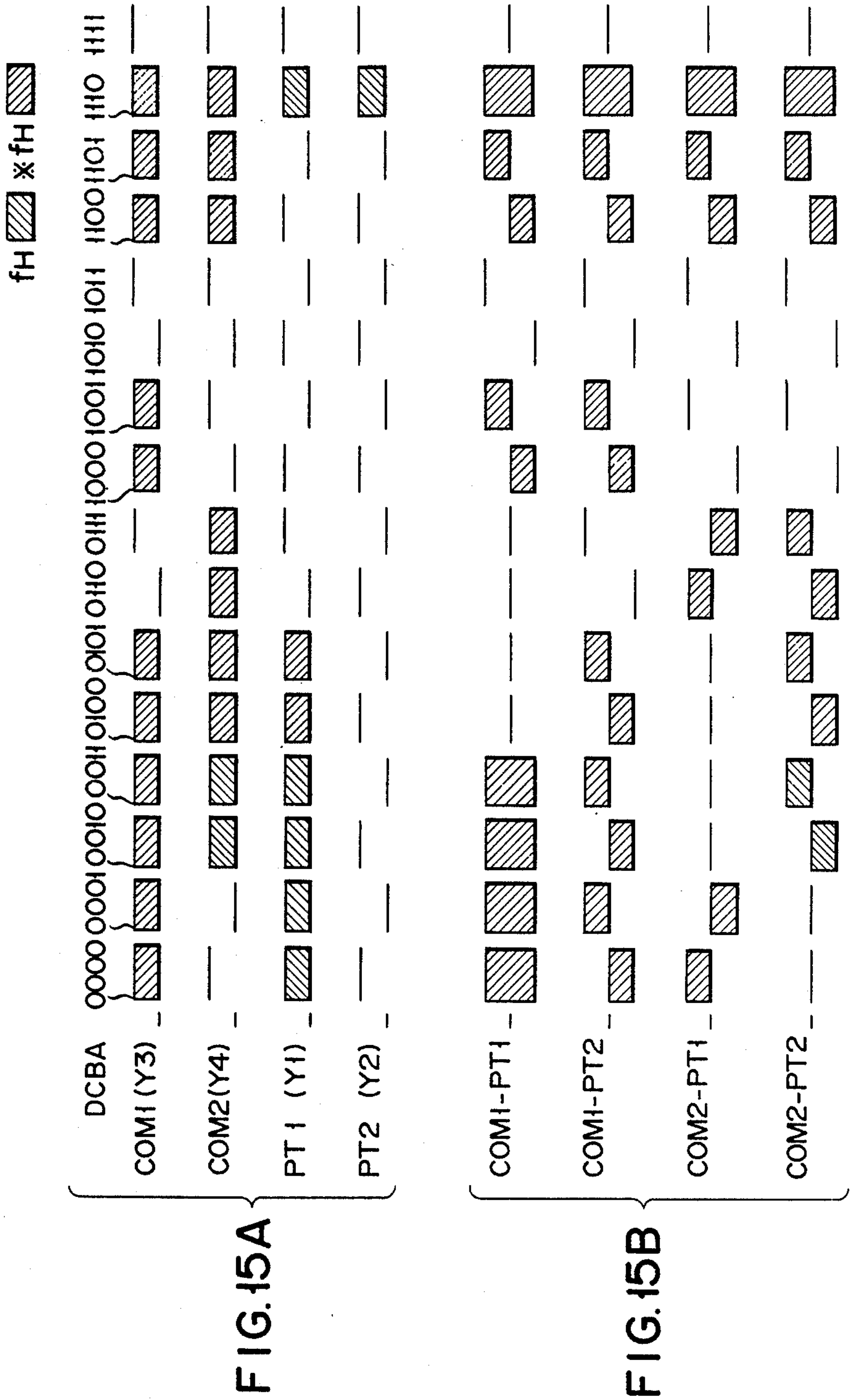
FIG. 15A shows signal waveform patterns of LCS drive signals COM1, COM2, PT1, and PT2 generated by the apparatus shown in FIG. 5.
FIG. 15B shows voltage waveform patterns applied to the LCS by using combinations of the signal waveforms shown in FIG. 15A.

FIG. 15A shows waveform patterns representing signals $\overline{COM1}$, $\overline{COM2}$, $\overline{PT1}$, and $\overline{PT2}$ in positive logic, which are generated by macro decoder 17 in accordance with the value of MAC(2x) or MAC(2x+1). Referring to FIG. 15A, the value of macro data MAC(2x) or MAC(2x+1) is indicated by DCBA, where D indicates the MSB (most significant bit) and A indicates the LSB (least significant bit). In FIG. 15A, fH and *fH are high-frequency signals, and *fH is a signal phase-shifted from signal fH by 180 degrees.

Sixteen combinations of $\overline{COM1}$, $\overline{COM2}$, PT1, and $\overline{PT2}$ are possible. For example, in order to generate waveforms shown in FIG. 6, 6 types of DCBA, i.e., "0000", "0001", "0010", "0011", "1000", and "1001", are used as can be seen from FIG. 8. Therefore, if data DSTATUS stored in memory 11 is changed, various waveforms different from those shown in FIG. 6 can be generated.

FIG. 15B shows waveform patterns of LCS drive signals generated by respective combinations when signals COM1 and COM2 are applied to common electrodes and signals PT1 and PT2 are applied to signal electrodes.

According to this embodiment, if the number of blocks is given as n, period Tw can be expressed as follows:

$$
\begin{aligned}
Tw &= 2 \cdot \{2 \times (ST(0) + 1) + \\
&\quad 2 \times (ST(2) + 1) + 2 \times (ST(n-2) + 1)\} \times T\phi 2 \\
&= 2 \cdot \{(ST(0) + 1) + ST(2) + 1 \ldots (ST(n-2) + 1)\}/fH
\end{aligned}
\qquad (2.1)
$$

where $T\phi2 = TfH/2 = \frac{1}{2}fH$ is used.

Since data ST(x) has an 8-bit format, $0 \leqq ST(x) \leqq 255$. Therefore, from equation (2.1), the range of period Tw can be defined as:

$$n/fH \leqq Tw \leqq 256/fH \quad (2.2)$$

More specifically, if n=16 blocks and fH=300 kHz, from equation (2.2), the range can be expressed by:

$$0.053 \text{ ms} \leqq Tw \leqq 13.653 \text{ ms} \quad (2.3)$$

Therefore, a waveform having a very wide range of a period can be generated. A DSTATUS capacity at this time is 16×8 bits. On the other hand, in the conventional drive signal generator, in order to obtain Tw=13.653, from equation (1.1), $$n = 2 \times 300 \times 10^{3} \times 13.653 \times 10^{-3} \approx 8192 \text{ blocks.}$$

In this case, the DSTATUS capacity is 8192×8 bits. Therefore, according to the above embodiment, an LCS drive signal having the same waveform (Tw=13.653 ms) can be obtained with a capacity of 16/8192=1/512 that of the prior art.

More specifically, the LCS drive signals having waveforms shown in FIG. 6 can be realized by DSTATUS of n=10 blocks shown in FIG. 8.

As described above, in the conventional LCS drive signal generator, DSTATUS of n=1200 blocks are necessary. Therefore, the capacity of data DSTATUS can be reduced to 10/1200=1/120.

Figure 16:
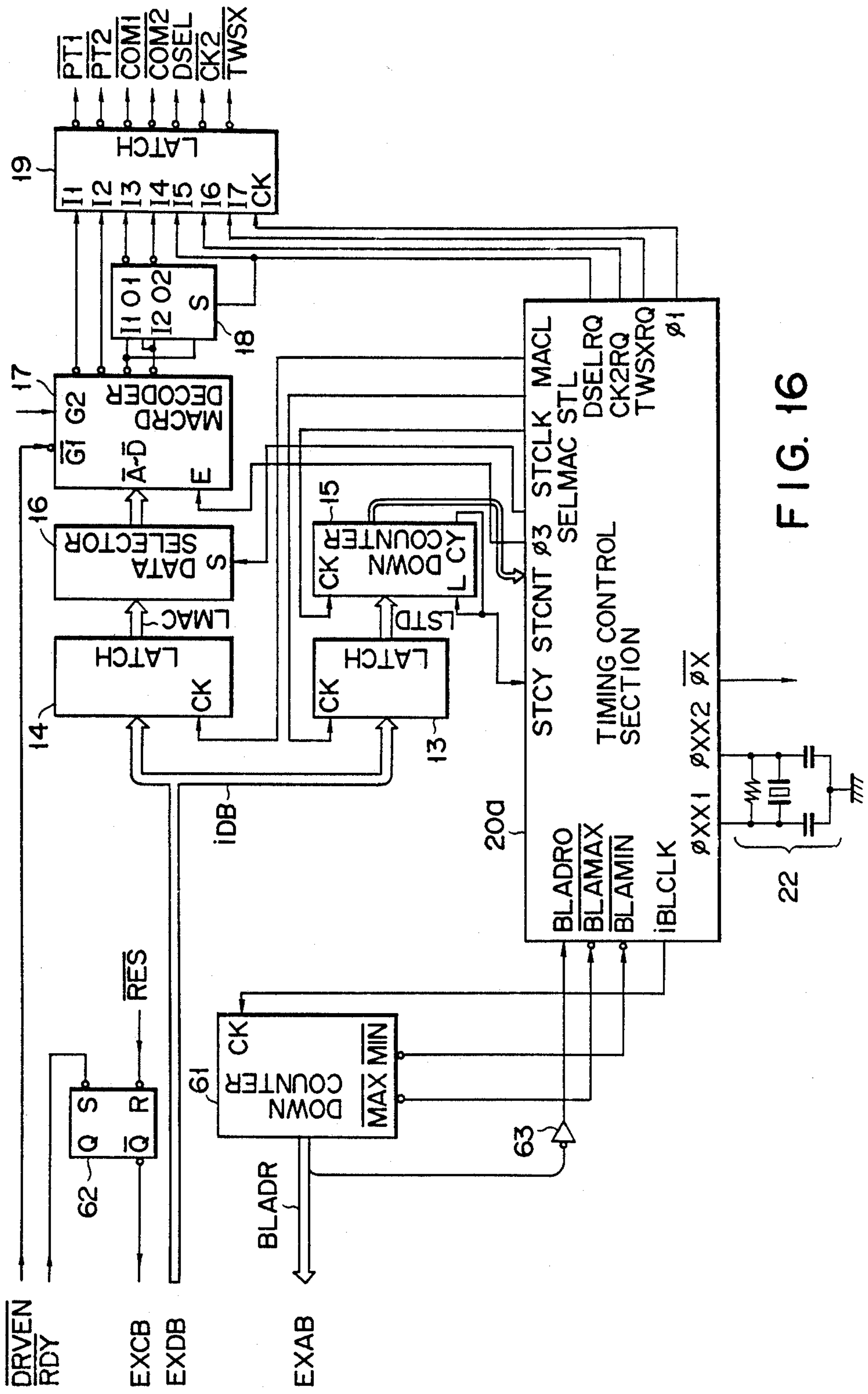
FIG. 16 is a block diagram of an arrangement of a waveform generating apparatus for driving a liquid crystal device according to another embodiment of the present invention.
Figure 17:
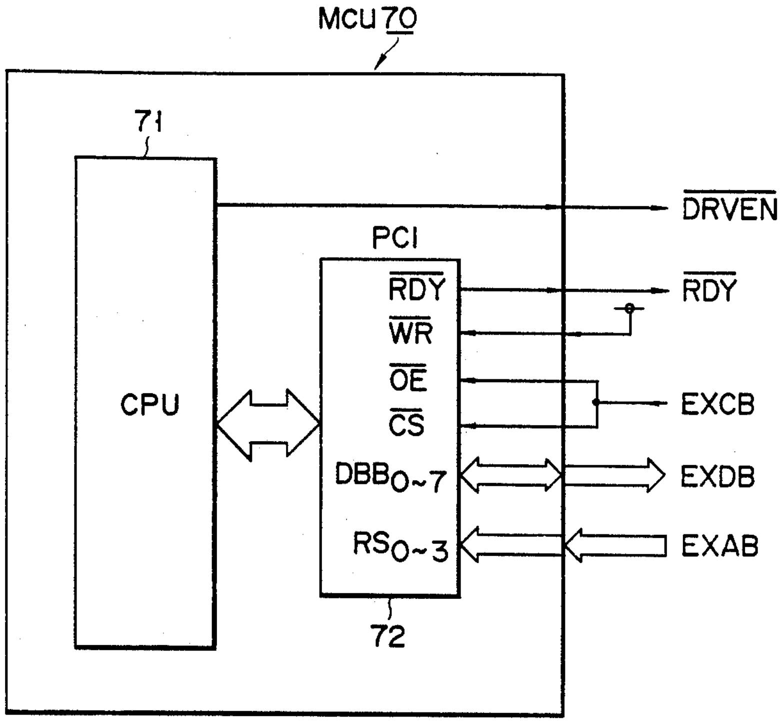
FIG. 17 is a block diagram showing an internal arrangement of an MCU.

FIGS. 16 and 17 are block diagrams showing a circuit arrangement according to another embodiment of the present invention.

FIG. 16 shows a modification of an LCS drive signal generator in the embodiment shown in FIG. 5, and the same reference numerals in FIG. 16 denote the same parts as in FIG. 5 and a detailed description thereof will be omitted. A timing control section in this embodiment consists of only timing control unit 20*a*. In the following description, timing control unit 20*a* will be referred to as timing control section 20*a* hereinafter, for the sake of simplicity. In FIG. 16, down counter 61 counts down values 15 to 2 in synchronism with the leading edge of pulse signal iBLCLK input from timing control section 20*a* through internal control bus iCB.

Down counter 61 outputs block address signal BLADR as its count value to MCU 70 shown in FIG. 17. Counter 61 outputs signals BLAMA and BLAMIN to timing control section 20*a*, and the LSB signal of block address signal BLADR to inverter 63. The LSB signal of signal BLADR is inverted by inverter 63, and inverted signal $\overline{\text{BLADRO}}$ is input to timing control section 20*a*. $\overline{\text{BLAMAX}}$ is a signal which goes to L level when signal BLADR indicates "2", and $\overline{\text{BLAMIN}}$ is a signal which goes to L level when signal BLADR indicates "15".

Internal data bus iDB connected to latches 13 and 14 is connected to MCU 70 through external data bus EXDB.

Flip-flop 62 receives ready signal $\overline{\text{RDY}}$ from MCU 70 at set terminal S, and reset signal $\overline{\text{RES}}$ from an external apparatus. Flip-flop 62 outputs its $\overline{\text{Q}}$ output (EXCB) to MCU 70. Terminal G1 of macro decoder 17 receives LCS drive enable signal $\overline{\text{DRVEN}}$ from MCU 70, and terminal G2 receives an external signal.

FIG. 17 is a block diagram showing an internal arrangement of MCU 70. MCU 70 is a one-chip microcomputer comprising CPU (central processing unit) 71 and PCI (parallel communication interface). 72. CPU 71 controls LCS drive enable signal $\overline{\text{DRVEN}}$ input to terminal G1 of macro decoder 17, and also controls validity of LCS drive signals $\overline{\text{COM1}}$, $\overline{\text{COM2}}$, $\overline{\text{PT1}}$, and $\overline{\text{PT2}}$ output from macro decoder 17.

Figure 18:
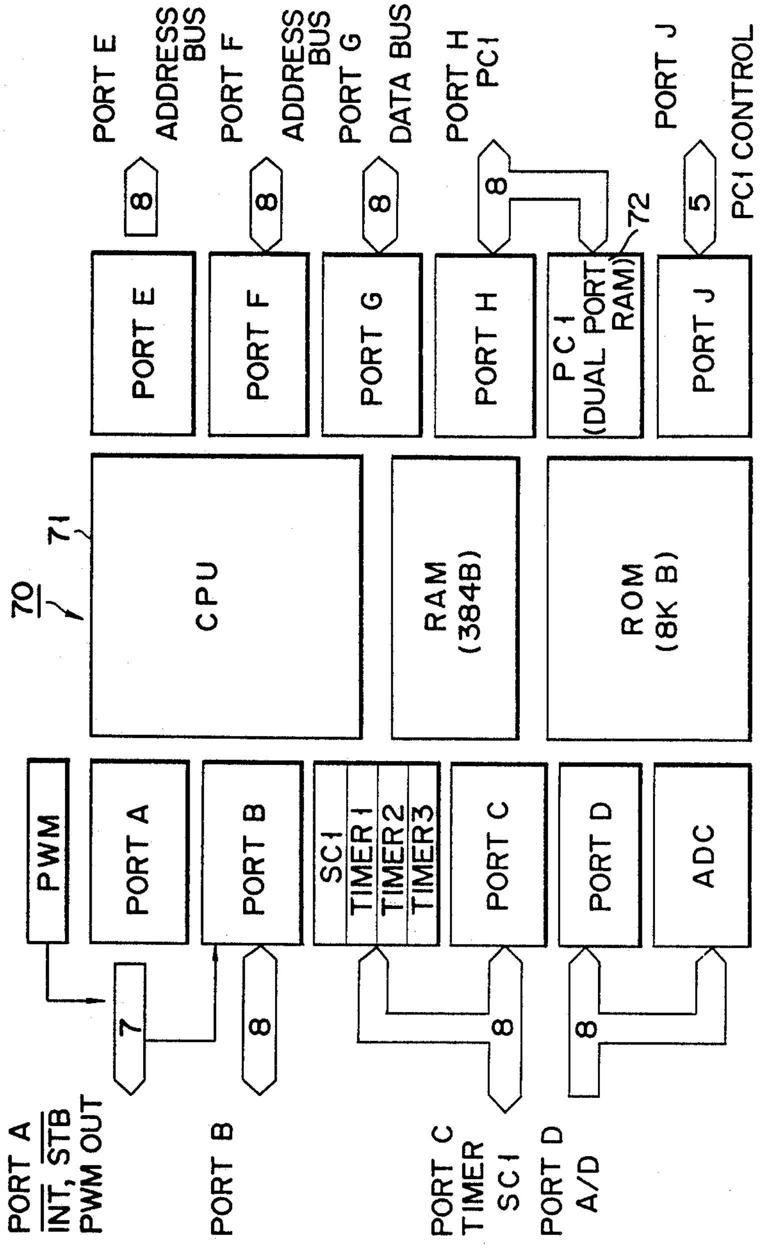
FIG. 18 is a block diagram showing the detailed arrangement of MCU 70 shown in FIG. 17.
Figures 19A, 19B:
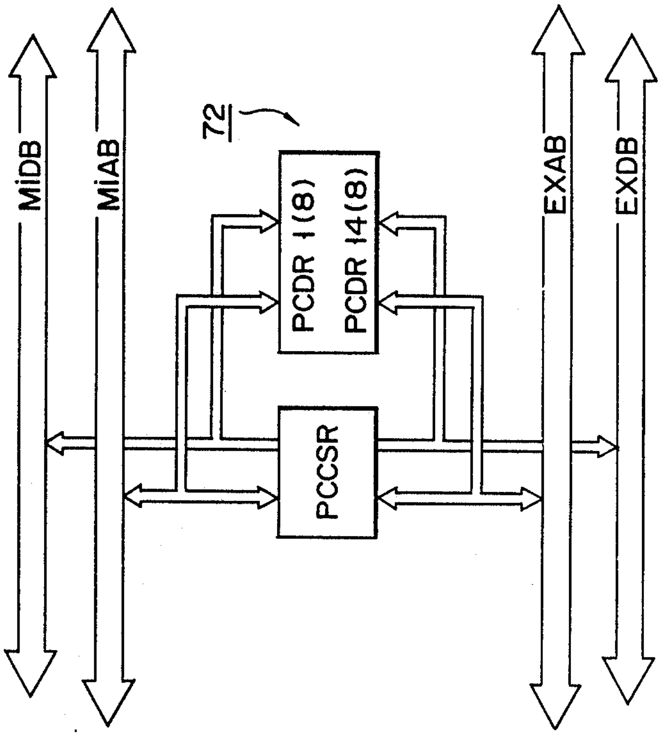
FIG. 19A is a diagram showing the arrangement of PCI 72 shown in FIG. 18 in relation with buses.
FIG. 19B is a view for explaining selection of PCDR1 to PCDR14 as PCI registers shown in FIG. 19A.

FIG. 18 shows the internal arrangement of MCU 70 in more detail. PCI 72 has a dual port RAM (FIG. 18) consisting of 14 8-bit data registers PCDR1 to PCDR14 and 8-bit control register PCCSR, as shown in FIG. 19A. In FIG. 19A, MiDB and MiAB respectively indicate a data bus and an address bus inside the MCU. Data registers PCRD1 to PCDR14 store step count ST(2m) and macro data MAC(2m) and MAC(2m+1). Since a total of two words of {ST(2m), MAC(2m), MAC(2m+1)} constitute one frame of an LCS drive signal, period Tw is constituted by 7 frames in this embodiment. Note that m is an integer within the range of 0 to 6.

As shown in FIG. 17, PCI 72 supplies ready signal $\overline{\text{RDY}}$ to terminal S of flip-flop 62, and receives the $\overline{\text{Q}}$ output (EXCB) from flip-flop 62 at terminals $\overline{\text{OE}}$ and $\overline{\text{CS}}$. PCI 72 outputs step counts ST(0) to ST(12) and macro data MAC(0) to MAC(13) stored in data registers PCDR1 to PCDR14 to latches 13 and 14 through external data bus EXDB, and receives signal BLADR from down counter 61 at input terminals RS0 to RS3 through external address bus EXAB (FIG. 17). FIG. 19B shows the relationship between values of input terminals RS0 to RS3 and selected data registers PCDR1 to PCDR14. Since the LSB of signal BLADR is input to terminal RS0, when signal BLADR indicates "15" to "2", data registers PCDR14 to PCDR1 are selected.

Figure 20:
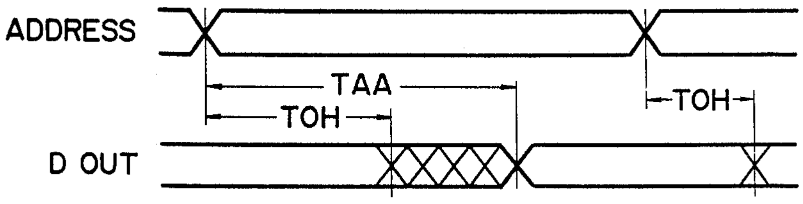
FIG. 20 is a timing chart showing a read timing of PCI registers PCDR1 to PCDR14 shown in FIG. 19B.

Read access of data registers PCDR1 to PCDR14 in PCI 72 is performed at a timing shown in FIG. 20 when $\overline{\text{OE}}$=L level, $\overline{\text{CS}}$=L level, and $\overline{\text{WR}}$=H level. In FIG. 20, TAA represents an access time, and TOH represents a shortest access time.

The operation of this embodiment with the above arrangement will be described. After MCU 70 completes write access of data DSTATUS in data registers PCDR1 to PCDR14 of PCI 72, it sets signal $\overline{\text{RDY}}$ from H level to L level. When signal $\overline{\text{RDY}}$ is set at L level, the $\overline{\text{Q}}$ output (L level) from latch 62 is supplied to terminals $\overline{\text{OE}}$ and $\overline{\text{CS}}$ of PCI 72 through external control bus EXCB to cause terminal $\overline{\text{WR}}$ to go to H level, thus allowing read access of data DSTATUS stored in data registers PCDR1 to PCDR14.

In the above embodiment, the same operation described with reference to FIGS. 6, 12, 13A and 13B is executed (note that signal BLADR periodically repeats a down-counting operation "15" to "2").

When two-pulse signal iBLCLK is input from timing control section 20*a* to clock terminal CK of down counter 61, address signal BLADR (=15−2m) for data register PCDR(15−2m−1) which stores step count ST(2m) is output to PCI 72 in CPU 70 through external address bus EXAB in response to the first pulse of signal iBLCLK. In response to the second pulse of signal iBLCLK, address signal BLADR (=15−2m−1) for data register PCDR(15−2m−2) which stores macro data MAC(2m) and MAC(2m+1) is output to PCI 72 through external address bus EXAB. Step count ST(2m) output onto external data bus EXDB from PCI 72 in accordance with address signal BLADR (=15−2m) is input to latch 13 in response to the leading edge of signal STL output from timing control section *20a*. Macro data MAC(2m) and MAC(2m+1) output onto external data bus EXDB in accordance with address signal BLADR (=15−2m−1) are input to latch 14 in response to the leading edge of signal MACL output from timing control section *20a*. Thereafter, during a period of (ST(2m+1)×Tϕ2 (the first half of the frame) during which down counter 15 counts down step count ST(2m) in the same manner as described with reference to FIGS. 6, 7, and 8, macro decoder 17 generates LCS drive signals COM1, COM2, PT1, and PT2 based on macro data MAC(2m). Next, during a period of (ST(2m)+1)×Tϕ2 (second half of a frame) during which down counter 15 counts down step count ST(2m), macro decoder 17 generates LCS drive signals COM1, COM2, PT1, and PT2 based on macro data MAC(2m+1).

When the above-mentioned operation is repeated (m=0 to 6), LCS drive signals $\overline{COM1}$, $\overline{COM2}$, $\overline{PT1}$, and $\overline{PT2}$, whose one period Tw consists of 14 frames are generated.

According to this embodiment, since data DSTATUS of blocks of n=14 is used, from equation (2.2), if fH=300 kHz, period Tw can be set within the range of:

$$0.024 \text{ ms} \leqq Tw \leqq 5.97 \text{ ms}.$$

Thus, no practical problem is posed.

Recording apparatus 200 to which the LCS drive signal generator of this embodiment is applied will be described.

Figure 22:
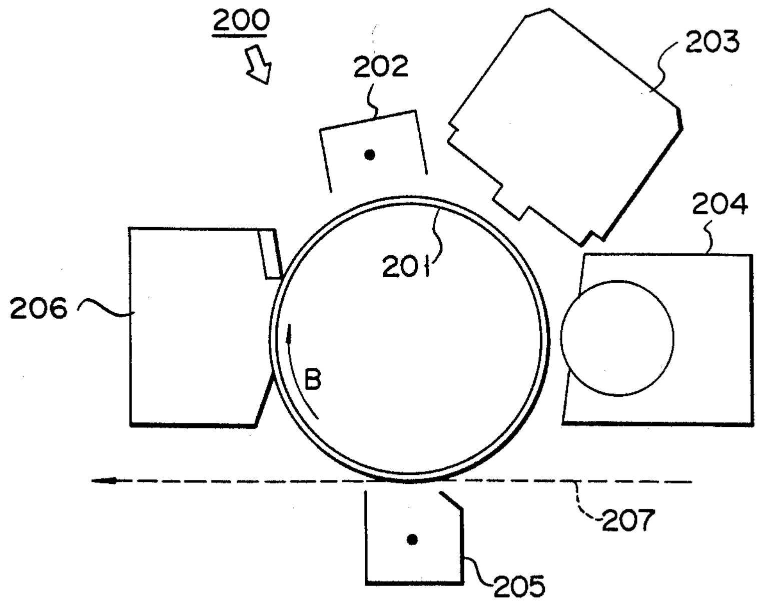
FIG. 22 is a schematic view of a recording apparatus to which a waveform generating apparatus of the present invention is applied.

FIG. 22 is a schematic view of recording apparatus 200. In FIG. 22, photosensitive drum 201 is constituted by coating or depositing a photoconductive material on an outer surface of a cylindrical base tube formed of a metal such as aluminum, and is rotated in a direction indicated by arrow B during a recording operation. Charger 202, optical recording head 203, developer 204, transfer device 205, cleaner 206, and the like are disposed around photosensitive drum 201.

Charger 202 performs corona discharge onto the surface of rotating photosensitive drum 201 to charge the surface of drum 201 to a predetermined potential. Optical recording head 203 performs light radiation in accordance with an image to be recorded onto the surface of photosensitive drum 201 which is charged to the predetermined potential, thus forming an electrostatic latent image (optical recording head 203 will be described later in detail).

The latent image formed on the surface of drum 201 is developed by developer 204 storing a toner to obtain a toner image.

The toner image overlaps transfer sheet 207 which is conveyed synchronously with the toner image by a convey means (not shown), and is transferred onto transfer sheet 207 by corona discharge of transfer device 205.

The toner image transferred onto transfer sheet 207 is fixed thereon by a fixing device (not shown), and transfer sheet 207 on which the toner image is fixed is discharged outside the apparatus. During the transfer operation, the toner left on the surface of drum 201 without being transferred to sheet 207 is removed by cleaner 206 therefrom.

Figure 23:
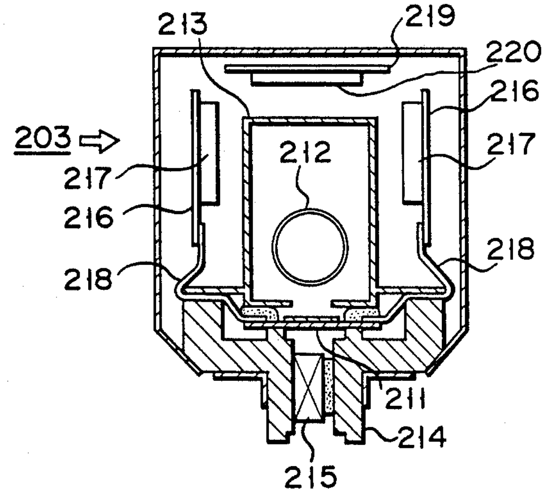
FIG. 23 is a sectional view of optical recording head 203 shown in FIG. 22.

FIG. 23 is a sectional view of optical recording head 203. The arrangement of optical recording head 203 will be described with reference to FIG. 23.

Figure 24:
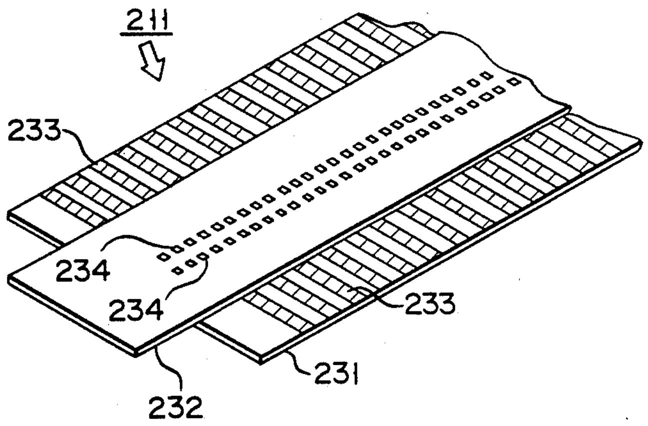
FIG. 24 is a perspective view of liquid crystal shutter (LCS) 211 shown in FIG. 23.

Liquid crystal shutter (LCS) 211 is arranged in optical recording head 203. FIG. 24 is a perspective view showing an arrangement of LCS 211. As shown in FIG. 24, LCS 211 is constituted by sealing a liquid cyrstal material (not shown) between lower and upper glass substrates 231 and 232. Signal electrodes 233 are formed on the upper surface of lower glass substrate 231, and two common electrodes (not shown) extending substantially perpendicular to signal electrodes 233 are formed on the lower surface of upper glass substrate 232. Microshutter 234 is formed at an intersection between each signal electrode 233 and the common electrode.

Each microshutter 234 is individually ON/OFF by supplying a predetermined drive signal to the common electrode and supplying on ON/OFF drive signal for turning on/off microshutter 234 to corresponding signal electrode 233.

Referring again to FIG. 23, fluorescent lamp 212 as a light source for illuminating LCS 211 with light is housed in lamp case 213. A space inside lamp case 213 is formed to communicate with external air for cooling fluorescent lamp 212. LCS 211 is fixed to a positioning reference portion of head base 214 to be accurately positioned. Focusing lens array 215 is also fixed at a predetermined position on head base 214 to have the predetermined positional relationship with LCS 211.

Driver circuit boards 216 are arranged at both sides of lamp case 213. LCS drive LSI 217 corresponding to a LCS driver is mounted on each circuit board 216. A conductive pattern (not shown) extending from each LCS drive LSI 217 is formed at a lower end portion of a surface of circuit board 216 facing lamp case 213 at the same pitch as the disposition pitch of signal electrodes 233.

The conductive pattern of each circuit board 216 and signal electrodes (FIG. 25) of LCS 211 are connected through film-like electrode connector 218 as a flexible connector having an image forming pattern formed at the same pitch as that described above.

Driver circuit board 219 for supplying a drive signal to the common electrodes is provided above lamp case 213. High-voltage driver 220 for converting a logical-level signal waveform into an actual signal waveform at a voltage of twenty and odd volts to be applied to the common electrodes is mounted on circuit board 219. Circuit board 219 and the common electrodes are connected through a connector (not shown).

Figure 25:
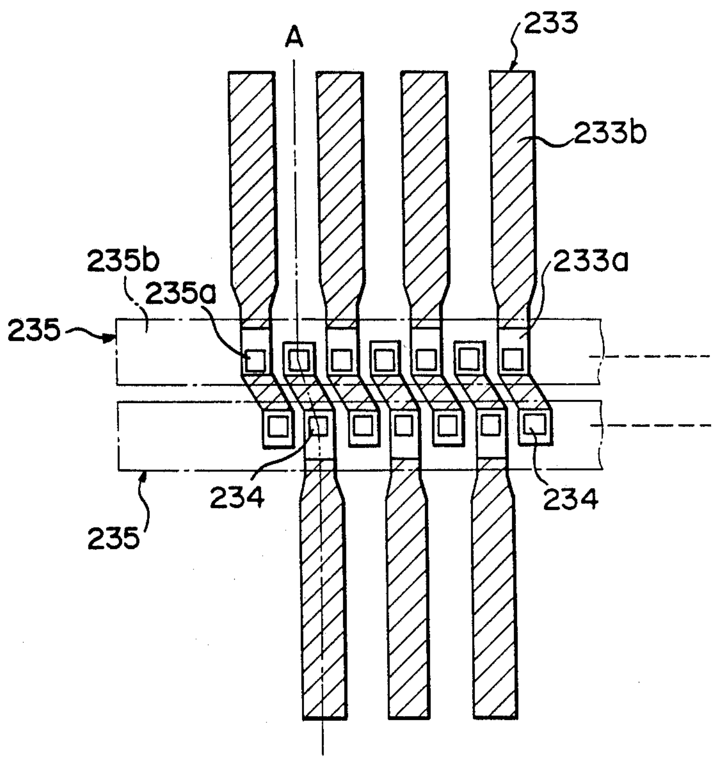
FIG. 25 is a partially enlarged view of LCS 211 shown in FIG. 24.
Figure 26:
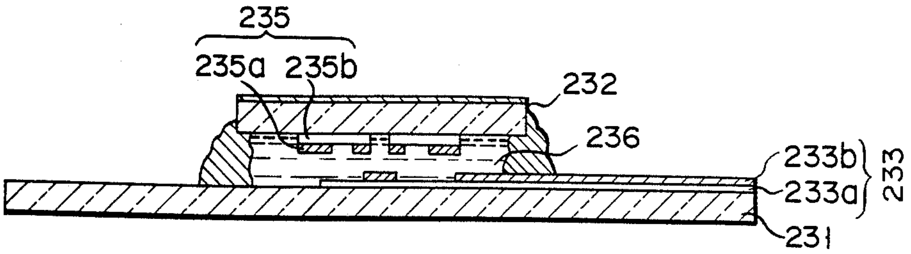
FIG. 26 is a sectional view of LCS 211.

FIG. 25 is a partially enlarged view of LCS 211. FIG. 26 is a sectional view of LCS 211 taken along line A—A' in FIG. 25.

Each signal electrode 233 is constituted by transparent conductive portion *233a* of, e.g., tin oxide, indium oxide, or the like, and metal electrode *233b* of chromium, gold, or the like. Each common electrode 235 is similarly constituted by transparent conductive portion *235a* and metal electrode *235b*. An opposing portion between transparent conductive portions *233b* and *235b* forms a microshutter, and this microshutter is ON/OFF in accordance with a signal applied across these electrodes.

Each signal electrode 233 intersects two common electrodes 235. Therefore, two microshutters 234 are formed on each signal electrode 233. This is because time-divisional driving is performed in order to reduce the number of drivers for turning on/off microshutters 234.

Microshutters 234 must be turned on/off at very high speed. For this purpose, as liquid crystal material 236 (FIG. 26), a mixture of a dichroic dye and a liquid crystal material whose dielectric anisotropy is inverted in accordance with a frequency of an electric field to be applied (a frequency for setting the dielectric anisotropy to be zero is called a crossover frequency, and is given as fc) is used. As a drive method, a so-called two-frequency drive method for driving a liquid crystal using a signal having a frequency higher than fc (referred to as fH hereinafter) and a signal having a frequency lower than fc (referred to as fL hereinafter) or a signal combining fH and fL is employed.

FIG. 27A is a block diagram showing an arrangement of recording control section 300 for performing optical write access by ON/OFF-controlling LCS 211.

As shown in FIG. 27A, LCS drive signals $\overline{PT1}$ and $\overline{PT2}$ and timing signals DSEL and $\overline{CK2}$ generated according to the above embodiment are supplied to LSIs 217 through control bus CB2.

LCS drive signals $\overline{COM1}$ and $\overline{COM2}$ are input to input terminals I10 and I11 of high-voltage driver 220 shown in FIG. 27B and are level-shifted to a voltage of twenty and odd volts by driver 220 to be applied to common electrodes 235. Furthermore, clock control section 301 alternately outputs clock signals $\overline{CK1A}$ and $\overline{CK1B}$ to LSIs 217 in response to every second clock of clock signal $\overline{HLTXCK}$ in synchronism with clock signal $\overline{HLTXCK}$ input from an external apparatus. Therefore, the {1,2}th, the {5,6}th, the {9,10}th, . . . dot data of video data LTXD (which have serial numbers from number "1" from the first 1-bit data) transferred from a video interface section (not shown) are input to upper LSIs 217, and the {3,4}th, the {7,8}th, the {10,11}th, . . . dot data are input to lower LSIs 217.

Figure 28A:
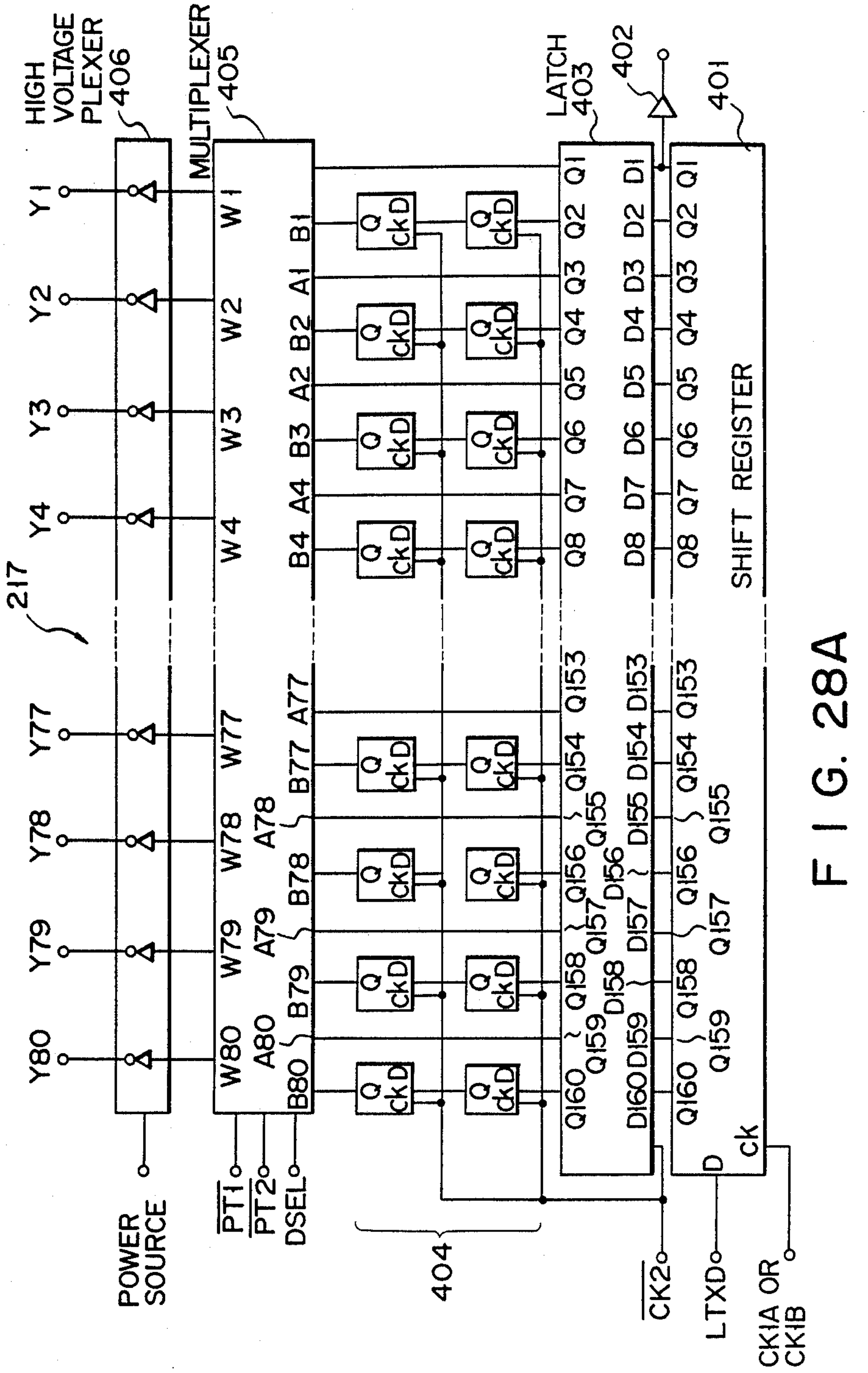
FIG. 28A is a block diagram showing an arrangement of LCS drive LSI 217 shown in FIG. 27A.

FIG. 28A is a block diagram showing an arrangement of each LSI 217.

Shift register 401 receives one-like video data LTXD in synchronism with the leading edge of clock signal $\overline{CK1A}$ (CK1B). The final output (Q1 output) of shift register 401 is supplied to next LSI 217 (FIG. 21A) which is cascade-connected to preceding LSI through buffer 402. Latch 403 receives one-line video data LTXD from shift register 401 in response to the leading edge of clock signal $\overline{CK2}$, and outputs even-numbered bit data to data delay flip-flops 404 and odd-nimbered bit data to terminals A1 to A80 of multiplexer 405. Multiplexer 405 selects an A or B input in accordance with select signal DSEL, and selects one of LCS drive signals $\overline{PT1}$ and $\overline{PT2}$ in accordance with the value of selected A or B input and outputs the selected signal to high-voltage driver 406 from terminals W1 to W80. High-voltage driver 406 level-shifts input LCS drive signal $\overline{PT1}$ or $\overline{PT2}$, and applies Y1 to Y80 outputs to signal electrodes 233 of LCS 211.

The operation of recording control section 300 with the above arrangement will be described with reference to the timing chart shown in FIG. 6. The video interface section outputs video data LTXD to LSIs 217 during an L-level interval of signal $\overline{TWSX}$ shown in FIG. 6. Each LSI 217 inputs video data LTXD to shift register 401 (FIG. 28A) in synchronism with the leading edge of clock signal CK1A or CK1B output from clock control section 301. After transfer of one-line video data LTXD from the video interface section is completed, clock signal CK2 is pulsated as shown in FIG. 6. One-line video data LTXD is transferred from shift register 401 to latch 403 in response to the trailing edge of the pulse of clock signal CK2. Thus, shift register 401 is allowed to receive new video data LTXD.

In this manner, one-line video LTXD is input to shift register 401 of each LSI 217 during one period Tw. Odd-numbered bits of previously received video data LTXD are input to terminals A1 to A80 of multiplexer 405 in response to the trailing edge of signal CK2. Even-numbered bits of video data LTXD are similarly input to flip-flops 404 in response to the trailing edge of signal CK2. Two flip-flops 404 are cascade-connected. Even-numbered bits of video data LTXD are input to multiplexer 405 and delayed from odd-numbered bits by two periods Tw. This is because microshutters 234 are arranged in two rows spaced apart for 2.5-line distance, and the micro-shutters of one row are staggered with respect to those of the other row, as is illustrated in FIG. 25.

As shown in FIG. 6, since signal DSEL is at L level in the first half of period Tw and at H level in the second half thereof, multiplexer 405 selects either LCS drive signal PT1 or PT2 in accordance with odd-numbered bit data of video data LTXD in the first half of period Tw, and outputs the selected signal to high-voltage driver 406, thus ON/OFF-controlling microshutters 234 through driver 406 to perform optical write access.

LCS drive signal $\overline{PT1}$ serves as an OFF signal for the LCS, and LCS drive signal $\overline{PT2}$ serves as an ON signal. When bit data of video data LTXD is "1", the LCS is OFF, and no optical write access is performed. When the bit data is "0", the LCS is ON, and optical write access is performed. Therefore, in a normal developing method, if bit data of video data LTXD is "1", an electrostatic latent image is formed, and if "0", no latent image is formed.

In the second half of period Tw, optical write access is performed in the same manner as described above in accordance with even-numbered bit data of video data LTXD which are delayed by two lines.

The circuit shown in FIGS. 5 and 16 described above can be easily mounted on one chip by gate arrays, a standard cell, or the like. Therefore, if any of the above circuit arrangements is employed, all the functions of the control section of the optical write apparatus can be realized by two chips, i.e., one-chip microcomputer and a gate array IC.

Figure 21:
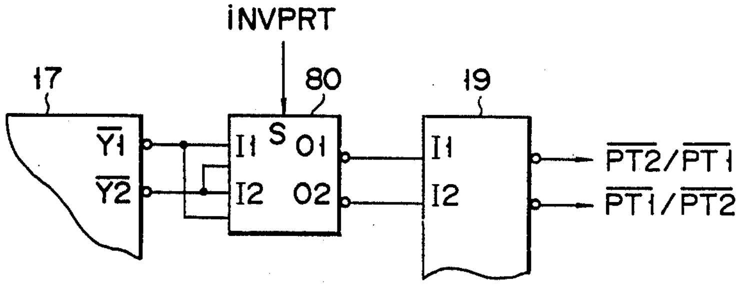
FIG. 21 is a diagram showing an arrangement wherein data selector 80 which allows optical write access in accordance with a developing method is arranged between macro decoder 17 and latch 19 in the arrangement shown in FIG. 16.

An image forming method by means of optical write access includes a positive developing method for a black image on a portion which is not subjected to light irradiation, and a reversal developing system in which a black image is formed on a portion subjected to light irradiation. As shown in FIG. 21, data selector 80 is provided between macro decoder 17 and latch 19 shown in FIGS. 5 and 16, and select signal INVPRT is controlled in accordance with a developing method, so that LSC OFF signal $\overline{PT1}$ and LCS ON signal $\overline{PT2}$ are selectively output. Thus, optical write access can be performed using identical macro MAC(2x) and MAC(2x+1) in either the normal or reversal developing system.

When a RAM is adopted as memory 11, data DSTATUS is written using a microcomputer after power-on. After signal $\overline{DRVEN}$ is set at H level, data DSTATUS can be modified.

When data DSTATUS is stored in a ROM incorporated in a microcomputer, a plurality of patterns of DSTATUS are stored in the RAM and can be externally selected using a DIP switch or the like. When data DSTATUS is stored in a PROM or EEPROM incorporated in a microcomputer, required data DSTATUS is preferably written in the PROM or EEPROM. Furthermore, data DSTATUS may be externally loaded through a serial interface connected to the microcomputer.

According to the above embodiment as described above, since waveforms are generated based on macro data storing waveforms and the number of developing steps of the macro data, the following advantages can be provided.

a. Since a program capacity for waveform generation can be greatly reduced, mounting efficiency can be improved;

b. Cost can be reduced due to advantage a.

c. Since macro data and its number of developing steps stored in a memory can be rewritten by a microcomputer, waveforms can be easily and efficiently modified without modifying a circuit arrangement.

Another embodiment of a waveform generating apparatus according to the present invention will be described with reference to the accompanying drawings. In this apparatus, a predetermined pattern of a waveform is defined by macro data, and the macro data and its number of developing steps are stored, thus reducing a program capacity. The macro data and the number of developing steps are stored in a memory which can be accessed by a 4-bit one-chip microprocessor to improve versatility. Moreover, a parity bit is added to the macro data or the number of developing steps thereof to perform data error detection, thus improving reliability and safety.

FIGS. 29A, 29B, 29C, and 29D are block diagrams of an LCS drive signal generator according to the embodiment of the present invention.

Figure 31:
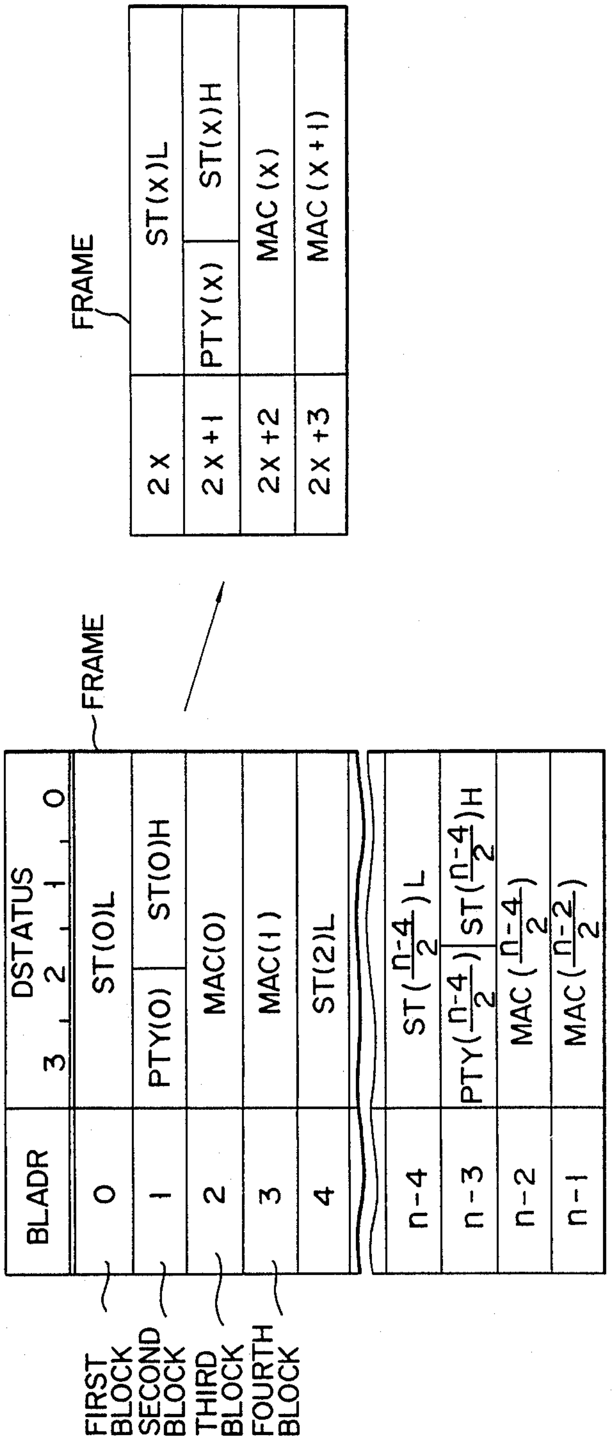
FIG. 31 is a view showing macro data stored in memory 11 shown in FIG. 29A and the number of developing steps thereof.

Memory 11 comprises a semiconductor memory such as a RAM, ROM, EEPROM, or the like, and has a 4 (bit x n (word) format. As shown in FIG. 31, data DSTATUS is stored at addresses (BLADR)="0" to "n−1". ST(0)L, ST(0)H, ST(2)L, . . . , ST{(n−4)/2}L, ST{(n−2)/2}H are numbers of developing steps of macro data MAC(0) to MAC{(n−2)/2} (to be described later). Data ST(x)L indicates lower bits (4 bits) of the number of developing steps, and data ST(x)H indicates upper bits (3 bits) thereof (where x is an even number within the range of 0 (to (n−4)/2. Therefore, the number of developing steps is set by 7 bits, i.e., [ST(x)H,ST(x)L]. Note that the number of developing steps [ST(x)H,ST(x)L] will be expressed by ST(x) hereinafter. MAC(0) to MAC{(n−2)/2} are macro data for generating predetermined waveforms, and can define $2^4=16$ types of waveforms, PTY(0), . . . , PTY{(n−4)/2} are parity bits. In this embodiment, parity check is performed by the odd-numbered parity, as will be described later.

Figure 30:
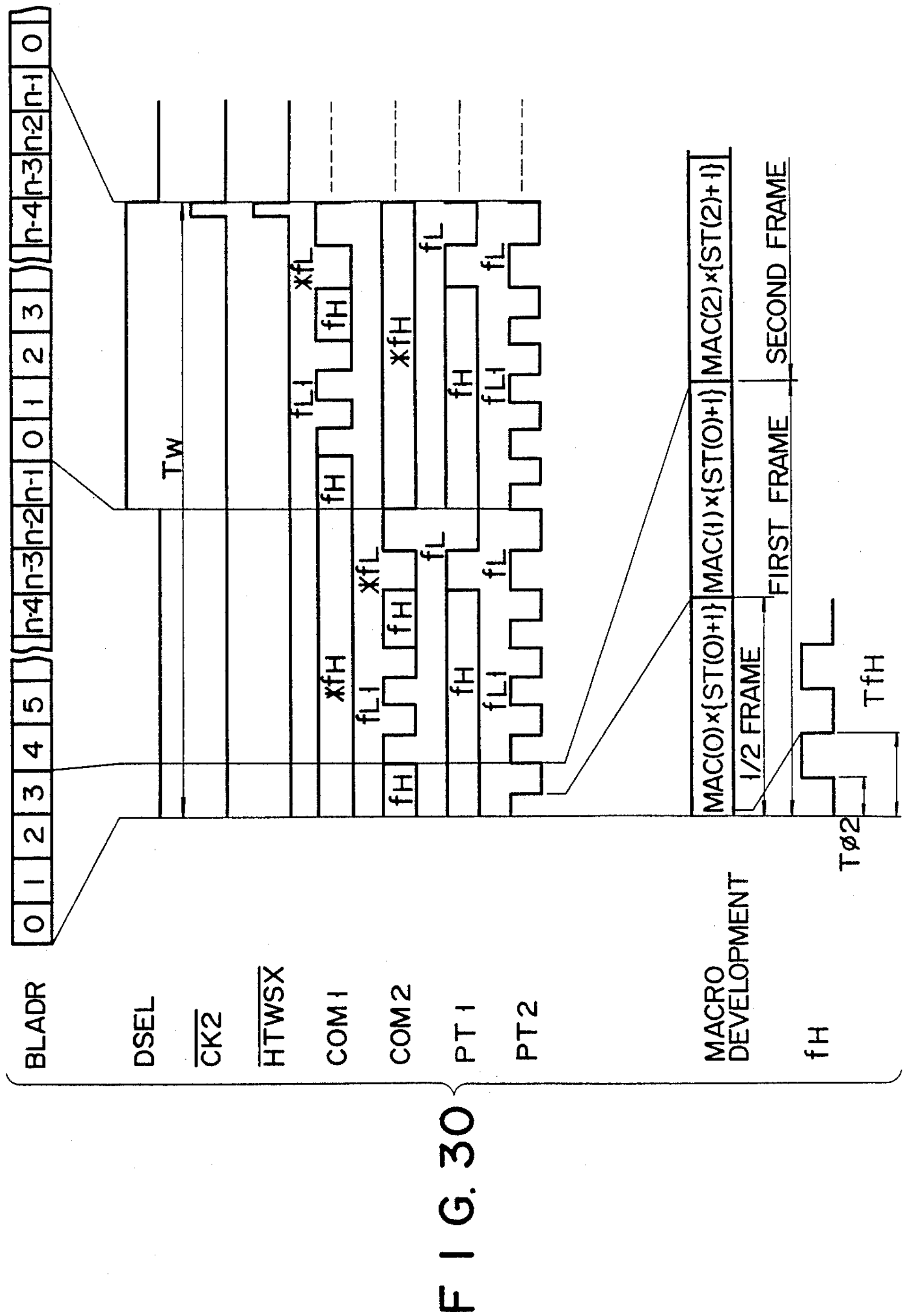
FIG. 30 is a timing chart for explaining an operation of the apparatus shown in FIGS. 29A, 29B, 29C, and 29D.

In this embodiment, 4 bits are defined as one block, and four blocks of [ST(x)L], [PTY(x),ST(x)H], [MAC(x)], and [MAC(x+1)] form a one-frame waveform. More specifically, blocks at BLADR=0 to 4 shown in FIG. 31 will be explained below. If a period of fundamental clock signal $\phi$ is given by $T\phi$, the waveform of MAC(0) is generated during a time period of $(ST(0)+1)\times T\phi$ in the first half of a frame, and the waveform of MAC(1) is generated during a time period of $(ST(0)+1)\times T\phi$ in the second half of the frame. Therefore, n/4 frames are generated by n blocks of data DSTATUS. FIG. 30 shows waveforms of actual LCS drive signals COM1, COM2, PT1, and PT2. Note that FIG. 30, FIGS. 48A and 48B, and FIG. 50 showing waveforms of the LCS drive signals show a case wherein signal PTSEL is at L level. As shown in FIG. 30, LCS drive signals COM1 and COM2 are waveforms in period Tw, and LCS drive signals PT1 and PT2 are waveforms in period Tw/2. LCS drive signals COM1 and COM2 have symmetrical waveforms in the first and second halves (Tw/2) of period Tw. In this embodiment, signals COM1 and COM2 are switched and output in the second half (Tw/2) of period Tw. For this reason, LCS drive signals COM1, COM2, PT1, and PT2 in period Tw (n/2 frame configuration) are generated by n block data (corresponding to n/4 frames). FIG. 32 shows the number of developing steps (ST(x)L, macro data MAC(x), and MAC(x+1) of this embodiment in detail. LCS drive signals COM1, COM2, PT1, and PT2 shown in FIG. 30 are generated by these 20 words of data DSTATUS. In FIG. 32, fH and *fH represent high-frequency signals, and fL and *fL represent low-frequency signals. Signals *fH and *fL are signals having a phase difference of 180 degrees from signals fH and fL, respectively. Drive signals COM1, COM2, PT1, and PT2 shown in FIG. 30 are the same as those generated by a conventional LCS drive signal generator. In the conventional generator, these waveforms are generated by 1200×8 bit data DSTATUS, while in this embodiment, drive signals COM1, COM2, PT1, and PT2 having the same waveforms can be generated by a capacity of $(4\times 20)/(8\times 1200)=1/120$.

In this embodiment, as memory 11, a RAM (Random Access Memory) having a capacity of 4 (bit)×32 (word).

Figure 29A:
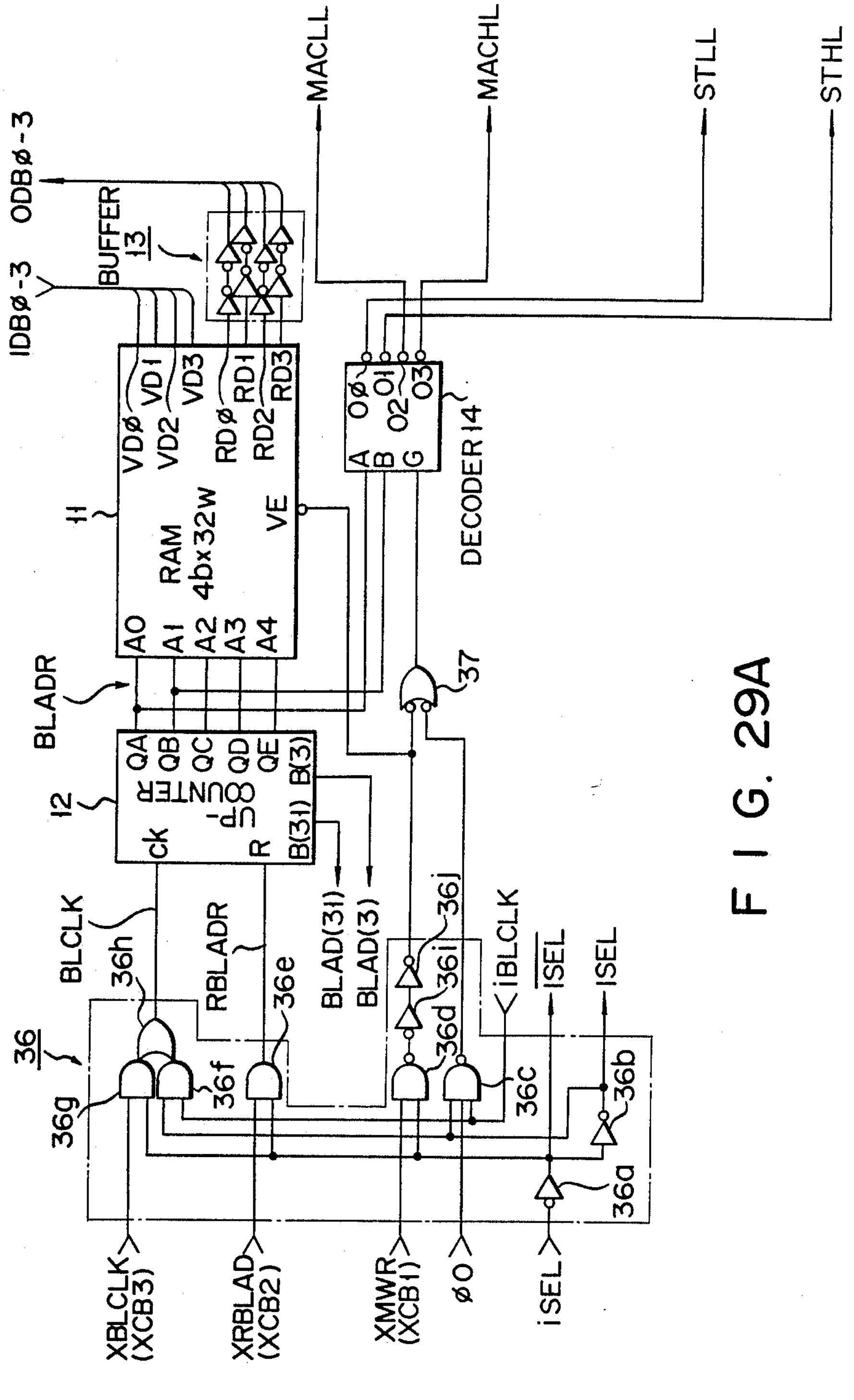
FIGS. 29A, 29B, 29C, and 29D are circuit diagrams of a waveform generating apparatus for driving a liquid crystal device, capable of detecting a data error by adding a parity bit to macro data, according to still another embodiment of the present invention.
Figure 33A:
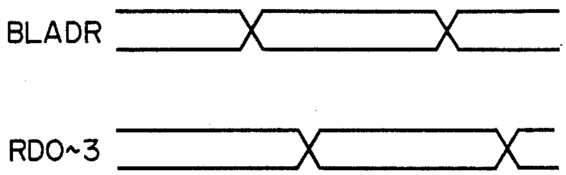
FIG. 33A is a timing chart for explaining a data read operation of memory 11 shown in FIG. 29A.
Figure 33B:
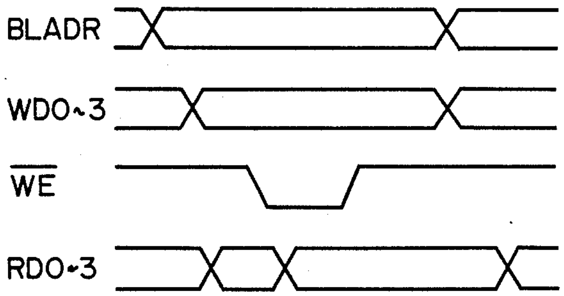
FIG. 33B is a timing chart for explaining a data write operation of memory 11 shown in FIG. 29A.
Figure 45A:
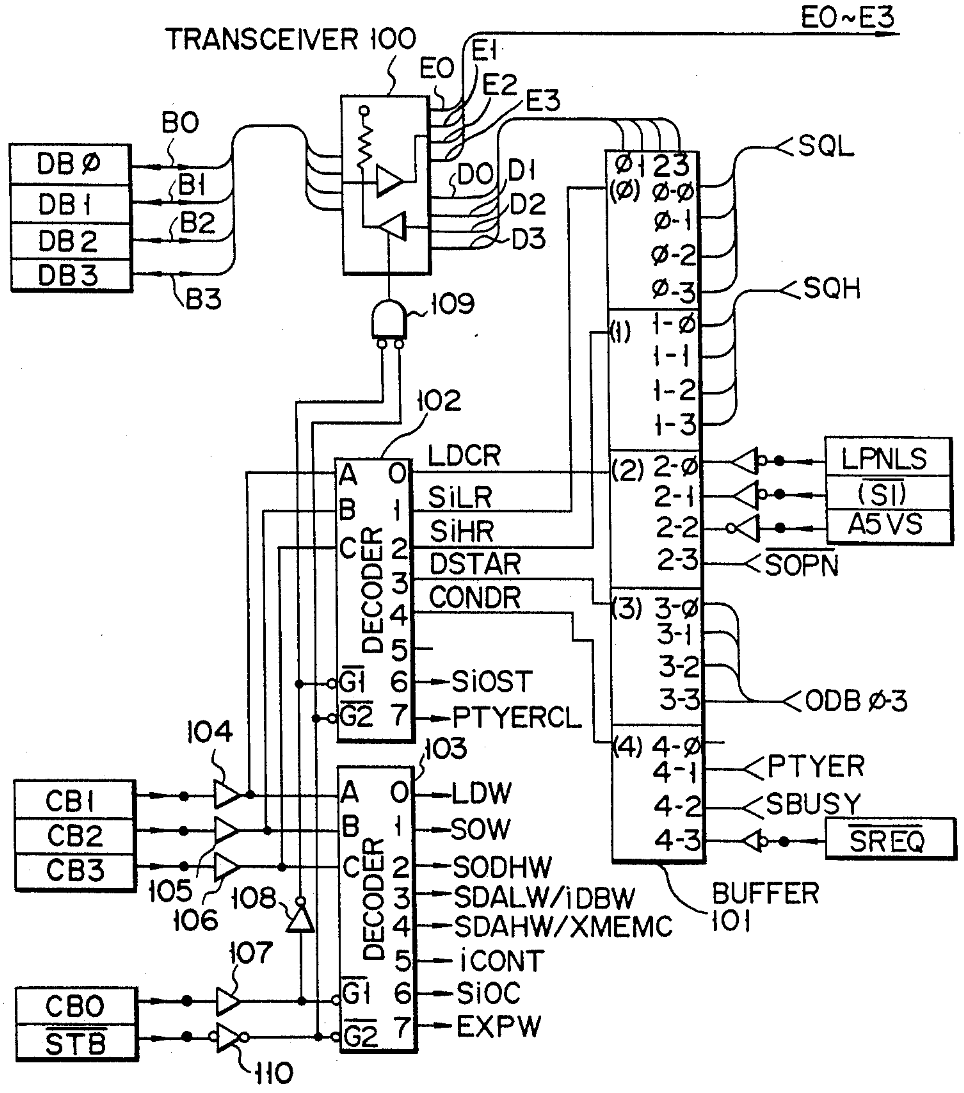
FIGS. 45A to 45D are circuit diagrams of a control section used in the embodiment of the present invention shown in FIGS. 29A to 29D.

The arrangement of memory 11 will be described below. As shown in FIG. 29A, QA to QE outputs (BLADR) from up counter 12 are input to address signal input terminals A0 to A4, respectively. Note that QA corresponds to the LSB, and QE corresponds to the MSB. Data input terminals VD0 to VD3 are connected to input data bus IDBO-3 (to be described later). Write access of data DSTATUS into memory 11 is performed through input data bus iDBO-3. Data DSTATUS read out from memory 11 is output from data output terminals RD0 to RD3 to latches 15-1, 15-2, 16-1, and 16-2 shown in FIG. 29B through buffer 13, and is also output to buffer 101 (FIG. 45A; to be described later) through output data bus ODBO-3. Read/write access of data DSTATUS in accordance with write signal $\overline{WE}$ output from data selector section 36 is performed. FIGS. 33A and 33B are timing charts of read and write access operations of memory 11, respectively. Although not shown, signal $\overline{WE}$ is set at H level in the read mode.

Figure 34:
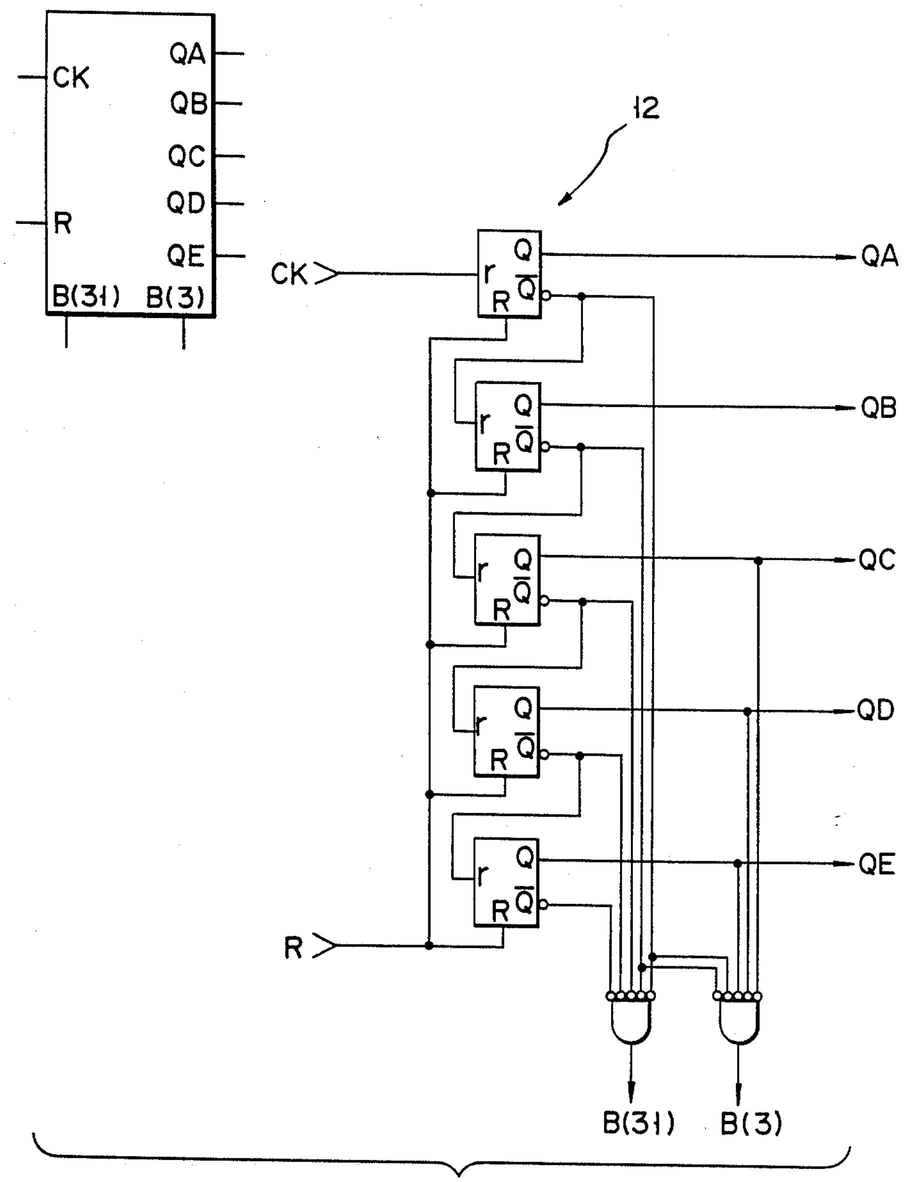
FIG. 34 is a circuit diagram of up counter 12 shown in FIG. 29A.

FIG. 34 shows an internal arrangement of up counter 12. As shown in FIG. 34, up counter 12 counts up "0" to "31". Up counter 12 receives pulse signal BLCLK and reset signal RBLADR at terminals CK and R from data selector section 36, respectively. Up counter 12 counts up the pulses in response to the leading edge of pulse signal BLCLK, and is reset to an initial value (0) in response to reset signal RBLADR (H level). Up counter 12 outputs count value BLADR to memory 11 as a block address signal. When count values BLADR are "3" and "31", counter 12 sets signals BLAD(3) and BLAD(31) at H level and applies them to NAND gate 30 and AND gate 34. Furthermore, signals representing lower 2 bits of count value BLADR are respectively output from terminals QA and QB of counter 12 to decoder 14.

Figure 35:
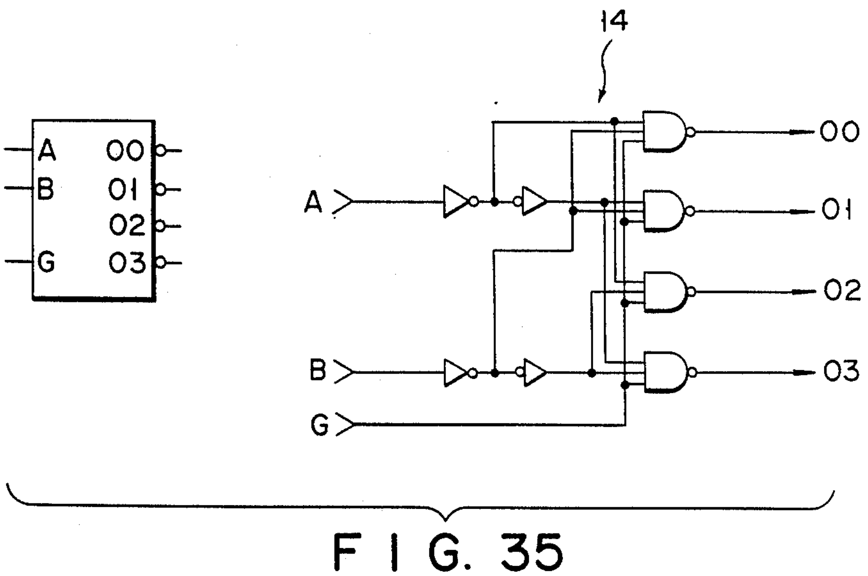
FIG. 35 is a circuit diagram of decoder 14 shown in FIG. 29A.
Figure 36:
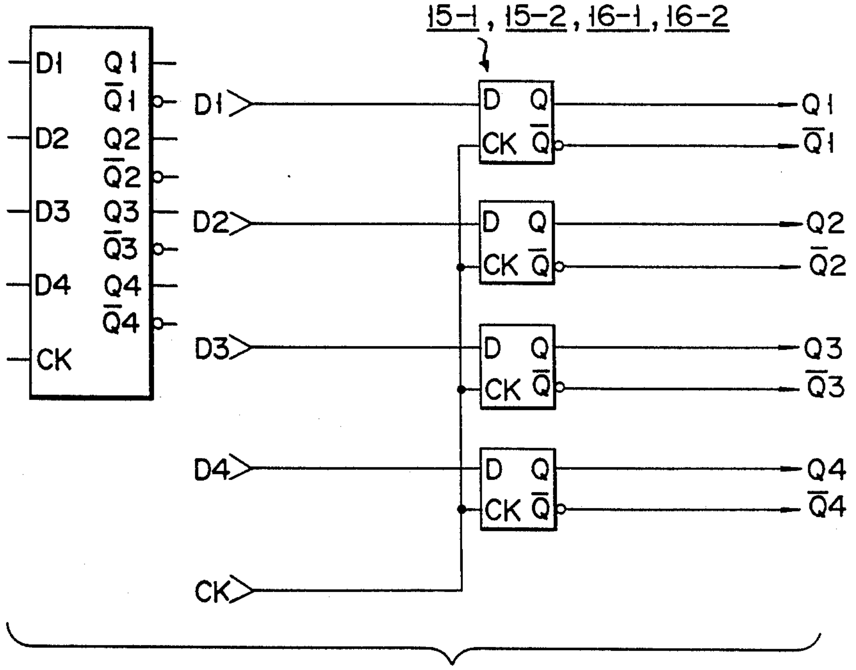
FIG. 36 is a circuit diagram of latches 16-1, 16-2, 15-1, and 15-2 shown in FIG. 29B.
Figure 37:
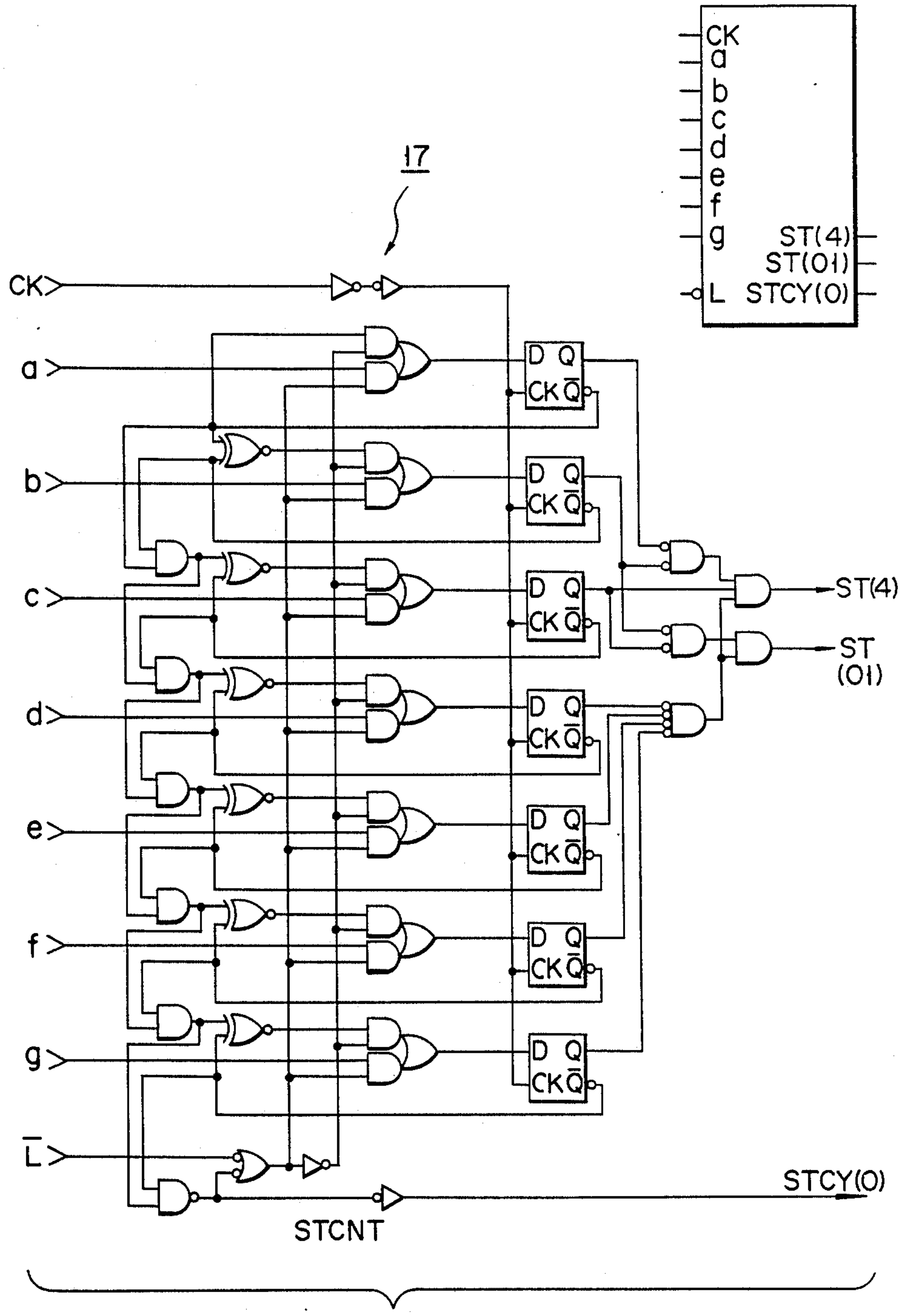
FIG. 37 is a circuit diagramm of down counter 17 shown in FIG. 29B.
Figure 38:
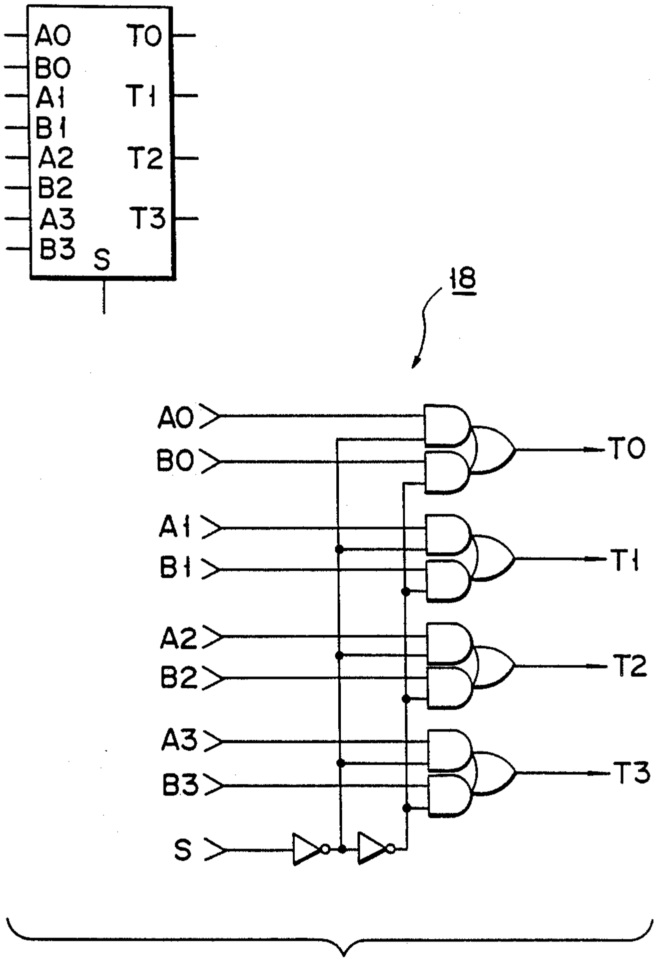
FIG. 38 is a circuit diagram of data selector 18 shown in FIG. 29B.
Figure 39:
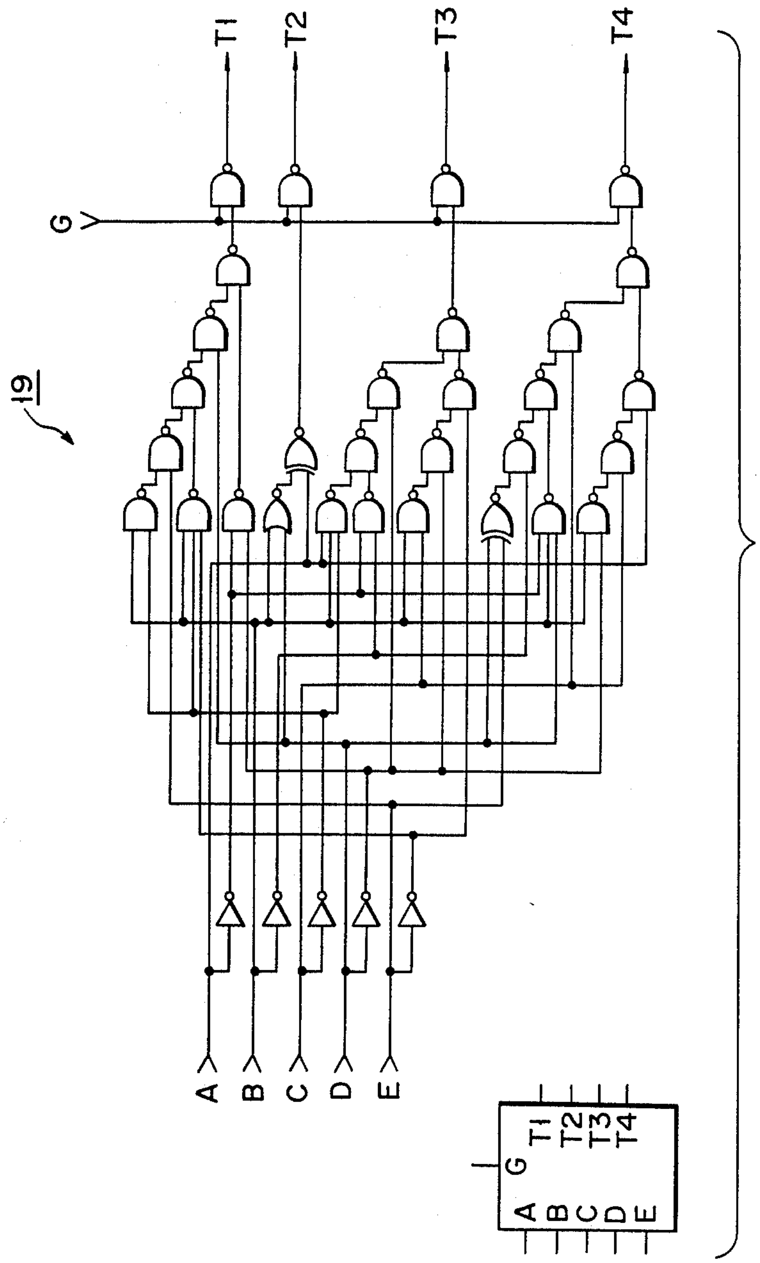
FIG. 39 is a circuit diagram of macro decoder 19 shown in FIG. 29B.

FIG. 35 shows an internal arrangement of decoder 14. As shown in FIG. 35, decoder 14 sets any of terminals 00 to 03 at L level in accordance with values input to terminals A and B when a value at terminal G is "1" (H level). Terminals A and B of decoder 14 receive lower 2 bits of count value BLADR from up counter 12. When value BLADR is "0" to "3", decoder 14 sets outputs from terminals 00 to 03 at L level, respectively. The output (STLL) from terminal 00, the output (STHL) from terminal 01, the output (MACLL) from terminal 02, and the output (MACHL) from terminal 03 are respectively applied to terminals CK of latches 15-1, 15-2, 16-1, and 16-2, respectively. FIG. 36 shows a circuit arrangement of latches 15-1, 15-2, 16-1, and 16-2. As shown in FIG. 36, latches 15-1, 15-2, 16-1, and 16-2 latch 4-bit input data (D1 to D4) when data at terminals CK rise (from L level to H level). The outputs from latches 15-1 and 15-2 are set in down counter 17 when select signal ISEL output from data selector section 36 goes to L level or the count value of down counter 17 reaches "0". FIG. 37 shows a circuit arrangement of down counter 17. As shown in FIG. 37, down counter 17 is a 7-bit input (terminals a to g) down counter, and performs counting of a maximum of $2^7=128$ times. When the count value has reached "4", the output (PTYSTB) from terminal ST(4) is set at H level, and is supplied to NAND gate 25 and AND gate 34. When the count value has reached "1", the output (ST01) from terminal ST(01) is set at H level, and is supplied to AND gate 33. When the count value is "0", carry signal STCY is set at H level, and is supplied to inverter 28, NAND gate 30, and terminal K of flip-flop 31. Data selector 18 selects either output from latch 16-1 or 16-2 in accordance with select signal SELMAC output from flip-flop 29, and supplies the selected signal to macro decoder 19. FIG. 38 shows a circuit arrangement of data selector 18. Macro decoder 19 generates four types of LCS drive signals based on macro data MAC(x) or MAC(x+1) input through data selector 18 and clock signal $\overline{\phi 3}$ input from an external apparatus, and outputs them from terminals T0 to T3. FIG. 39 shows a circuit arrangement of macro decoder 19.

Figure 40:
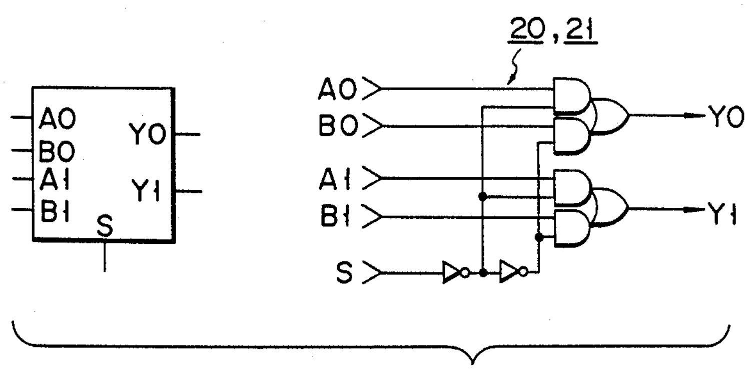
FIG. 40 is a circuit diagram of data selectors 20 and 21 shown in FIG. 29C.
Figure 45B:
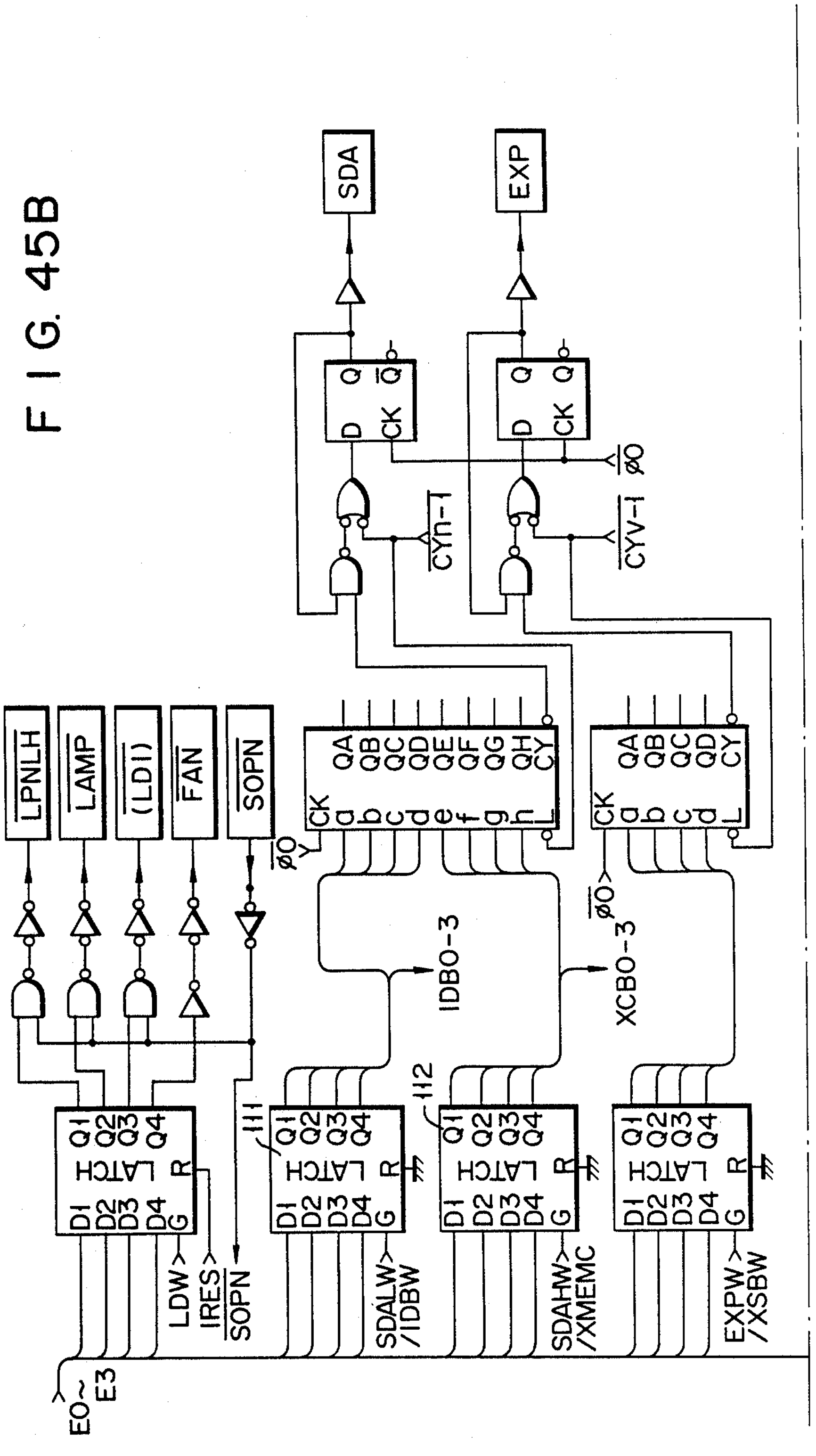

The T1 output of macro decoder 19 is input to A0 and A1 terminals of data selector 20, and the T2 output thereof is input to B0 and A1 terminals of data selector 20. The T3 output of decoder 19 is input to A0 and B1 terminals of data selector 21, and the T4 output thereof is input to B0 and A1 terminals of selector 21. FIG. 40 shows a circuit arrangement of data selectors 20 and 21. Select terminal S of data selector 20 receives selector signal PTSEL from latch 113 (FIG. 45B; to be described later). Data selector 20 switches connections between the T1 and T2 outputs from macro decoder 19 and input terminals D1 and D2 of latch 22 under the control of signal PTSEL.

Figure 41:
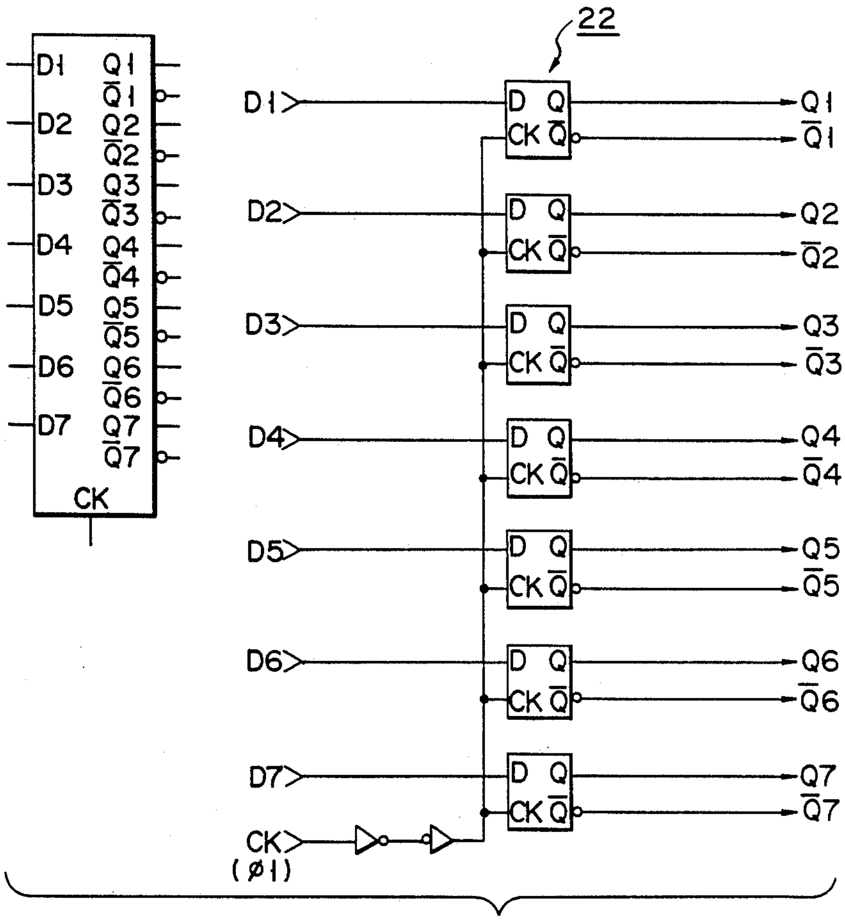
FIG. 41 is a circuit diagram of latch 22 shown in FIG. 29C.

As shown in FIG. 40, when signal PTSEL is at L level, A0 and A1 inputs serve as the Y0 and Y1 outputs. When signal PTSEL is at H level, B0 and B1 inputs serve as Y0 and Y1 outputs. Select terminal S of data selector 21 receive select signal DSELQ as an output from flip-flop 32. As will be described later, since signal DSELQ is set at L level in the first half of period Tw and at H level in the second half thereof, the T3 and T4 outputs from macro decoder 19 serve as D3 and D4 inputs of latch 22 in the first half of period Tw. In the second half of period Tw, the T4 and T3 outputs serve as D3 and D4 inputs, respectively. Latch 22 receives the output (DSELQ) from flip-flop 32, the output ($\overline{\text{iTWSX}}$) from flip-flop 31, and the output ($\overline{\text{TWSXQ}}$) from NAND gate 35 at terminals D5 to D7, respectively, as well as the Y0 and Y1 outputs from data selectors 20 and 21. FIG. 41 shows a circuit arrangement of latch 22. Latch 22 latches data from terminals D1 to D7 in synchronism with the leading edge of clock signal $\phi 1$ input from an external apparatus.

The Q1 to Q7 outputs from latch 22 are output to a recording control section as LCS drive signals PT1, PT2, COM1, and COM2, and timing signals DSEL, $\overline{\text{CK2}}$, and $\overline{\text{HTWSX}}$ through buffer 23.

Figure 42:
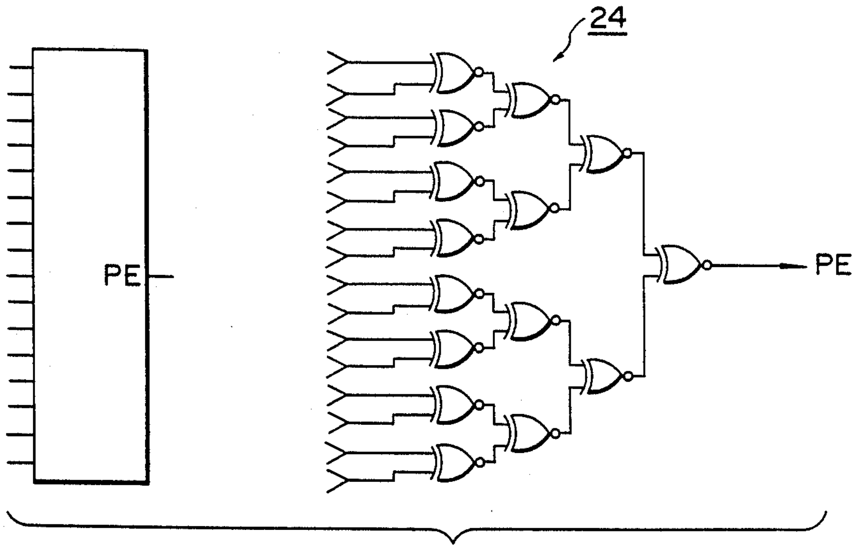
FIG. 42 is a circuit diagram of parity generator 24 shown in FIG. 29B.

The outputs from latches 15-1, 15-2, 16-1, and 16-2 are also input to parity generator 24. FIG. 42 shows a circuit arrangement of parity generator 24. In this embodiment, as shown in FIG. 32, one frame (4 blocks) of data is set to have an odd-numbered parity. If a parity error occurs (if one frame of data becomes an even-numbered parity), an H-level signal is supplied from terminal PE to NAND gate 25. NAND gate 25 receives the output (PTYSTB) from down counter 17 and signal PTYEN output from latch 113 (FIG. 45B). When signal PTYEN is set at H level and the count value of down counter 17 is "4", parity check is performed. The count value of down counter 17 becomes "4" every half a period (Tw/2). Therefore, parity check is performed every half a period. When a parity error occurs, the output from terminal PE of parity generator 24 goes to H level, and as a result, the output from NAND gate 25 goes to L level. The L-level output from NAND gate 25 is supplied to set terminal S of flip-flop 26. Thus, the Q output (PTYER) from flip-flop 26 goes to H level, and is supplied to OR gate 114 (FIG. 45B; to be described later).

Reset terminal R of flip-flop 26 receives signal PTYERCL output from decoder 102 and signal IRES output from buffer 117 (FIG. 45B) through NOR gate 27. When one of signals PTYERCL and IRES goes to H level, the Q output (PTYER) from flip-flop 26 is reset.

Figure 43:
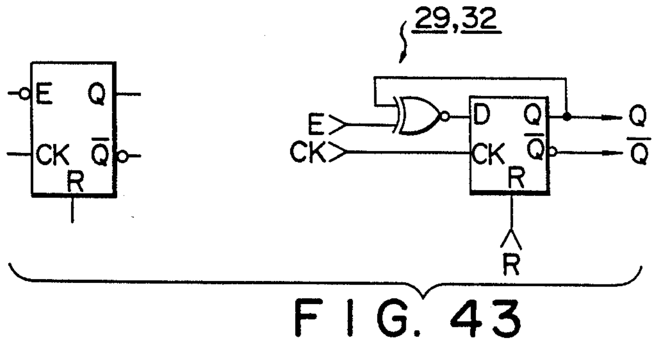
FIG. 43 is a circuit diagram of flip-flops 29 and 32 shown in FIG. 29C.

Carry signal STCY output from down counter 17 is input to inverter 28, NAND gate 30, and terminal K of flip-flop 31. The output from inverter 28 is input to terminal E of toggle flip-flop 29, as shown in FIG. 43, with an enable terminal. Flip-flop 29 is enabled when carry signal STCY is at H level, i.e., when the output from inverter 28 is at L level. Each time external clock signal $\overline{\phi 2}$ input to terminal CK rises, the Q output (SELMAC) from flip-flop 29 is inverted. The output from NAND gate 30 which receives signals SELMAC, STCY, and BLAD(3) is input to terminal E of toggle flip-flop 32 with an enable terminal shown in FIG. 43. The Q output (DSELQ) from flip-flop 32 is inverted in response to the leading edge of clock signal $\overline{\phi 2}$ input to terminal CK when all the signals SELMAC, STCY, and BLAD(3) are at H level.

Reset terminals R of flip-flops 29 and 32 receive signal ISEL output from data selector section 36. When signal ISEL goes to L level (external control state), signals SELMAC and DSELQ go to L level.

Signal ST01 output from down counter 17, the Q output (SELMAC) from flip-flop 29, and clock signal $\phi 1$ are input to AND gate 33. During an H-level interval of signals ST01 and SELMAC, clock signal $\phi 1$ passes through AND gate 33 to be converted to pulse signal iBLCLK. Signal iBLCLK is then supplied to data selector section 36. The Q output (SELMAC) of flip-flop 29, the Q output (DSELQ) of flip-flop 32, signal BLAD(31) output from up counter 12, and signal PTYSTB output from down counter 17 are input to AND gate 34. The output (TSXQ) from AND gate 34 goes to H level and is supplied to terminal J of flip-flop 31 when signals SELMAC and DSELQ are at H level and signal BLAD(31) is also at H level in the second half (Tw/2) of period Tw. Flip-flop 31 is a J-K flip-flop. Terminal K of flip-flop 31 receives carry signal STCY output from down counter 17. The Q output (iTWSX) from flip-flop 31 is input to terminal D6 of latch 22, and its $\overline{Q}$ output is input to NAND gate 35. NAND gate 35 receives signal ISEL output from data selector section 36. When signal ISEL is at H level (internal control state), the $\overline{Q}$ output from flip-flop 31 passes through NAND gate 35, is converted to signal $\overline{\text{TWSXQ}}$, and is then input to terminal D7 of latch 22.

Data selector section 36 comprises: inverter 36*a* for inverting signal ISEL and outputting inverted signal $\overline{\text{ISEL}}$ to flip-flops 29 and 32; inverter 36*b* for inverting signal $\overline{\text{ISEL}}$ output from inverter 36*a* and outputting signal ISEL to down counter 17 and NAND gate 35; NAND gate 36*c* which allows clock signal $\phi 0$ to pass therethrough when both signal iBLCLK output from AND gate 33 and signal ISEL output from inverter 36*b* are at H level; NAND gate 36*d* which allows externally input signal XMWR to pass therethrough when signal $\overline{\text{ISEL}}$ output from inverter 36*a* is at H level; AND gate 36*e* which allows externally input signal XRBLAD to pass therethrough and supplies it to reset terminal R of up counter 12 when signal $\overline{\text{ISEL}}$ output from inverter 36*a* is at H level; AND gate 36*f* which allows signal iBLCLK output from AND gate 33 to pass therethrough when signal ISEL output from inverter 36*b* is at H level; AND gate 36*g* which allows externally input signal XBLCLK to pass therethrough when signal $\overline{\text{ISEL}}$ output from inverter 36*g* is at H level; OR gate 36*h* which receives signal iBLCLK output from AND gate 36*f* and signal XBLCLK output from AND gate 36*g* and outputs one of them to clock terminal CK of up counter 12; inverter 36*i* for receiving and inverting the output from NAND gate 36*d;* and inverter 36*j* for inverting the output from inverter 36*i* and supplying the inverted signal to NOR gate 37 and terminal $\overline{\text{WE}}$ of up counter 12.

An arrangement of video interface section 40 will be described with reference to FIG. 29D. Video interface section 40 is an interface circuit having the following functions. That is, section 40 latches externally input video data HLTXD in synchronism with external clock $\overline{\text{HLTXCK}}$, and performs buffering to output the data to a recording control section (not shown). Section 40 frequency-divides clock $\overline{\text{HLTXCK}}$ to generate two clock signals $\overline{\text{CK1A}}$ and $\overline{\text{CK1B}}$, and outputs them to the recording control section. The circuit arrangement will be described below in detail. Video data HLTXD is inverted by inverter 40*a*, and is then input to terminal D of flip-flop 40*b*. Externally input clock signal $\overline{\text{HLTXCK}}$ is inverted by inverter 40*c*, and is then input to clock terminal CK of flip-flop 40*b*. Inverted signal $\overline{\text{HLTXD}}$ of video data HLTXD is latched by flip-flop (latch) 40*b* in response to the trailing edge of clock signal $\overline{\text{HLTXCK}}$. The Q output from latch 40*b* is inverted by inverter 40*d*, and is then output from buffer 40*e* to the recording control section as video data LXTD.

Inverted signal HLTXCK of clock signal $\overline{\text{HLTXCK}}$ output from inverter 40*c* is also input to terminal T of flip-flop 40*f* and inverter 40*g*. Flip-flops 40*f* and 40*h* are cascade-connected to each other. Signal HLTXCK is ¼-frequency divided by flip-flops 40*f* and 40*h*. The Q output from flip-flop 40*h* is supplied to AND gate 40*i* and terminal S of flip-flop 40*k*. The $\overline{Q}$ output from flip-flop 40*h* is supplied to NAND gate 40*j*, and the Q output from flip-flop 40*k* is input to NAND gates 40*i* and 40*j*. NAND gates 40*i* and 40*j* also receive signal $\overline{\text{HLTXCK}}$ through inverter 40*g*. the $\overline{Q7}$ output (LTWSX) of latch 22 is input to reset terminals R of flip-flops 40*f*, 40*h*, and 40*k* through inverter 40*r*. The outputs from NAND gates 40*i* and 40*j* are supplied to the recording control section as clock signals $\overline{\text{CK1A}}$ and $\overline{\text{CK1B}}$ respectively through buffers 40*l* and 40*m*.

Figure 44:
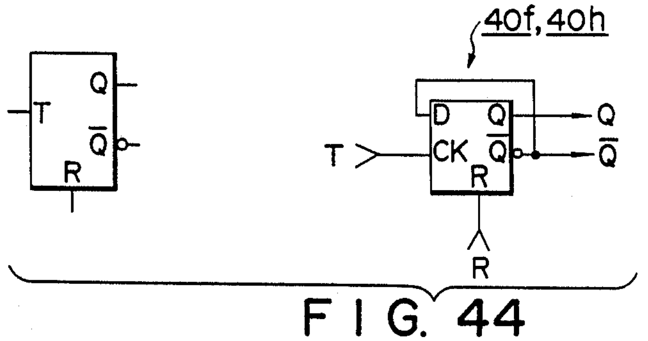
FIG. 44 is a circuit diagram of flip-flops 40*f* and 40*h* shown in FIG. 29D.

In clock signals CL1A and Ck1B, two clock pulses alternately appear in synchronism with signal HLTXCK. Note that FIG. 44 shows the circuit arrangement of latches 40*f* and 40*h*.

FIGS. 45A, 45B, 45C, and 45D are block diagrams showing a circuit arrangement of a control section according to this embodiment. The main part of this control section will be described with reference to FIGS. 45A to 45D.

Transceiver 100 is connected to terminals DB0 to DB3 through bidirectional buses B0 to B3. Transeiver 100 receives 4-bit data input from buffer 101 through buses D0 to D3, and outputs the data from terminals DB0 to DB3 to an external central processing unit (to be referred to as a CPU hereinafter) through bidirectional buses B0 to B3. Transceiver 100 also receives data input from the CPU through bidirectional buses B0 to B3 and outputs the data onto buses E0 to E3.

Terminals A to C of decoders 102 and 103 receive control signals CB1 to CB3 output from the CPU through buffers 104 to 106. Control signal CB0 is input to terminal $\overline{\text{G1}}$ of decoder 103 through buffer 107. The inverted signal of control signal CB0 by inverter 108 is input to terminal $\overline{\text{G1}}$ of decoder 102 and NOR gate 109. Strobe signal $\overline{\text{STB}}$ output from the CPU is input to terminals $\overline{\text{G2}}$ of decoders 102 and 103 and NOR gate 109 through buffer 110.

When signal CB0 is at H level and signal $\overline{\text{STB}}$ is at L level, decoder 102 is activated, and sets one of signals LDCR, SiLR, SiHR, DSTAR, CONDR, SiOST, and PTYERCL at H level in accordance with values of three-bit control signals CB1 to CB3, thereby selecting output data from buffer 101. Signal PTYERCL is input to NOR gate 27. When signal PTYERCYL goes to H level (CB1 to CB3=7), signal PTYER is reset.

When signal DSTAR is at H level (CB1 to CB3=3), data on output data bus ODBO-3 is output to data buses D0 to D3, and is output to the CPU through transceiver 100 and bidirectional buses B0 to B3. When signal CONDR is at H level (CB1 to CB3=4), the Q output (PTYER) from flip-flop 26 is output from buffer 101 to the CPU through transceiver 100 and bidirectional bus B1.

When signal CB0 is at L level and signal $\overline{\text{STB}}$ is at L level, decoder 103 is activated, and sets one of LOW, SOW, SODHW, SDALW/iDBW, SDAHW/X-MEMC, iCONT, SiOC, and EXPW at H level in accordance with the values of control signals CB1 to CB3.

When signal SDALW/iDBW goes to H level (CB1 to CB3=3), data on data buses B0 to B3 are input to latch 111. The Q1 to Q4 outputs of latch 111 are connected to input data bus iBDO-3, and are written in memory 11.

When signal SDAHW/XMEMC goes to H level (CB1 to CB3=4), the output from latch 112 is supplied to data selector section 36 through control bus XCBO-3.

Figure 29B:
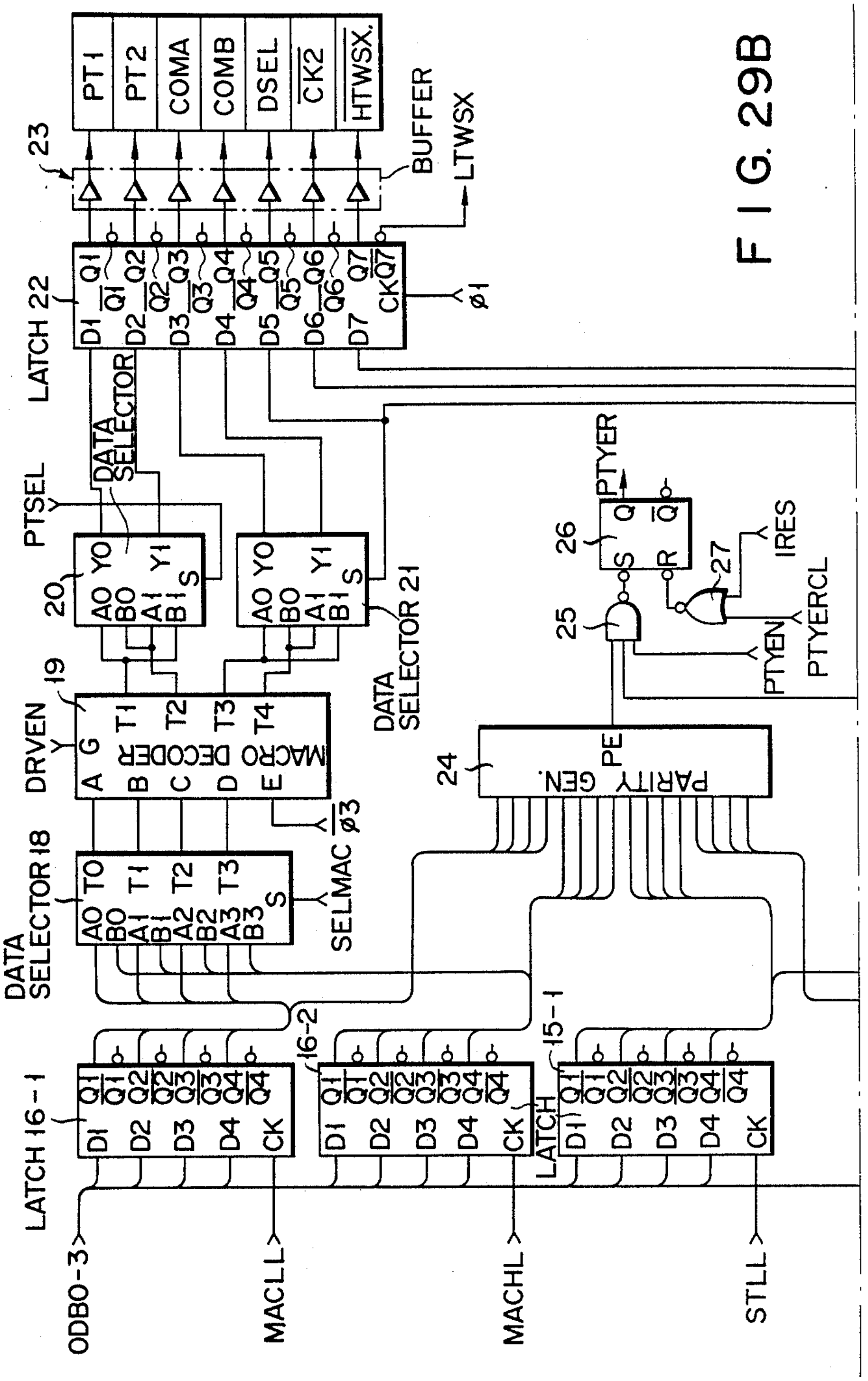
Figure 29C:
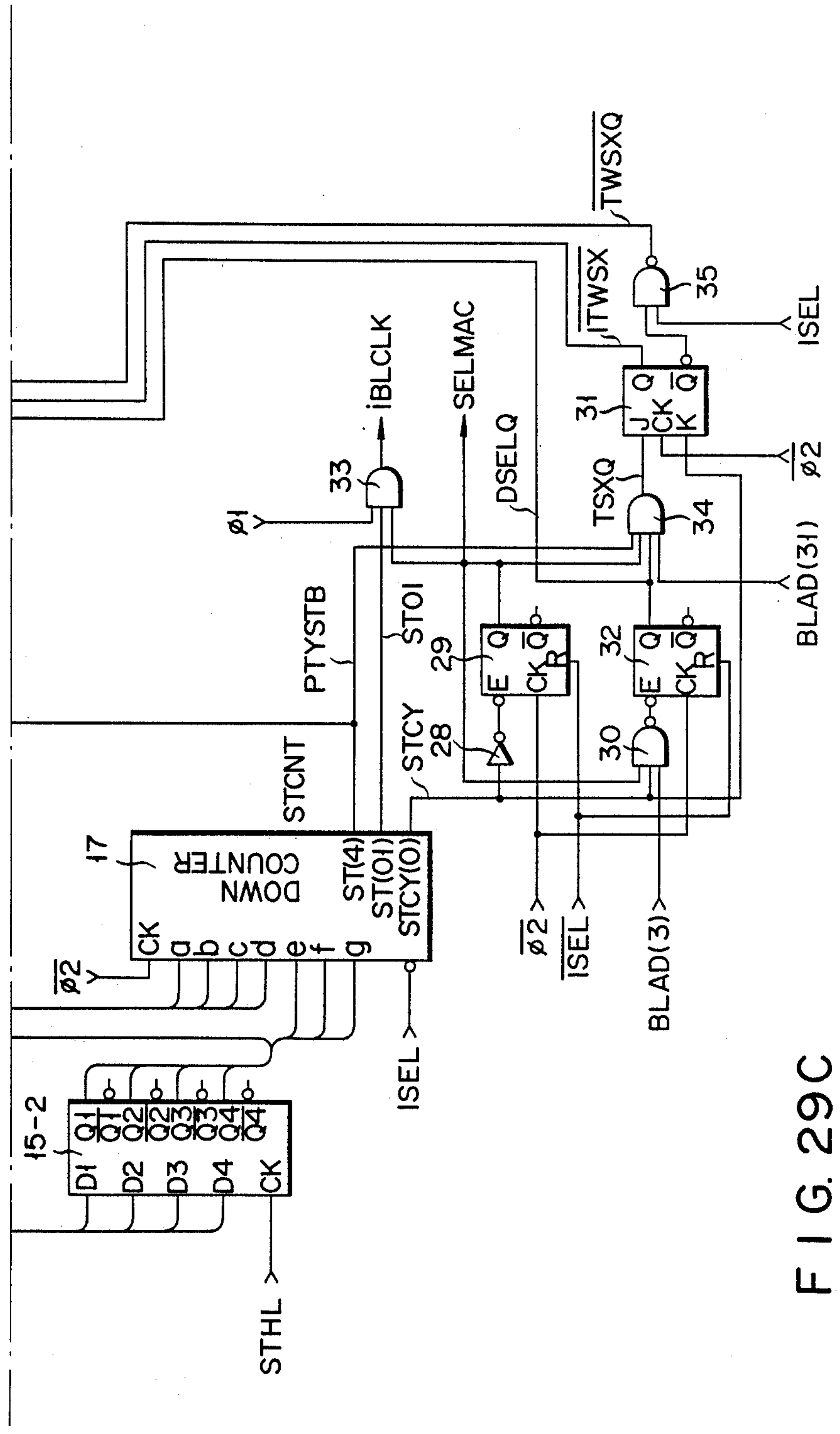
Figure 45C:
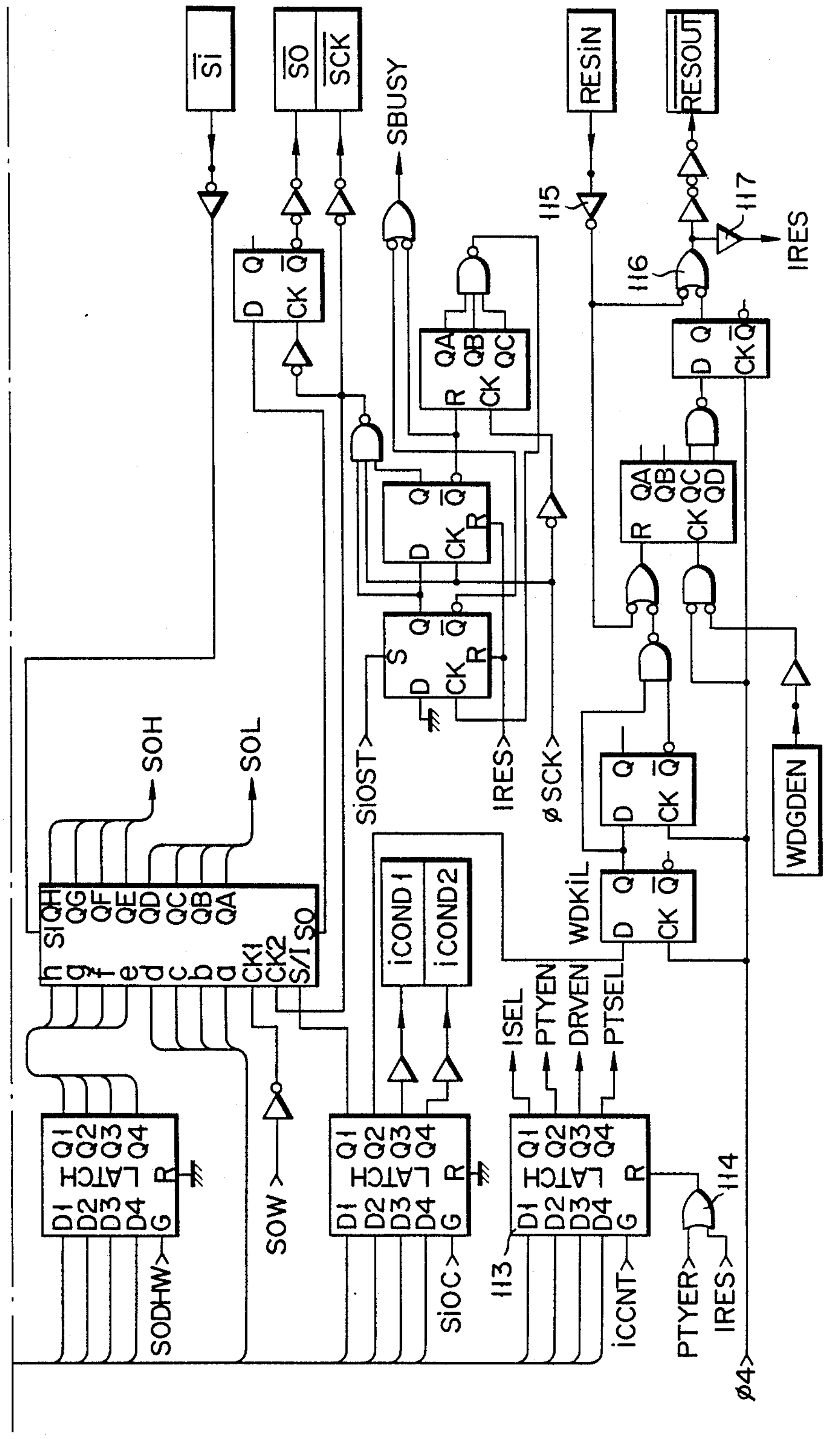

When signal iCONT goes to H level (CB1 to CB3=5), signal iSEL is supplied from latch 113 to data selector section 36; signal PTYEN to NAND gate 25;

signal DRVEN to macro decoder 19; and PTSEL to data selector 20 (FIGS. 29B and 29C). Reset terminal R of latch 113 receives signal PTYER which is output from flip-flop 26 through OR gate 114 and goes to H level when a parity error occurs, or signal IRES output from buffer 117 (FIG. 45C; to be described later). Therefore, when the parity errors occurs, signals iSEL, PTYEN, DRVEN, and PTSEL are reset. For this reason, signal iSEL goes to L level to select the external control state. Meanwhile, since signal DRVEN goes to L level, the T1 to T4 outputs from macro decoder 19 are made invalid, and the operation of the LCS is stopped. When an external reset switch or the like is operated, an external H-level signal is supplied to terminal RESiN, and signal IRES goes to H level through inverter 115, NAND gate 116, and buffer 117. Then, H-level signal IRES is applied to OR gate 114 and NOR gate 27 (FIG. 29C). Therefore, upon operation of the external switch, parity error signal PTYER is reset. In addition, since both signals iSEL and DRVEN go to L level, the external control state is set, and the operation of the LCS is stopped, as described above.

Figure 45D:
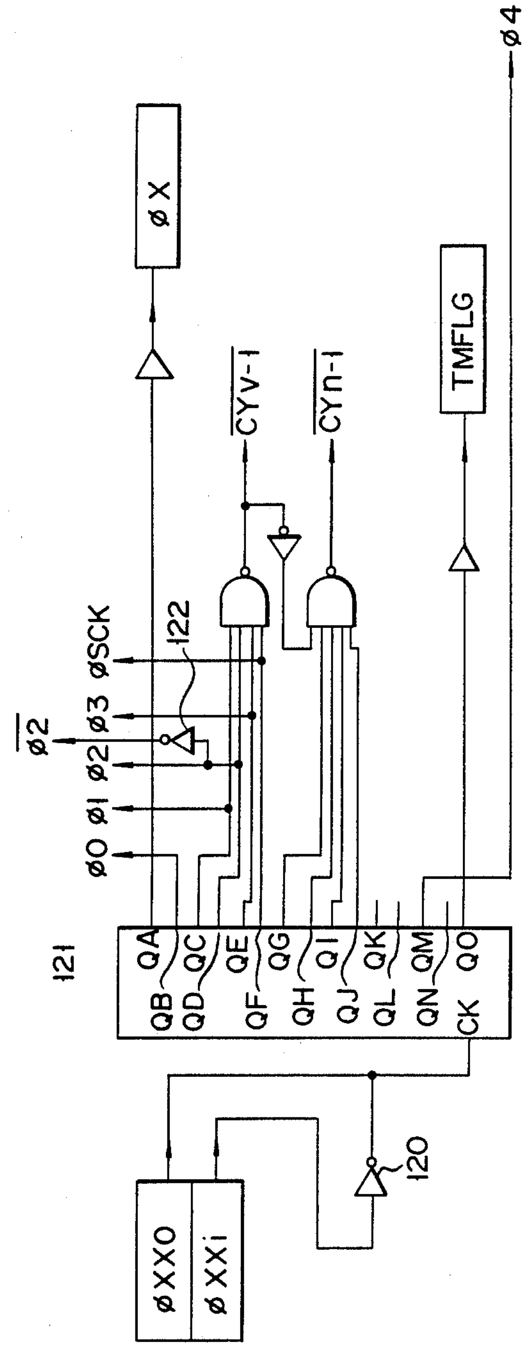

As shown in FIG. 45D, external clock signal φXXi (6.4 MHz) is supplied to terminal CK of time-base counter 121 through inverter 120. Time-base counter 121 frequency-divides clock signal φXXi to generate clock signals φ0, φ1, φ2, φ3, φsck, and φX. Counter 121 supplies signal φ0 to data selector section 36; and φ1 to latch 22 and AND gate 33. In additiion, counter 121 supplies signal φ2 to inverter 122 to be inverted to signal $\overline{\phi 2}$, and supplies the inverted signal to down counter 17, and flip-flops 29, 31, and 32 (FIGS. 29B and 29C).

The operation of the LCS drive signal generator with the above arrangement will be described hereinafter.

An operation for writing data DSTATUS in memory 11 will be described. In this case, signal DRVEN (L level) is output from the CPU (not shown) onto bidirectional bus B2. Then, signal DRVEN (L level) is output to macro decoder 19 through transceiver 100 and latch 113 while CB1=1 (H level), CB2=0 (L level), CB3=1 (H level), CB0=L level, and $\overline{\text{STB}}$=L level.

When signal DRVEN (L level) is supplied to macro decoder 19, the T1 to T4 outputs from macro decoder 19 are fixed at H level. LCS drive signals PT1 and PT2 applied to the signal electrodes of the LCS (not shown) and LCS drive signals COM1 and COM2 applied to the common electrodes of the LCS have the same potential, and the LCS can be prevented from being applied with an accidental voltage, in particular, a DC voltage.

The CPU then outputs the signal iSEL (L level) onto bidirectional bus B0. Signal iSEL (L level) is output to data selector section 36 through transceiver 100 and latch 113 while CB1 to CB3="5", CBO=L level, and $\overline{\text{STB}}$=L level, in the same manner as in outputting of DRVEN. After the CPU sets CB1 to CB3="4", signal RBLADR (H level) is applied to reset terminal R of up counter 12 through bidirectional bus B2, transceiver 100, latch 112, and AND gate 36e, thus resetting up counter 12. In this manner, preparation for writing data DSTATUS in memory 11 is made (FIG. 29A).

An operation for writing one block of data DSTATUS in memory 11 will be described. While keeping CBO=L level:

(1) Data DSTATUS is output to memory 11 through bidirectional buses B0 to B3, tranceiver 100, latch 111, and input data bus iDB0-3 while setting CB1 to 4="3".

(2) Write signal $\overline{\text{WE}}$ (L level) is supplied to memory 11 through bidirectional bus B1, transceiver 100, latch 112, NAND gate **36*d*, inverter 36*i*, and inverter 36*j*** while setting CB1 to CB3="4".

(3) Pulse signal BLCLK is supplied to clock terminal CK of up counter 12 through bidirectional bus B3, transceiver 100, latch 112, control bus XCB3, AND gate **36*g*, and OR gate 36*h* to cause up counter 12** to count up, thus incrementing address BLADR, while setting CB1 to CB3="4".

With the above operations (1) to (3), one block of data DSTATUS is written in memory 11 at a timing shown in FIG. 33B.

The operations (1) to (3) are repetitively performed to write all the blocks of the data DSTATUS into memory 11. Thereafter, while CB0=H level, STB=L level, and CB1 to CB3="3", written data DSTATUS is read out from memory 11 to verify its content.

As a result of verification, if it is confirmed that all the blocks of data DSTATUS is normal, signal iSEL is set at H level to select the internal control state. Note that signal DRVEN is set a H level at least one period (Tw) after signal iSEL is set at H level.

LCS drive signals PT1, PT2, COM1, and COM2, and timing signals DSEL, $\overline{\text{CK2}}$, and $\overline{\text{HTWSX}}$ can be normally operated. After signal iSEL is set at H level, signal PTYEN is set at H level to set a parity check monitoring state.

An operation in one period (Tw) of this embodiment shown in FIGS. 29A and 29B will be described with reference to the timing charts shown in FIGS. 46A and 46B and FIGS. 47A and 47B.

Figure 46A:
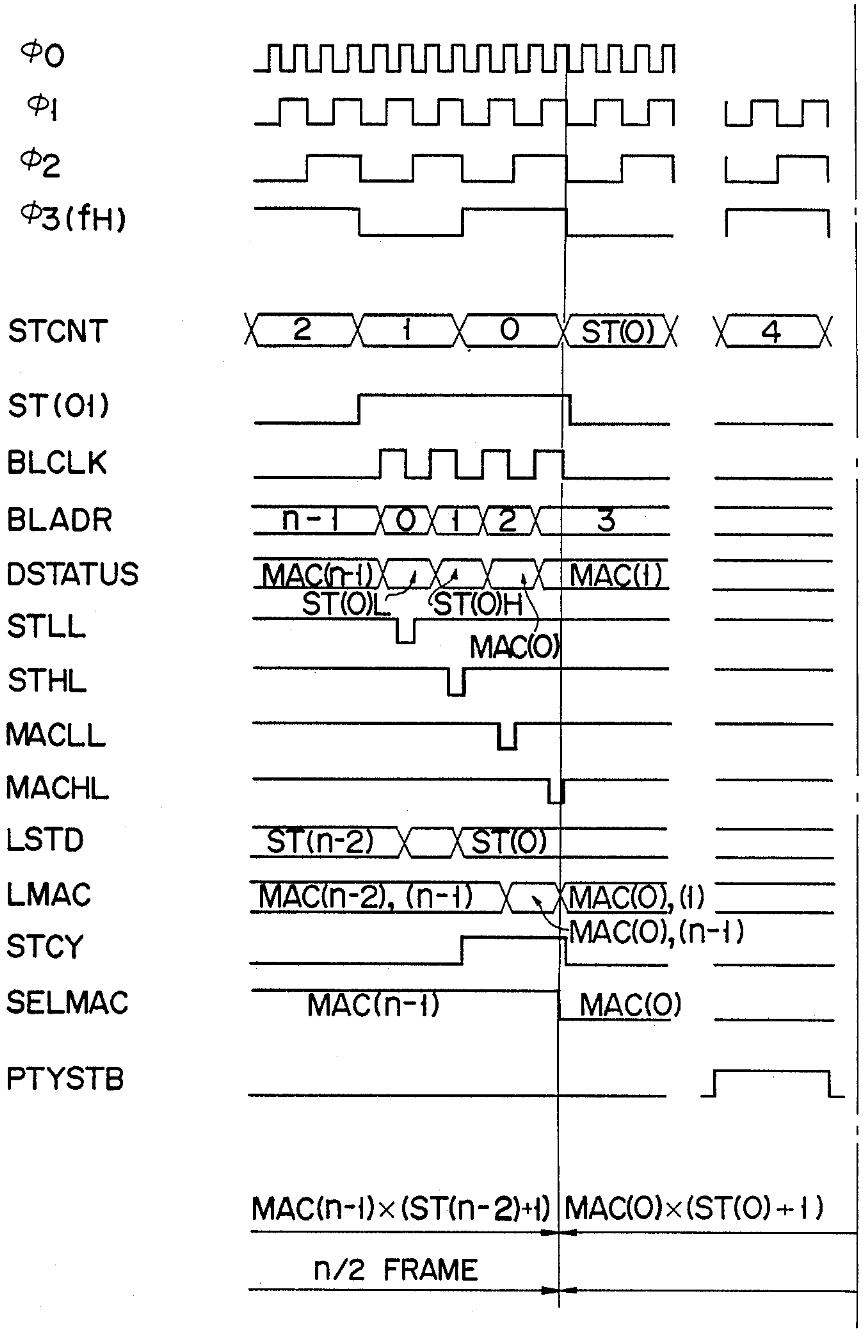
FIGS. 46A and 46B and FIGS. 47A and 47B are respectively timing charts for explaining the operation of still another embodiment of the present invention.
Figure 46B:
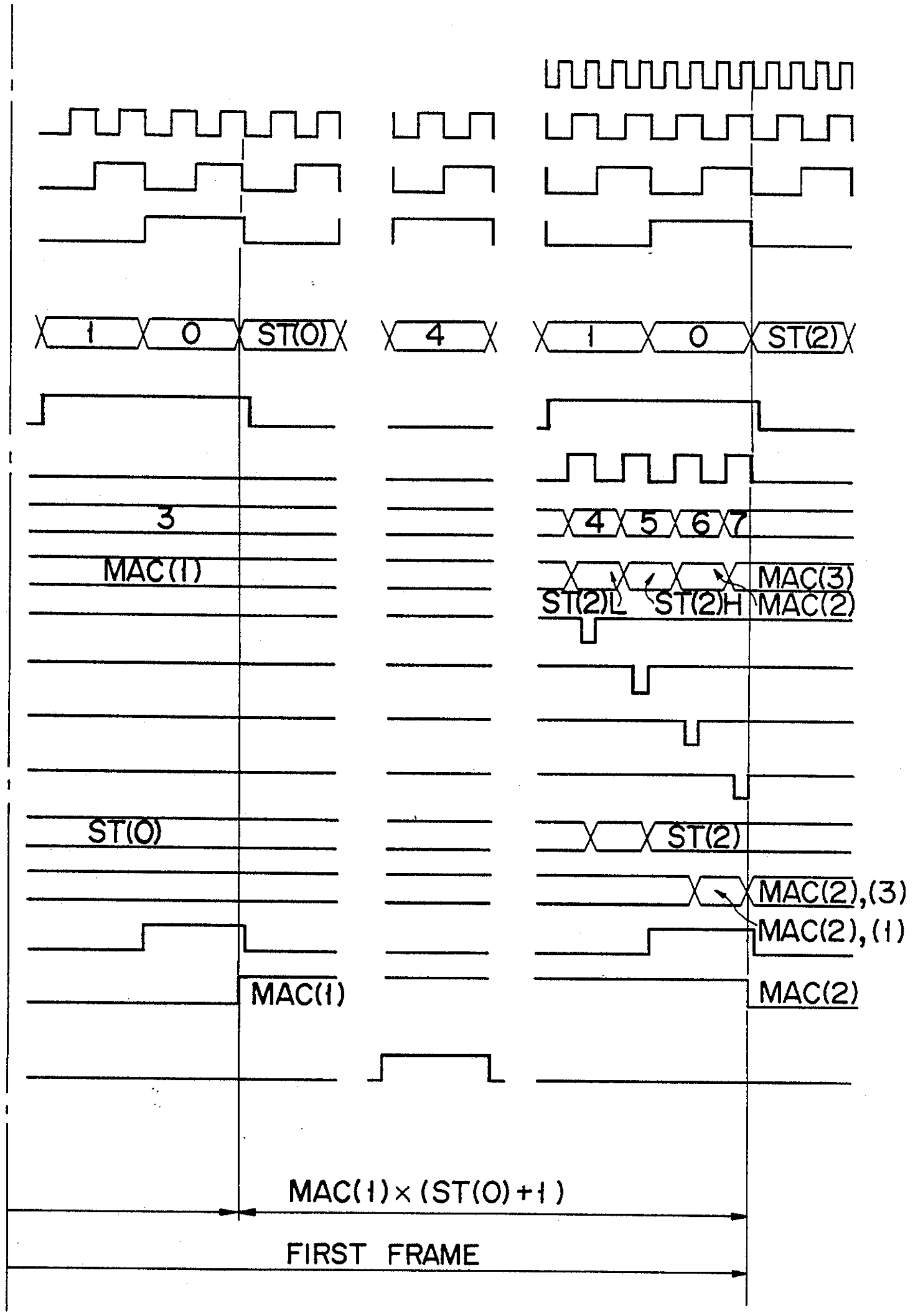

As described above, memory 11 stores n blocks of data DSTATUS, i.e., data DSTATUS corresponding to n/4 frames shown in FIG. 31. Since data DSTATUS for n/4 frames is used in the first and second halves (Tw/2) of period Tw, one period (Tw) corresponds to n/2 frames. FIGS. 46A and 46B are timing charts starting from the second half of the last frame ((n/2)th frame) in the second half of period Tw.

When count value STCNT of down counter 17 reaches "1" in the second half of the (n/2)th frame, H-level signal ST01 is supplied from down counter 17 to AND gate 33. Signal ST01 is maintained at H level while count value STCNT is a value between "1" and "0". In this case, the Q output (SELMAC) of flip-flop 29 is at H level. Thus, clock signal φ1 passes through AND gate 33 and is supplied to data selector section 36 as signal iBLCLK.

When signal iBLCLK is input to data selector section 36, four clock pulses appear in signal BLCLK input from data selector section 36 to terminal CK of up counter 12, as shown in FIGS. 46A and 46B. Then, signal BLADR=0, 1, 2, 3 is output from up counter 12 to memory 11 each time signal BLCLK rises. In this case, since signal ISEL is at H level, clock signal φ0 is input to terminal G of decoder 14 through NAND gate **36*c* and NOR gate 37 during an H-level interval of signal iBLCLK. Decoder 14** is active while clock signal φ0 is at H level.

When signal BLADR (=0) is output from up counter 12, memory 11 outputs date ST(0)L onto output data bus ODB0-3 through buffer 13. In this case, pulse signal STLL is output to latch 15-1 in synchronism with clock signal φ0. Latch 15-1 receives data ST(0)L on data bus ODB0-3 in response to to the leading edge of pulse signal STLL. Latch 15-1 then outputs data ST(0)L to terminals a to d of down counter 17 and to parity generator 24. When signal BLADR (−1) is output from up counter 12 to memory 11, data [PTY(0),ST(0)H] output from memory 11 onto data bus ODB0-3 is latched by latch 15-2 in response to the leading edge of pulse signal STLL output from decoder 14. Then, data [PTY(0),ST(0)H] is supplied from latch 15-2 to parity generator 24, and data ST(0)H is supplied to terminals e to g terminals of down counter 17.

Similarly, signals BLADR (=3) and BLADR (=4) are output from up counter 12 to memory 11 in response to the leading edge of signal BLCLK, and data MAC(0) and MAC(1) output from memory 11 are respectively latched by latches 16-1 and 16-2 in response to pulse signals MACLL and MACHL output from decoder 14. Latches 16-1 and 16-2 output data MAC(0) and MAC(1) to parity generator 24.

In the timing chart of FIG. 46B, LSTD indicates the number of developing steps output from latches 15-1 and 15-2 to down counter 17, and LMAC indicates macro data output from latches 16-1 and 16-2. In FIG. 46B, ST(0) indicates 7-bit data [ST(0)L,ST(0)H]. When count value STCNT of down counter 17 has reached "0", carry signal STCY goes to H level, and down counter 17 inputs data LSTD {in this case, ST(0)}.

Figures 48A, 48B:
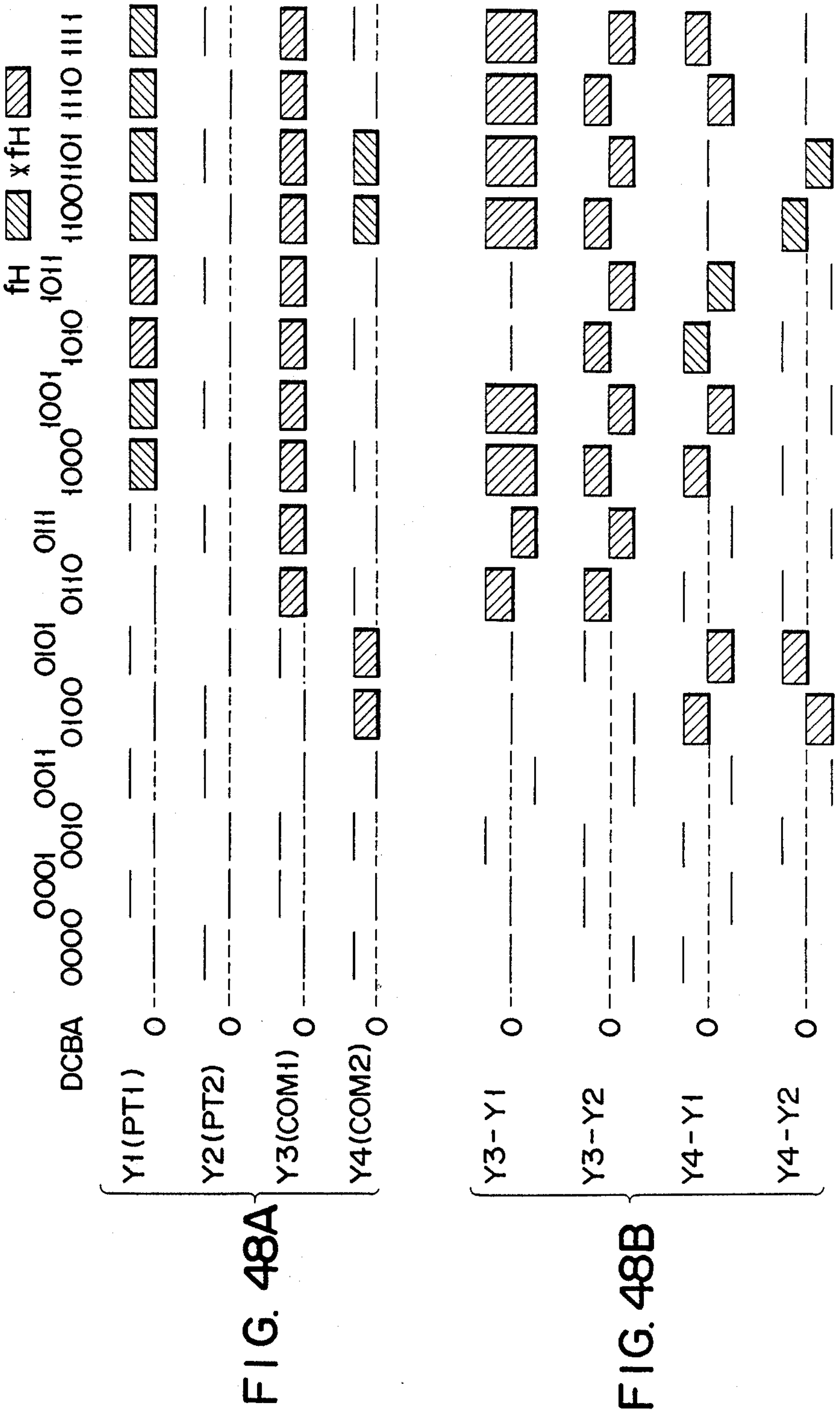
FIG. 48A shows signal waveform patterns of LCS drive signals COM1, COM2, PT1, and PT2 generated by the apparatus shown in FIGS. 29A to 29D.
FIG. 48B shows voltage waveform patterns applied to the LCS using the combinations of the signal waveform patterns shown in FIG. 48A.

H-level carry signal STCY is supplied from down counter 17 to inverter 28, NAND gate 30, and terminal K of flip-flop 31. Thus, the output (L level) from inverter 28 is applied to terminal E of flip-flop 29, and flip-flop 29 is enabled. The Q output (SELMAC) of flip-flop 29 is inverted from H level to L level in response to the leading edge of clock signal $\overline{\phi 2}$ (or the trailing edge of clock signal $\phi 2$). When output SELMAC goes to L level, data selector 18 selects the output (MAC(0)) from latch 16-1, and supplies the selected signal to macro decoder 19. Down counter 17 sets data ST(0) as count value STCNT in response to the leading edge of clock signal $\overline{\phi 2}$ (in this case, signal STCY is at H level), and then counts down in synchronism with the leading edge of clock signal $\overline{\phi 2}$. While down counter 17 counts down from ST(0) to 0{$T\phi 2 \times x$(ST(0)+1)}, signal waveforms are generated by macro decoder 19. FIG. 48A shows signal waveforms generated by macro decoder 19

In FIG. 48A, "DCBA" indicates a 4-bit value of macro data MAC(x) and MAC(x+1), and D corresponds to the MSB and A corresponds to the LSB (where x is an integer within the range of 0 to 15). The ordinate represents a voltage value, and fH and *fH represent high-frequency signals (*fH is a signal having a phase difference of 180 degrees from signal fH). FIG. 48B shows waveforms of LCS drive signals when signals Y1 (PT1) and Y2 (PT2) are applied to signal electrons (to be described later) of the LCS and signals Y3 (COM1) and Y4 (COM2) are applied to common electrodes (to be described later) thereof. In FIG. 48B, [0] represents a non-electric field state.

ON/OFf control of the LCS is performed by applying the waveforms shown in FIG. 48B to the LCS (two-frequency driving).

Figure 50:
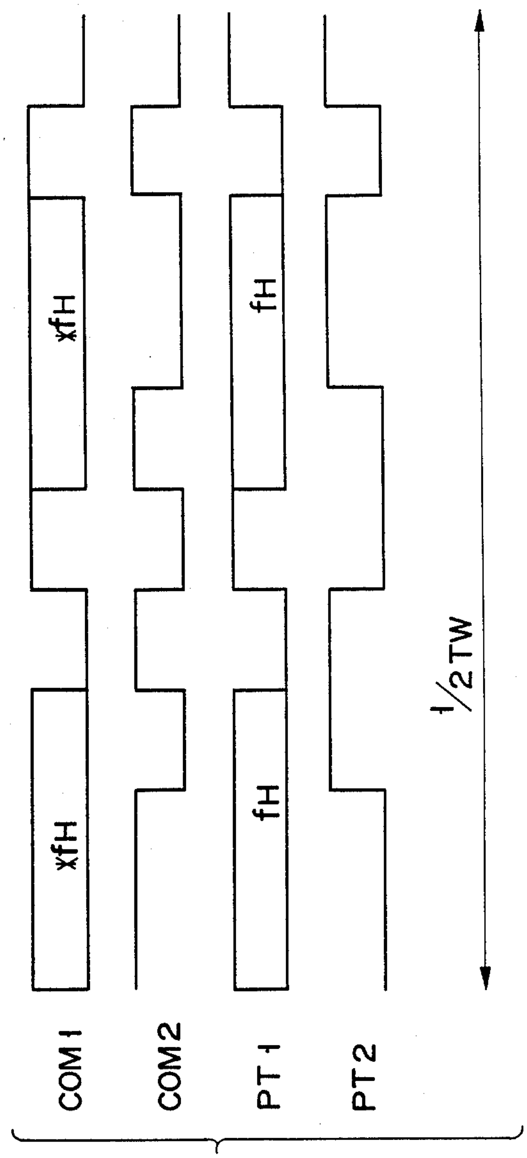
FIG. 50 shows signal waveform patterns of LCS drive signals COM1, COM2, PT1, and PT2 generated in accordance with data DSTATUS.

In this embodiment, since a RAM having a capacity of 4 (bits)=32 (bits) words is used as memory 11, macro data shown in FIG. 32 is stored to be divided into eight frames, as shown in FIG. 49, in practice. When data DSTATUS shown in FIG. 51 is stored in memory 11, waveforms shown in FIG. 50 are generated. FIG. 50 shows waveforms only in the first half (Tw/2) of period Tw.

When signal BLADR (=3) is output from up counter 12 to memory 11, signal BLAD(3) goes to H level, and is supplied to NAND gate 30. As shown in the timing charts of FIGS. 46A and 46B, since signal BLAD(3) goes to H level when both signals SELMAC and STCY are at H level, an L-level signal is applied from NAND gate 30 to terminal E of flip-flop 32. The Q output (DSELQ) from flip-flop 32 is inverted from L level to H level in response to the leading edge of clock signal $\overline{\phi 2}$ (i.e., the trailing edge of signal $\phi 2$), as shown in the timing charts of FIGS. 47A and 47B. Thus, data selector 21 causes the T3 and T4 outputs from macro decoder 19 to be input to terminals D4 and D3 of latch 22, respectively. Since the output from AND gate 30 does not go to L level unless signal BLADR indicates "3" and signal BLAD(3) goes to H level, the Q output (DSELQ) from flip-flop 32 is kept at H level during the first half (Tw/2) of the period. Therefore, during the first half of the period, the T3 and T4 outputs from macro decoder 19 are respective input to terminals D3 and D4 of latch 22.

While down counter 17 counts down ST(0) to 0[$T\phi 2 \times$(ST(0)+1)], signal waveforms are generated by macro decoder 19 based on data MAC(0). During this interval, when count value STCNT of down counter 17 becomes "4", signal PTYSTB from down counter 17 goes to H level, and is supplied to NAND gate 25 and AND gate 34. Since signal PTYEN is already set a H level, when signal PTYSTB goes to H level, the output from parity generator 24 passes through NAND gate 25, and is supplied to set terminal S of flip-flop 26. When a parity error occurs, the output from purity generator 24 goes to H level, and is supplied to set terminal S of flip-flop 26. Then, the Q output (PTYER) from flip-flop 26 goes to H level and passes through OR gate 114. Then, the H-level Q output is applied to reset terminal R of latch 113. Thus, signals iSEL, PTYEN, DRVEN, and PTSEL output from latch 113 go to L level (FIG. 45B).

When signal DRVEN goes to L level, the T1 to T4 outputs from macro decoder 19 are made invalid, and the operation of the LCS is stopped, as described above. In this manner, a malfunction of the LCS can be prevented.

When signal iSEL goes to L level, the internal control state is switched to the external control state.

Since count value STCNT of down counter 17 becomes "4" every half a frame, parity check is performed every half a frame.

When down counter 17 further counts down and its count value STCNT has reached "1", signal ST01 is changed from L level to H level. However, at this time, since signal SELMAC is at L level, clock signal $\phi 1$ cannot pass through AND gate 33, and no clock pulses appear in signal iBLCLK. Therefore, signal BLADR output from up counter 12 is left unchanged, i.e., "3". When count value STCNT of down counter 17 has reached "0", carry signal STCY goes to H level and is supplied to inverter 28, so that flip-flop 29 is enabled through inverter 28. Then, the Q output (SELMAC) of flip-flop 29 is changed from L level to H level in response to the leading edge of clock signal $\overline{\phi 2}$ (or trailing edge of signal $\phi 2$). When H-level signal SELMAC is applied to terminal S, data selector 18 selects macro data MAC(1) output from latch 16-2, and outputs it to macro decoder 19. Meanwhile, step count ST(0) output from latches 15-1 and 15-2 is set in down counter 17 in response to the leading edge of clock signal $\overline{\phi 2}$. Thus, macro decoder 19 generates signal waveforms based on macro data MAC(1) in the second half of the 1st frame during $T\phi2\times(ST(0)+1)$, and the generated waveforms are output from terminals T1 to T4.

In the second half of the 1st frame, signal PTYSTB goes to H level when count value STCNT of down counter 17 is "4", and parity check is performed in the same manner as described above. If no parity error is detected, internal processing is continued. When count value STCNT is "1" and "0", signal ST01 goes to H level, four successive pulses appear in signal BLCLK in the same manner as in the second half of the (n/2)th frame described above, and BLADR=4 to 7 is output from up counter 12 to memory 11. Step count ST(2) is latched by latches 15-1 and 15-2 in response to the leading edges of signals STLL and STHL. Macro data MAC(2) is latched by latch 15-1 in response to the leading edge of signal MACLL, and macro data (3) is latched by latch 15-2 in response to the leading edge of signal MACHL. When carry signal STCY output from down counter 17 goes to H level in the second half of the 1st frame, step count ST(2) output from latches 15-1 and 15-2 is set in down counter 17 in response to the leading edge of clock signal $\overline{\phi2}$ (trailing edge of signal $\phi2$). Then, signal SELMAC is changed from H level to L level in response to the leading edge of clock signal $\overline{\phi2}$, and macro data MAC(2) output from latch 16-1 is selected by data selector 18 and is input to macro decoder 19. Thereafter, in the same manner as in the 1st frame, signal waveforms are generated by macro decoder 19 based on macro data MAC(2) in the second half of the 1st frame during $T\phi2\times(ST(2)+1)$, and based on macro data MAC(3) in the second half of the 2nd frame during T®2×(ST(2)+1).

In this manner, each time a one-frame operation is completed, 4-pulse signal BLCLK is generated from data selector section 36, and four serial blocks of addresses are output from up counter 12 to memory 11. Step counts ST(x)L and ST(x)H read out from memory 11 are respectively latched by latches 15-1 and 15-2 and macro data MAC(x) and MAC(x+1) are respectively latched by latches 16-1 and 16-2 in response to latch signals STLL, STHL, MACLL, and MACHL output from decoder 14. Note that x is an even number within a range of 0 to $(n-4)/2$. In this embodiment, since n=32, x is an even number within the range of 0 to 14. In response to signal SELMAC output from flop-flop 29, macro decoder 19 receives macro data MAC(x) in the first half of the frame and macro data MAC(x+1) in the second half of the frame. Then, LCS drive signals PT1, PT2, COM1, and COM2 are generated by macro decoder 19 based on macro data MAC(x) in the first half of the frame and based on macro data MAC(x+1) in the second half of the frame.

The period of the frame is defined by step count ST(x), and each of the first and second halves of the frame corresponds to $T\phi2x(ST(x)+1)$. FIG. 20 shows waveforms of LCS drive signals COM1, COM2, PT1, and PT2 generated by developing macro data MAC(0) to MAC(15) in the first half (Tw/2) of period Tw. In FIG. 50, fL and fL1 are low-frequency signals, and fH and *fH are high-frequency signals. *fL and *fH are waveforms phase-shifted from those of fL and fH by 180 degrees. Since AC waveforms are generated by clock signal $\overline{\phi3}$, frequency TfH of signal fH is equal to period $T\phi3$ of clock signal $\phi3$. As shown in FIGS. 46A and 46B, since the period of $\phi3$ is twice that of $\phi2$, $TfH=2T\phi2$, as shown in FIG. 30.

When the first half (Tw/2) of period Tw is completed, four pulses appear in signal BLCLK, as described above, and BLADR=0, 1, 2, 3 is output from up counter 12 to memory 11. When BLADR becomes "38", signal BLAD(3) from up counter 12 goes to H level, and is supplied to terminal E of flip-flop 32 through NAND gate 30. Therefore, the logic level of the Q output (DSELRQ) of flip-flop 32 is changed (from L level to H level), and the T3 and T4 outputs of macro decoder 19 are switched by data selector 21 to be input to terminals D4 and D3 of latch 22, respectively. In the second half (Tw/2) of period Tw, macro data MAC(0) to MAC(15) are developed based on step counts ST(0) to ST(7). In this case, since the T3 and T4 outputs of macro decoder 19 are switched by data selector 21, the waveforms of signals COM1 and COM2 replace each other in the first and second halves (Tw/2) of period Tw, as shown in FIG. 30.

LCS drive signals PT1, PT2, COM1, and COM2 generated by macro decoder 19 are output to the recording control section (not shown) through latch 22 and buffer 23 in synchronism with the leading edge of clock signal $\phi1$.

Figure 47A:
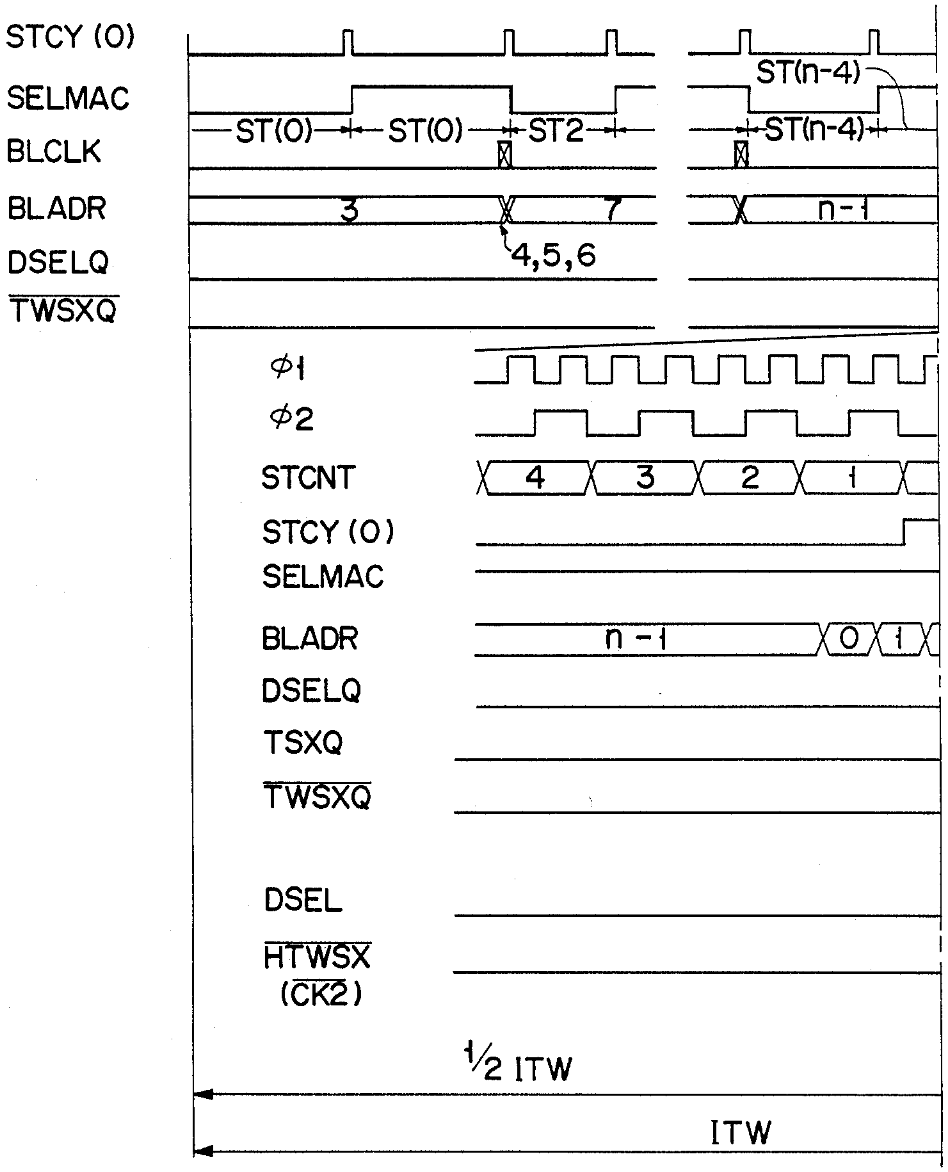

As shown in the timing chart of FIG. 47A, in the second half of the last frame (8th frame) in the second half (Tw/2) of period Tw, block address BLADR output from up counter 12 indicates the end address ("31"), and count value STCNT output from down counter 17 becomes "4". Then, the output (TSXQ) from AND gate 34 goes to H level, and the Q output ($\overline{\text{iTWSC}}$) from flip-flop 31 goes to H level and its $\overline{Q}$ output is inverted to L level in response to the leading edge of signal $\overline{\phi2}$. For this reason, the output ($\overline{\text{TWSXQ}}$) from NAND gate 35 is changed from L level to H level. Signal TSXQ goes to L level when count value STCNT becomes "3", and the Q output ($\overline{\text{iTWSX}}$) from flip-flop 31 is latched by latch 22 in response to the leading edge of signal $\phi1$. Then, the Q output is output, as signal $\overline{\text{CK2}}$, to the recording control section through buffer 23.

In this case, signal $\overline{\text{TWSXQ}}$ is latched by latch 22 in response to the leading edge of signal $\phi1$, and is output, as signal $\overline{\text{HTWSX}}$, to an external apparatus (not shown) through buffer 23. Inverted signal LTWSX of signal $\overline{\text{HIWSX}}$ is output to buffer 40*r* of video interface section 40 (FIG. 29D).

When count value STCNT becomes "0", carry signal STCY from down counter 17 goes to H level, and is supplied to terminal K of flip-flop 31. The $\overline{Q}$ output of flip-flop 31 is inverted to H level in response to the leading edge of clock signal $\overline{\phi2}$. Therefore, output $\overline{\text{TWSXQ}}$ of NAND gate 35 again goes to L level.

Carry signal STCY is supplied to AND gate 30, and an L-level signal is supplied from AND gate 30 to terminal E of flip-flop 32. Therefore, the Q output (DSELQ) from flip-flop 32 is inverted from H level to L level in response to the leading edge of signal $\overline{\phi2}$. Signal DSELQ is latched by latch 22 in response to the leading edge of signal $\phi1$, and is output, as signal DSEL, to the recording control section through buffer 23.

In video interface section 40, one-line video data HLTXD is latched by latch 40*b* in synchronism with the trailing edge of clock signal $\overline{\text{HLTXCK}}$ from an external apparatus during an L-level interval of signal $\overline{\text{HTWSX}}$, and is output, as video data LTXD, to the recording control section through inverter 40*d* and buffer 40*e*. Two clock si gnals $\overline{\text{CK1A}}$ and $\overline{\text{CK1B}}$ are generated from clock signal $\overline{\text{HLTXCK}}$ by flip-flops 40*f* and 40*h*, inverter 40*g*, and NAND gates 40*i* and 40*j*, and are output to the recording control section respectively through buffers 40m and 40l. Two clock pulses of clock signals $\overline{CK1A}$ and CK1B are alternately generated as described above.

As will be described later in detail, the recording control section receives one-line video data LTXD from video interface section 40 in synchronism with clock signals $\overline{CK1A}$ and $\overline{CK1B}$ during period Tw. Based on the value of video data LTXD, the recording control section selects LCS drive signals PT1 and PT2 input from the LCS drive signal generator, and applies the selected signal to the signal electrodes f the LCS to ON/OFF-control the microshutters in the LCS, thus performing optical write access. In this case, LCS drive signals COM1 and COM2 are applied to the common electrodes of the LCS. When signal PTSEL is at L level, LCS drive signal PT1 serves as an LCS OFF signal for turning off the LCS, and LCS drive signal PT2 serves as an LCS ON signal for turning on the LCS. LCS drive signals COM1 and COM2 are signals for selecting the LCS in the first and second halves (Tw/2) of period Tw, respectively.

An image forming system by means of optical write access including a normal developing method for recording, in black, a portion which is not subjected to light irradiation when the LCS is OFF, and a reversal developing method for recording, in black, a portion subjected to light irradiation when the LCS is ON. In this embodiment, PTSEL is set at L level in the normal developing method, and PTSEL is set a H level in the reversal developing method under the control of the external CPU. Thus, when a bit of video data LTXD is "1", a black dot can be recorded in either developing method.

In this embodiment, parity check is performed by an odd-numbered parity. However, parity check may be performed by an even-numbered parity. DATA DSTATUS in which parity bit PTY(x) is set may be set in any block of data DSTATUS constituting one frame.

Since the circuit shown in FIGS. 29A to 29D and FIGS. 45A to 45D can be easily mounted on one chip as a gate array, a standard cell, or the like, a low-cost apparatus can be provided.

In this embodiment, memory 11 is designed to match with a versatile 4-bit one-chip microprocessor. However, memory 11 can be easily designed to match with various other one-chip microprocessors. According to the present invention, a compact, low-cost apparatus can be provided. Memory 11 may comprise a ROM. In this case, drive waveforms for a liquid crystal device can be generated using a small-capacity ROM.

According to the embodiment described above in detail, the following advantages can be expected.

a. A program capacity can be reduced, and program data need not be stored in an additional memory unlike in the conventional apparatus but can be prestored in a small-capacity memory arranged in one chip, thus improving mounting efficiency and reducing cost.

b. The small-capacity memory can be easily designed to match with a data bus of a versatile one-chip microprocessor, and versatility and cost performance can be greatly improved by the present invention.

c. Since parity check is performed, a malfunction or device error caused by external noise can be prevented, and reliability and safety of the apparatus can be improved. In particular, when the apparatus of this embodiment is applied a generator for generating drive signals for ON/OFF-controlling an LCS used in a recording apparatus, the LCS can be disabled before an error signal is applied to the LCS. Therefore, erroneous image formation and the like can be effectively prevented.

d. When the conventional apparatus is used for generating drive signals for ON/OFF-controlling the LCS used in the recording apparatus, an average DC voltage may be applied to electrodes of the LCS due to write error or read error in the conventional apparatus. However, in this embodiment, drive signals applied to the common electrodes are always changed every half a period, and parity check is performed. Therefore, a DC voltage is not applied to the LCS for a long period of time, thus preventing the LCS from being degraded.

Still another embodiment of the present invention will be described hereinafter with reference to the drawings. An apparatus of this embodiment can obtain various drive waveforms by rewriting data by an external apparatus and can quickly cope with modifications in specifications of LCS drive waveforms accompanied by modification or improvement of a liquid crystal material. Therefore, the apparatus can easily generate optimal drive waveforms in accordance with specifications.

Figure 52A:
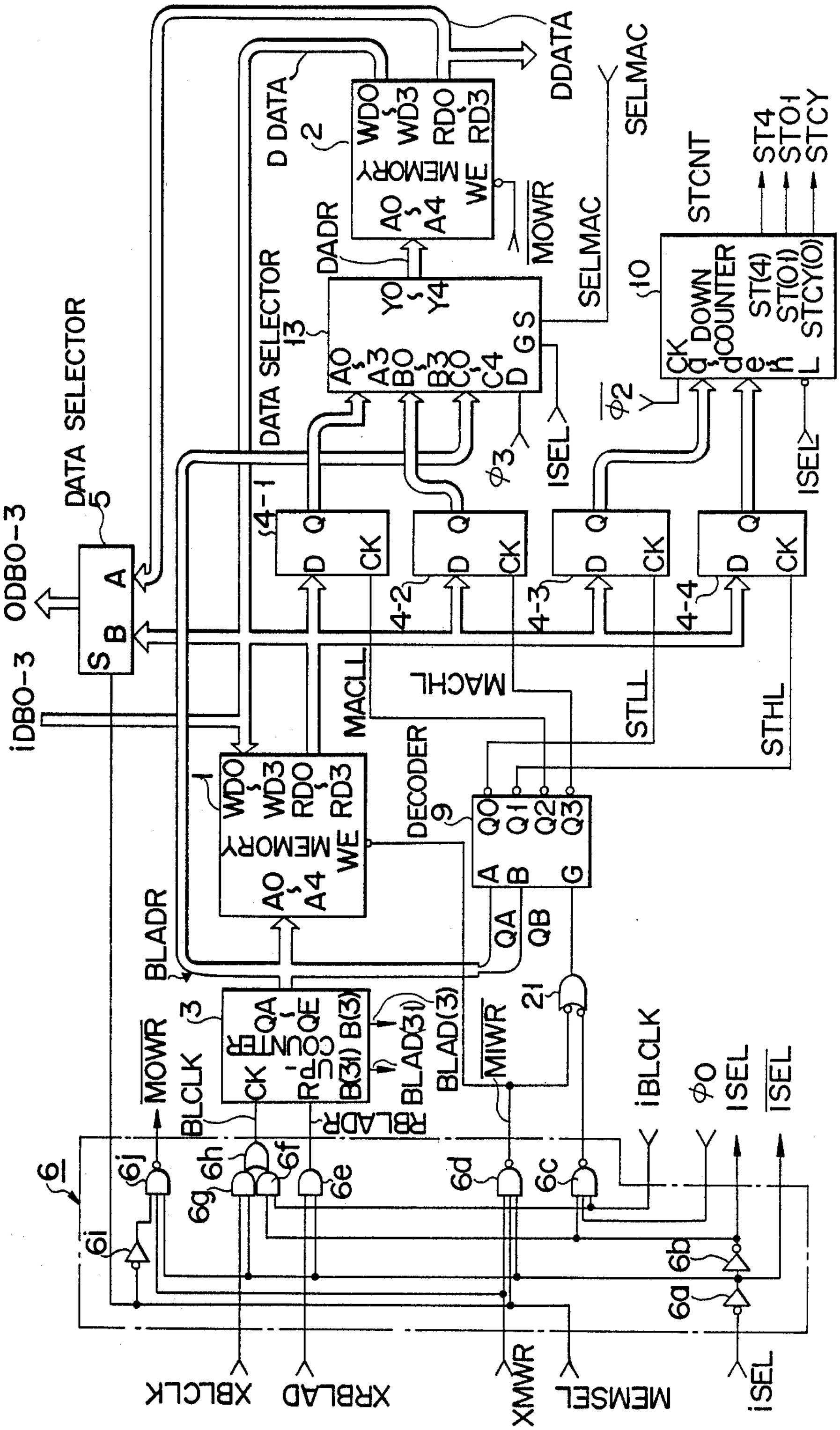
FIGS. 52A and 52B are circuit diagrams of a waveform generating apparatus capable of obtaining a variety of drive waveforms by externally rewriting data, according to still another embodiment of the present invention.
Figure 52B:
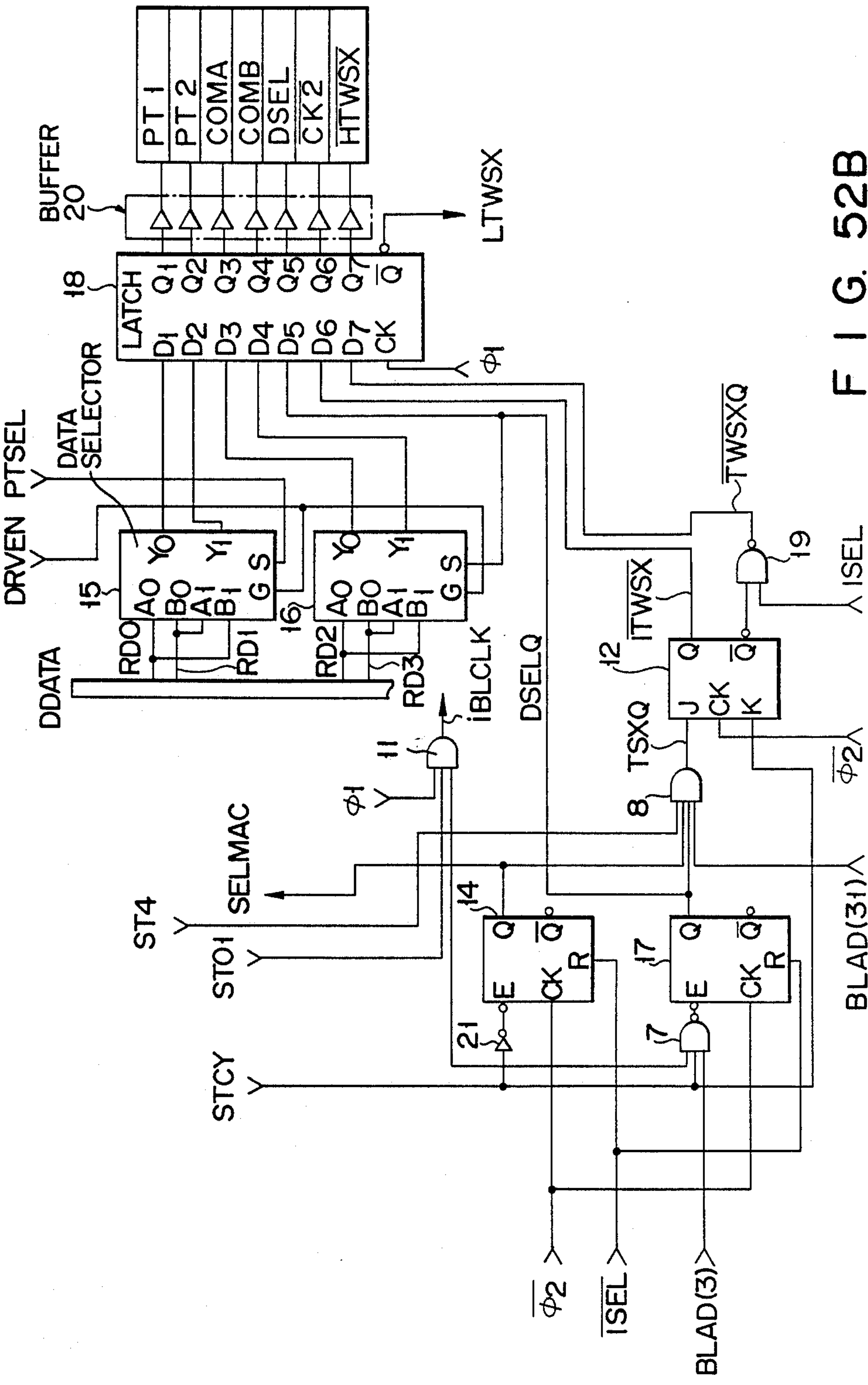

FIGS. 52A and 52B are block diagrams showing a circuit arrangement of an LCS drive signal generator according to this embodiment of the present invention. In FIG. 52A, memories 1 and 2 comprise static RAMs each having a 4 (bits)×32 (words) configuration. Memory 1 stores macro code MAC(x) and the number of developing steps ST(x)H and ST(x)L of macro code MAC(x), and memory 2 stores data DSTATUS for generating LCS drive waveforms. Note that memory 1 can comprise a ROM. In this case, the object of this embodiment can be achieved such that drive waveforms of the liquid crystal device can be generated by a small-capacity ROM.

Figures 55, 56, 57:
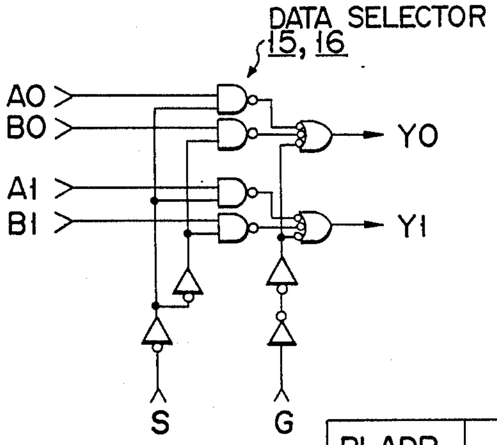
FIG. 55 is a circuit diagram of data selectors 15 and 16 shown in FIG. 52B.
FIG. 56 is a view showing one frame formed by macro data and the number of developing steps stored in memory 1 shown in FIG. 52A.
FIG. 57 is a view showing a one-frame data format.

FIG. 56 shows formats of macro code MAC(x) and the number of developing steps ST(x)H and ST(x)L stored in memory 1. As shown in FIG. 56, ST(0)L, ST(0)H, MAC(0), MAC(1), ST(2)L, . . . , ST(14)L, ST(14)H, MAC(14), and MAC(15) are stored in memory 1 in the order of block addresses (BLADR), and ST(x)L, ST(x)H, MAC(x), and MAC(x+1) stored at addresses (BLADR)=2x to 2x+3 shown in FIG. 47 constitute one frame (where x is an even number of 0, 2, . . . , 12, 14). ST(x)L and ST(x)H are respectively upper and lower 4 bits of the number of developing steps, and the number of developing steps is 8-bit data. In the following description, the number of developing steps [ST(x)L,ST(x)H] is represented by ST(x). Therefore, $0 \leqq ST(x) \leqq 255$, and developing step count ST(x) can be logically designated from 0 step to 255 steps. FIG. 58 shows a detailed data format of developing step count data ST(x)L, ST(x)H, MAC(x), and MAC(x+1).

An arrangement of memory 1 will be described below. Address signal input terminals A0 to A4 of memory 1 receive QA to QE outputs (BLADR) from up counter 3, respectively. Note that QA corresponds to the LSB, and QE corresponds to the MSB. Data input terminals WD0 to WD3 are connected to input data bus iDB0-3, and write access of macro codes MAC(x) and MAC(x+1) and their developing step count data ST(x)L and ST(x)H in memory 1 is performed through input data bus iDB0-3. Macro codes MAC(x) and MAC(x+1) and their developing step count data ST(x)L and ST(x)H are output to latches 4-1, 4-2, 4-3, and 4-4 from data output terminals RD0 to RD3, respectively, and are also output to data selector 5.

Read/write access of macro codes MAC(x) and MAC(x+1) and their developing step count data ST(x)L and ST(x)H is performed in accordance with write signal $\overline{\text{M1WR}}$ output from data selector section 6.

Up counter 3 counts up 0 to 31. Terminals CK and R of up counter 3 receive pulse signal BLCLK and reset signal RBLADR from data selector section 6, respectively. Counter 3 performs counting in response to the leading edge of pulse signal BLCLK, and is reset to an initial value (0) in response to reset signal RBLADR (H level). Up counter 3 outputs count value BLADR as a block address signal to memory 1. When count values BLADR are "3" and "31", counter 3 sets signals BLAD(3) and BLAD(31) at H level and supplies these signal to NAND gate 7 and AND gate 8 shown in FIG. 52B, respectively. A lower 2-bit signal of count value BLADR of up counter 3 is output from terminals QA and QB to decoder 9.

Figures 53, 54:
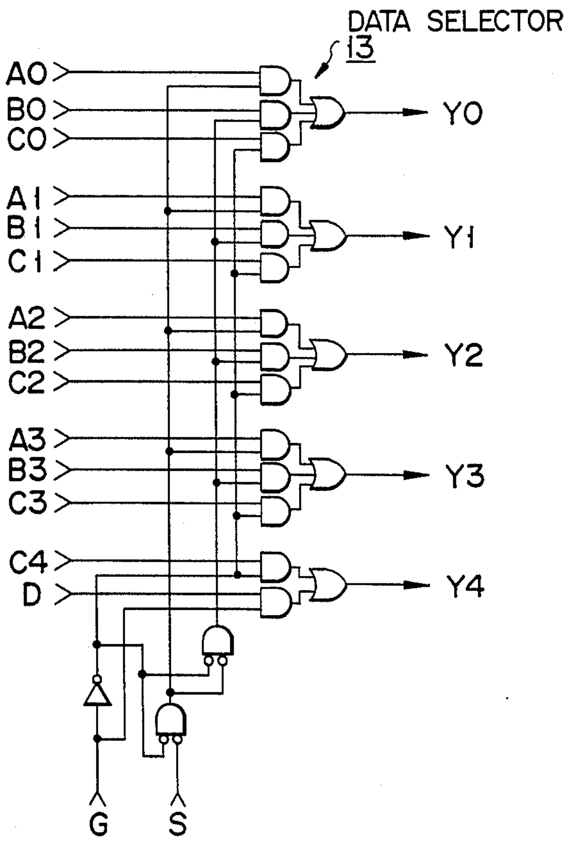
FIG. 53 is a circuit diagram of data selector 13 shown in FIG. 52A.
FIG. 54 is a view showing the I/O relationship in the arrangement shown in FIG. 53.

Decoder 9 sets any of terminals Q0 to Q3 at L level in accordance with values input at terminals A and B when a value at terminal G is "1" (H level). Since lower 2 bits of count value BLADR of up counter 3 are input to terminals A and B of decoder 9, as described above, decoder 9 sets the output from terminal Q0 at L level when BLADR="2x+0"; terminal Q1 when BLADR="2x+1"; terminal Q2 when BLADR="2x+2"; and terminal Q3 when BLADR="2x+3" (where x is an even number of 0 to 14). The output (MACLL) from terminal Q2, the output (MACHL) from terminal Q3, the output (STLL) from terminal Q0, and the output (STHL) from terminal Q1 are respectively supplied to terminals CK of latches 4-1, 4-2, 4-3, and 4-4. Latches 4-1, 4-2, 4-3, and 4-4 latch 4-bit input data D when corresponding terminals CK go from L level to H level. The outputs from latches 4-3 and 4-4 are set in down counter 10 in response to the leading edge of clock signal $\overline{\phi 2}$ when select signal ISEL output from data selector section 6 is set at L level or the count value of down counter 10 becomes "0". Down counter 10 is an 8-bit input (terminals a to h) down counter, and performs counting a maximum of $2^8=128$ times. When the count value becomes "4", counter 10 sets the output at terminal ST(4) at H level, and supplies it to AND gate 8 shown in FIG. 52B. When the count value becomes "1", counter 10 sets the output at terminal ST(01) at H level, and supplies it to AND gate 11. When the count value is "0", counter 10 sets carry signal STCY at H level, and supplies it to NAND gate 7 and terminal K of flip-flop 12. Data selector 13 selects either the output from latch 4-1 and clock signal $\phi 3$ or the output from latch 4-2 and clock signal $\phi 3$ in accordance with select signal SELMAC output from flip-flop 14 when signal ISEL (to be described later) is at H level. Then, selector 13 outputs the selected signals to memory 2 as data address signal DADR. In the same manner as in memory 1, memory 2 can comprise not only a RAM but also a ROM, and need only be a small-capacity ROM. FIG. 53 shows a circuit arrangement of data selector 13. In the circuit diagram of FIG. 53, macro code MAC(x) output from latch 4-1 is input to input terminals A0 to A3. Macro code MAC(x+1) output from latch 4-2 is input to input terminals B0 to B3. Block address signal BLADR output from up counter 12 is input to input terminals C0 to C4. Clock signal $\phi 3$ is input to input terminal D. Internal select signal ISEL output from data selector section 6 is input to external terminal G. MACRO data select signal SELMAC output from flip-flop 14 is input to select terminal S. The operation of data selector 13 will be described with reference to FIG. 54. When terminal S (SELMAC)="0" (L level) and terminal G (ISEL)="1" (H level), A0 to A3 inputs, i.e., macro code MAC(x), and clock signal $\phi 3$ as a D input are output from output terminals Y0 to Y4. When terminal S (SELMAC)="1" (H level) and terminal G (ISEL)="1" (H level), B0 to B3 inputs, i.e., macro code MAC(x+1) output from latch 4-2, and clock signal $\phi 3$ as the D input, are output from output terminals Y0 to Y4. When terminal G (ISEL)="0", C0 to C4 inputs, i.e., block address signal BLADR output from up counter 3, are output to address signal input terminals A0 to A4 of memory 2 as address signal DADR.

Memory 2 performs read/write access of data DDATA stored at addresses designated by address signal DADR input from data selector 13 in accordance with write signal $\overline{\text{M0WR}}$ input from data selector section 6. Data input terminals WD0 to WD3 of memory 2 are connected to input data bus iDB0-3. When signal $\overline{\text{M0WR}}$ is at L level, write access of macro data DDATA is performed through input data bus iDB0-3. Lower 2 bits of 4-bit macro data DDATA read out from memory 2 are output from data output terminals RD0 and RD1 to data selector 15 shown in FIG. 52B, and upper 2 bits thereof are output from data output terminals RD2 and RD3 to data selector 16. FIG. 55 shows the circuit arrangement of data selectors 15 and 16. As shown in FIG. 55, Y0 and Y1 outputs of data selectors 15 and 16 are fixed at H level when terminal G is at L level. When terminal G is at H level and selector terminal S is at L level, if A0 and A1 inputs are at H level, B0 and B1 inputs are selected and serve as Y0 and Y1 outputs. In this embodiment, control signal PTSEL from an external apparatus is input to select terminal S of data selector 15. The Q output (DSELQ) from flip-flop 17 is input to select terminal S of data selector 16. Terminal RD0 of memory 2 is connected to terminals A0 and B1 of data selector 15. Terminal RD1 of memory 2 is connected to terminals A1 and B0 of data selector 15. Terminal RD2 of memory 2 is connected to terminals A0 and B1 of data selector 16. Terminal RD3 of memory 2 is connected to terminals A1 and B0 of data selector 16. The Y0 and Y1 outputs from data selector 15 are respectively connected to terminals D1 and D2 of latch 18. The Y0 and Y1 outputs from data selector 16 are respectively input to terminals D3 and D4 of latch 18. Therefore, data selector 15 switches connections between the RD0 and RD1 outputs of memory 2 with input terminals D1 and D2 of latch 18 under the control of signal PTSEL. As will be described later, since signal DSELQ goes to L level in the first half of period Tw and goes to H level in the second half thereof, the RD2 and RD3 outputs of memory 2 respectively serve as D3 and D4 inputs of latch 18 in the first half of period Tw, and the RD3 and RD2 outputs of memory 2 respectively serve as the D3 and D4 inputs of latch 18 in the second half of period Tw.

Latch 18 receives the output (DSELQ) from flip-flop 17, the output ($\overline{\text{iTWSX}}$)from flip-flop 12, and the output ($\overline{\text{TWSXQ}}$) from NAND gate 19 respectively at terminals D5 to D7 in addition to the Y0 and Y1 outputs from data selectors 15 and 16. Latch 18 latches data from terminals D1 to D7 in synchronism with the leading edge of clock signal $\phi 1$ input at terminal CK from an external apparatus.

The Q1 to Q7 outputs from latch 18 are output, as LCS drive signals PT1, PT2, COM1, and COM2 and timing signals DSEL, $\overline{CK2}$, and $\overline{HTWSX}$, to a recording control section (not shown) through buffer section 20. The $\overline{Q7}$ output as the inverted Q7 output is output to a video interface section (not shown) as timing signal LTWSX. Note that the recording control section is the same as that shown in FIG. 27A and the video interface section is the same as that shown in FIG. 29D, and a detailed description thereof will be omitted.

Carry signal STCY output from down counter 10 is input to inverter 21, NAND gate 7, and terminal K of flip-flop 12. The output from inverter 21 is input to terminal E of toggle flip-flop 14 with an enable terminal. Flip-flop 14 is enabled when carry signal STCY is at H level, i.e., when the output from inverter 21 is at L level. The Q output (SELMAC) of flip-flop 14 is inverted each time external clock signal $\overline{\phi 2}$ input to terminal CK rises. The output from NAND gate 7 which receives signal SELMAC, STCY, and BLAD(3) is input to terminal E of toggle flip-flop 17 with an enable terminal. The Q output (DSELQ) of flip-flop 17 is inverted in response to the leading edge of external clock signal $\overline{\phi 2}$ input to terminal CK when all the signals SELMAC, STCY, and BLAD(3) are at H level.

Reset terminals R of flip-flops 14 and 17 receive select signal $\overline{ISEL}$ output from data selector section 6. When signal $\overline{ISEL}$ goes to H level (external control state), signals SELMAC and DSELQ go to L level.

Signal ST01 input from down counter 10, the Q output (SELMAC) from flip-flop 14, and external clock signal $\phi 1$ are input to AND gate 11. During the H-level interval of signals ST01 and SELMAC, clock signal $\phi 1$ passes through AND gate 11 to be pulse signal iBLCLK, and is input to data selector section 6. The Q output (SELMAC) from flip-flop 14, the Q output (DSELQ) from flip-flop 17, signal BLAD(31) output from up counter 3, and signal ST4 output from down counter 10 are input to AND gate 8. When signals SELMAC and DSELQ are at H level and signal BLAD(31) is at H level in the second half (Tw/2) of period Tw, if signal ST4 goes to H level, the output (TSXQ) from AND gate 8 goes to H level, and is applied to terminal J of flip-flop 12. Flip-flop 12 is a J-K flip-flop, and its terminal K receives carry signal STCY output from down counter 10. The Q output ($\overline{iTWSX}$) from flip-flop 12 is input to terminal D6 of latch 18, and its $\overline{Q}$ output is input to NAND gate 19. NAND gate 19 also receives signal ISEL output from data selector section 6. When signal ISEL is at H level (internal control state), the Q output from flip-flop 12 passes through NAND gate 19 to be converted to signal $\overline{TWSXQ}$, and is input to terminal D7 of latch 18.

Data selector section 6 has inverter 6a for inverting select signal iSEL which is input from an external apparatus and outputting signal $\overline{ISEL}$ to reset terminals R of flip-flops 14 and 17, and inverter 6b for inverting signal $\overline{ISEL}$ output from inverter 6a and outputting signal ISEL to down counter 10 and NAND gate 19 shown in FIG. 52B. Data selector section 6 has NAND gate 6c for allowing external clock signal 0 to pass therethrough and outputting it to NAND gate 21 when pulse signal iBLCLK output from AND gate 11 and signal ISEL output from inverter 6b are at H level. Section 6 has NAND gate 6d for allowing write signal XMWR input from an external apparatus to pass therethrough and outputting it as signal $\overline{M1WR}$ to NAND gate 21q and terminal WE of memory 1 when signal $\overline{ISEL}$ output from inverter 6a and external select signal MEMSEL are at H level. Section 6 has AND gate 6e for allowing reset signal XRBLAD which is input from an external apparatus to pass therethrough and outputting it as reset signal $\overline{RBLADR}$ to reset terminal R of up counter 3 when signal $\overline{ISEL}$ output from inverter 6a is at H level, and AND gate 6f for allowing pulse signal iBLCLK output from AND gate 11 to pass therethrough when signal $\overline{ISEL}$ output from inverter 6b is at H level. Furthermore, section 6 has AND gate 6g for allowing pulse signal XBLCLK input from an external apparatus to pass therethrough when signal ISEL output from inverter 6a is at H level, OR gate 6h for receiving signal iBLCLK output from AND gate 6f and signal XBLCLK output from AND gate 6g and outputting one of them to clock terminal CK of up counter 3, and inverter 6i for receiving and inverting external select signal MEMSEL. In addition, section 6 has NAND gate 6j for inverting write control signal XMWR, allowing it to pass therethrough, and supplying it as write control signal $\overline{MOWR}$ to terminal WE of memory 2 when the output from inverter 6i and signal $\overline{ISEL}$ (output from inverter 6a) are at H level.

Furthermore, data selector 5 selects data read out from output data terminals RD0 to RD3 of memory 1 or data read out from output data terminals RD0 to RD3 of memory 2 in accordance with external select signal MEMSEL, and outputs the selected data onto output data bus ODB0-3.

Figure 29D:
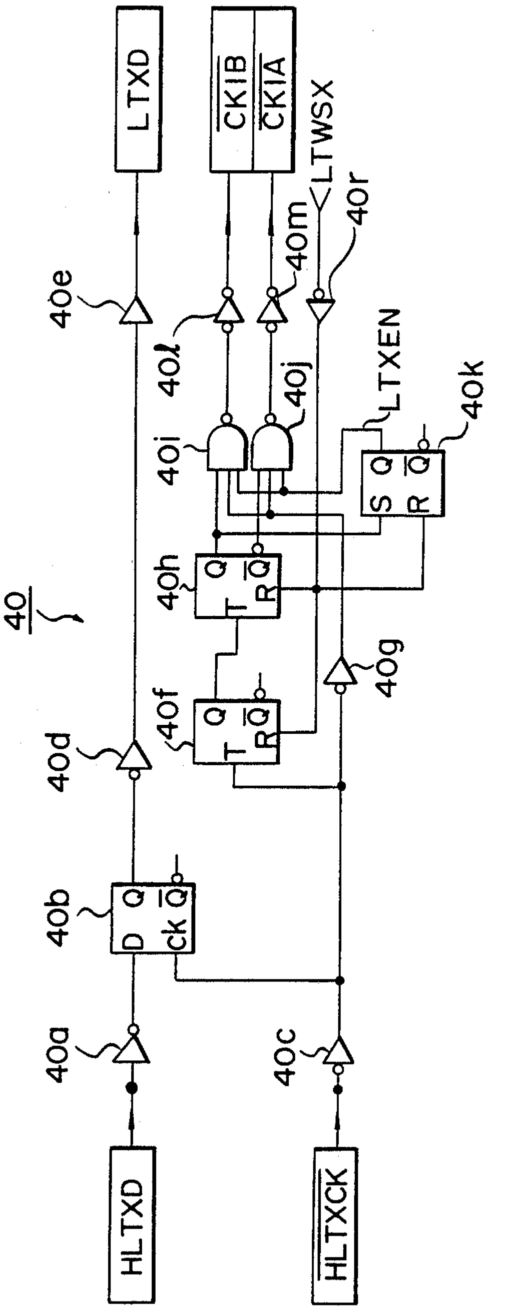

The arrangement of a video interface section in this embodiment is the same as that in the embodiment shown in FIG. 29D, and a detailed description thereof will be omitted.

The operation of the LCS drive signal generator with the arrangement as shown in FIGS. 52A and 52B will be described below.

Upon starting the apparatus, signals iSEL and DRVEN are reset to L level. When L-level signal DRVEN is applied to terminals G of data selectors 15 and 16, the Y0 and Y1 outputs from data selectors 15 and 16 are fixed at H level. Thus, LCS drive signals PT1 and PT2 applied to the signal electrodes (not shown) of the LCS and LCS drive signals COM1 and COM2 applied to the common electrodes (not shown) of the LCS have the same potential, and the LCS can be prevented from being applied with an accidental voltage, especially, a DC voltage. Since signal iSEL is reset to L level, the external control mode is selected, and externally input pulse signal XBLCLK, reset signal XRBLAD, write control signal XMWR, and select signal MEMSEL are made valid. When signal $\overline{ISEL}$ goes to H level through data selector section 6, the Q outputs (SELMAC, DSELQ) from flip-flops 14 and 17 go to L level, and external clock signal $\phi 1$ cannot pass through AND gate 11, thus interrupting generation of internal pulse signal iBLCLK. Furthermore, since signal ISEL goes to L level and is supplied to terminal G of data selector 13, data selector 13 selects the C0 to C4 inputs (block address signal BLADR output from up counter 3), and outputs them to address signal input terminals A0 to A4 of memory 2. Since signals SELMAC and DSELQ go to L level and are applied to AND gate 8, output TSXQ from AND gate 8 is fixed at L level, and is applied to terminal J of flip-flop 12. For this reason, the Q output ($\overline{iTWSX}$) from flip-flop 12 is fixed at L level, and generation of pulse signal $\overline{CK2}$ output through latch 18 and buffer section 20 is interrupted. Thus, the recording control section disables a video signal input supplied from the video interface section. When signal iSEL is set at L level to input reset signal XRBLAD (H level), signal RBLADR (H level) is applied to reset terminal R of up counter 3 through data selector section 6, and up counter 3 is reset to "00000 B" (symbol B represents a binary value). When external pulse signal XBLCLK is input to data selector section 6, pulse signal BLCLK is supplied from data selector section 6 to clock terminal CK of up counter 3, thus incrementing up counter 3. The count value of up counter 3 is input to address signal input terminals A0 to A4 of memory 1 and terminals C0 to C4 of data selector 13 as block address signal BLADR. Thus, block address signal BLADR is supplied to address signal input terminals A0 to A4 of memory 2 through data selector 13 as address signal DADR.

In an initialization mode, it is not limited that data is first written in either memory 1 or 2. However, it is preferable that data is first written in memory 2. Therefore, external select signal $\overline{\text{MEMSEL}}$ is set at L level, so that write signal $\overline{\text{MOWR}}$ is applied from data selector section 6 to terminal WE of memory 2 by the pulse input of external write control signal XMWR.

A write method of macro data DDATA in memory 2 will be briefly described (iSEL=DRVEN=MEMSEL=L level).

(1) Macro data DDATA is output to data input terminals WD0 to WD3 of memory 2 through input data bus iDB0-3.

(2) Write signal $\overline{\text{MOWR}}$ (L level) is applied to terminal WE of memory 2 through data selector section 6 by the pulse input of external write control signal XMWR. Thus, macro data DDATA is written at addresses designated by block address signal BLADR.

(3) External pulse signal XBLCLK is applied, so that pulse signal BLCLK is supplied to clock terminal CK of up counter 3 through data selector section 6. Thus, up counter 3 counts up and block address signal BLADR is incremented.

With the above operations (1) to (3), one block of macro data DDATA is written in memory 2.

The operations (1) to (3) are repetitively executed so that all the blocks of macro data DDATA are written in memory 2.

After the write access, written macro data DDATA is read out from memory 2 through data selector 5 and output data bus ODB0-3 to verify the content of macro data DDATA.

As a result of verification, if it is confirmed that all the blocks of macro data DDATA are normal, memory select signal MEMSEL is switched to H level, and developing step count data ST(x)L and ST(x)H, and macro codes MAC(x) and MAC(x+1) are written in memory 1 in substantially the same operation as operations (1) to (3) described above. In the data write operation to memory 1, in the operation (1), developing step count data ST(x)L and ST(x)H, and macro codes MAC(x) and MAC(x+1) are sequentially output onto input data bus iDBO-3. Data written in memory 1 are read out through data selector 5 and output data bus ODBO-3 in the same manner as in the write access to memory 2, and it is verified if written developing step count data ST(x)L and ST(x)H and macro codes MAC(x) and MAC(x+1) are normal. If it is confirmed that these data are normal, signal iSE1 is set at H level to select the internal control mode. Note that signal DRVEN is set at H level at least one period (Tw) after signal iSEL is set at H level.

LCS drive signals $\overline{\text{PT1}}$, PT2, COM1, and COM2 and timing signals DSEL, $\overline{\text{CK2}}$, and HTWSX are normally enabled.

The operation of the circuit arrangement of this embodiment in one period (Tw) is the same as that of the embodiment shown in FIGS. 46A and 46B and FIGS. 47A and 47B, and is partially used in a description of this embodiment.

Figure 47B:
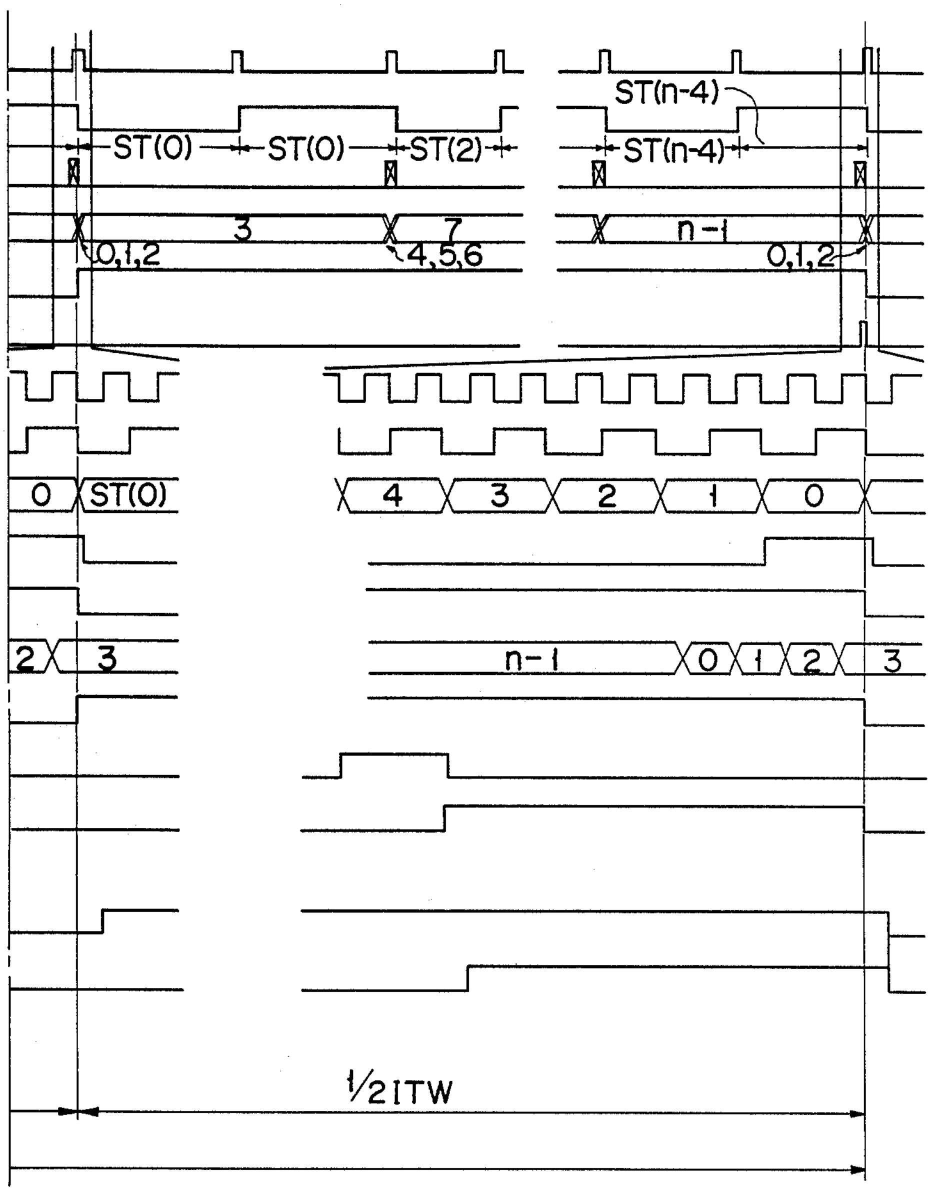

Memory 1 stores 32 blocks of data DSTATUS shown in FIG. 56, i.e., data DSTATUS corresponding to 8 frames. Since data DSTATUS corresponding 8 frames are used in the first and second halves (Tw/2) of the period, one period (Tw) corresponds to 16 frames. FIGS. 46A and 46B are timing charts starting from the second half of the last frame (16th frame) in the second half of period Tw, and FIGS. 47A and 47B are timing charts of one period (Tw).

When count value STCNT of down counter 10 becomes "1" in the second half of the 16th frame, signal ST01 from down counter 10 goes to H level, and is supplied to AND gate 11. Signal ST01 is maintained at H level while count value STCNT is "1" and "0". At this time, the Q output (SELMAC) of flip-flop 14 is at H level, and clock signal $\phi 1$ passes through AND gate 11 to be converted to pulse signal iBLCLK. Signal iBLCLK is input to data selector section 6 (FIG. 52B).

When signal iBLCLK is input to data selector section 6, four clock pulses appear in signal BLCLK input from data selector section 6 to terminal CK of up counter 3, and BLADR=0, 1, 2, 3 is output to memory 1 each time signal BLCLK from up counter 3 rises. At this time, since signal ISEL is at H level, clock signal $\phi 0$ is input from NAND gate 6c of data selector section 6 to terminal G of decoder 9 through NAND gates 6c and 21 while signal iBLCLK is kept at H level, and decoder 9 is activated while clock signal $\phi 0$ is kept at H level.

When BLADR (−0) is output from up counter 3 to memory 1, memory 1 outputs data ST(0)L. In this case, in synchronism with clock signal $\phi 0$, pulse signal STLL is output from decoder 9 to latch 4-3. Latch 4-3 receives data ST(0)L output from memory 1 in response to the leading edge of signal STLL, and outputs data ST(0)L to terminals a to d of down counter 10. When BLADR (=1) is output from up counter 3 to memory 1, data ST(0)H output from memory 1 is similarly latched by latch 4-4 in response to the leading edge of pulse signal STHL output from decoder 9. Then, latch 4-4 outputs data ST(0)H to terminals e to h of down counter 10.

In response to the leading edge of signal BLCLK, BLADR (=3) and BLADR (=4) are output from up counter 3 to memory 1, and data MAC(0) and MAC(1) output from memory 1 are respectively latched by latches 4-1 and 4-2 in response to pulse signals MACLL and MACHL output from decoder 9. Latches 4-1 and 4-2 respectively output data MAC(0) and MAC(1) to terminals A0 to A3 and B0 to B3 of data selector 13.

In the timing charts of FIGS. 46A and 46B, LSTD indicates a developing step count output from latches 4-3 and 4-4 to down counter 10, and LMAC indicates a macro code output from latches 4-1 and 4-2. In FIGS. 46A and 46B, ST(0) indicates 8-bit data [ST(0)L,ST(0)H]. When count value STCNT of down counter 10 becomes "0", carry signal STCY goes to H level, and down counter 10 receives LSTD {in this case, ST(0)}.

H-level carry signal STCY is supplied from down counter 10 to inverter 21, NAND gate 7, and terminal K of flip-flop 12. Thus, the output (L level) of inverter 21 is applied to terminal E of flip-flop 14 to enable flip-flop 14. Then, the Q output (SELMAC) of flip-flop 14 is inverted from H level to L level in response to the leading edge of clock signal $\overline{\phi 2}$ (i.e., the trailing edge of clock signal $\phi 2$). When signal SELMAC goes to L level, the output (MAC(0)) from latch 4-1 is selected by data selector 13, and is supplied to terminals A0 to A3 of data selector 13 together with clock signal $\phi 3$. The output (L level) from NAND gate 7 is applied to terminal E of flip-flop 17, and the Q output (DSELQ) from flip-flop 17 is inverted from H level to L level in response to the leading edge of clock signal $\overline{\phi 2}$. Thus, data selector 16 causes data output terminals RD2 and RD3 of memory 2 to be connected to terminals D3 and D4 of latch 18 (FIG. 52B). The connecting relationship between data output terminals RD0 and RD1 of memory 2 and terminals D1 and D2 of latch 18 is determined by selection of data selector 15 based on external select signal PTSEL. In the following description, signal PTSEL is assumed to be at L level. When signal PTSEL is at L level, data output terminals RD0 and RD1 of memory 2 are respectively connected to terminals D1 and D2 of latch 18 by data selector 15.

Down counter 10 then sets data ST(0) as count value STCNT in response to the leading edge of clock signal $\overline{\phi 2}$ (at this time, signal STCY is at H level), and thereafter, counts down the data in synchronism with the leading edge of clock signal $\overline{\phi 2}$. While down counter 10 counts down from ST(0) to 0 {T$\phi$2 x (ST(0)+1)}, macro data DDATA is designated by 5-bit address signal DADR consisting of macro code MAC(0) and clock signal $\phi 3$, and is read out from memory 2. The readout data is input to terminals D1 to D4 of latch 18 through data selectors 15 and 16. Since clock signal $\phi 3$ serves as MSB A4 of address signal input terminals A0 to A4 of memory 2, address signal DADR of memory 2 is changed to be DADR0 and DADR0+16 each time clock signal $\phi 3$ is changed to be "0" (L level) and "1" (H level) (note that DADRO is address signal DADR when clock signal $\phi 3$ is "0", and two macro data DDATAi (i=0, 1, 2, . . . ) designated by DADRi and DADRi+16 can be explained such that MAC(0), MAC(1), and MAC(2) in FIG. 30 are replaced with DDATA0, DDATA1, and DDATA2 and T$\phi$2 is replaced with T$\phi$3). Therefore, period TfH of high-frequency signal fH is equal to T$\phi$3.

Macro data DDATA input to terminals D1 to D4 of latch 18 is output as LCS drive signals PT1, PT2, COM1, and COM2 from output terminals Q1 to Q4 to the recording control section.

Assume that developing step count data ST(x)L and ST(x)H and macro codes MAC(x) and MAC(x+1) shown in FIG. 58 are stored at block addresses BLADR=0 to 31 of memory 1, and macro data DDATA shown in FIG. 59 is stored at addresses DADR=0 to 31 of memory 2. In this case, LCS drive signals COM1, COM2, PT1, and PT2 similar to those shown in FIG. 30 are output from ata output terminals Q1 to Q4 of latch 18 to the recording control section.

Figure 60A:
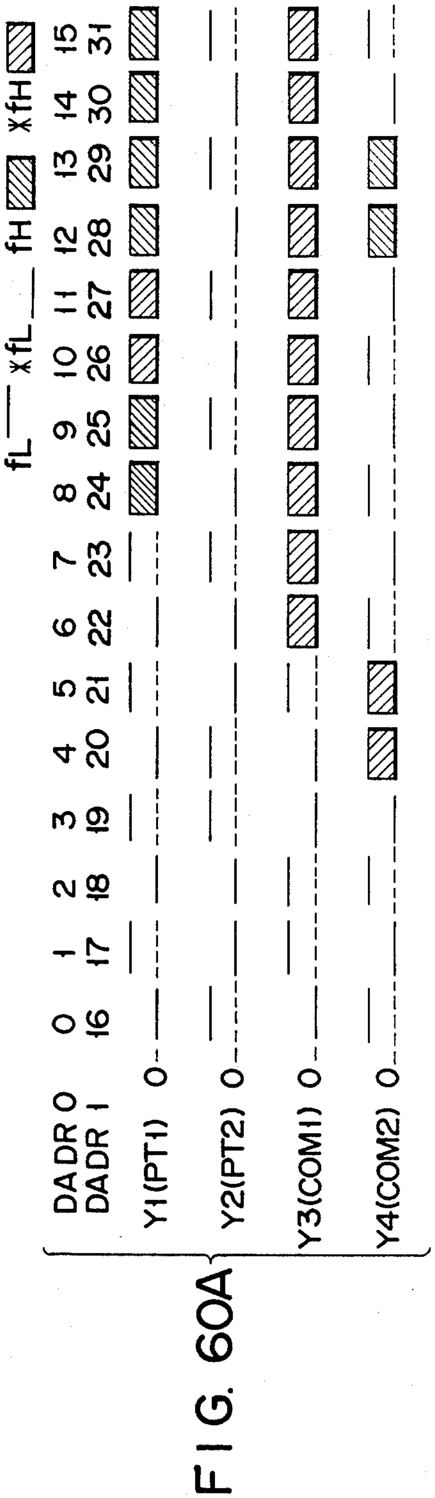
FIG. 60A shows signal waveform patterns of LCS drive signals PT1, PT2, COM1, and COM2 generated in accordance with two data DDATA.

FIG. 60A shows signal waveforms PT1, PT1, COM1, and COM2 generated based on macro data DDATA stored at addresses DADR "0" to "31" shown in FIG. 59.

Figure 60B:
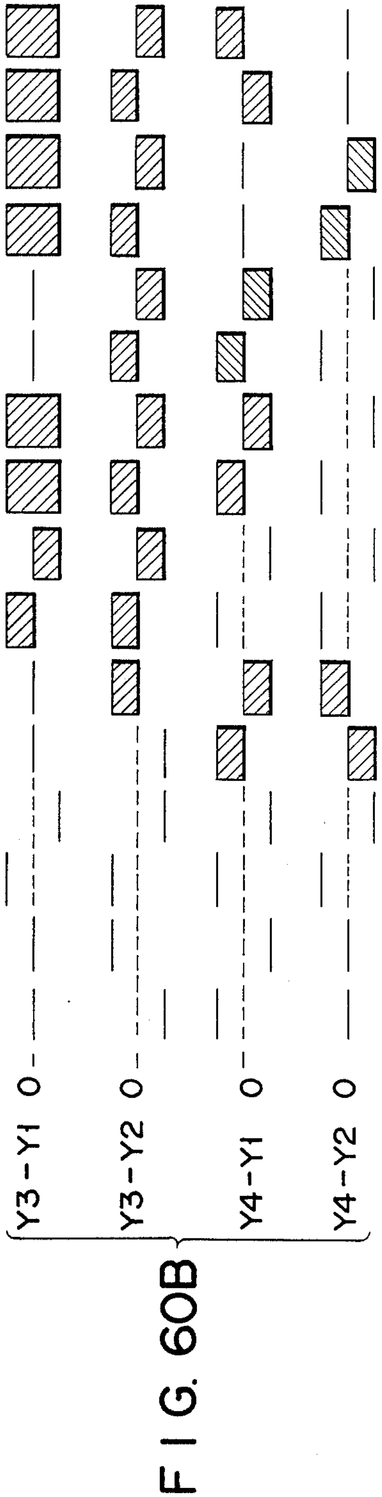
FIG. 60B shows voltage waveform patterns applied to the LCS using combinations of signal waveform patterns shown in FIG. 60A.

In FIG. 60A, DADR0 and DADR1 indicate addresses DADR of memory 2, two macro data DDATA stored at addresses designated by DADR0 and DADR1 in the identical column are developed to obtain signal waveforms PT1, PT2, COM1, and COM2, shown in FIG. 60A. The ordinate indicates a voltage value, and fH and *fH represent high-frequency signals (*fH is a signal having phase difference of 180 degrees from signal fH). The Y1 and Y2 outputs respectively correspond to OFF-OFF drive segment electrode signal PT1 and ON-ON drive segment electrode signal PT2, and the Y3 and Y4 outputs respectively correspond to common electrode signals COM1 and COM2. FIG. 60B shows voltage waveforms applied to microshutters of the LCS when signals Y1 (PT1) and Y2 (PT2) are applied to the signal electrodes (to be described later) of the LCS and Y3 (COM1) and Y4 (COM2) are applied to the common electrodes. In FIG. 60B, [0] represents a non-electric field state.

ON/OFF control of the LCS is performed by applying voltage waveforms shown in FIG. 60B to the LCS (two-frequency driving).

Figure 61:
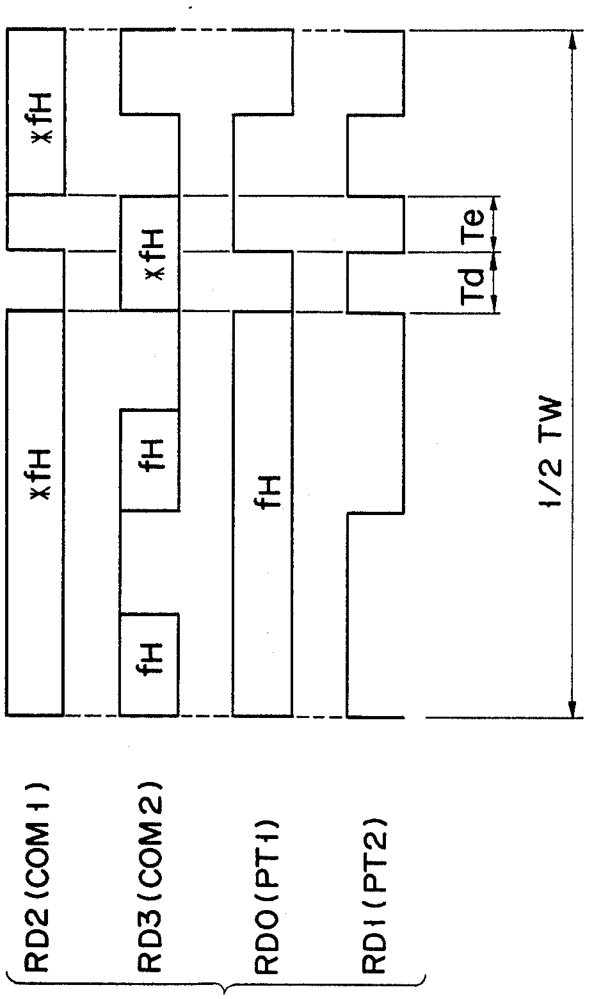
FIG. 61 shows detailed waveforms of LCS drive signals COM1, COM2, PT1, and PT2 generated by the apparatus shown in FIGS. 52A and 52B.

When drive waveforms COM1, COM2, PT1, and PT2 shown in FIG. 61 are to be generated, waveforms during intervals Td and Te in FIG. 61 cannot be generated by the drive waveforms shown in FIG. 60A. In this case, the content of macro data DDATA stored in memory 2 is changed, as shown in FIG. 62. As can be seen from comparison between FIGs. 59 and 62, in FIG. 62, the contents of macro data DDATA at addresses DADR=8, 9, 24, 25 shown in FIG. 59 are changed. FIG. 63 shows the contents of data DDATA to be stored at block addresses BLADR=0 to 31 of memory 1 in order to develop macro data DDATA stored at addresses DADR=0 to 31 of memory 2 and to obtain the drive waveforms shown in FIG. 61.

When signal BLADR (=3) is output from up counter 3 to memory 1, signal BLAD(3) goes to H level and is supplied to NAND gate 7. In the same manner as in the timing charts shown in FIGS. 46A and 46B, since signal BLAD(3) goes to H level when both signals SELMAC and STCY are at H level, an L-level signal is applied from NAND gate 7 to terminal E of flip-flop 17. Thus, the Q output (DSELQ) of flip-flop 17 is inverted from H level to L level in response to the leading edge of clock signal $\overline{\phi 2}$ (i.e., the trailing edge of signal $\phi 2$) in the same manner as in the timing charts shown in FIGS. 47A and 47B. For this reason, data selector 16 supplies the RD2 and DR3 outputs from memory 2 to terminals D3 and D4 of latch 18. The output from NAND gate 7 does not go to L level unless signal BLADR becomes "3" and signal BLAD(3) again goes to H level. therefore, the Q output (DSELQ) from flip-flop 17 is maintained at L level during the first half (Tw/2) of the period. In the first half of the period, the RD2 and RD3 outputs from memory 2 are input to terinals D3 and D4 of latch 18.

When down counter 10 further counts down the data, and its count value STCNT again reaches "1", signal ST01 therefrom is changed from L level to H level. However, in this case, since signal SELMAC is at L level, clock signal $\phi 1$ cannot pass through AND gate 11, and no clock pulses appear in signal iBLCLK. Therefore, signal BLADR output from up counter 3 is left unchanged, i.e., "3". When count value STCNT of down counter 10 becomes "0", carry signal STCY goes to H level and is supplied to inverter 21. Flip-flop 14 is thus enabled through inverter 21, and the Q output (SEMLAC) thereof is changed from L level to H level in response to the leading edge of clock signal $\overline{\phi 2}$ (i.e., the trailing edge of signal $\phi 2$). When H-level signal SELMAC is applied to terminal S of data selector 13, selector 13 selects macro code MAC(1) output from latch 4-2, and receives the selected at its terminals B0 to B3. Since step count ST(0) output from latches 4-3 and 4-4 is again set in down counter 10 in response to the leading edge of clock signal $\overline{\phi 2}$, signal waveforms are generated during an interval of T$\phi$2 x (ST(0)+1) in the second half of the 1st frame in accordance with macro data DDATA stored at addresses designated by address signals DADR consisting of macro code MAC(1) and clock signal $\phi$3, in the same manner as in the first half of the 1st frame describe above. The generated signal waveforms are output to the recording control section through latch 18 and buffer section 20.

When down counter 10 further counts down the data and its count value STCNT becomes "1" and "0", signal ST01 again goes to H level, and four successive pulses appear in signal BLCLK in the same manner as in the second half of the 16th frame, and signal BLADR=4 to 7 is output from up counter 3 to memory 1. Step count ST(2) is latched by latches 4-3 and 4-4 in response to the leading edge of signals STLL and STHL, macro code MAC(2) is latched by the latch 4-3 in response to the leading edge of signal MACLL, and macro mode MAC(3) is latched by latch 4-4 in response to the leading edge of signal MACHL. When the count value of down counter 10 has reached "0", down counter 10 generates carry signal STCY (H level), and stepcount ST(2) output from latches 4-3 and 4-4 is set in down counter 10 in response to the leading edge of clock signal $\overline{\phi 2}$ (i.e., the trailing edge of signal $\phi$2). The Q output (SELMAC) from flip-flop 14 is changed from H level to L level in response to the leading edge of clock signal $\overline{\phi 2}$, and macro data MAC(2) output from latch 4-1 and clock signal $\phi$3 are selected by data selector 13 to be input to memory 2 as addresss signal DADR. Thereafter, macro data DDATA are read out from memory 2 based on macro data MAC(2) and clock signal $\phi$3 during an interval of T$\phi$2 x (ST(2)+1) in the first half of the second frame, and based on macro data MAC(3) and clock signal $\phi$3 during an interval of T$\phi$2 x (ST(2)+1) in the second half of the second frame, thus generating signal waveforms PT1, PT2, COM1, and COM2.

In this manner, each time one-frrame operation is completed, 4-pulse signal BLCLK is generated from data selector section 6, and addresses (BLADR) for four successive blocks are output from up counter 3 to memory 1 in synchronism with signal BLACLK. Step count data ST(x)L and ST(x)H read out from memory 1 are latched by latches 4-3 and 4-4, and macro data MAC(x) and MAC(x+1) are latched by latches 4-1 and 4-2 in response to the leading edges of latch signals STLL, STHL, MACLL, and MACHL, respectively. Since x is an even number within the range of 0 to (n/2−2), i.e., n=32 in this embodiment, x is an even number within the range of 0 to 14. Address signal input terminals A0 to A4 of flip-flop 14 receive macro data MAC(x) and clock signal $\phi$3 in the first half of the frame and macro data MAC(x+1) and clock signal $\phi$3 in the second half of the frame under the control of signal SELMAC output from flip-flop 14. Then, macro data MAC(x) and macro data DDATA which are stored at addresses designated by clock signal $\phi$3 in the first half of the frame and macro data MAC(x+1) and macro data DDATA which are stored at addresses designated by clock $\phi$3 in the second half thereof are read out from memory 2, thus generating LCS drive signals PT1, PT2, COM1, and COM2 (FIG. 30).

The cycle of the frame is defined by step count ST(x), and corresponds to T$\phi$2 x(ST(x)+1) in both the first and second halves of the frame. FIG. 30 also shows waveforms of LCS drive signal COM1, COM2, PT1, and PT2 in the first half (Tw/2) of period Tw generated when data DSTATUS shown in FIG. 58 is stored in memory 1 and macro data DDATA shown in FIG. 59 is stored in memory 2. In FIG. 30, fL and fL1 represent low-frequency signals, and fH and *fH represent high-frequency signals. Signal *fH has a phase difference of 180 degrees from signal fH. Address signal DADR of memory 2 is changed depending on clock signal $\phi$3. Therefore, frequency TfH of signal fH is equal to period T$\phi$3 of clock signal $\phi$3. Since the period of clock signal $\phi$3 is twice that of signal $\phi$2, as shown in FIG. 46A, TfH=2T®2, as shown in FIG. 30.

When the first half (Tw/2) of period Tw is completed, 4-pulse signal BLCLK is generated from data selector section 6, and BLADR=0, 1, 2, 3 is output from up counter 3 to memory 1. When signal BLADR indicates "3", signal BLAD(3) from up counter 3 goes to H level, and is supplied to terminal E of flip-flop 17 through NAND gate 7. Therefore, the logic level of the Q output (DSELQ) from flip-flop 17 is changed (i.e., from L level to H level), and the RD2 and RD3 outputs from memory 2 are switched by data selector 16 and input to terminals D4 and D3 of latch 18, respectively. In the second half (Tw/2) of period Tw, macro data DDATA stored in memory 2 is developed based on step counts ST(0) to ST(7) in the same manner as in the first half (Tw/2). However, since the RD2 and RD3 outputs from memory 2 are switched by data selector 16, the waveforms of signals COM1 and COM2 replace with each other in the first and second halves (Tw/2) of period Tw, as shown in FIG. 30.

LCS drive signals PT1, PT2, COM1, and COM2 generated by macro data DDATA stored in memory 2 are output to the recording control section through latch 18 and buffer section 20 in synchronism with the leading edge of clock signal $\phi$1.

As shown in the timing charts of FIGS. 47A and 47B, in the second half of the last frame (16th frame) in the second half (Tw/2) of period Tw, block address BLADR output from up counter 3 indicates the end address ("31"), and count value STCNT output from down counter 10 becomes "4". Then, signals BLAD(31) and ST4 go to H level, and the output (TSXQ) from AND gate 8 goes to H level and is input to terminal J of flip-flop 12. Since signal STCY is at L level, the Q output ($\overline{\text{iTWSX}}$) from flip-flop 12 is inverted to H level and its $\overline{\text{Q}}$ output is inverted to L level in response to the leading edge of clock signal $\overline{\phi 2}$. For this reason, the output ($\overline{\text{TWSXQ}}$) from NAND gate 19 is changed from L level to H level. Signal TSXQ goes to L level when count valve STCNT becomes "3", and the Q output ($\overline{\text{iTWSX}}$) from flip-flop 12 is latched by latch 18 in response to the leading edge of clock signal $\phi$1. Then, the Q output is output as signal $\overline{\text{CK2}}$ to the recording control section through buffer section 20.

In this case, signal $\overline{\text{TWSXQ}}$ is latched by latch 18 in respone to the leading edge of signal $\phi$1, and is output as signal $\overline{\text{HTWSK}}$ to an external apparatus (not shown) through buffer section 20. Inverted signal LTWSX of signal $\overline{\text{HTWSX}}$ is output to buffer 40r of video interface section 40 (FIG. 29D).

When count value STCNT becomes "0", H-level carry signal STCY is output from down counter 10 to terminal K of flip-flop 12. Since signal TSXQ applied to terminal J is at L level, the Q output from flip-flop 12 is inverted to H level in respone to the leading edge of clock signal $\phi 2$. For this reason, output $\overline{TWSXQ}$ from NAND gate 19 again goes to L level.

Carry signal STCY is also applied to NAND gate 7, and an L-level signal is then supplied from NAND gate 7 to terminal E of flip-flop 17. Therefore, the Q output (DSELQ) of flip-flop 17 is inverted from H level to L level in response to the leading edge of clock signal $\phi 2$. Signal DSELQ is latched by latch 18 in response to the leading edge of clock signal $\phi 1$, and is output as signal DSEL to th recording control section through buffer section 20.

The video interface section and the recording control section have the same circuit arrangements as those shown in FIGS. 29D and 27A, and a detailed description thereof will be omitted. A recording apparatus to which the waveform generating apparatus according to this embodiment is applied is the same as that in the embodiment shown in FIGS. 22 to 26, and a detailed description thereof will be omitted.

According to the embodiment of the present invention as described above, since a decoder for generating waveforms comprises a programmable memory, the following advantages can be expected.

a. Almost infinite combinations of waveforms can be obtained.

b. Since data in the memory can be rewritten by external control, when the generator of this embodiment is applied to generate LCS drive waveforms, modifications of drive waveforms due to improvement or modification of a liquid crystal material can be readily performed, and hence, easy maintenance is assured.

c. When the generator of this embodiment is applied to generate LCS drive waveforms for a recording apparatus which forms optical write access using a normally-ON type LCS, a waveform for turning off microshutters in a warm-up mode can be applied to the microshutters. Thus, a photosensitive body need not be rotated when an LCS panel is auxiliarily heated by a light source in the warm-up mode, resulting in easy control. In addition, degradation in photosensitive body can be prevented.

An embodiment of a drive waveform generating apparatus for an LCS will be described hereinafter. This apparatus can desirably generate predetermined drive waveforms by rewriting data in a memory of the apparatus, and can check an error of generated drive waveforms.

Figure 64A:
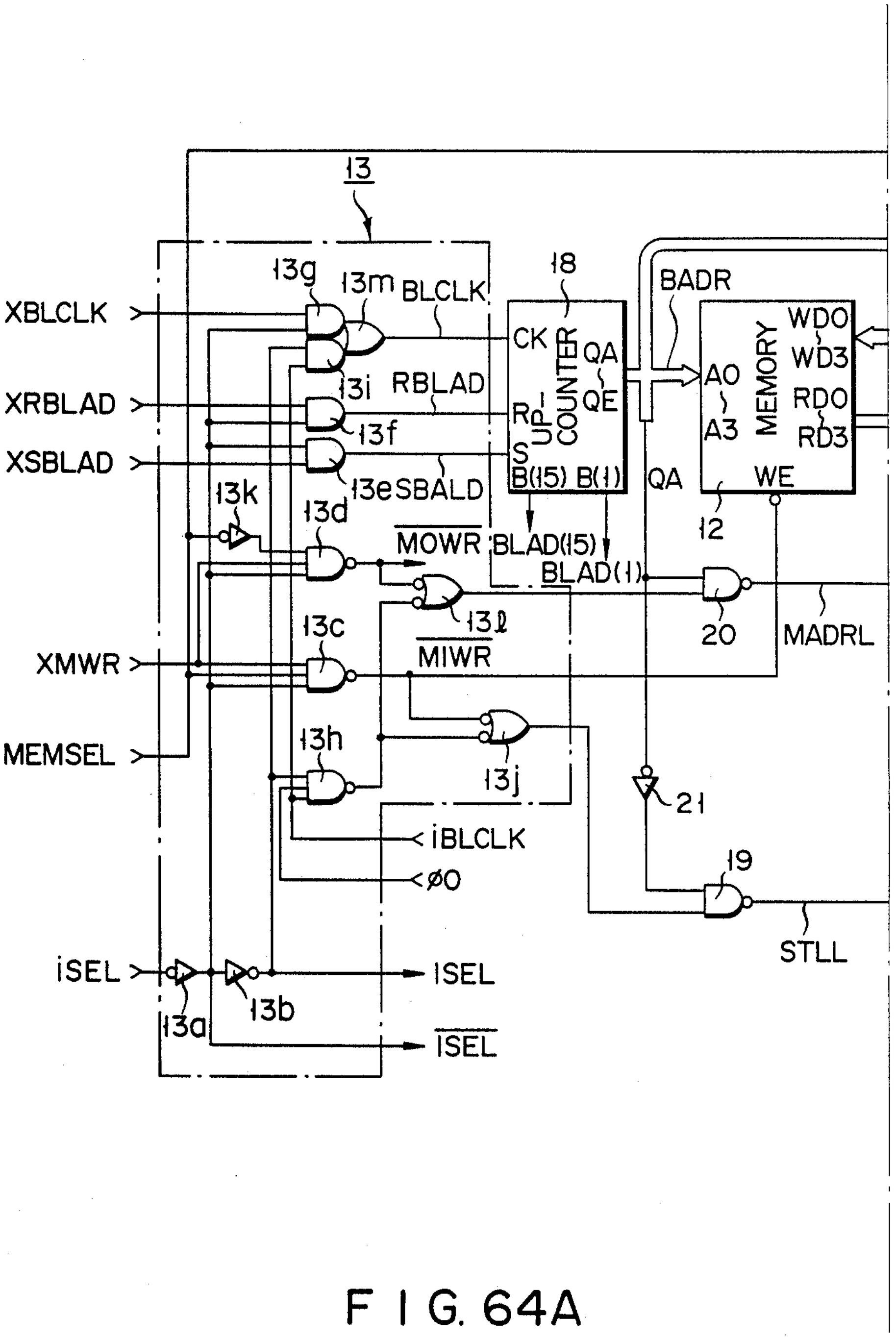
FIGS. 64A, 64B, and 64C are block diagrams showing an arrangement of a liquid crystal waveform generating apparatus which can generate desired drive waveforms by rewriting data and can check an error of the generated drive waveforms, according to still another embodiment of the present invention.
Figure 64B:
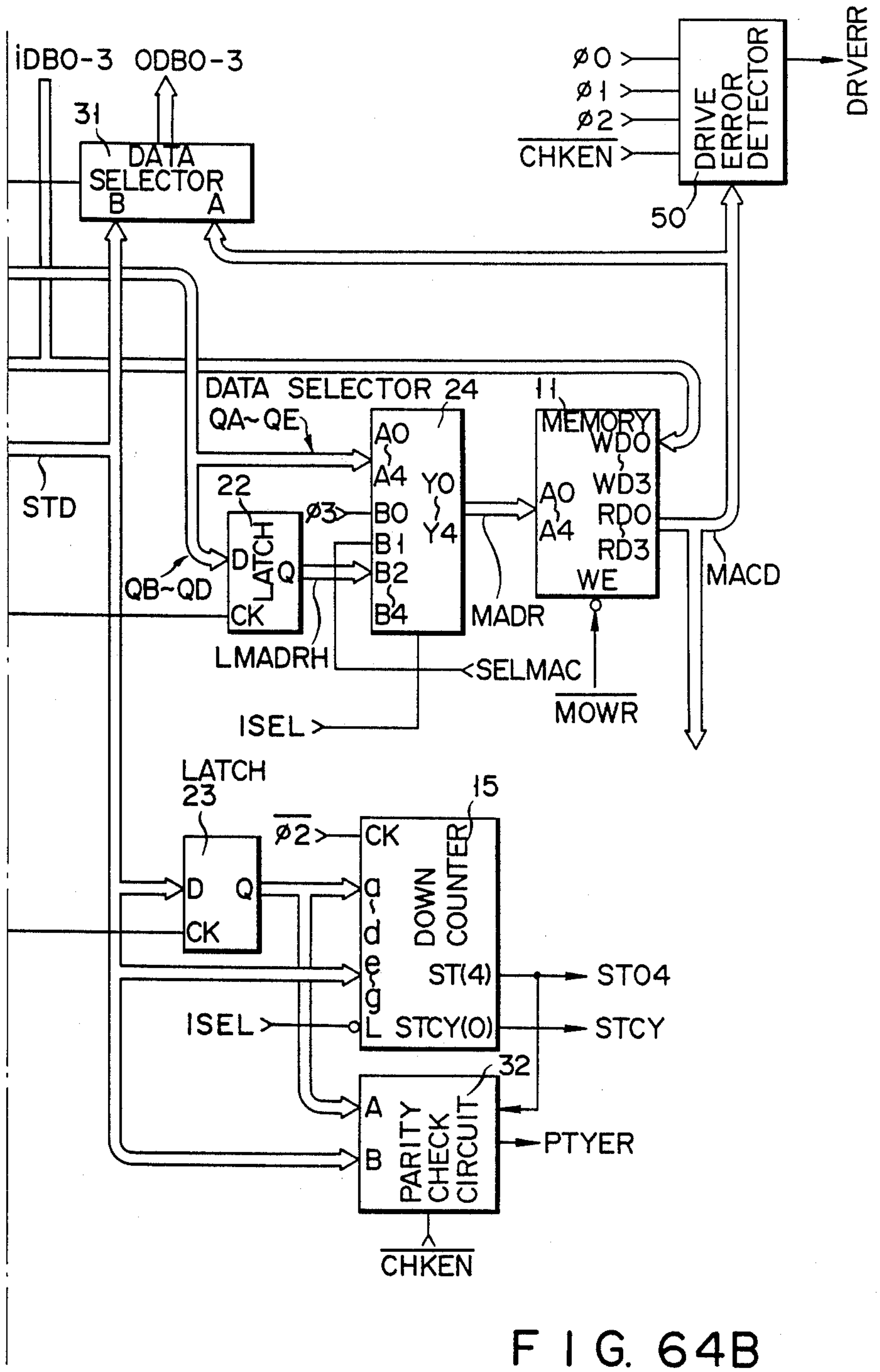
Figure 64C:
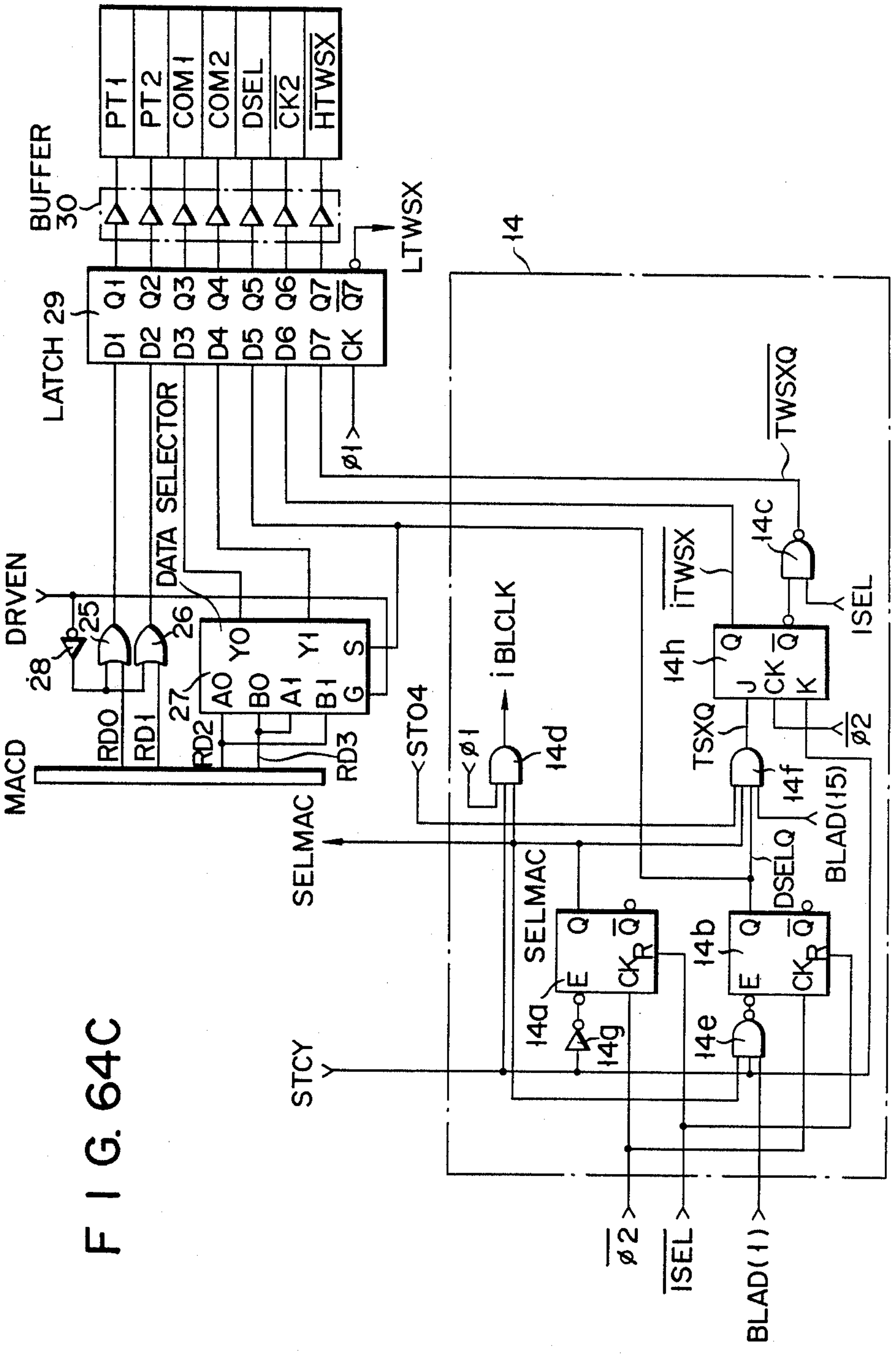

FIGS. 64A, 64B, and 64C are block diagrams of an LCS drive signal generator according to an embodiment of the present invention.

The LCS drive signal generator is a circuit for generating LCS drive signals for two-frequency driving an LCS. Eight types of LCS drive signals, i.e., PT1, PT2, COM1, COM2, DSEL, $\overline{CK2}$, $\overline{HTWSX}$, and LTSWX can be generated by the LCS drive signal generator. These signals are constant period signals having one dot line write time corresponding to period Tw.

Of the LCS drive signals, signals PT1 and PT2 are inverted signals of signals applied to signal electrodes of the LCS, and signals COM1 and COM2 are inverted signals of signals applied to common electrodes of the LCS. In order to perform two-frequency driving, one period of each LCS drive signal corresponds to Tw/2 of period Tw. Signals PT1, PT2, COM1, and COM2 are binary digital signals, and are generated based on macro data MAC(x) read out from memory 11 in synchronism with a change in level of clock signal $\phi 3$. Macro data MAC(x) has a 4-bit length, and 1st to 4th bits thereof respectively correspond to LCS drive signals PT1, PT2, COM1, and COM2. As will be described later, the 3rd and 4th bits of data MAC(x) correspond to both signals COM1 and COM2. The number of developing steps of each macro data MAC(x) stored in memory 11 is stored in memory 12 as step count data ST(y). As will be described later in detail, one step count data ST(y) is assigned to continuous four blocks of macro data MAC(x), MAC(x+1), MAC(x+2), and MAC(x+3), and four blocks of macro data MAC(x), MAC(x+1), MAC(x+2), and MAC(x+3) are developed during one frame for a duration of step count (ST(y)+1). One frame is equally divided into first and second halves each having the number of developing steps of (ST(y)+1). In the first half, MAC(x) and MAC(x+1) are developed, and in the second half, MAC(x+2) and MAC(x+3) are developed. Upon development of macro data, macro data (MAC(x) and MAC(x+1) (or macro data MAC(x+2) and MAC(x+3)) are alternately developed for every period of clock signal $\phi 2$. All the macro data MAC(x) are developed by the predetermined number of frames. An interval during which all the macro data are developed is given as a $\frac{1}{2}$ period (Tw/2). In the $\frac{1}{2}$ period of the second half, the 3rd and 4th bits of macro data MAC(x) are respectively assigned to signals COM2 and COM1, and macro data MAC(x) is developed in the same manner as in the $\frac{1}{2}$ period of the first half.

Microshutters of the LCS are formed at intersections of signal and common electrodes. LCS drive signals PT1 and PT2 are applied to the signal electrodes and LCS drive signals COM1 and COM2 are applied to the common electrodes, so that a high- or low-frequency voltage is applied to the microshutters, thereby turning on/off the microshutters. In this embodiment, two-frequency driving is performed. In the case of the two-frequency driving, ON/OFF control of microshutters in one line is performed in the first half (TW/2) of period Tw, and that of microshutters in the other line is performed in the second half (Tw/2) of period Tw. One dot line can be recorded in one period Tw.

As is known, when a DC electric field is applied to the LCS for a long period of time, a liquid crystal material causes electrolysis, and is broken. For this reason, LCS drive signals PT1, PT2, COM1, and COM2 must be applied to the signal and common electrodes so that DC components of an electric field applied to the LCS during period Tw become "0". In the case of n-time divisional driving, LCS drive signals PT1, PT2, COM1, and COM2 are preferably applied to signal and common electrodes so that DC components of an electric field applied to the LCS during a duration of Tw/n become "0". These DC components are equivalent to the integrated intensity of the electric field applied during duration of Tw/n.

In this invention, both memories 11 and 12 comprise programmable memories (RAM, EEROM, or the like), and almost infinite combinations of drive waveforms can be generated. However, an integrated value of a voltage applied to the LCS during one period Tw may be become "0" because of write access error of macro data or step count data or changes in data content of memories 11 and 12 due for any cause. Taking such an accidental condition into consideration, there is provided a circuit for checking if an integrated value of a voltage applied to the LCS during period Tw becomes "0", i.e., a DC component of an electric field becomes "0" based on waveforms of LCS drive signals PT1, PT2, COM1, and COM2 to be generated. Step count data is added with a parity bit to perform parity check, thus improving reliability of LCS drive signals PT1, PT2, COM1, and COM2. Note that memories 11 and 12 may comprise a Read Only Memory (ROM). In this case, drive waveforms for the LCS cand be generated using a small-capacity ROM.

A circuit configuration of the LCS drive signal generator according to the present invention will be described with reference to FIGS. 64A to 64C.

In FIGS. 64A to 64C, memory 11 comprises a static RAM having a 4 (bit)×m (word) format, and macro data MAC(0) to MAC(m−1) are stored at addresses (MADR)=0 to m−1, as shown in FIG. 79.

Macro data MAC(0) to MAC(m−1) are used for generating waveforms of LCS drive signals PT1, PT2, COM1, and COM2.

Memory 12 comprises a static RAM having a 4 (bit)×n (word) format, and step count data ST(0)L, ST(0)H, . . . , ST{(n/2)−1}L, ST{(n/2)−1}H are stored at addresses (BADR)=0 to n−1, as shown in FIG. 78. Step count data ST(y)L and ST(y)H respectively correspond to lower and upper 4 bits of developing step count data ST(y). A pair of ST(y)L and ST(y)H constitute developing step count ST(y) where y is an integer within the range of 0 to n/2−1). Strictly, however, lower 7 bits of 8-bit data ST(y) represent an actual developing step count, and the MSB of data ST(y), i.e., the MSB of data ST(y)H is used for parity check (to be described later).

Figure 77:
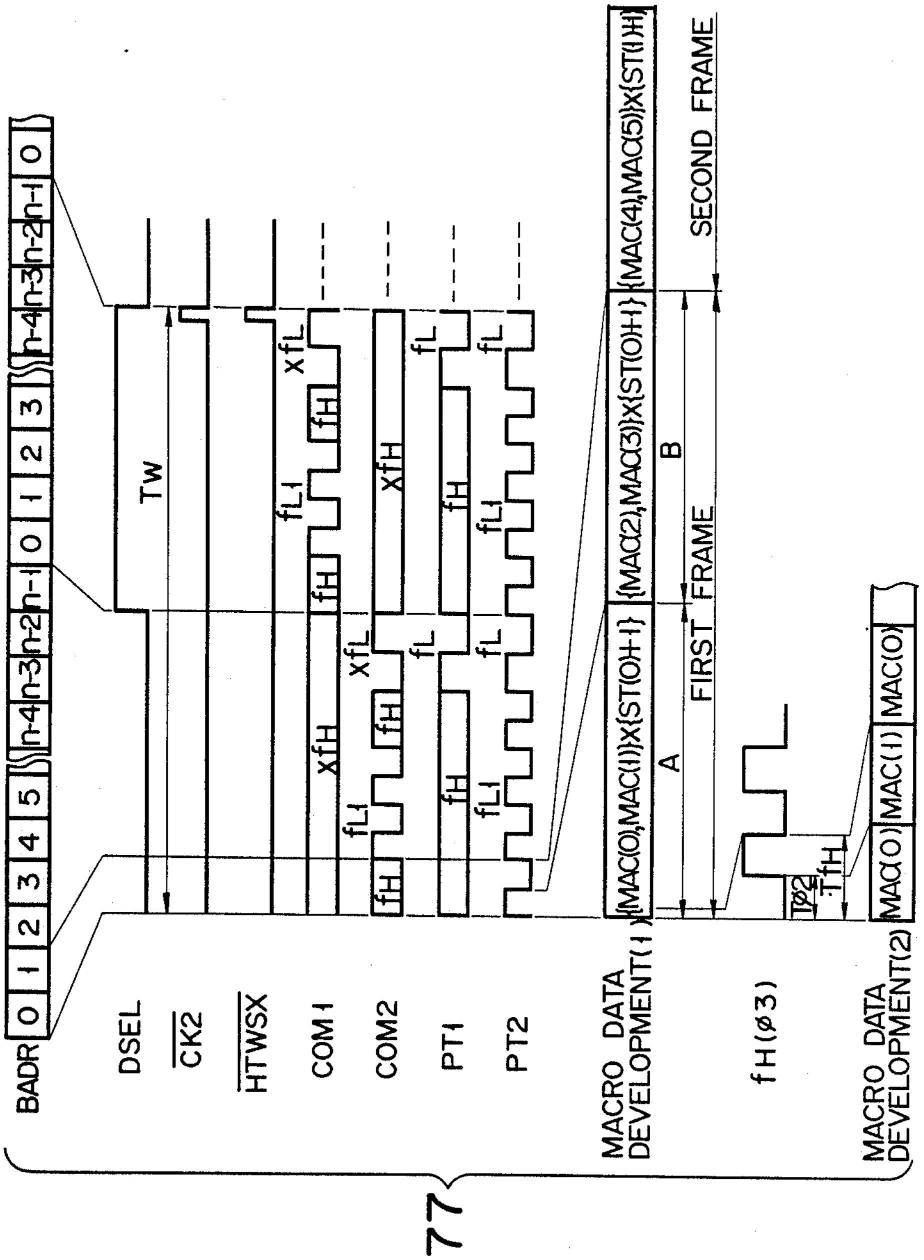

FIG. 77 shows waveforms of LCS drive signals COM1, COM2, PT1, and PT2 which are generated based on macro data MAC(0) to MAC(m−1) and developing step count data ST(0) shown in FIGS. 78 and 79. In this embodiment, drive waveforms COM1, COM2, PT1, and PT2 for one frame are generated based on four blocks of macro data [MAC(x),MAC(x+1),MAC(x+2),MAC(x+3)] (x is a multiple of 4 like 0, 4, 8, . . . , m−4) stored in memory 11 and developing step count data ST(y) stored in memory 12 and consisting of two blocks. More specifically, a waveform predetermined by data MAC(x) and MAC(x+1) is generated during a predetermined period (indicated by A in FIG. 77) defined by developing step count data ST(y), and a predetermined waveform determined by data MAC(x+2) and MAC(x+3) is generated during a predetermined period (indicated by B in FIG. 77 and equal to period A) defined by developing step count data ST(y). As a result, a waveform for one frame is generated. Therefore, m and n have the relationship m/4=n/2, that is:

$$m=2n \tag{3.1}$$

A period for one frame is determined by one step count data ST(y), and a ½ period (Tw/2) consisting of m/2 frames is determined by n/2 step count data ST(y) stored in memory 12.

In this embodiment, n=16 and m=32. Therefore, memory 11 has a 32 (word)×4 (bit) format, and memory 12 has a 16 (word)×4 (bit) format.

In both memories 11 and 12, one word consists of 4 bits because a low-cost 4-bit one-chip microprocessor is connected to input data bus iDBO-3 and output data bus ODBO-3 (to be discussed later).

Referring further to FIG. 77, LCS drive signals COM1 and COM2 are waveforms in period Tw, and LCS drive signals PT1 and PT2 are waveforms in period Tw/2. LCS drive signals COM1 and COM2 have symmetrical waveforms in the first and second halves (Tw/2) of period Tw. In this embodiment, signals COM1 and COM2 are switched and output in the second half (Tw/2) of period Tw.

Referring again to FIGS. 64A to 64C, data selector section 13 is a circuit block for selecting one of a mode (loading mode) for writing data in memories 11 and 12 under the external control upon starting of the generator and a mode (execution mode) for generating and supplying drive waveforms to a recording control section (to be described later) during the operation of a liquid crystal printer. Section 13 receives select signal iSEL, memory select signal MEMSEL, external write signal XMWR, external set signal XSBLAD, external reset signal XRBLAD, pulse signal XBLCLK, and clock signal $\phi 0$ from an external circuit. External select signal iSEL is input to inverter 13*a* to be converted to signal $\overline{\text{ISEL}}$. Signal $\overline{\text{ISEL}}$ is supplied to terminals R of flip-flops 14*a* and 14*b* in timing control section 14 and inverter 13*b*, NAND gates 13*c* and 13*d*, and AND gates 13*e*, 13*f*, and 13*g* in data selector section 13. Inverter 13*b* inverts signal ISEL, and supplies signal ISEL to load terminal L of down counter 15, and to NAND gate 13*h* and AND gate 13*i* in section 13.

NAND gate 13*c* allows external write signal XMWR to pass therethrough when signal $\overline{\text{ISEL}}$ is at H level and external memory select signal MEMSEL is at H level, and supplies it as signal $\overline{\text{M1WR}}$ to terminal WE of memory 12 and NAND gate 13*j* in section 13. NAND gate 13*d* allows signal XMWR to pass therethrough when signal $\overline{\text{ISEL}}$ is at H level and signal MEMSEL received through inverter 13*k* is at L level, and supplies it as signal $\overline{\text{M0WR}}$ to terminal WE of memory 11 and NAND gate 13*l*. In this manner, when signal $\overline{\text{ISEL}}$ goes to H level, external control is enabled. Thus, when signal MEMSEL is at H level, write access of memory 12 is enabled, and when signal MEMSEL is at L level, write access of memory 11 is enabled.

NAND gate 13*h* generates a negative pulse signal based on external clock signal $\phi 0$ when signal ISEL output from inverter 13*b* is at H level and signal iBLCLK output from AND gate 14*d* in control section 14 is at H level, and supplies the pulse signal to NAND gates 13*j* and 13*l*.

NAND gate 13*j* allows the pulse signal input from NAND gate 13*h* to pass therethrough when signal $\overline{\text{M1WR}}$ is at H level and signal $\overline{\text{ISEL}}$ is at L level (internal control state), and supplies it to NAND gate 19. NAND gate 13*l* allows the pulse signal input from NAND gate 13*h* to pass therethrough when signal $\overline{\text{M0WR}}$ is at H level, i.e., signal $\overline{\text{ISEL}}$ is at L level (internal control state), and supplies it to NAND gate 20.

AND gates 13*e* and 13*f* respectively supply external set signal XSBLAD and external reset signal XRBLAD to terminals S and R of up counter 18 when signal $\overline{\text{ISEL}}$ is at H level (external control state).

OR gate 13*m* receives external pulse signal XBLCLK through AND gate 13*g* when $\overline{\text{ISEL}}$ is at H level (external control state) and receives internal pulse signal iBLCLK through AND gate 13*i* when signal ISEL is at H level (internal control state), and supplies the received signal to terminal CK of up counter 18.

Figure 73:
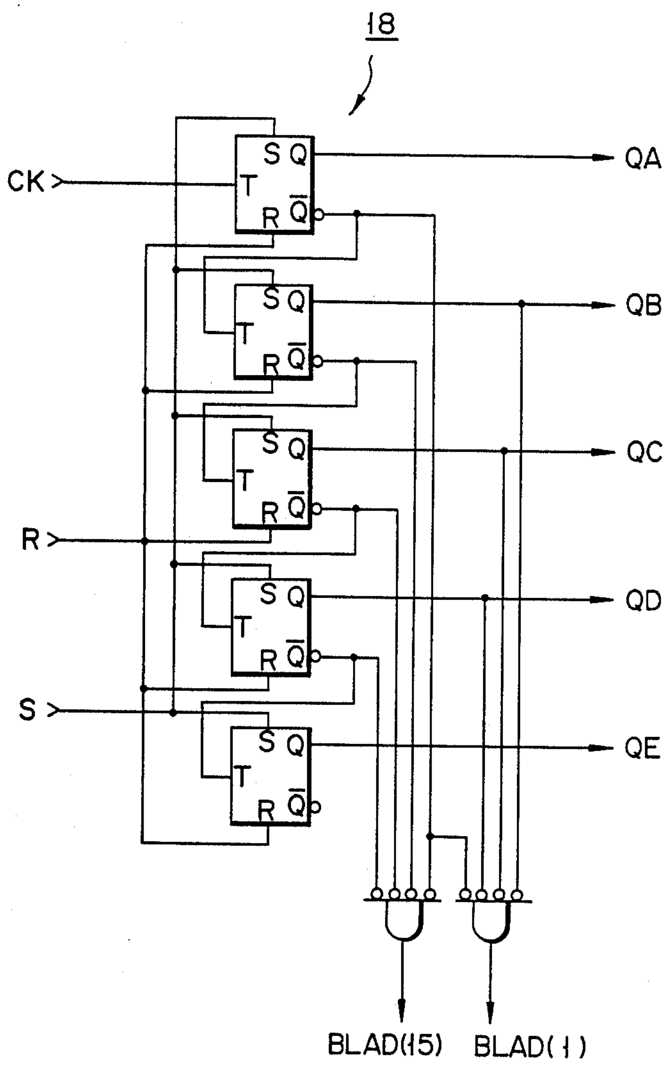
FIG. 73 is a circuit diagram of up counter 18 shown in FIG. 64A.

FIG. 73 shows the internal arrangement of up counter 18. As shown in FIG. 73, up counter 18 is a presettable up counter for counting from 0 to 31. Up counter 18 receives pulse signal BLCLK, reset signal RBLAD, and set signal SBLAD at terminals CK, R, and S, respectively. Up counter 18 performs counting in response to the leading edge of pulse signal BLCLK, and is reset to an initial value (0) in response to reset signal RBLAD (H level). Counter 18 has count value "31" in response to set signal SBLAD (H level).

Up counter 18 supplies its QA to QD outputs to memory 12 as block address signal BADR. When block address signals BADR indicate "1" and "15", counter 18 sets terminals BLAD(1) and BLAD(15) at H level to supply signals BLAD(1) and BLAD(15) to NAND gate **14*e* and AND gate 14*f* in timing control section 14 (FIG. 64C). Up counter 18 supplies its QB to QD outputs to latch 22 and QA to QE outputs to terminals A0 to A4 of data selector 24. An LSB signal (QA) of count value BADR of up counter 18 is output to NAND gate 20 and inverter 21**.

NAND gate 20 allows the pulse signal input from NAND gate **13*l* in data selector section 13 to pass therethrough when the QA output is "1" (H level) so as to generate pulse signal MADRL. Gate 20 supplies signal MADRL to terminal CK of latch 22. An inverted signal of the QA output from inverter 21 is supplied to NAND gate 19. NAND gate 19 allows the pulse signal input from NAND gate 13*j* to pass therethrough when QA is "0" (L level) so as to generate pulse signal STLL. Gate 19 supplies signal STLL to terminal CK of latch 23**.

Address signal input terminals A0 to A3 of memory 12 respectively receive the QA to QD outputs (BADR) from up counter 18. Note that QA corresponds to the LSB, and QD corresponds to the MSB. Data input terminals WD0 to WD3 are connected to input data bus iDBO-3, and write access to memory 12 is performed through input data bus iDBO-3. Data STD read out from memory 12 is supplied from data output terminals RD0 to RD3 to latch 23, a B input of data selector 31, and a B input of parity check circuit 32. Lower 3 bits of 4-bit data STD are input to terminals e to g of down counter 15. Parity check circuit 32 will be described later in detail. Latch 23 latches data STD output from memory 12 in response to latch signal STLL supplied from NAND gate 19, and supplies the latched data to terminals a to d of down counter 15 and the A input of parity check circuit 32. As described above, latch signal STLL is generated when the QA output is "0" . Therefore, terminals a to d of down counter 15 receive lower 4 bits of developing step count data ST(y), i.e., data ST(y)L.

Figure 74:
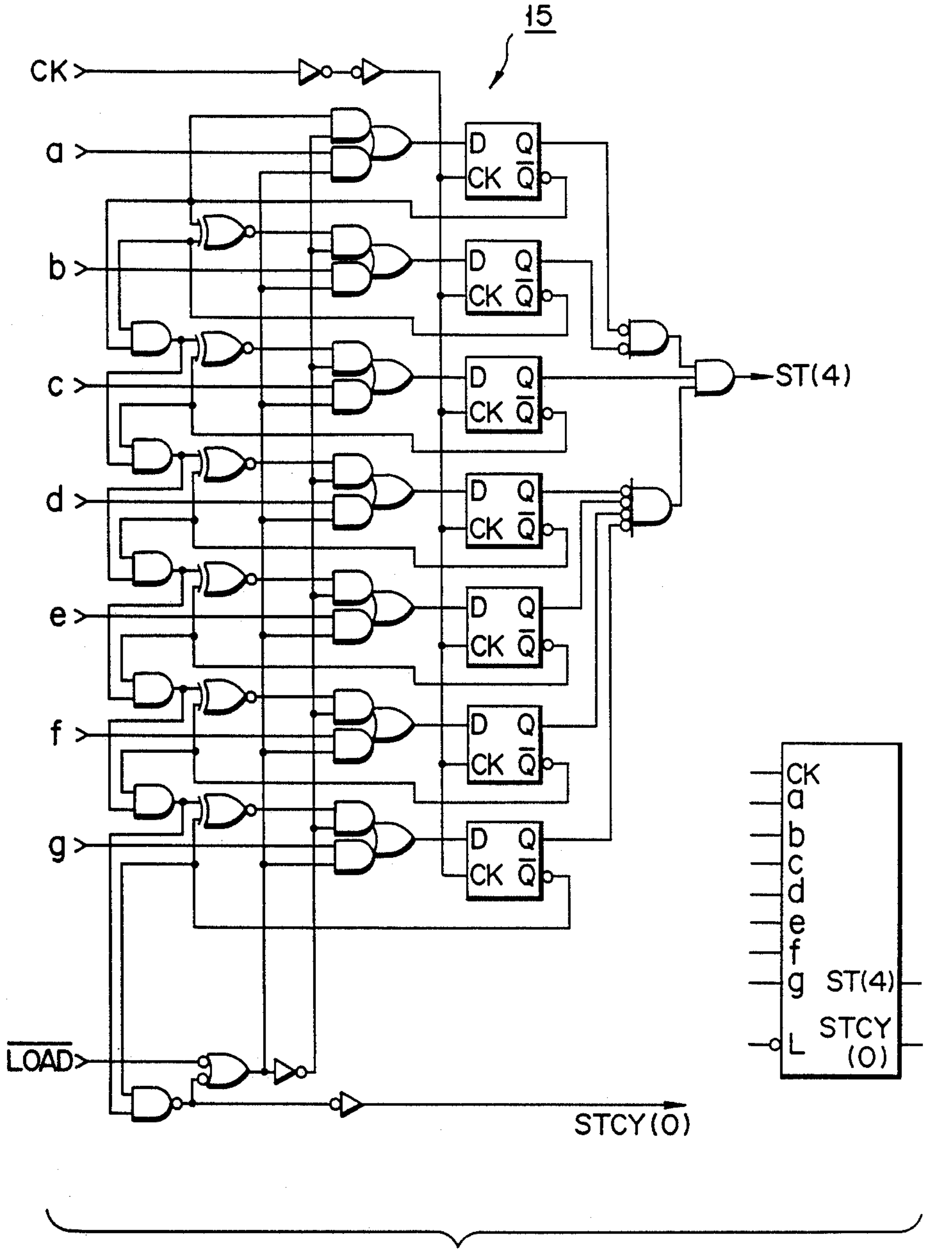
FIG. 74 is a circuit diagram of down counter 15 shown in FIG. 64B.

The output from latch 23 and the RD0 to RD2 outputs from memory 12 are set in down counter 15 when select signal ISEL output from data selector section 13 goes to L level or the count value of down counter 15 becomes "0". FIG. 74 shows the circuit arrangement of down counter 15. As shown in FIG. 74, down counter 15 is a 7-bit input (terminals a to g) down counter, and can perform a maximum of $2^7$32 128 times of counting operations in synchronism with the leading edge of clock signal $\overline{\phi 2}$. When the count value has reached "4", counter 15 sets output STO4 from terminal ST(4) at H level, and supplies the H-level signal to AND gate **14*f* in control section 14 and parity check circuit 32. When the count value has reached "0", counter 15 sets carry signal STCY at H level and supplies it to AND gate 14*d*, inverter 14*g*, NAND gate 14*e*, and terminal K of flip-flop 14*h***.

Figures 71, 72A, 72B:
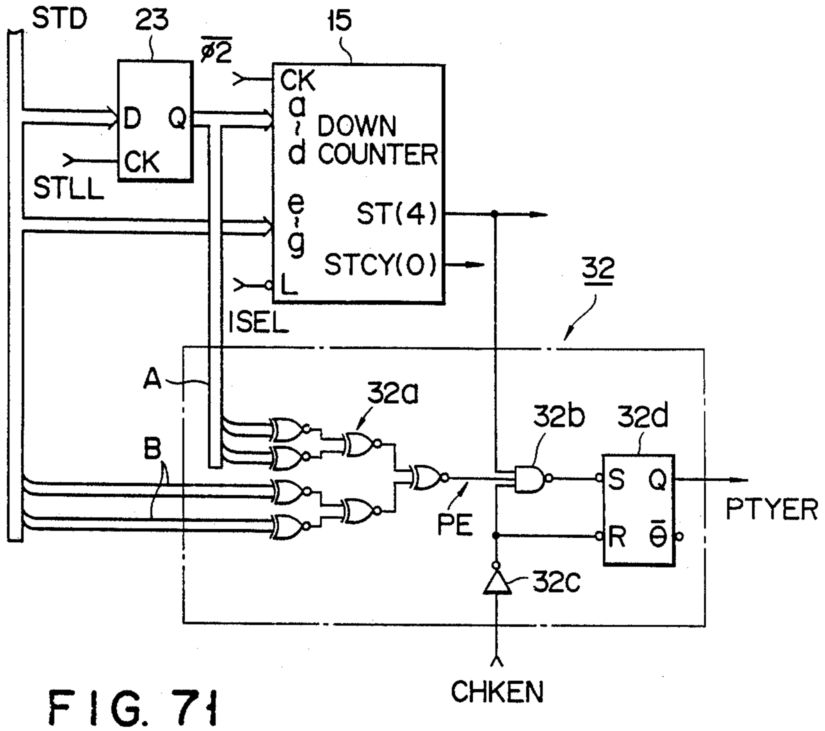
FIG. 71 is a circuit diagram of a parity check circuit in the embodiment shown in FIG. 64B.
FIG. 72A shows a format of step count STD when the parity check circuit shown in FIG. 71 is used.
FIG. 72B shows a detailed format of step count STD.

FIG. 71 shows an arrangement of parity check circuit 32 as the principal part of the circuit arrangement of this embodiment. As shown in FIG. 71, parity check circuit 32 comprises EVEN parity generator **32*a* consisting of seven EX-NOR gates, and NAND gate 32*b* having three input terminals, inverter 32*c*, and flip-flop 32*d***.

EVEN parity generator **32*a* receives upper 4 bits (ST(y)H) of step count data ST(y) output from latch 23, and lower 4 bits (ST(y)L) of data ST(y) output from terminals RD0 to RD3 of memory 12. When a parity of 8-bit data ST(y) is EVEN (even number), i.e., when an ODD (odd number) parity error occurs, EVEN parity generator 32 sets parity error signal PE at H level, and supplies it to NAND gate 32*b*. NAND gate 32*b* receives signal STO4 output from down counter 15 every half a period (Tw/2) and external signal $\overline{\text{CHKEN}}$ through inverter 32*c*. When signal $\overline{\text{CHKEN}}$ is externally set active (L level), parity error signal PE output from EVEN parity generator 32*a* passes through NAND gate 32*b* when signal STO4 goes to H level, and is supplied to set terminal S of flip-flop 32*d*. Reset terminal R of flip-flop 32*d* receives an inverted signal of signal $\overline{\text{CHKEN}}$ through inverter 32*c*. When signal $\overline{\text{CHKEN}}$ is active (L level), reset terminal R of flip-flop 32*d* goes to H level. When parity error signal PE goes to H level (parity error occurs), an H-level signal is applied to set terminal S of flip-flop 32*d*. Therefore, parity error signal PTYER is output from terminal Q of flip-flop 32*d***. Parity error signal PTYER is reset by externally setting signal $\overline{\text{CHKEN}}$ at H level (inactive).

Figure 75:
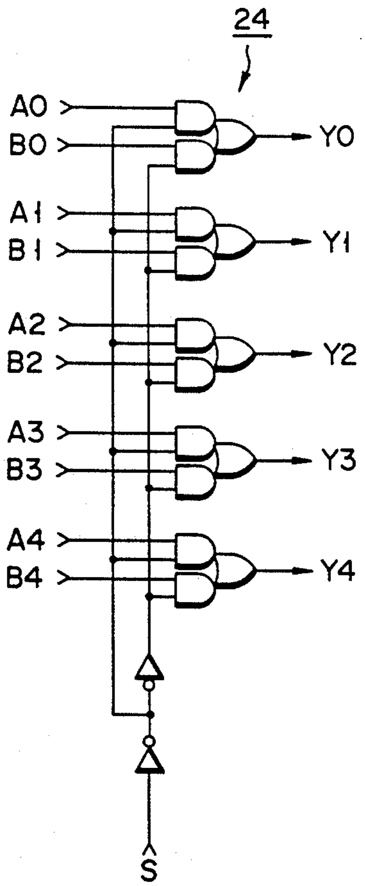
FIG. 75 is a circuit diagram of data selector 24 shown in FIG. 64B.

Referring again to FIGS. 64A, 64B, and 64C, latch 22 latches the QB to QD outputs from NAND gate 20 in response to latch signal MADRL output from NAND gate 20, and supplies them to terminals B2 to B4 of data selector 24. Data selector 24 has the circuit arrangement as shown in FIG. 75. In addition to the above-mentioned inputs, data selector 24 receives clock signal $\phi 3$ at terminal B0 and select signal SELMAC output from timing control section 14. Data selector 24 outputs B0 to B4 inputs from terminals Y0 to Y4 to address signal input terminals A0 to A4 of memory 11 as address signal MADR when signal ISEL is at H level (internal control state), and outputs the A0 to A4 inputs when signal ISEL is at L level (external control state). Signal SELMAC as the B1 input goes to L level in the first half of the frame and to H level in the second half of the frame, as will be described later. Therefore, address signal MADR output from data selector 24 is changed like {"0", "1"}, {"4", "5"}, {"8", "9"}, . . . , {"28", "29"} in the first half of the frame, and is changed like {"2", "3"}, {"6", "7"}, . . . , {"30", "31"} in the second half of the frame.

Figure 76:
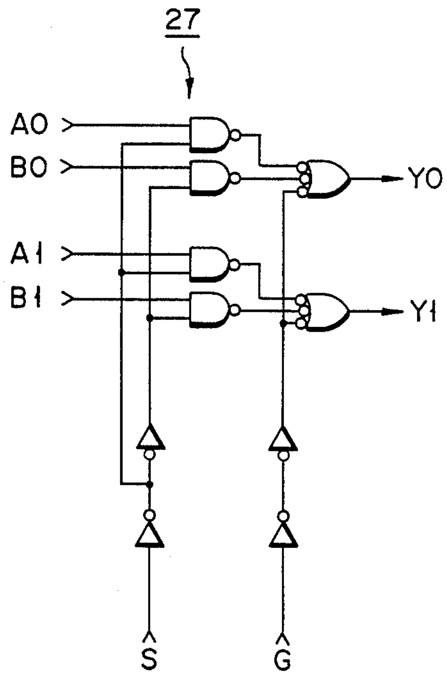
FIG. 76 is a circuit diagram of data selector 27 shown in FIG. 64C.

Memory 11 outputs macro data MACD designated by address signal MADR output from data selector 24 from terminals RD0 to RD3 to drive error detector 50; RDO and RD1 outputs to OR gates 25 and 26; and an RD3 output to data selector 27 (FIG. 64). Drive error detector 50 will be described later in detail. The RD0 and RD1 outputs are supplied to terminals D1 and D2 of latch 29 through OR gates 25 and 26 when signal DRVEN input through inverter 28 is at H level. In data selector 27, the RD2 output is input to terminals A0 and B1, and the RD3 output is input to terminals B0 and A1. The RD0 to RD3 outputs from memory 11 are supplied to the A input of data selector 31, and are output onto output data bus ODBO-3 through data selector 31. FIG. 76 shows the circuit arrangement of data selector 27.

Select terminal S of data selector 27 receives the Q output (DSELQ) from flip-flop **14*b* in timing control section 14, and gate terminal G receives external signal DRVEN. When signal DRVEN is at H level, data selector 27 outputs A0 and A1 inputs as Y0 and Y1 outputs to terminals D3 and D4 of latch 29** when signal DSELQ is at L level, and outputs B0 and B1 inputs thereto when signal DSELQ is at H level. Since signal DSELQ goes to L level in the first half of period Tw and to H level in the second half, as will be described later, the waveforms of the Y0 and Y1 outputs are switched in the first and second halves of period Tw.

Latch 29 receives, at terminals D5 to D7, the output (DSELQ) from flip-flop 14*b*, the output ($\overline{\text{iTWSX}}$) from flip-flop 14*h*, and the output ($\overline{\text{TWSXQ}}$) from NAND gate 14*c* in timing control section 14 in addition to the outputs from OR gates 25 and 26 and the Y0 and Y1 outputs from data selector 27, respectively. Latch 29 latches data from terminals D1 to D7 in synchronism with the leading edge of externally input clock signal $\phi$1. The Q1 to Q6 outputs from latch 29 are output to a recording control section (not shown) as LCS drive signals PT1, PT2, COM1, and COM2, and timing signals DSEL and $\overline{\text{CK2}}$ through buffer section 30, and its Q7 output ($\overline{\text{HTWSX}}$) is output to a printer controller (not shown) for controlling a recording apparatus (to be described later). The $\overline{\text{Q7}}$ output (LTWSX) as the inverted signal of signal HTWSX is output to a video interface section.

Data selector section 31 receives external memory select signal MEMSEL at select terminal S. When signal MEMSEL is at L level, section 31 outputs macro data MACD output from memory 11 onto output data bus ODBO-3, and when signal MEMSEL is at H level, outputs thereto step count data STD output from memory 12.

Timing control section 14 generates pulse signal iBLCLK for counting up counter 18, and also generates timing signals DSELQ, $\overline{\text{iTWSX}}$, and $\overline{\text{TWSXQ}}$ and outputs them to terminals D5 to D7 of latch 29.

The circuit arrangement of timing control section 14 will be described below in more detail. Carry signal STCY output from down counter 15 is supplied to inverter 14*g*, NAND gate 14*e*, AND gate 14*d*, and terminal K of flip-flop 14*h*. The output from inverter 14*g* is supplied to terminal E of toggle flip-flop 14*a* with an enable terminal. Flip-flop 14*a* is enabled when carry signal STCY is at H level, i.e., the output from inverter 14*g* is at L level. Thus, the Q output (SELMAC) from flip-flop 14*a* is inverted in response to the leading edge of external clock signal $\phi$2 input at terminal CK. The output from NAND gate 14*e* receiving signals SELMAC, STCY, and BLAD(1) is input to terminal E of toggle flip-flop 14*b* with an enable terminal. The Q output (DSELQ) from flip-flop 14*b* is inverted in response to the leading edge of clock signal $\overline{\phi 2}$ input at terminal CK when all the signals SELMAC, STCY, and BLAD(1) are at H level.

Reset terminals R of flip-flops 14*a* and 14*b* receive signal $\overline{\text{ISEL}}$ output from data selector section 13. When signal $\overline{\text{ISEL}}$ goes to H level (external control state), signals SELMAC and DSELQ go to L level.

Carry signal STCY output from down counter 15, the Q output (SELMAC) from flip-flop 14*a*, and clock signal $\phi$1 are supplied to AND gate 14*d*. While signals STCY and SELMAC are at H level, clock signal $\phi$1 passes through AND gate 14*d* and is input to data selector section 13 as pulse signal iBLCLK. The Q output (SELMAC) from flip-flop 14*a*, the Q output (DSELQ) from flip-flop 14*b*, signal BLAD(15) output from up counter 18, signal STO4 output from down counter 15 are supplied to AND gate 14*f*. The output (TSXQ) from AND gate 14*f* goes to H level when signals SELMAC and DSELQ are at H level and signal STO4 is at H level in the second half (Tw/2) of period Tw, and is supplied to terminal J of flip-flop 14*h*. Flip-flop 14*h* is a JK flip-flop, and its terminal K receives carry signal STCY output from down counter 15. Therefore, the Q output (iTWSX) from flip-flop 14*h* is set at H level in response to the leading edge of clock signal $\overline{\phi 2}$ when signal TSXQ is at H level and signal STCY is at L level. When signal TSXQ goes to L level and signal STCY goes to H level, signal $\overline{\text{iTWSX}}$ is reset to L level in response to the leading edge of clock signal $\overline{\phi 2}$. The Q output ($\overline{\text{iTWSX}}$) from flip-flop 14*h* is supplied to terminal D6 of latch 29, and its $\overline{\text{Q}}$ output is supplied to NAND gate 14*c*. NAND gate 14*c* receives signal ISEL output from data selector section 13. When signal ISEL is at H level (internal control state), the $\overline{\text{Q}}$ output from flip-flop 14*h* passes through NAND gate 14*c* and is input to terminal D7 of latch 29 as signal $\overline{\text{TWSXQ}}$.

The arrangement of the video interface section is the same as that shown in FIG. 29D, and a detailed description will be omitted.

In the embodiment of the circuit arrangement shown in FIGS. 64A, 64B, and 64C, the operation of the LCS drive signal generator for generating signals COM1 and COM2 shown in FIG. 77 will be described below.

First, an operation for writing data in memories 11 and 12 upon starting of the apparatus will be described.

When data write access is to be performed, signal iSEL is set at L level (external control mode), signals XBLCLK, XRBLAD, XSBLAD, XMWR, and MEMSEL are made valid by data selector section 13. Since signal ISEL goes to L level, the output ($\overline{\text{TWSXQ}}$) from NAND gate 14*c* in timing control section 14 is fixed at H level, and hence, signal $\overline{\text{HTWSX}}$ is fixed at H level through latch 29 and buffer section 20 and applied to the printer controller. Thus, the printer controller detects that the LCS head is set in a loading mode (a mode in which data is written in memories 11 and 12).

Signal DRVEN is set at L level and is supplied to terminal G of data selector 27, and inverter 28. The outputs from OR gates 25 and 26, and the Y0 and Y1 outputs from data selector 27 are thus fixed at H level. LCS drive signals PT1 and PT2 and LCS drive signals COM1 and COM2 applied to the common electrodes of the LCS have the same potential, thus preventing the LCS being applied with an accidential voltage, in particular, a DC voltage.

When signal $\overline{\text{ISEL}}$ goes to H level through data selector section 13, the Q outputs (SELMAC, DSELQ) of flip-flops 14*a* and 14*b* in timing control section 14 go to L level. Thus, external clock signal $\phi$1 cannot pass through AND gate 14*d*, and generation of internal pulse signal iBLCLK is interrupted. Signal ISEL goes to L level, and is supplied to select terminal S of data selector 24. Thus, data selector 24 selects A0 to A4 inputs (i.e., the QA to QE outputs from up counter 18), and outputs them. Signals SELMAC and DSELQ go to L level and are applied to AND gate 14*f*, so that output TSXQ from AND gate 14*f* is fixed at L level, and is supplied to terminal J of flip-flop 14*h*. The Q output ($\overline{\text{iTWSX}}$) from flip-flop 14*h* is then fixed at L level, thus interrupting generation of pulse signal $\overline{\text{CK2}}$ output through latch 29 and buffer section 30. For this reason, the recording control section interrupts video signal LTXD input supplied from the video interface section.

Then, pulse signal XRBLAD is supplied to data selector section 13 to cause signal RBLAD to reset up counter 18, thus setting the QA to QE outputs from up counter 18 to be "0". Signal MEMSEL is set at L level, so that data selector 31 causes the RD0 to RD3 outputs from memory 11 to be output onto output data bus ODBO-3. Since signal ISEL is at L level, the QA and QE outputs from up counter 18 are converted to address signal MADR through data selector 24, and signal MADR is input to address signal input terminals A0 to A4 of memory 11.

Thereafter, macro data MAC(0) shown in FIG. 79 is output onto input data bus IDBO-3, and pulse signal XMWR is input to data selector section 13. Then, selector section 13 supplies write signal MOWR to terminal WE of memory 11 so that macro data MAC(0) is written at address (MADR)=0 of memory 11. After macro data MAC(0) is written, the data stored at address (MADR)=0 is read out onto output data bus ODBO-3 through data selector 31 to verify if normal macro data is written.

Then, pulse signal XBLCLK is input to data selector section 13, so that pulse signal BLCLK is applied to terminal CK of up counter 18 to increment counter 18 to have BADR=1. Thus, macro data MAC(1) output onto intput data bus iBDO-3 is written at address (MADR)=1 of memory 11 in accordance with signal XMWR. After macro data MAC(1) is written, verification is performed, and the same operation as described above is repeated, so that macro data MAC(1) to MAC(31) are written in memory 11.

After all the macro data MAC(0) to MAC(31) are written in memory 11, signal MEMSEL is set at H level to select memory 12, and pulse signal XRBLAD is input to data selector section 13. In response to this signal, selector section 13 supplies signal RBLAD to terminal R of up counter 18 to reset counter 18, thus setting address signals QA to QE to "0". Since signal MEMSEL is at H level, data selector 31 outputs the RD0 to RD3 outputs from memory 12 onto output data bus ODBO-3. Data ST(0)L shown in FIG. 78 is output onto input data bus iBDO-3, and pulse signal XMWR is applied to data selector section 13. Then, selector section 13 supplies pulse signal $\overline{\text{M1WR}}$ to terminal WE of memory 12, so that data ST(0)L is written at address (BADR)=0 of memory 12. After data ST(0)L is written, data stored at address (BADR)=0 of memory 12 is read out from output data bus ODBO-3 through data selector 31 to verify if normal data is written.

Thereafter, pulse signal XBLCLK is sequentially supplied to increment address BADR, and step count data ST(O)H, ST(1)L, ST(1)H, . . . , ST(7)L, and ST(7)H are written at addresses BADR=1 to 15. Each time one step count data is written, the written data is verified through data selector 31 and output data bus ODBO-3. FIG. 80 shows a bit format of address signal MADR shown in FIGS. 78 and 79.

After the macro data are stored in memory 11 and step count data are stored in memory 12 as described above, pulse signal XSBLAD is supplied to data selector section 13. In response to this, section 13 supplies set signal SBLAD to set terminal S of up counter 18 so that the count value of up counter 31 is set to be "31" or address signal BADR is set to be "15". Then, signal iSEL is set at H level to switch the loading mode to the execution mode, thereby starting the waveform generating operation of the LCS drive signals.

Signal iSEL is set at L level, i.e., signal ISEL is set at L level in the loading mode and hence load terminal L of down counter 15 is set at L level. Therefore, a to g inputs are preset in down counter 15 in response to the leading edge of signal $\overline{\phi 2}$. When signal iSEL is set at H level, down counter 15 starts counting down of the present count value.

Signal DRVEN is set at H level at least one period Tw later after signal iSEL is set at H level, thus starting outputting of LCS drive signals PT1, PT2, COM1, and COM2. Thus, hazard can be prevented. Latch 29 generates LCS drive signals PT1, PT2, COM1, and COM2, and timing signals DSEL, CK2, and HTWSX in synchronism with the leading edge of clock signal $\phi$1, thus minimizing hazard during a signal generation process.

Figure 81A:
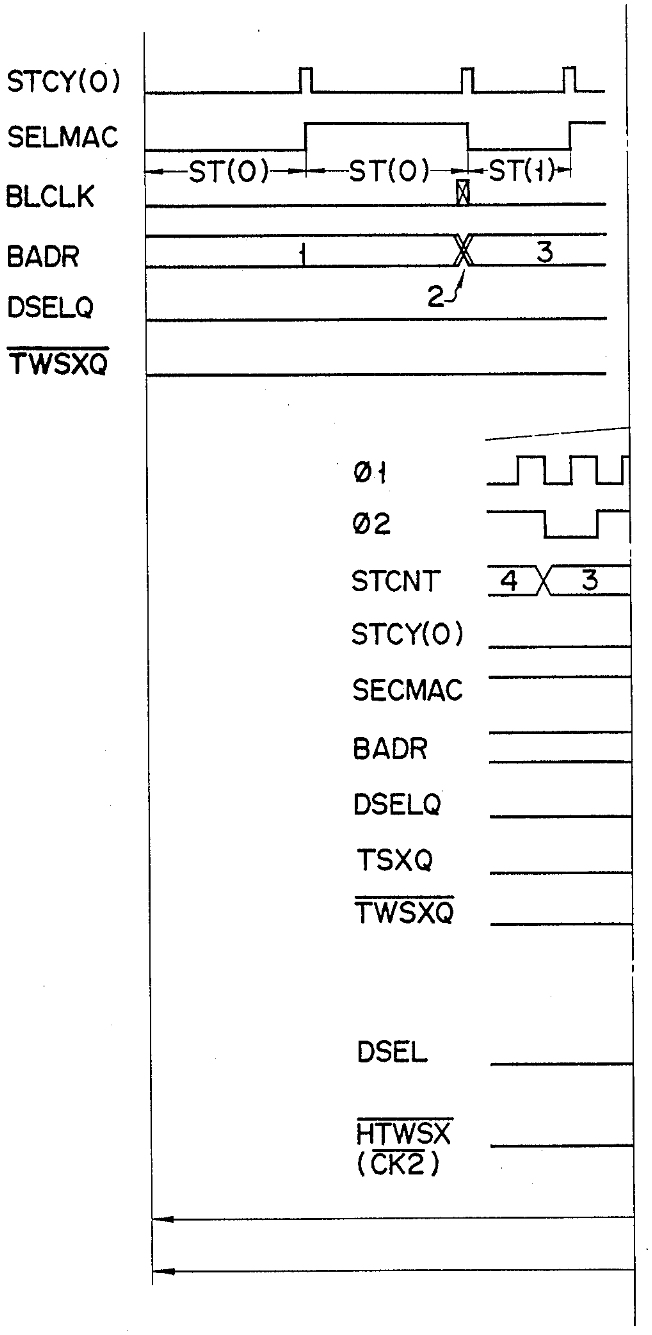
FIGS. 81A, 81B and 81C and FIGS. 82A and 82B are timing charts for explaining the operation of the embodiment shown in FIGS. 64A to 64C.
Figure 81B:
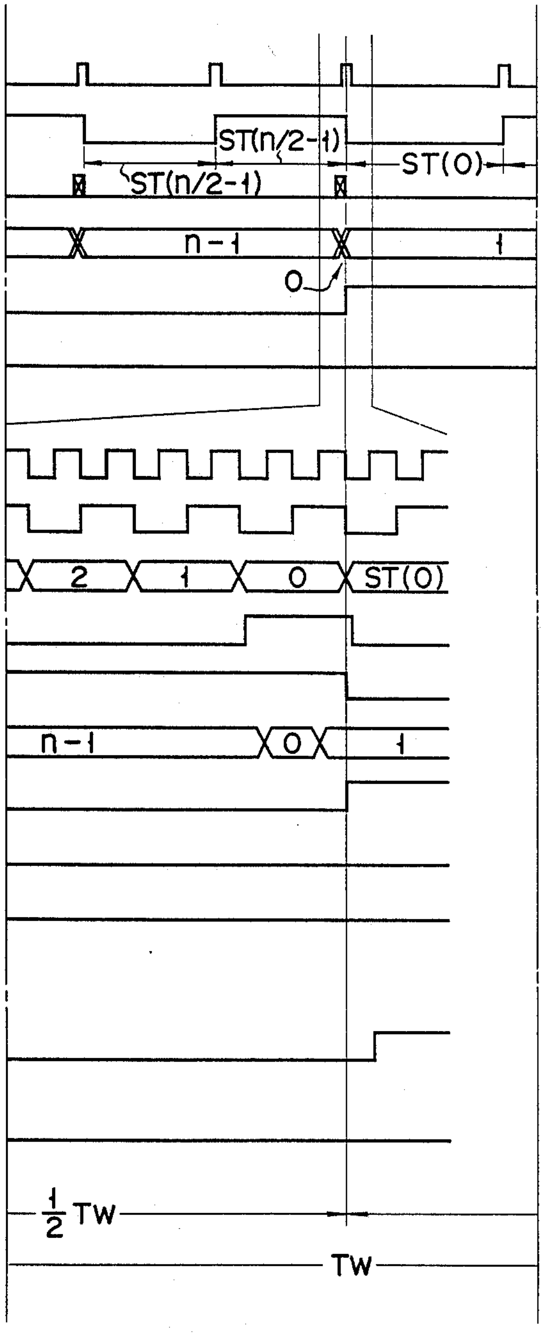
Figure 82A:
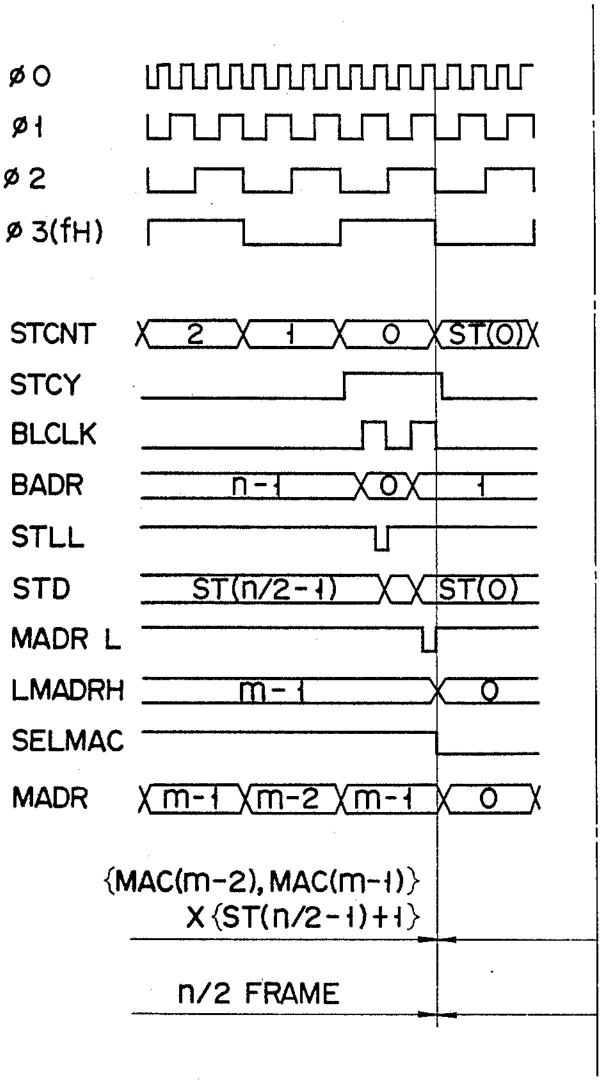
Figure 82B:
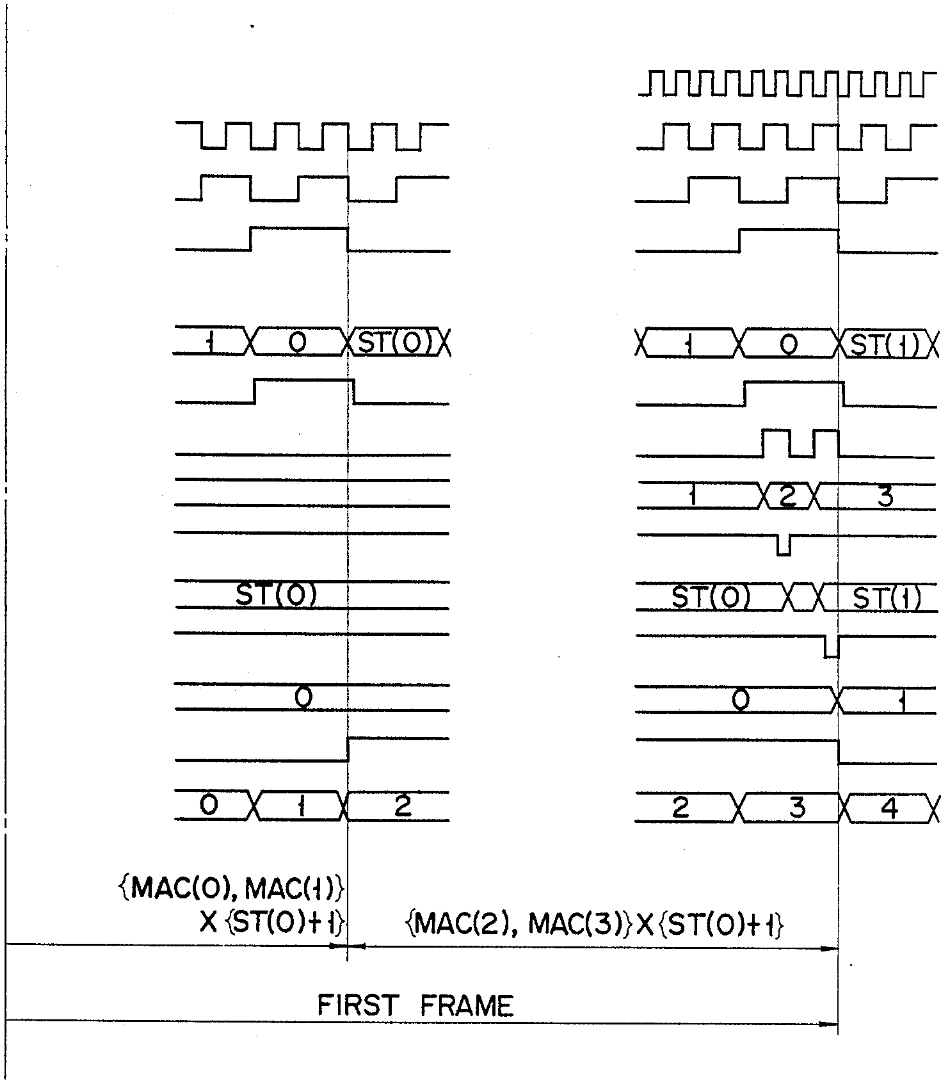

FIGS. 81A and 81B and FIGS. 82A and 82B are timing charts for explaining an operation in the execution mode according to the present invention. FIGS. 81A and 81B show an operation in period Tw, and FIGS. 82A and 82B show an operation in one frame. In this embodiment, as described above n=16 and m=32.

The operation in one period (Tw) of this embodiment will be described hereinafter.

Memory 12 stores n blocks of STD, i.e., n/2 frames of STD shown in FIG. 78, as described above. Memory 11 stores macro data MACD, i.e., m/4 frames of macro data MACD shown in FIG. 79.

Since n/2 frames of STD and MACD are used in both first and second halves (Tw/2) of the period, one period (Tw) consists of n (=m/2) frames. FIGS. 82A and 82B are timing charts starting from the second half of the last frame ((n/2)th frame) in the second half of period Tw.

When count value STCNT of down counter 15 becomes "0" in the second half of the last frame, carry signal STCY from counter 15 goes to H level and is supplied to AND gate **14*d* of timing control section 14. Signal STCY is maintained at H level while count value STCNT is "0". In this case, the Q output (SELMAC) from flip-flop 14*a* is at H level, and hence, clock signal $\phi$1 passes through AND gate 14*d* to be converted to pulse signal iBLCLK. Then, signal iBLCLK is applied to data selector section 13**.

When signal iBLCLK is input to data selector section 13, two H level pulses appear in signal BLCLK input from data selector section 13 to terminal CK of up counter 18, as shown in FIG. 64A. Each time signal BLCLK rises, up counter 18 supplies signal BADR=0, 1 to memory 12. In this case, since signal $\overline{\text{ISEL}}$ is at H level, clock signal $\phi$0 passes through NAND gate **13*h* while signal iBLCLK is at H level, and is supplied to NAND gate 13*j*. Signal $\overline{\text{M1WR}}$ is set at H level and applied to NAND gate 13*j*. Clock signal $\phi$0 is then supplied to NAND gate 19 through NAND gate 13*j*. The other input of NAND gate 19 receives the QA output from up counter 18 through inverter 21. Therefore, when signal BADR indicates "0", i.e., when the QA output is at H level, clock signal $\phi$0 passes through NAND gate 19 and is converted to latch signal STLL and supplied to terminal CK of latch 23. For this reason, step count data ST(0)L read out from address (BADR)=0 of memory 12 is applied to terminals a to d of down counter 15 in response to the leading edge of signal STLL. Up counter 18 starts counting in response to the next leading edge of signal BLCLK, and signal BADR is incremented to be "1". Then, data ST(0)H stored at address (BADR)=1 of memory 12 is applied to terminals e to g of down counter 15. Furthermore, since signal $\overline{ISEL}$ is at L level, signal $\overline{MOWR}$ (H level) is applied to NAND gate 13*l*. While signal iBLCLK is at H level, clock signal φ0 passing through NAND gate 13*h* passes through NAND gate 13*l*, and is supplied to NAND gate 20. Therefore, when signal BADR indicates "1", i.e., the QA output is "1" (H level), clock signal φ0 passes through NAND gate 20 and is converted to latch signal MADRL and supplied to latch 22. In response to the leading edge of latch signal MADRL, the QB to QD outputs from up counter 18 are supplied to B2 to B4 inputs (LMADRH) of data selector 24. At this time, since BADR is "1", signal LMADR is changed from "m−1" to "0". An L-level signal is supplied to terminal E of flip-flop 14 through inverter 14*g* by carry signal STCY (H level). Therefore, the Q output (SELMAC) from flip-flop 14*a* is inverted (from H level to L level) in response to the leading edge of clock signal $\overline{\phi 2}$ (the trailing edge of signal φ2) and is supplied to terminal B1 of data selector 24. The Q output (SELMAC) from flip-flop 14*a* is kept at that level until carry signal STCY is again output from down counter 15. Since signal φ3 is set at L level at the leading edge of signal $\overline{\phi 2}$, data selector 24 selects the B0 to B4 inputs ("0") (ISEL=H level), and supplies them as address signal MADR to address signal input terminals A0 to A4 of memory 11. Since terminal B0 of data selector 24 receives clock signal φ3, signal MADR is alternately changed to be "0" and "1" each time clock signal φ3 is changed between "L" and "H". In response to the leading edge of clock signal $\overline{\phi 2}$ (i.e., the trailing edge of signal φ2), step count data ST(0) is set in down counter 15. Thereafter, in synchronism with the leading edge of clock signal $\overline{\phi 2}$, count-down is performed. That is, down counter 15 counts down from ST(0) to 0. While down counter 15 counts down from ST(0) to 0, i.e., {(ST(0)+1×Tφ2}, macro data MAC(0) and MAC(1) are alternately read out from addresses (MADR="0" and "1" of memory 11, and 0th to 3rd bits of MAC(1) are supplied to terminals D1 to D4 of latch 29 through OR gate 25 and data selector 27. Latch 29 latches the D1 to D4 inputs in response to the leading edge of clock signal φ1, and outputs LCS drive signals PT1, PT2, COM1, and COM2 from terminals Q1 to Q4 through buffer section 30 (FIG. 64C**).

When signal BADR (=1) is output from up counter 18 to memory 12, signal BLAD(1) goes to H level, and is supplied to NAND gate **14*e* in timing control section 14. As shown in the timing charts of FIGS. 82A and 82B, when both signals SELMAC and STCY are at H level, signal BADR indicates "1". Therefore, an L-level signal is applied from NAND gate 14*e* to terminal E of flip-flop 14*b*, and the Q output (DSELQ) from flip-flop 14*b* is inverted from H level to L level in response to the leading edge of signal $\overline{\phi 2}$ (the trailing edge of signal φ2). Data selector 27 outputs the RD2 and RD3 outputs from memory 11 to terminals D3 and D4 of latch 29, respectively. The output from AND gate 14*e* does not go to L level unless signal BADR indicates "1", and signal BLAD(1) goes to H level. Therefore, the Q output (DSELQ) from flip-flop 14*b* is maintained at L level during the first half (Tw/2) of the period. Therefore, in the first half of the period, the RD2 and RD3 outputs from memory 11 are input to terminals D3 and D4 of latch 29**, respectively.

While down counter 15 counts down from ST(0) to 0 [Tφ2×(ST(0)+1], LCS drive signal waveforms are generated based on data MAC(0) and MAC(1) alternately read out from memory 11 in synchronism with clock signal φ3. During this interval, when count value STCNT of down counter 15 indicates "4", signal STO4 from down counter 15 goes to H level and is supplied to AND gate **14*f***.

However, since signals SELMAC and DSELQ are at L level, the output (TSXQ) from AND gate **14*f*** is kept at L level.

When down counter 15 further counts down the data and count value STCNT again indicates "0", carry signal STCY is changed from L level to H level. In this case, since signal SELMAC is at L level, clock signal φ1 cannot pass through AND gate **14*d***, and no clock pulses appear in signal iBLCLK.

Therefore, signal BADR output from up counter 18 is left unchanged, i.e., "1". When count value STCNT of down counter 15 becomes "0", carry signal STCY (H level) is also supplied to inverter **14*g*. Then, flip-flop 14*a* is enabled through inverter 14*g*, and the Q output (SELMAC) from flip-flop 14*a* is changed from L level to H level in response to the leading edge of clock signal $\overline{\phi 2}$ (i.e., the trailing edge of signal φ2). For this reason, the B1 input of data selector 24 becomes "1", and address signal MADR output from data selector 24** is alternately changed between "2" and "3" in accordance with clock signal φ3 (B0 input).

Since step count data ST(0) output from latch 23 and memory 12 is again set in down counter 15 in response to the leading edge of clock signal $\overline{\phi 2}$, LCS drive signal waveforms are generated based on macro data MAC(2) and MAC(3) stored at addresses (MADR)=2 and 3 of memory 11 during an interval of Tφ2×(ST(0)+1) in the second half of the 1st frame, and are output through latch 29 and buffer section 30.

When count value STCNT of down counter 15 becomes "0" and carry signal STCY (H level) is generated in the second half of the 1st frame, since signal SELMAC is at H level, two successive pulses appear in signal BLCLK by the same operation as in the second half of the (n/2)th frame described above, and signal BADR=2 is output from up counter 18 to memory 12. In response to the leading edge of signal STLL, step count data ST(1)L is latched by latch 23. When signal BADR indicates "3", data ST(1)H is read out from memory 12, and step count data ST(1) is set in down counter 15 in response to the leading edge of signal $\overline{\phi 2}$ (the trailing edge of signal φ2) (FIG. 78). In response to the leading edge of signal MADRL, the output QB to QD (="1") of up counter 18 is latched by latch 22, and is input to terminals B2 to B4 of data selector 24.

Furthermore, when carry signal STCY output from down counter 15 goes to H level in the second half of the 1st frame, signal SELMAC is changed from H level to L level in response to the leading edge of clock signal $\overline{\phi 2}$ (the trailing edge of signal φ2), signal SELMAC goes to L level in the first half of the 2nd frame. Therefore, in the first half of the 2nd frame, the B0 to B4 inputs are alternately changed between "4" and "5" in synchronism with clock signal φ3 so as to be address signals. The address signals are applied to address signal input terminals A0 to A4 of memory 11. Therefore, macro data MAC(4) and MAC(5) are alternately read out from memory 11 in synchronism with clock signal φ3, and are input to OR gates 25 and 26 and data selector 27. Thereafter, during an interval of Tφ2×(ST(1)+1), waveforms of LCS drive signals PT1, PT2, COM1, and COM2 are generated based on macro data MAC(4) and MAC(5) read out from memory 11 in the first half of the 2nd frame and based on macro data MAC(6) and MAC(7) read out from memory 11, in the same manner as in the 1st frame.

In this manner, each time one-frame operation is completed, data selector section 13 generates 2-pulse signal BLCLK, and two continuous blocks of addresses are output from up counter 18 to memory 12 in synchronism with signal BLCLK. Step count data ST(y)L is read out from memory 12 based on the first output address, is latched by latch 23 in response to the leading edge of latch signal STLL, and is then input to terminals a to d of down counter 15. Step count data ST(1)H is read out based on the next output address, and its lower 3 bits are applied to terminals e to g. Each time count-down of down counter 15 is completed (one frame is terminated), the above data is set in down counter 15 as step count ST(y).

2nd to 4th bits (QB to QD) of address signal BADR output from up counter 18 are latched by latch 22 in response to leading edge of latch signal MADRL, and are applied to terminals B2 to B4 of data selector 24. Terminal B1 of data selector 24 receives the Q output (SELMAC), which goes to L level in the first half of the frame and to H level in the second half of the frame, from flip-flop 14*a* in timing control section 14, and its terminal B0 receives clock signal $\phi$3. The B0 to B4 inputs of data selector 24 are selected by data selector 24 since signal ISEL is at H level in the execution mode, and are converted to address signal MADR and supplied to address signal input terminals A0 to A4 of memory 11.

As described above, each time the frame is ended, 2-pulse signal BLCLK is generated, and down counter 15 counts twice. Address signals BADR output from down counter 15 are [0, 1] (1st frame), [2, 3] (2nd frame), [4, 5] (3rd frame), . . . , [n−3, n−2] ((n/2−1)th frame), and [n−2, n−1] ((n/2)th frame). Note that a left digit in [ ] indicates the first half of the frame, and a right digit indicates the second half of the frame. This applies to the following description. Therefore, the QB to BD outputs of down counter 15 become [0, 0], (1st frame), [1, 1] (2nd frame), [2, 2] (3rd frame), . . . , [3, 3] (4th frame, . . . [(n/2)−1, (n/2)−1] ((n/2)th frame).

FIG. 80 shows a bit configuration of address signal MADR output from data selector 24 to address signal input terminals A0 to A4.

Referring to FIG. 80, MADR0 to MADR4 respectively indicate 0th to 4th bits of address signal MADR. First bit SELMAC becomes "0" (L level) in the first half of a frame, and becomes "1" (H level) in the second half of the frame, and the 0th bit corresponds to clock signal $\phi$3. Therefore, address signal MADR is alternately changed between 4*i* and 4*i*+1 in the first half of the frame and between 4*i*+2 and 4*i*+3 in the second half in synchronism with clock signal $\phi$3 (i=an integer of 0, 1, . . . , (m/4)−1)). For this reason, waveforms of LCS drive signals PT1, PT2, COM1, and COM2 are generated based on macro data MAC(4*i*) and MAC(4*i*+1) in the first half of an (i+1)th frame, and based on macro data MAC(4*i*+2) and MAC(4*i*+3) in the second half thereof.

The period of the (i+1)th frame is defined by step count data ST(i), and corresponds to T$\phi$2×(ST(i)+1) in both the first and second halves of the frame.

Figures 83, 85:
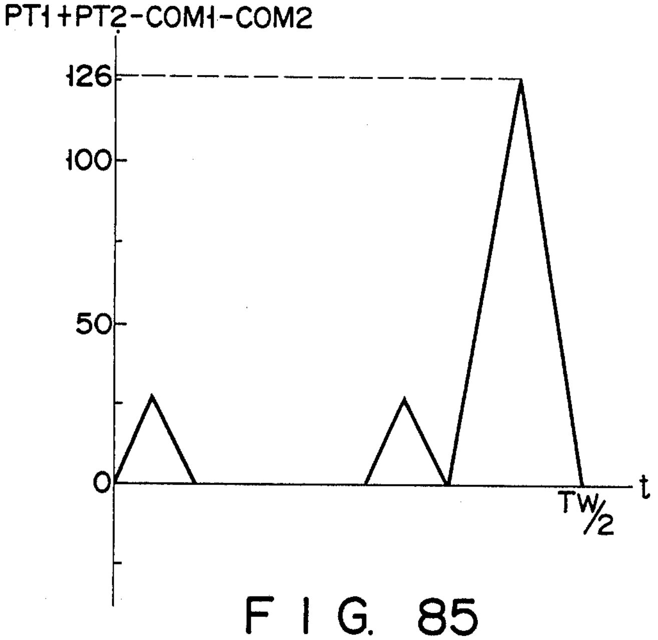

FIG. 77 shows waveforms of LCS drive signals PT1, PT2, COM1, and COM2 when step count data STD shown in FIG. 83 is stored in memory 12 and macro data MACD shown in FIG. 84 is stored in memory 11.

In FIG. 77, fL, *fL, and fL1 represent low-frequency signals, and fH and *fH represent high-frequency signals. Signals *fL and *fH have inverted phases to those of signals fL and fH, respectively. Since AC waveforms are generated by changing address signal MADR of memory 11 in accordance with clock signal $\phi$3, period TfH of signal fH is equal to period T$\phi$3 of clock signal $\phi$3. As shown in FIG. 77, since period of signal $\phi$3 is twice that of signal $\phi$2, TfH=2T$\phi$2.

When the first half (Tw/2) of period of Tw is completed, two pulses appear in signal BLCLK as described above, and signals BADR=0 and 1 are output from up counter 18 to memory 12. When BADR becomes "1", signal BLAD(1) from up counter 18 goes to H level, and is supplied to terminal E of flip-flop 14*b* through NAND gate 14*e* of timing control section 14. Therefore, the level of the Q output (DSELQ) from flip-flop 14*b* is changed (from L level to H level), and data selector 27 switches the RD2 and RD3 outputs of memory 11 to the D4 and D3 outputs of latch 29. In the second half (Tw/2) of period Tw, macro data MAC(0) to MAC(m−1) stored in memory 11 are developed based on step count data (ST(0) to ST((n/2)−1) stored in memory 12 in the same manner as in the first half (Tw/2). However, since the RD2 and RD3 outputs from memory 11 are switched by data selector 27, waveforms of signals COM1 and COM2 are replaced with each other in the first and second halves (Tw/2) of period Tw.

Generated LCS drive signals PT1, PT2, COM1, and COM2 are output to the recording control section through latch 29 and buffer section 30 in synchronism with the leading edge of clock signal $\phi$1.

Figure 81C:
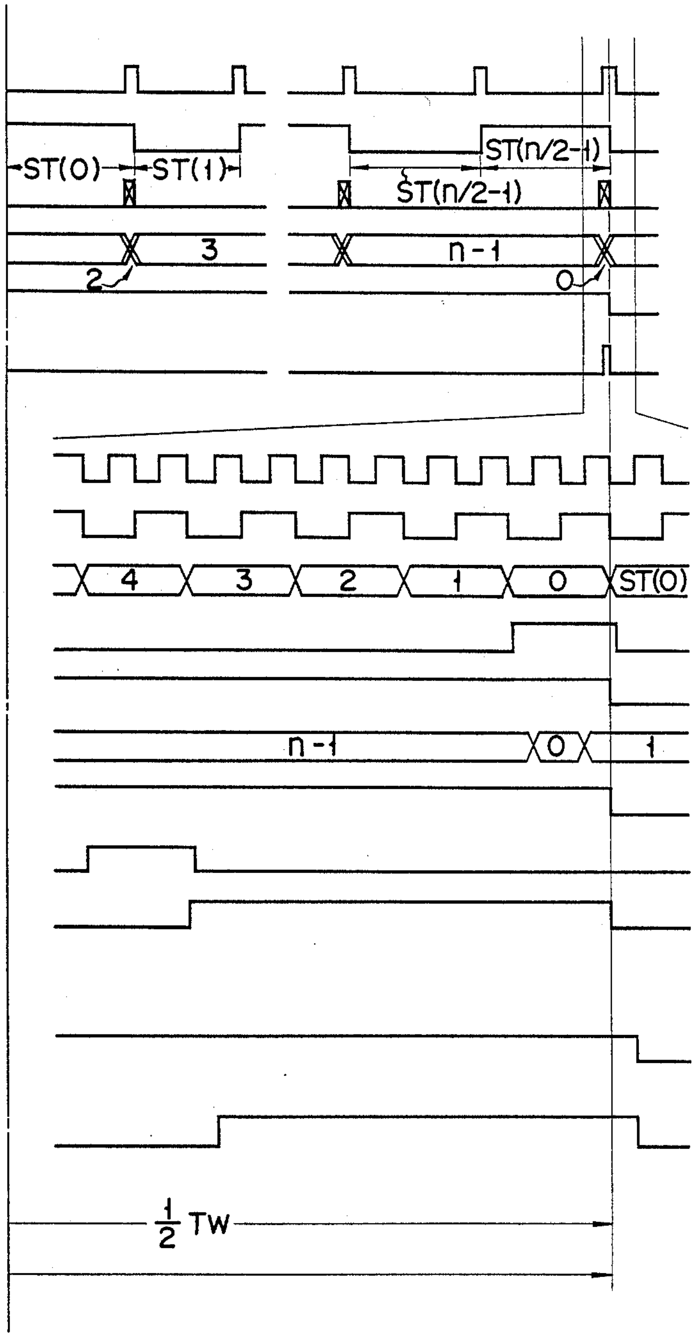

As shown in the timing charts of FIGS. 81A, 81B and 81C, in the second half of the last frame ((n/2)th frame) in the second half (Tw/2) of period Tw, block address BADR output from up counter 18 indicates the end address ("15"), and count value STCNT output from down counter 15 indicates "4". Then, the output (TSXQ) from AND gate 14*f* in timing control section 14 goes to H level, and is supplied to terminal J of flip-flop 14*h*. Since carry signal $\overline{\text{STCY}}$ applied to terminal K is at L level, the Q output ($\overline{\text{iTWSX}}$) from flip-flop 14*h* goes to H level and its $\overline{\text{Q}}$ output goes to L level. For this reason, the output ($\overline{\text{TWSXQ}}$) from NAND gate 14*c* is changed from L level to H level. Signal TSXQ is changed to L level when count value STCNT becomes "3". The Q output ($\overline{\text{iTWSX}}$) from flip-flop 14*h* is latched by latch 29 in response to the leading edge of signal $\phi$1, and is output to the recording control section as signal $\overline{\text{CK2}}$ through buffer section 30.

At this time, signal $\overline{\text{TWSXQ}}$ is latched by latch 29 in response to the leading edge of signal $\phi$1, and is output signal $\overline{\text{HTWSX}}$ to the printer controller through buffer section 30. Inverted signal LTWSX of signal $\overline{\text{HTWSX}}$ is output to inverter 40*r* of video interface section 40 similar to that shown in FIG. 29D.

When count value STCNT becomes "0", carry signal STCY from down counter 15 goes to H level, and is supplied to terminal K to flip-flop 14*h*. Since signal TSXQ applied to terminal J is at L level, the Q output (iTWSX) from flip-flop 14*h* is inverted to L level in response to the leading edge of clock signal $\overline{\phi 2}$. Therefore, output $\overline{\text{TWSXQ}}$ from NAND gate 14*c* again goes to L level. For this reason, signals $\overline{\text{CK2}}$ and $\overline{\text{HTWSX}}$ go to L level in response to the leading edge of signal $\phi$1.

Carry signal STCY is applied to NAND gate 14*e*, and and L-level signal is then applied from NAND gate 14*e* to terminal E of flip-flop 14b. Therefore, the Q output (DSELQ) from flip-flop 14b is inverted from H level to L level in response to the leading edge of signal $\overline{\phi 2}$. Signal DSELQ is latched by latch 29 in response to the leading edge of signal $\phi 1$, and in output as signal DSEL to recording control section through buffer section 30. video interface section 40 shown in FIG. 29D is also used in this embodiment. In section 40, during an L-level interval of signal $\overline{HTWSX}$, one-line video data HLTXD is latched by latch 40b in synchronism with clock signal $\overline{HLTXCK}$ from the printer controller, and is output as video data LTXD to the recording control section through inverter 40d and buffer 40e. Two clock signals $\overline{CK1A}$ and $\overline{CK1B}$ are generated from clock signal $\overline{HLTXCK}$ by flip-flops 40f and 40h, inverter 40g, and NAND gates 40i and 40j, and are output to the recording control section respectively through buffers 40m and 40l. Two clock pulses of clock signals $\overline{CK1A}$ and $\overline{CK1B}$ alternately appear, as described above. The recording control section described herein is the same as that shown in FIG. 27A, and its description will be omitted.

As described above, the recording control section receives one-line video data LTXD from video interface section 40 during one period Tw in synchronism with clock signals $\overline{CK1A}$ and $\overline{CK1B}$. The recording control section selects LCS drive signals PT1 and PT2 input from the LCS drive signal generator based on the value of video data LTXD, and applied the inverted signal of the selected signal to the signal electrodes of the LCS to ON/OFF control the microshutters of the LCS, thereby performing optical write access. In this case, inverted signals of LCS drive signals COM1 and COM2 are applied to the common electrodes of the LCS. LCS drive signals COM1 and COM2 are signals for selecting the LCS in the first and second halves (Tw/2) of period Tw, respectively.

The image forming method by means of optical write access includes a normal developing method for recording a portion which is not subjected to light irradiation in black while the LCS is OFF, and a reversal developing method for recording a portion subjected to light irradiation in black while the LCS is ON. In this embodiment, signal PT1 serves as a modulated signal for writing a black (character portion) image, and signal PT2 serves as a modulated signal for writing a white (background portion) image. In accordance with the developing methods, macro data MAC(0) to MAC(m−1) to be stored in memory 11 are rewritten, so that a black image can be recorded when video data LTXD is "1" regardless of the recording method. In this manner, macro data are stored in programmable memory 11, and a very flexible waveform generating apparatus can be provided.

An embodiment will be described below. For example, when LCS drive signals PT1, PT2, COM1, and COM2 shown in FIG. 77 are generated, 16 words of step count data STD and 32 words of macro data MACD shown in FIGS. 83 and 84 can be respectively stored in memories 12 and 11.

Figures 86, 87:
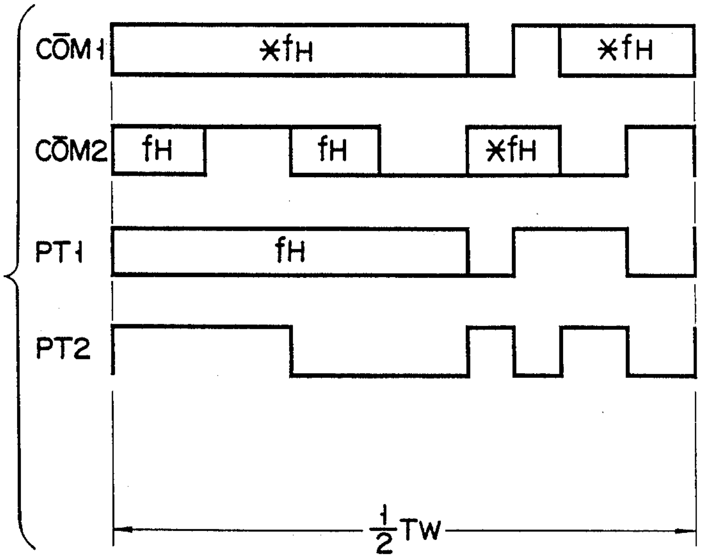
Figure 90:
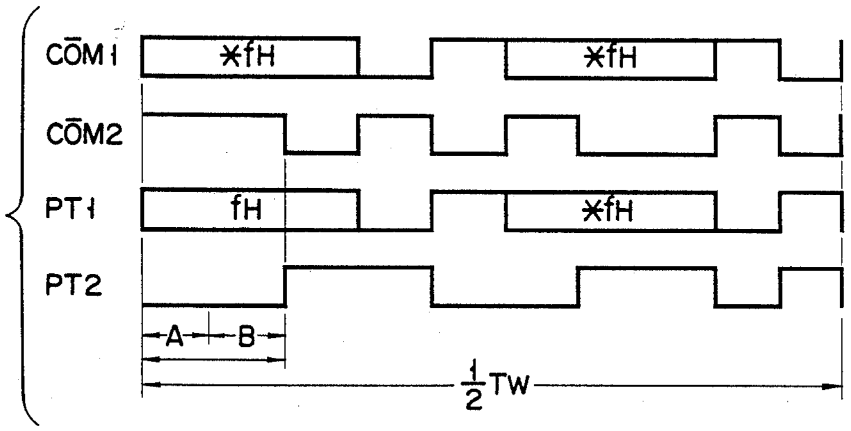
FIG. 90 is a waveform chart of LCS drive signals COM1, COM2, PT1, and PT2 generated by the LCS drive signal generator in the embodiment shown in FIGS. 64A, 64B, and 64C.

LCS drive signals PT1, PT2, COM1, and COM2 shown in FIG. 86 can be generated by storing 16 words of step number data STD and 32 words of macro data MACD shown in FIGS. 87 and 88 respectively in memories 12 and 11. Furthermore, LCS drive signals, PT1, PT2, COM1, and COM2 shown in FIG. 90 can be generated by storing 16 words for step count data STD and 32 words of macro data MACD shown in FIGS. 91 and 92 respectively in memories 12 and 11.

In this embodiment, a recording apparatus employing an LCS drive signal driver can be the same as in FIGS. 22, 23, 24, 25, and 26. The recording apparatus will be described below.

As described above, in accordance with binary data of LCS drive signal PT1 and PT2, 0 V is applied to signal electrodes 233 of LCS 211 if binary data is "1" and a predetermined voltage is applied thereto by high-voltage driver 220 if it is "0". In accordance with binary values of LCS drive signals COM1 and COM2, 0 V is applied to common electrodes 234 of the LCS if the binary value is "1" and a predetermined voltage is applied thereto by high-voltage driver 220 in the same manner as the signal electrodes. A voltage actually applied to LCS 211 is a differential voltage between signal electrodes 233 and common electrodes 234. Therefore, a DC component of an electric field applied to the LCS is to be "0" and electrical breakdown of the LCS is prevented, so that a product of differential voltage applied to the LCS during period Tw can be set to be "0". Since LCS drive signals PT1, PT2, COM1, and COM2 are generated from macro data MACD read out for each period T$\phi$2 of clock signal $\phi 2$, differences between PT1 and COM1, PT1 and COM2, PT2 and COM1, and PT2 and COM2 are calculated each time macro data MACD is read out from memory 11. These differences are multiplied during one period Tw. If all of the product are represented by "0", The DC component of the electric field applied to the LCS can be regarded to be "0".

It is most preferable to individually check if products of four differences PT1−COM1, PT1−COM2, PT2−COM1, and PT2−COM2 become "0". However, if it is checked if a sum of all the four differences (PT1−COM1)+(PT1−COM2)+(PT2−COM1)+(PT2−COM2)=2(PT1+PT2−COM1−COM2) becomes "0", that is, (PT1+PT2−COM1−COM2) becomes "0", there is no problem in terms of reliability. Even if two or more signals of LCS drive signals PT1, PT2, COM1, and COM2 include an error, a possibility of the product of PT1+PT2−COM1−COM2 yielding "0" during one period Tw is very low.

FIG. 85 shows a change in produce during a ½ period when PT1+PT2−COM1−COM2 for LCS drive signals PT1, PT2, COM1, and COM2 generated based on step count data STD and macro data MACD shown in FIGS. 83 and 84 are accumulated during a ½ period (Tw/2). In FIG. 85, a product (PT1+PT2−COM1−COM2) is plotted along the ordinate, and a time is plotted along the abscissa. As shown in FIG. 85, the product (PT1+PT2−COM−COM2) is changed between a minimum value "−1" and a maximum value "126" during the ½ period (Tw/2). After the lapse of the ½ period (Tw/2), the product becomes "0". That is, a DC component applied to the LCS during the ½ period is "0".

Figure 89:
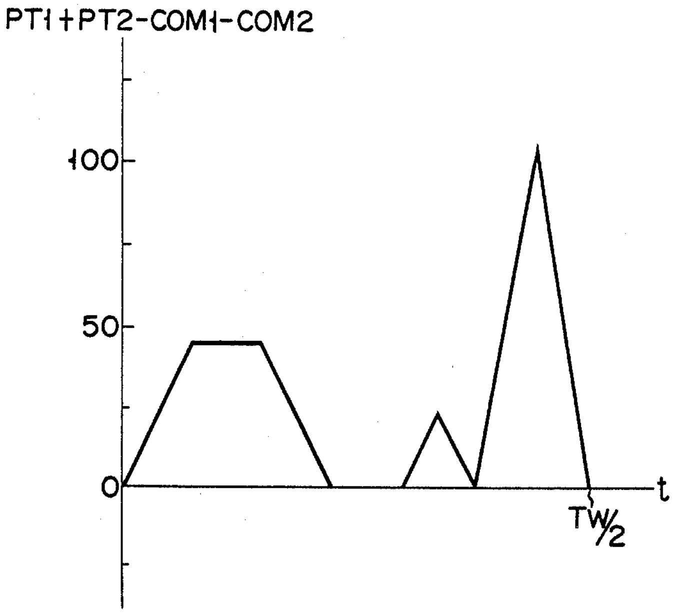
FIG. 89 is a graph showing a change in product of PT1+PT2−COM1−COM2 for one period Tw using LCS drive signals COM1, COM2, PT1, and PT2 generated in accordance with step count STD and macro data MACD shown in FIGS. 87 and 88.
Figures 91, 93:
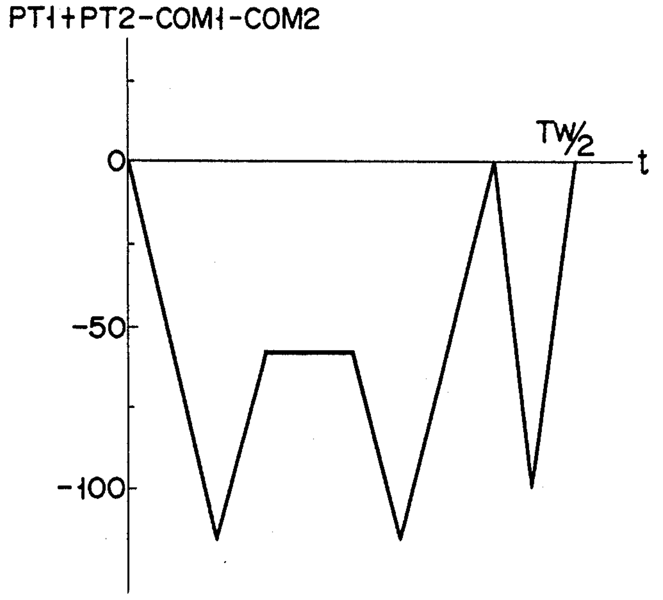

FIGS. 89 and 93 also show a change in product (PT1+PT2−COM1−COM2) during the ½ period (Tw/2) as in FIG. 85. FIG. 89 shows a change in product (PT1+PT2−COM1−COM2) using LCS drive signals PT1, PT2, COM1, and COM2 generated by step count data STD shown in FIG. 87 and macro data MACD shown in FIG. 88, and FIG. 93 shows a change in product (PT1+PT2−COM1−COM2) using LCS drive signals PT1, PT2, COM1, and COM2 generated by step count data STD shown in FIG. 91 and macro data MACD shown in FIG. 92.

In this case of FIG. 89, although the product (PT1+PT2−COM1−COM2) changes while taking various positive values, it becomes "0" after the lapse of the ½ period (Tw/2).

In the case of FIG. 93, although the product (PT1+PT2−COM1−COM2) changes while taking various negative values, it becomes "0" after the lapse of the ½ period (Tw/2). Therefore, in both the cases of FIGS. 89 and 93, the DC component of the electric field applied to the LCS during the ½ period (Tw/2) can be regarded to be "0".

In this manner, if the product (PT1+PT2−COM1−COM2) is "0" during the ½ period (Tw/2), a product (PT1+PT2−COM1−COM2) during the second half (Tw/2) of period Tw also becomes "0" (in the second half (Tw/2) of period Tw, the waveforms of COM1 and COM2 are switched, and the product (PT1+PT2−COM1−COM2) yields the same value as that in the first half of period Tw).

FIGS. 65 and 66, FIGS. 67 and 68, and FIGS. 69 and 70 show an embodiment of a drive error detector which checks based on the above principle if the product of PT1+PT2−COM1−COM2 during period Tw is "0" so as to prevent a DC voltage from being applied to LCS 211 for a long period of time.

A circuit arrangement and operation of drive error detector 60 will be described with reference to the circuit diagram shown in FIG. 65 and the timing chart shown in FIG. 66. Data selector 61 receives macro data MACD output from terminals RD0 to RD3 of memory 11 at terminals I0 to I3, and selects one of I0 to I3 inputs in accordance with clock signals $\phi$1 and $\phi$2 input at select terminals A and B. Selector 61 then outputs the selected signals from output terminals Y to terminal EN of up-down counter 62. Signals input at terminals I0 to I3 are respectively LCS signals PT1, PT2, COM1, and COM2.

Macro data MACD read out from memory 11 changes every half a period of clock signal $\phi$3. Up-down counter 62 counts up the data when clock signal $\phi$2 input at terminal D/U is at L level, and counts down when clock signal $\phi$2 is at H level. Counter 62 counts up or down the data in accordance with the level at terminal D/U in synchronism with the leading edge of clock signal $\phi$0 input at clock terminal CK when a value input at terminal EN is "1". Unless the count value counted by up-down counter 62 is "0", an H-level signal is output from terminal CNT(0) to OR gate 53.

Signal DSELQ output from flip-flop **14*b* in timing control section 14 is input to terminals CK of flip-flops 65 and 66 through inverter 64. Data terminal D of flip-flop 65 is connected to power supply Vc, so that its D input is always set at H level. Reset terminal R of flip-flop 65 receives external control signal $\overline{\text{CHKEN}}$. When signal $\overline{\text{CHKEN}}$ is enabled (L level), the $\overline{\text{Q}}$ output from flip-flop 65 goes to L level, and is supplied to terminal R of up-down counter 62 and terminal R of flip-flop 66. Therefore, up-down counter 62 performs counting while control signal $\overline{\text{CHKEN}}$ is enabled (L level). When control signal $\overline{\text{CHKEN}}$ is disabled (H level), flip-flop 65 is reset, and its $\overline{\text{Q}}$ output goes to H level. Therefore, up-down counter 62 and flip-flop 66** are reset.

The Q output from flip-flop 66 is positively fed back and input to OR gate 63, and the output from up-down counter 62 or the Q output from flip-flop 66 is input to data input terminal D of flip-flop 66 through OR gate 63.

Upon starting of the LCS drive signal generator, check enable signal $\overline{\text{CHKEN}}$ is set at H level and is supplied to flip-flop 65, thus setting the $\overline{\text{Q}}$ output from flip-flop 65 at H level. Thus, the count value of up-down counter 65 is reset to "0", and the Q output (DRVERR) from flip-flop 66 is reset to L level.

After signal iSEL is set at H level to select the execution mode, signal $\overline{\text{CHKEN}}$ is set at L level, thus starting checking of LCS drive signals PT1, PT2, COM1, and COM2. Macro data MACD read out from memory 11 is output as LCS drive signals PT1, PT2, COM1, and COM2 from latch 29, and is input to data selector 61 at the same time. Macro data is read out from memory 11 every half a period of clock signal $\phi$3, i.e., every period of clock signal $\phi$2. Data selector 61 sequentially selects PT1, PT2, COM1, and COM2 during a period of clock signal $\phi$2 under the control of clock signals $\phi$1 and $\phi$2 and outputs the selected signals to up-down counter 62. FIG. 66 is the timing chart showing the operation of data selector 61. As shown in the timing chart of FIG. 66, data selector 61 selects PT1 when $\phi$1=$\phi$2=L level; PT2 when $\phi$1−H level and $\phi$2=L level; COM1 when $\phi$1=L level and $\phi$2=H level; and COM2 when $\phi$1=$\phi$2=H level.

Up-down counter 62 performs count-up (U) in synchronism with the leading edge of clock signal $\phi$0 if the EN input is "1" (H level) when clock signal $\phi$2 is at L level, and performs count-down (D) in synchronism with the leading edge of clock signal $\phi$0 if the EN input is "1" (H level) when clock signal $\phi$2 is at H level. As shown in the timing chart in FIG. 66, signals PT1 and PT2 are input to terminal EN with clock signal $\phi$2 is at L level, and signals COM1 and COM2 are input to terminal EN when clock signal $\phi$2 is at H level. Therefore, up-down counter 62 performs count-up if PT1 and PT2 are "1" (H level), and performs count-down if COM1 and COM2 are "1" (H level). Note that if the EN input is at L level, that is, if PT1, PT2, COM1, and COM2 are "0" (L level), up-down counter 62 performs no counting. In this manner, up-down counter 62 counts PT1+PT2−COM1−COM2 and accumulates them each time macro data MACD is read out from memory 11 and LCS drive signals PT1, PT2, COM1, and COM2 are generated. When one period Tw is ended, new period Tw is started, and signa DSELQ goes from H level to L level, the output from up-down counter 62 is input to terminal D of flip-flop 66 through OR gate 63. In this case, if the product of PT1+PT2−COM1−COM2 is not "0", since an H-level signal is output from terminal CNT(0) of counter 62, the Q output, that is, signal DRVERR, from flip-flop 66 goes to H level. The Q output (DRVERR) from flip-flop 66 is positively fed back to terminal D of flip-flop 66 through OR gate 63. Therefore, signal DRVERR which is once set at H level is maintained at H level unless signal CHKEN is reset to H level.

FIG. 67 is a circuit diagram of drive error detector 70 as another embodiment of the drive error detector. Detector 70 has substantially the same circuit configuration as that of detector 60, except that terminal D/U of up-down counter 62 receives clock signal $\phi$1, and I1 and I2 inputs of data selector 61 are respectively signals COM1 and PT2. FIG. 68 is a timing chart showing the operation of detector 70. As shown in FIG. 68, in the case of detector 70, data selector 61 selects signals in the order of PT1, COM2, PT2, and COM2, and outputs the selected signal to terminal EN of up-down counter 62. Therefore, up-down counter 62 calculates PT1−COM1+PT2−COM2 from the left. In detector 70, the product of PT1−COM1+PT2−COM2 during period Tw is counted by up-down counter 62. Unless the product="0", the CNT(0) output from up-down counter 62 goes to H level. Checking of the product of PT1−COM1+PT2−COM2 during period Tw is performed in synchronism with the trailing edge of signal DSEL every period. Once the Q output (DRVERR) from flip-flop 66 goes to H level, it is held at H level unless signal CHKEN is reset to H level, as in detector 60.

Figure 69:
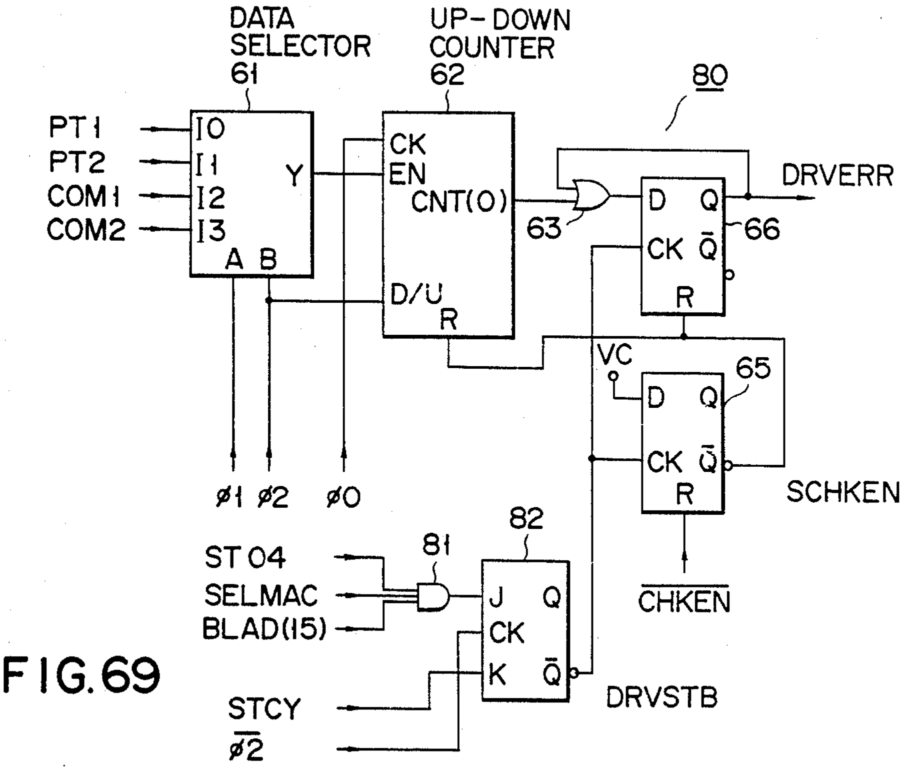
FIG. 69 is a circuit diagram of a third embodiment of the drive error detector.

FIG. 69 is a circuit diagram of drive error detector 80 for checking a product of PT1+PT2−COM1−COM2 during the ½ period (Tw/2) in correspondence with two-time divisional driving. The same reference numerals in FIG. 69 denote the same parts as in detector 60 shown in FIG. 65, and a detailed description thereof will be omitted. In FIG. 69, AND gate 81 receives signal STO4 output from down counter 15 for every ½ period (Tw/2), signal SELMAC output from timing control section 14, and output BLAD(15) output from up counter 18 for every ½ period (Tw/2). The output from AND gate 81 is supplied to terminal J of JK flip-flop 82. Terminal K of flip-flop 82 receives signal STCY output from down counter 15, and its clock terminal CK receives clock signal φ2. The $\overline{Q}$ output (DRVSTB) from flip-flop 82 is supplied to terminals CK of flip-flops 65 and 66.

Figure 70:
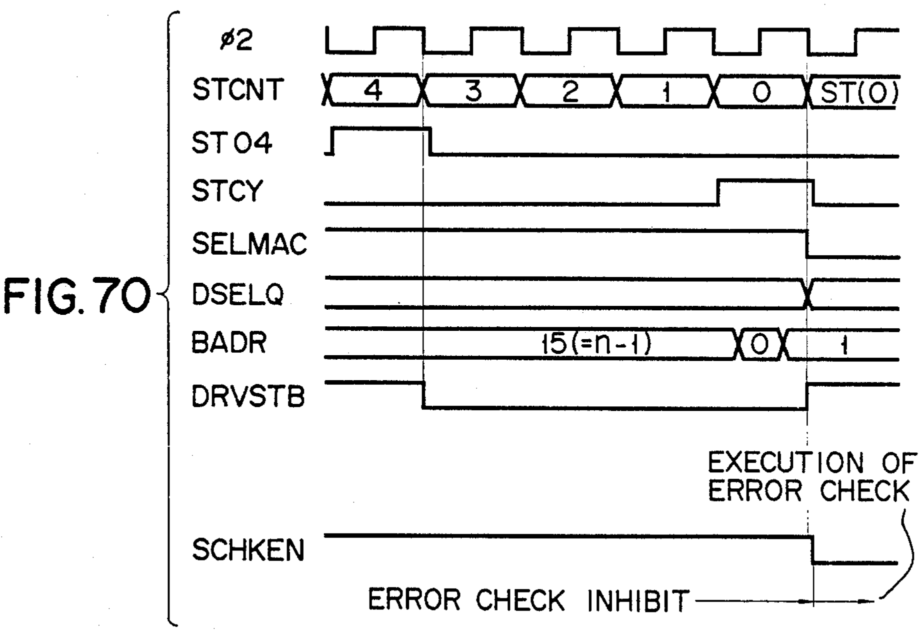
FIG. 70 is a timing chart of the drive error detector shown in FIG. 69.

FIG. 70 is a timing chart for explaining the operation of drive error detector 80 from the second half of period Tw to the first half of next period Tw. If block address signal BADR output from up counter 18 becomes "15" in the second half of period Tw, signal BLAD(15) from up counter 18 goes to H level and is supplied to AND gate 81. Down counter 15 counts down step count ST(y). When count value STCNT of counter 15 has reached "4", signal STO4 from down counter 15 goes to H level, and is supplied to AND gate 81. Since signal SELMAC output from timing control section 14 is at H level in the second half of periof Tw, an H-level signal is applied to terminal J of flip-flop 82 through AND gate 81 while signal STO4 is at H level. While signal STO4 is at H level, count value STCNT of down counter 15 is not "0". Therefore, signal STCY is at L level, and terminal K of flip-flop 82 is set at L level.

When clock signal $\overline{\phi 2}$ rises from L level to H level (clock signal φ2 falls from H level to L level), the $\overline{Q}$ output (DRVSTB) from flip-flop 82 is changed from H level to L level in synchronism therewith. Down counter 15 keeps counting down. When count value STCNT becomes "0", signal STCY output from down counter 15 goes to H level, and is supplied to terminal K of flip-flop 82. In this case, since signal STO4 output from down counter 15 is set at L level, terminal J of flip-flop 82 is at L level. Therefore, the $\overline{Q}$ output (DRVSTB) from flip-flop 82 goes from L level to H level in synchronism with the leading edge of clock signal $\overline{\phi 2}$ (the trailing edge of signal φ2). In response to the leading edge of signal DRVSTB, signal CNT(0) output from up-down counter 62 is input to terminal D flip-flop 66 through OR gate 63. Signal DRVSTB is held at H level. However, if signals BLAD(15), SELMAC, and STO4 go to H level in the last frame in the second half of period Tw, signal DRVSTB goes from H level to L level in synchronism with the leading edge of clock signa $\overline{\phi 2}$. After the lapse of a predetermined period of time, when signal STCY goes to H level immediately before the end of period Tw, signal DRVSTB goes from L level to H level in synchronism with the leading edge of clock signal $\overline{\phi 2}$, and the CNT(0) output from up-down counter 62 is input to terminal D of flip-flop 66 through OR gate 63.

In this manner, in detector 80, at the beginning of period Tw (beginning of the first half) and at the beginning of the second half of period Tw, the $\overline{Q}$ output (DRVSTB) from flip-flop 82 rises, and it is checked during the ½ period (Tw/2) if the product of PT1+PT2−COM1−COM2 is "0".

Figure 65:
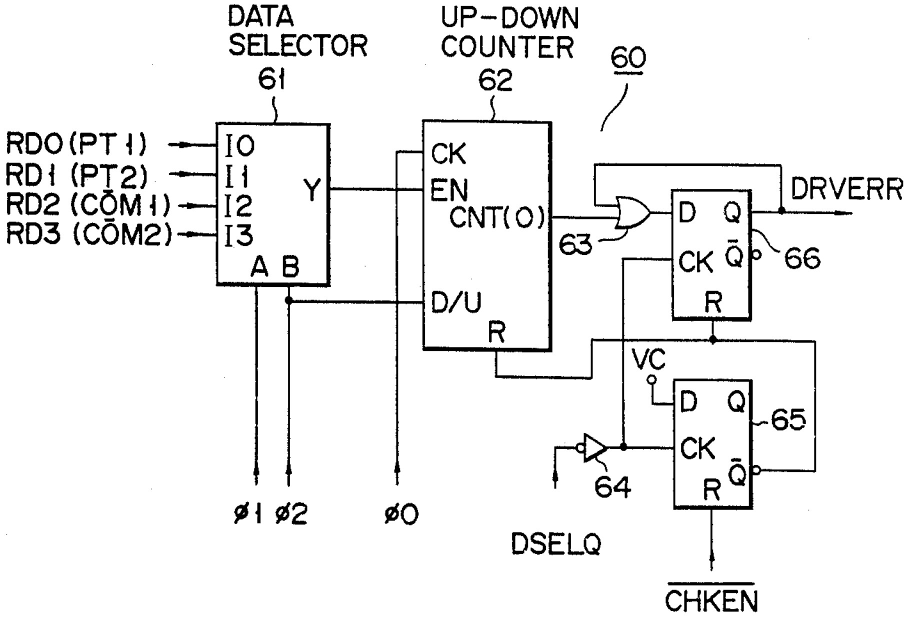
FIG. 65 is a circuit diagram showing a first embodiment of a drive error detector in the embodiment shown in FIGS. 64A, 64B, and 64C.
Figure 66:
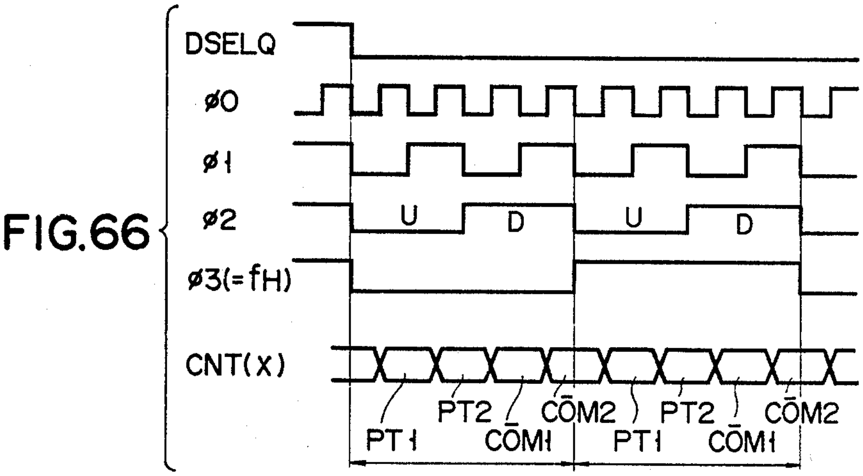
FIG. 66 is a timing chart of the drive error detector shown in FIG. 65.

In FIGS. 65, 67, and 69, the arrangement of up-down counter 62 may be freely modified. For example, in the case of FIG. 85, if the product of PT1+PT2−COM1−COM2 falls within the range of −1 to 126 during period Tw, counter 62 may have an 8-bit structure. If an 8-bit up-down counter is employed, it can count from 0 to 255, and count value "−1" is equal to count value "255".

In this manner, if an up-down counter having an n-bit structure satisfying the following condition with respect to maximum value Av of the absolute value of the possible products (PT1+PT2−COM1−COM2) is used, a problem due to overflow is not posed:

$$Av \leqq 2^n - 1.$$

Figures 94, 95:
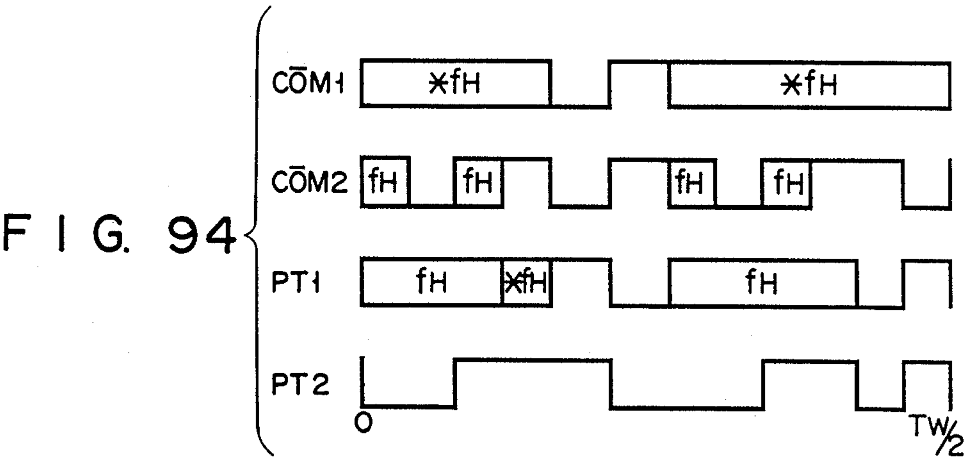
Figure 97:
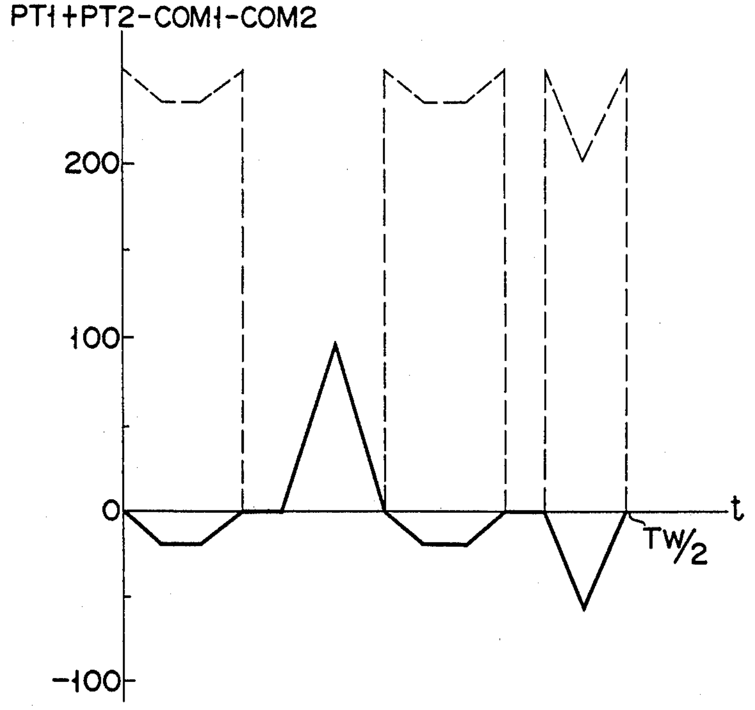
FIG. 97 is a graph showing a change within one period Tw when a product of PT1+PT2−COM1−COM2 using LCS drive signals COM1, COM2, PT1, and PT2 generated in accordance with step count STD and macro data MACD shown in FIGS. 95 and 96 is counted by an 8-bit up-down counter.

An embodiment will be described in more detail. In FIG. 97, the solid lines indicate changes in product of PT1+PT2−COM1−COM2 during the ½ period (Tw/2) when LCS drive signals PT1, PT2, COM1, and COM2 shown in FIG. 94 are generated based on step count data STD shown in FIG. 95 and macro data MACD shown in FIG. 96. As shown in FIG. 97, the product (PT1+PT2−COM1−COM2) takes both the negative and positive values. In this case, a negative count value counted by the 8-bit up-down counter changes is indicated by broken lines in FIG. 97. In this manner, when the 8-bit up-down counter is employed, negative values −1 to −255 are equal to positive values 255 to 1. Therefore, if the 8-bit up-down counter is used, additions can be performed without causing overflow when the product (PT1+PT2−COM1−COM2) changes within the range of −255 to 255.

Figure 98:
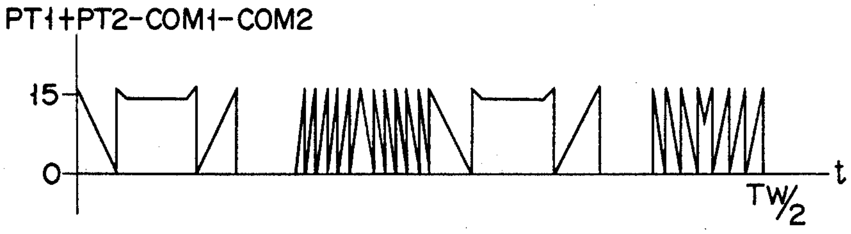
FIG. 98 is a graph showing a change within one period Tw when the product of PT1+PT2−COM1−COM2 is counted by a 4-bit up-down counter.

FIG. 98 shows count values of the product (PT1+PT2−COM1−COM2) when a 4-bit up-down counter is used.

In this case, since this up-down counter can only count from 0 to 15 (−1 to −14), overflow occurs. However, as can be seen from FIG. 98, if the product (PT1+PT2−COM1−COM2) during the ½ period (Tw/2) is "0", the count value becomes "0" after the lapse of duration Tw/2 in the same manner as in the 8-bit up-down counter. Since the up-down counter has the 4-bit structure, if the count value becomes a multiple of 16, the count value becomes "0". For this reason, if the 4-bit up-down counter is used, even if the product during the ½ period (Tw/2) is the multiple of 16, the count value becomes "0". Although reliability is rather degraded, since a probabilty of yielding a multiple of 16 is low, this arrangement can be satisfactorily applied to practical applications.

If step count data STD includes an error, since period Tw is changed, a length of a dot to be printed is changed, and image quality may be degraded. If waveforms of LCS drive signals PT1, PT2, COM1, and COM2 are changed, an image may be blurred. For this reason, in order to improve reliability of an image, it must be checked if step count data STD is normal. In this embodiment, parity check circuit 32 (FIG. 64B) for performing parity check of step count data STD is arranged. When parity check is performed by parity check circuit 32, the MSB of developing step count data, i.e., the 3rd bit of ST(x)H is used as parity bit PTY. For this reason, data STD defining the number of developing steps consists of 7 bits, and the maximum number of developing steps during each ½ frame is $2^7=128$, resulting in no problem.

Parity check circuit 32 performs ODD (odd-numbered) parity check. In this case, developing step count data STD is as shown in FIG. 72B.

As described above, developing step count data STD of macro data MACD is set in down counter 15 in synchronism with the beginning of the frame. At the same time, data STD is also input to EVEN parity generator 32*a* of parity check circuit 32 (FIG. 71). When parity of 8-bit developing step count data STD is EVEN (even number), i.e., an ODD parity error occurs, EVEN parity generator 32*a* sets output PE at H level and supplies it to NAND gate 32*b*. NAND gate 32*b* receives output STO4 from down counter 15 and external check enable signal $\overline{\text{CHKEN}}$ through inverter 32*c* in addition to PE. When the LCS drive signal generator is set in the execution mode, since signal $\overline{\text{CHKEN}}$ is at L level, parity error signal PE output from EVEN parity generator 32*a* passes through NAND gate 32*b* each time signal STO4 goes to H level, and is supplied to set terminal S of flip-flop 32*d*. For this reason, when parity error signal PE goes to H level, i.e., an ODD parity error occurs, the Q output (parity error signal PTYER) from flip-flop 32*d* goes to H level. Since signal STO4 output from down counter 15 goes to H level every ½ frame, EVEN parity check is performed every ½ frame. If once ODD parity error occurs, parity error signal PTYER is held at H level by flip-flop 32*d* unless external check enable signal $\overline{\text{CHKEN}}$ is set at H level to reset flip-flop 32*d*. In this embodiment, ODD parity check is performed, but EVEN parity check may be performed instead.

If external signals XBLCLK, XRBLAD, XSBLAD, XMWR, MEMSEL, and iSEL, and data buses iDBO-3 and ODBO-3 are connected to a microprocessor, data in memories 11 and 12 can be desirably rewritten under the control of the microprocessor. Therefore, almost infinite combinations of LCS drive signals PT1, PT2, COM1, and COM2 can be generated.

Even if optimal drive waveforms are drifted due to improvement or modification of an LCS liquid crystal material used in a liquid crystal head of the recording apparatus, the LCS drive signal generator can be readily used without modification.

The LCS panel is preferably heated to about 40° to 60° C. in favor of electrooptical characteristics to be used while keeping warm. When the LCS panel is used as an optical shutter in an electrophotographic printer, a light source is turned on to warm up the printer upon power-on, and the LCS panel is auxiliarily heated by radiation heat from the light source. In this case, if the LCS is of a normally-OFF type such as a guest-host type (normally, microshutters are OFF), there is no problem. However, if the LCS is of a normally-ON type such as a twisted nematic type or birefringence type (normally, microshutters are ON), light emitted from the light sources passes through the LCS, and is kept radiated on a predetermined portion of a photosensitive body. Therefore, the irradiated portion of the photosensitive body is degraded. For this reason, the photosensitive body is rotated to prevent degradation of the photosensitive body. In this case, a specific drive waveform for completely turning off (closing) the microshutters of the normally-ON type LCS can be applied to the microshutters, and a photosensitive drum need not be rotated.

When ON/OFF control of the microshutters of the LCS is performed by two-frequency driving, since the frequency of high-frequency signal fH is high, i.e., falls within the range of several tens of kHz to several hundreds of kHz, electrodes of the LCS panel is self heated due to a current. However, in order to prevent that the temperature of the LCS panel exceeds an optimal temperature (40° C. to 60° C.), a special drive waveform is preferably applied to the microshutters of the LCS, so that the LCS panel is stabilized at the optimal temperature.

In this manner, when a special drive waveform different from ones normally used is applied like in a warm-up state, the capacity of ROM 2 must be increased in the conventional waveform generating apparatus. However, in this embodiment, step count data ST(y)L and ST(y)H stored in memory 11 and macro data MACD stored in memory 12 can be rewritten. Therefore, the content of macro data DDATA is changed in the warm-up state and in a normal operation state, so that the special drive waveform can be generated without increasing a memory capacity.

In this embodiment, memories 11 and 12 comprise a RAM but may comprises an EEPROM (Electrical Erasable Read Only Memory). If the EEPROM is used, data write access upon starting of the generator can be omitted.

When external signals $\overline{\text{CHKEN}}$, DRVEN, PTYER, and DRVERR are also connected to the microprocessor, proper processing when a drive error or a parity error occurs can be performed under the control of the microprocessor.

For example, if a drive error occurs (signal DRVERR goes to H level) or if a parity error occurs (signal PTYER goes to H level), a DC component of the electric field is applied to the LCS, and the LCS may be electrically broken. Thus, signal DRVEN is set at H level, and LCS drive signals PT1, PT2, COM1, and COM2 are set at L level to reduce an electric field applied to the LCS to 0 V, so that no electric field is applied to the LCS.

When no electric field is to be applied to the LCS, precaution is necessary depending on the type of LCS used and developing method.

For example, when an image is recorded by the normal developing method using a normally-ON type LCS which is turned on in a non-electric field state, or when an image is recorded by the reversal developing method using a normally-OFF type LCS which is turned off in a non-electric field state, other processes (charging process, developing process) are performed while applying no electric field to the LCS, so that a solid black image may be developed on the photosensitive drum.

This development is wasteful, and accompanies waste of toner, contamination due to scattering of the toner inside the apparatus, wear of a cleaner, and the like. Therefore, charging of a charger and a developing bias voltage of the developer are appropriately controlled, so that no solid black image is developed on the photosensitive drum.

When a drive error or parity error occurs, an error signal is sent to the printer controller, and printing may be interrupted until a user turns off a power switch.

Printing may be repeated taking into consideration a drive error or parity error simply caused by an erroneous operation. In the case of an erroneous operation, printing is normally performed. However, if no erroneous operation is made and macro data or step count data includes an error, an error occurs again. If the number of times of errors has reached a predetermined number of times, an error signal may be sent to the printer controller to interrupt printing. If a drive error or parity error occurs, the LCS can be immediately prevented from being applied with an electric field. Therefore, after the drive error or parity error occurs as described above, if printing is repeated several times, the LCS may not be damaged.

The above embodiment exemplifies the wave shaping apparatus operated by 2-time divisional driving. However, the present invention may also be applied to a wave shaping apparatus operated by n-time divisional driving. In this case, it may be checked if the product of LCS application voltages during one period Tw is "0" or if the product of LCS application voltages every Tw/n is "0".

According to the above embodiment as described above, data for setting a one-frame period and data for designating a waveform are stored in a programmable memory, the waveform is developed, and it is checked if a DC component of an electric field applied to the LCS becomes "0" within one period. Therefore, the following advantages can be expected.

a. Almost infinite combinations of waveforms can be obtained.

b. Since data in the memory can be rewritten under the external control, if this embodiment is applied to generation of LCS drive waveforms, modifications of drive waveforms due to improvement or modifications of a liquid crystal material can be readily performed, resulting in easy maintenance.

c. It is checked if a DC component of an electric field applied to the LCS becomes "0" within one period. If the DC component is not "0", no electric field is applied to the LCS, and hence, the LCS can be prevented from being electrically broken due to a change in data or illegal write access.

d. A parity bit is added to step count data to perform parity check, so that an image with degraded image quality can be prevented from being printed, thus improving image reliability.

e. When this embodiment is applied to an LCS drive signal generator of a recording apparatus which performs optical write access using the normally-ON type LCS, a waveform for turning off microshutters of the LCS is applied to the microshutters in a warm-up state, so that a photosensitive body need not be rotated when an LCS panel is auxiliarily heated by a light source in the warm-up state, resulting in easy control. In addition, degradation of the photosensitive body can also be prevented.

f. For both the normal and reversal developing methods, data to be stored in a memory can be rewritten to record identical video data.

What is claimed is:

1. A drive waveform generating apparatus for driving a liquid crystal device, comprising:

memory means for storing waveform data for designating a drive waveform of said liquid crystal device and duration data for designating a duration for which the drive waveform designated by the waveform data is to be supplied, and for outputting the waveform data and the duration data in accordance with an input address designation signal;

drive waveform output means for receiving the waveform data and a clock signal having a predetermined period and a predetermined phase and outputting a plurality of drive waveforms designated by the waveform data from corresponding output terminals;

measuring means for receiving the duration data and measuring the duration designated by the duration data; and count means which is incremented by a predetermined value when said measuring means completes measurement of the duration designated by the duration data, and outputs a count value serving as an address designation signal to be input to said memory means.

2. An apparatus according to claim 1, wherein the duration data includes a parity bit for detecting an error of the waveform data and the duration data and is stored in said memory means.

3. An apparatus according to claim 1, wherein said drive waveform output means selects, in accordance with the waveform data, one of:

the clock signal having the predetermined period and the predetermined phase, a clock signal having a phase opposite to the predetermined phase, a DC signal of a predetermined voltage, and a zero-volt signal, and outputs the selected signal from the corresponding output terminals.

4. An apparatus according to claim 1, wherein said drive waveform output means serves as second memory means having a plurality of address input terminals and a plurality of output terminals, said plurality of address input terminals receiving an address signal including the waveform data and the clock signal having the predetermined period and the predetermined phase, and said drive waveform output means outputs, from corresponding one of said plurality of output terminals, one of:

the clock signal having the predetermined period and the predetermined phase, a clock signal having a phase opposite to the predetermined phase, a DC signal of a predetermined voltage, and a zero-volt signal.

5. An apparatus according to claim 1, wherein said memory means comprises programmable memory means.

6. An apparatus according to claim 1, wherein said memory means comprises read-only memory means.

7. An apparatus according to claim 4, wherein said second memory means comprises programmable memory means.

8. An apparatus according to claim 4, wherein said second memory means comprises read-only memory means.

9. A drive waveform generating apparatus for driving a liquid crystal device, comprising:

first memory means for storing a drive waveform and outputting the drive waveform in accordance with an input address designation signal;

second memory means for storing duration data for designating a duration for which the drive waveform is to be supplied, and outputting the duration data in accordance with an input address designation signal;

measuring means for receiving the duration data and measuring the duration designated by the duration data; and count means which is incremented by a predetermined value when said measuring means completes measurement of the duration designated by the duration data, and outputs a count value serving as an address designation signal to be input to said second memory means, wherein an address designation signal input to said first memory means includes the count value output from said count means and a clock signal having a predetermined period and a predetermined phase.

10. An apparatus according to claim 9, wherein said first memory means has a plurality of output terminals, and outputs, from corresponding one of said output terminals, one of:

the clock signal having the predetermined provide and the predetermined phase, a clock signal having a phase opposite to the predetermined phase, a DC signal of a predetermined voltage, and a zero-volt signal.

11. An apparatus according to claim 9, wherein said drive waveform generating apparatus further comprises:

detecting means for detecting whether or not an integrated value of voltage waveforms applied to a liquid crystal material of said liquid crystal device becomes zero for each predetermined duration; and means for inhibiting application of a voltage to said liquid crystal material when said detecting means detects that the integrated value is not zero.

12. An apparatus according to claim 9, wherein the duration data includes a parity bit for detecting an error of the duration data and is stored in said second memory means.

13. An apparatus according to claim 9, wherein said first memory means comprises programmable memory means.

14. An apparatus according to claim 9, wherein said first memory means comprises read-only memory means.

15. An apparatus according to claim 9, wherein said second memory means comprises programmable memory means.

16. An apparatus according to claim 9, wherein said second memory means comprises read-only memory means.

17. An apparatus according to claim 1 or 9, wherein said measuring means comprises a down counter for counting down the duration data as an initial value in accordance with a predetermined clock signal, and said count means is incremented by a predetermined count in association with an output signal generated when a count value of said down counter has reached a predetermined value.

18. An apparatus according to claim 1 or 9, wherein said liquid crystal device comprises a liquid crystal optical shutter for transmission-controlling light emitted from a light source, and radiating the transmission-controlled light to a photosensitive body.

19. An apparatus according to claim 3, 4, or 10, wherein a dielectric anisotropy of the liquid crystal material adopted in said liquid crystal device changes in accordance with a frequency of an electric field to be applied, and becomes zero when said liquid crystal material is applied with an electric field of a crossover frequency, a frequency of the clock signal having the predetermined period being higher than the crossover frequency.

* * * * *